(12) United States Patent
Jones

(10) Patent No.: US 7,433,885 B2
(45) Date of Patent: Oct. 7, 2008

(54) SYSTEM AND METHOD FOR MULTI-DIMENSIONAL ORGANIZATION, MANAGEMENT, AND MANIPULATION OF DATA

(75) Inventor: Dennis Benson Jones, Blacksburg, VA (US)

(73) Assignee: Quantum Matrix Holdings, LLC, Littleton, CO (US)

( * ) Notice: Subject to any disclaimer, the term of this patent is extended or adjusted under 35 U.S.C. 154(b) by 304 days.

(21) Appl. No.: 11/011,451

(22) Filed: Dec. 15, 2004

(65) Prior Publication Data

US 2005/0131924 A1 Jun. 16, 2005

Related U.S. Application Data

(60) Provisional application No. 60/529,174, filed on Dec. 15, 2003.

(51) Int. Cl.
G06F 17/30 (2006.01)
(52) U.S. Cl. .................. 707/102; 707/10; 707/101; 707/103 R; 715/234
(58) Field of Classification Search .............. 707/3, 707/10, 101, 102, 103 R; 715/234; 345/440
See application file for complete search history.

(56) References Cited

U.S. PATENT DOCUMENTS

| | | | | |
|---|---|---|---|---|
| 4,523,226 A * | 6/1985 | Lipton et al. | .................. | 348/49 |
| 5,295,243 A * | 3/1994 | Robertson et al. | ........... | 715/848 |
| 5,666,472 A * | 9/1997 | Huddy | ........................ | 345/419 |
| 5,767,854 A * | 6/1998 | Anwar | ........................ | 715/848 |
| 5,896,139 A | 4/1999 | Strauss | | |
| 5,983,232 A * | 11/1999 | Zhang | ........................ | 707/102 |
| 6,064,353 A * | 5/2000 | Hoshi | ........................... | 345/7 |
| 6,877,006 B1 * | 4/2005 | Vasudevan | .................... | 707/10 |
| 7,152,071 B2 * | 12/2006 | Xing | ........................... | 707/101 |
| 2001/0043237 A1 * | 11/2001 | Schmieder | .................. | 345/839 |
| 2004/0243593 A1 * | 12/2004 | Stolte et al. | ................. | 707/100 |

OTHER PUBLICATIONS

Jones, Dennis B. "The Quantum Matrix: A Three Dimensional Data Intergration and Collaboration Tool For Virtual Environments." Sixth Design and Decision Support Systems in Architecture and Urban Planning_Part one: Architecture Proceedings Avegoor, The Netherlands, 2002, pp. 200-229.*

Dennis B. Jones, "The Quantum Matrix: A Three Dimensional Data Integration and Collaboration Tool for Virtual Environments", Sixth Design and Decision Support Systems in Architecture and Urban Planning_Part one: Architecture Proceedings Avegoor, The Netherlands, 2002, pp. 200-229.

International Search Report dated Jan. 18, 2006.

* cited by examiner

*Primary Examiner*—Shahid A Alam
(74) *Attorney, Agent, or Firm*—Sterne, Kessler, Goldstein & Fox P.L.L.C.

(57) ABSTRACT

The Quantum Matrix system is a multi-dimensional, multi-threaded exchange environment for data organization, management, and manipulation. Data is organized into a multi-dimensional structure of nodes. Nodes may represent data, absence of data, or another set of nodes. The multi-dimensional structure or portions of it can be automatically created from a file system. One or more associations are also defined for the multi-dimensional structure. An association indicates a relationship between a node and another node, data, or a set of nodes. The multi-dimensional structure is then displayed three-dimensionally and navigated. Relational logic, Boolean algebra, or a scripting language can be applied to the nodes, data, and associations to produce a resultant set of nodes. Furthermore, portions of the multi-dimensional structure can be isolated with the use of planes to ease navigation. Furthermore, Avatars may be displayed and used for collaborative purposes and to automate the navigation of the multi-dimensional structure.

26 Claims, 103 Drawing Sheets

DQube - ActiveX CONTROL

SetSelEndCol (Args...)
GetSelEndRow (Args...)
SetSelEndRow (Args...)
GetAllowSplitters (Args...)
SetAllowSplitters (Args...)
GetQueryByPass (Args...)
SetQueryByPass (Args...)
GetDataPath (Args...)
SetDataPath (Args...)
GetDataNotAvailableCaption (Args...)
SetDataNotAvailableCaption (Args...)
GetFields (Args...)
GetRowFields (Args...)
GetColFields (Args...)
GetDataFields (Args...)
GetHiddenFields (Args...)
GetPageFields (Args...)
GetPageFieldsVisible (Args...)
SetPageFieldsVisible (Args...)
GetPrinterOrientation (Args...)
SetPrinterOrientation (Args...)
GetNextCol (Args...)
GetNextRow (Args...)
GetColDepth (Args...)
GetRowDepth (Args...)
Refresh (Args...)
PrintPreview (Args...)
Print (Args...)
RefreshDate (Args...)
RecalcData (Args...)
DataPosition (Args...)
GetColWidth (Args...)
SetColWidth (Args...)
GetDataValue (Args...)
GetIsNull (Args...)
GetCubeBackColor (Args...)
SetCubeBackColor (Args...)
GetFilteredFieldBackColor (Args...)
SetFilteredFieldBackColor (Args...)
GetFilteredFieldForeColor (Args...)
SetFilteredFieldForeColor (Args...)
GetFilteredFieldFont (Args...)
SetFilteredFieldFont (Args...)
SetRefFilteredFieldFont (Args...)
GetHeaderBackColor (Args...)
SetHeaderBackColor (Args...)
GetHeaderForeColor (Args...)
SetHeaderForeColor (Args...)
GetHeaderFont (Args...)
SetHeaderFont (Args...)
SetRefHeaderFont (Args...)
GetFooterBackColor (Args...)
SetFooterBackColor (Args...)
GetFooterForeColor (Args...)
SetFooterForeColor (Args...)
GetFooterFont (Args...)
SetFooterFont (Args...)

24-6

DQube - ActiveX CONTROL

SetRefFooterFont (Args...)
GetLoadProgressNotifyDelay (Args...)
SetLoadProgressNotifyDelay (Args...)
Save (Args...)
Load (Args...)
GetColHeading (Args...)
GetRowHeading (Args...)
AddRow (Args...)
About (Args...)
CalcHit (Args...)
AddRowEx (Args...)
GetPrintRowFieldNames (Args...)
SetPrintRowFieldNames (Args...)
GetPrintColFieldNames (Args...)
SetPrintColFieldNames (Args...)
GetDriverPrompt (Args...)
SetDriverPrompt (Args...)
_DDRenderToCanvas (Args...)
GetPassword (Args...)
SetPassword (Args...)
GetMousePointer (Args...)
SetMousePointer (Args...)
GetPrinterSizeToFit (Args...)
SetPrinterSizeToFit (Args...)
SetPreviewColumnWidth (Args...)
GetPreviewColumnWidth (Args...)
GetPreviewColumnCount (Args...)
GetTextValue (Args...)
EnsureVisible (Args...)
ExpandRow (Args...)
ExpandColumn (Args...)
IsRowHeadingExpanded (Args...)
IsColumnHeadingExpanded (Args...)
GetMaxColDepth (Args...)
GetMaxRowDepth (Args...)
IsColumnHasTotal (Args...)

FIG. 27

27-1 — CF1Book - ActiveX Control Class Library

CvcFootnote
CvcFrame
CvcGradient
CvcHiLo
CvcIntersection
CvcLabel
CvcLabels
CvcLCoor
CvcLegend
CvcLight
CvcLightSource
CvcLightSources
CvcLocation
CvcMarker
CVcPen
CvcPicture
CvcPie
Cvcplot
CvcPlotBase
CvcPrintInformation
CVcRect
CvcSeries
CveSeriesCollection
CvcSeriesLabel
CvcSeriesMarker
CveSeriesPosition
CvcShadow
CvcStatLine
CVeSurface
CvcTextLayout
CvcTick
CVcTitle
CvcValueScale
CVcView3d
CvcWall
CvoWeighting
CVcXYZ
sAmWFetchData

FIG. 35

35-1
CTX4OLE - ActiveX Control

SetClipChildren
SetClipSiblings
SetControlChars
SetCurrentPages
SetDataFormat
SetDataText
SetEditMode
SetEnabled
SetEnableHyperlinks
SetFieldChangeable
SetFieldCurrent
SetFieldDeleteable
SetFieldEnd
SetFieldPosX
SetFieldPosY
SetFieldStart
SetFieldText
SetFontBold
SetFontItalic
SetFontName
SetFontSize
SetFontStrikethru
SetFontUnderline
SetFontUnderlineStyle
SetForeColor
SetFormatSelection
SetFrameDistance
SetFrameLineWidth
SetFrameStyle
SetHideSelection
SetHWnd
SetImageDisplayMode
SetImageFilename
SetImageFilters
SetImageSaveMode
SetIndentB
SetIndentFL
SetIndentL
SetIndentR
SetIndentT
SetInsertionMode
SetLanguage
SetLineSpacing
SetLineSpacingT
SetMousePointer
SetNextWindow
SetObjectCurrent
SetObjectScaleX
SetObjectScaleY
SetObjectSizeMode
SetObjectTextflow
SetPageHeight
SetPageMarginB
SetPageMarginL
SetPageMarginR
SetPageMarginT
SetPageWidth
SetPrintColors 35-2
CTX4OLE - ActiveX Control
SetPrintDevice
SetPrintOffset
SetPrintZoom
SetRTFSelText
SetRulerHandle
SetScrollBars
SetScrollPosX
SetScrollPosY
SetSelLength
SetSelStart
SetSelText
SetSizeMode
SetStatusBarHandle
SetTabCurrent
SetTabKey
SetTableAtInputPos
SetTableCanChangeAttr
SetTableCanDeleteLines
SetTableCanInsert
SetTableColAtInputPos
SetTableGridLines
SetTableRowAtInputPos
SetTabPos
SetTabType
SetText
SetTextBkColor
SetViewImagePath
SetViewMode
SetViewSection
SetVTSpellDictionary
SetZoomFactor Operations AboutBox
Clip
FieldDelete
FieldInsert
FieldNext
FindReplace
FontDialog
GetFieldData
GetFieldEditAttr
GetLoadSaveAttribute
GetObjectDistance
GetTableCellText
GetTableColumns
GetTableRows
Load
ObjectDelete
ObjectInsertAsChar
ObjectInsertFixed
ObjectNext
ParagraphDialog
PrintPage
Redo
Refresh 35-3
CTX4OLE - ActiveX Control

RTFExport
RTFImport
Save
SetFieldData
SetFieldEditAttr
SetLoadSaveAttribute
SetObjectDistance
SetTableCellText
TableAttrDialog
TableDeleteLines
ViewNextHighlight 35-4
CTXBBAR - ActiveX Control

RTFExport
RTFImport
Save
SetFieldData
SetFieldEditAttr
SetLoadSaveAttribute
SetObjectDistance
SetTableCellText
TableAttrDialog
TableDeleteLines
ViewNextHighlight 35-5
CTXRULER - ActiveX Control

RTFExport
RTFImport
Save
SetFieldData
SetFieldEditAttr
SetLoadSaveAttribute
SetObjectDistance
SetTableCellText
TableAttrDialog
TableDeleteLines
ViewNextHighlight 35-6
CTXSBAR - ActiveX Control

RTFExport
RTFImport
Save
SetFieldData
SetFieldEditAttr
SetLoadSaveAttribute
SetObjectDistance
SetTableCellText
TableAttrDialog
TableDeleteLines
ViewNextHighlight

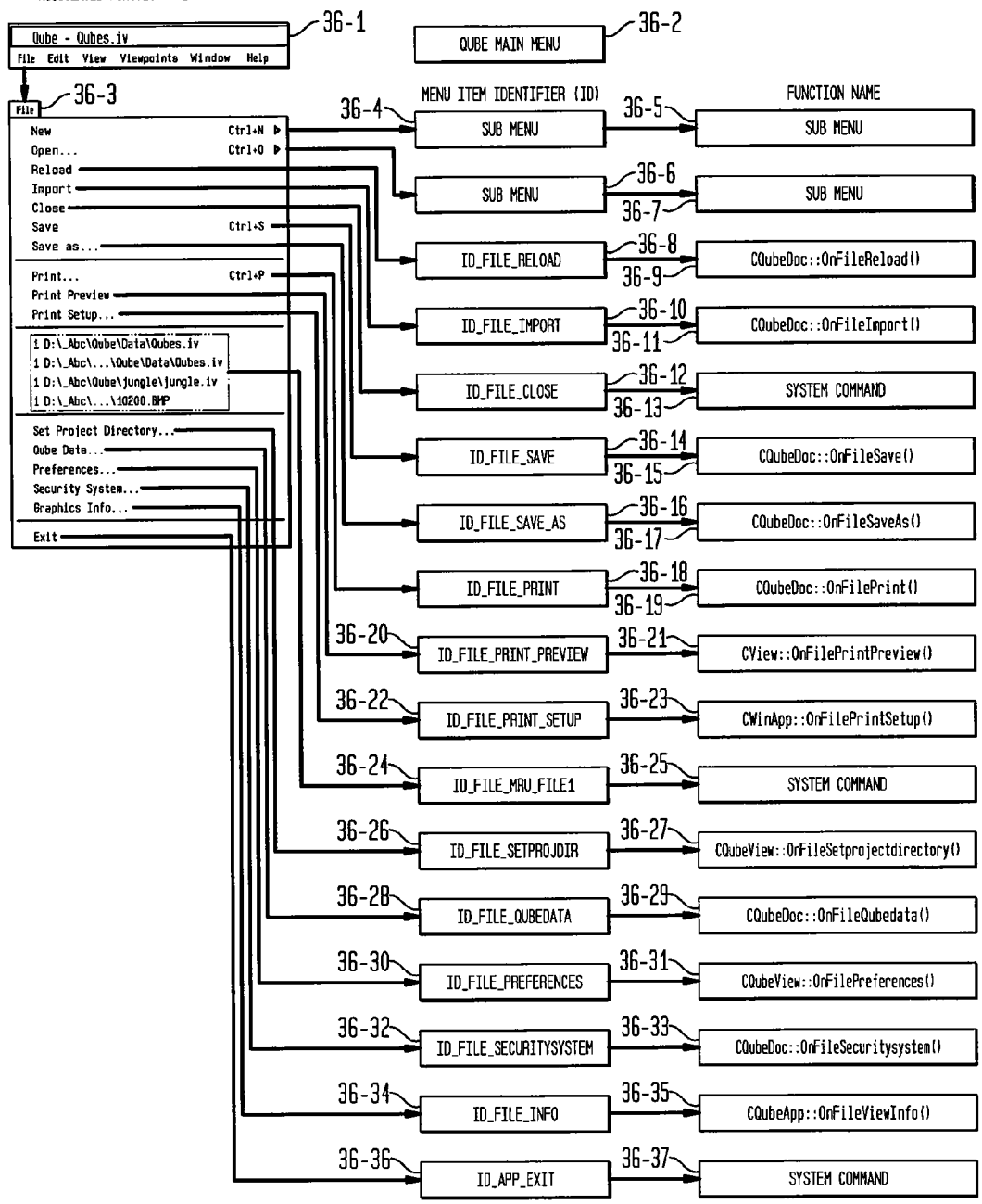

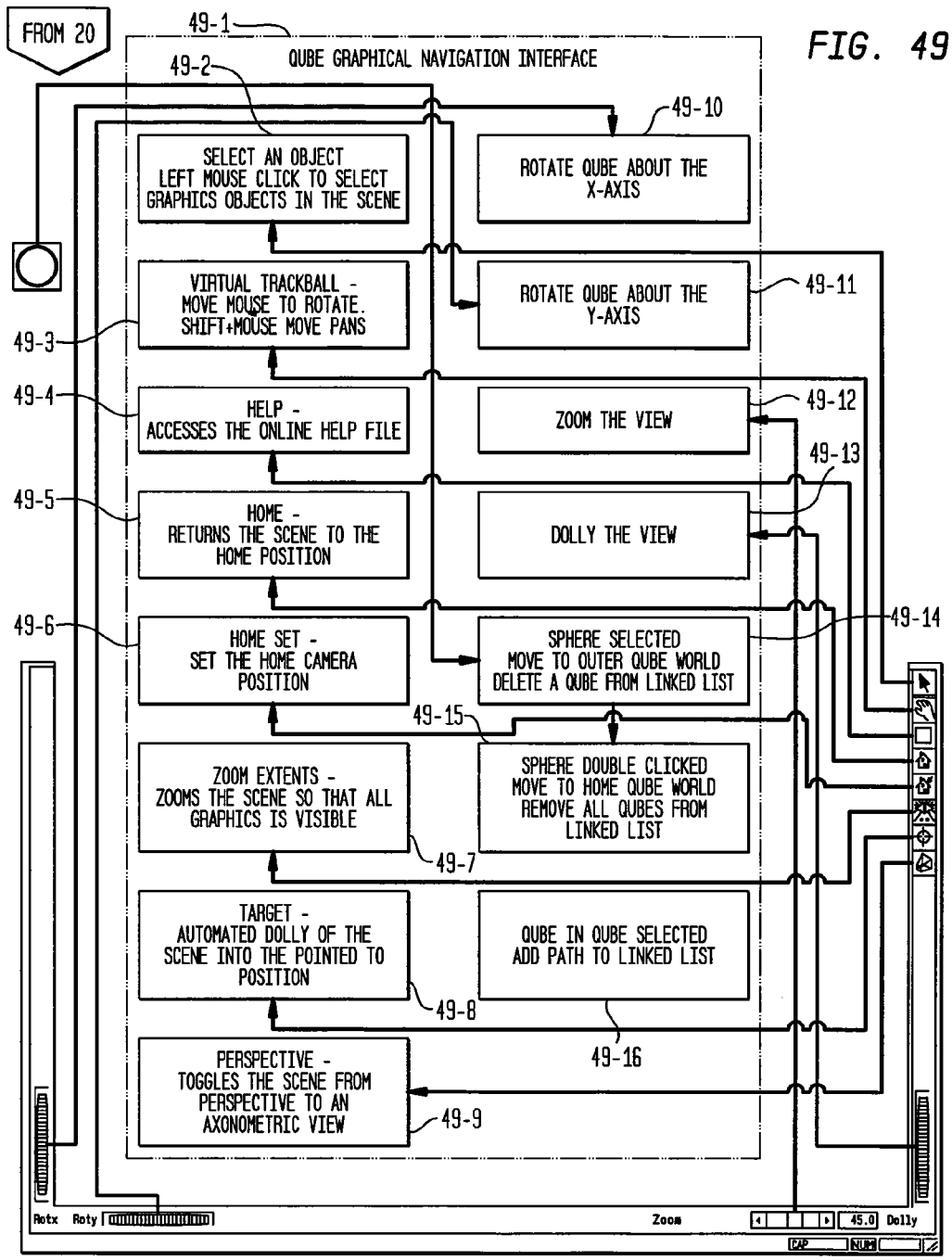

FIG. 49

Qube Navigation Interface

The navigation features are related to object selection and the graphics viewport. These commands are connected to the window's perimeter buttons and controls.

These commands are executed automatically via the windows event messaging system either when an object is selected and the mouse is moved or when a navigation control button is pressed. In the later case the command effects a viewport change.

Figure 42 illustrates the object in a IVF MDI application. Note there is no fundamental difference between the object relationships in an IVF application and an MFC application. An IVF application is an MFC application. The Quantum Matrix is an MFC MDI application.

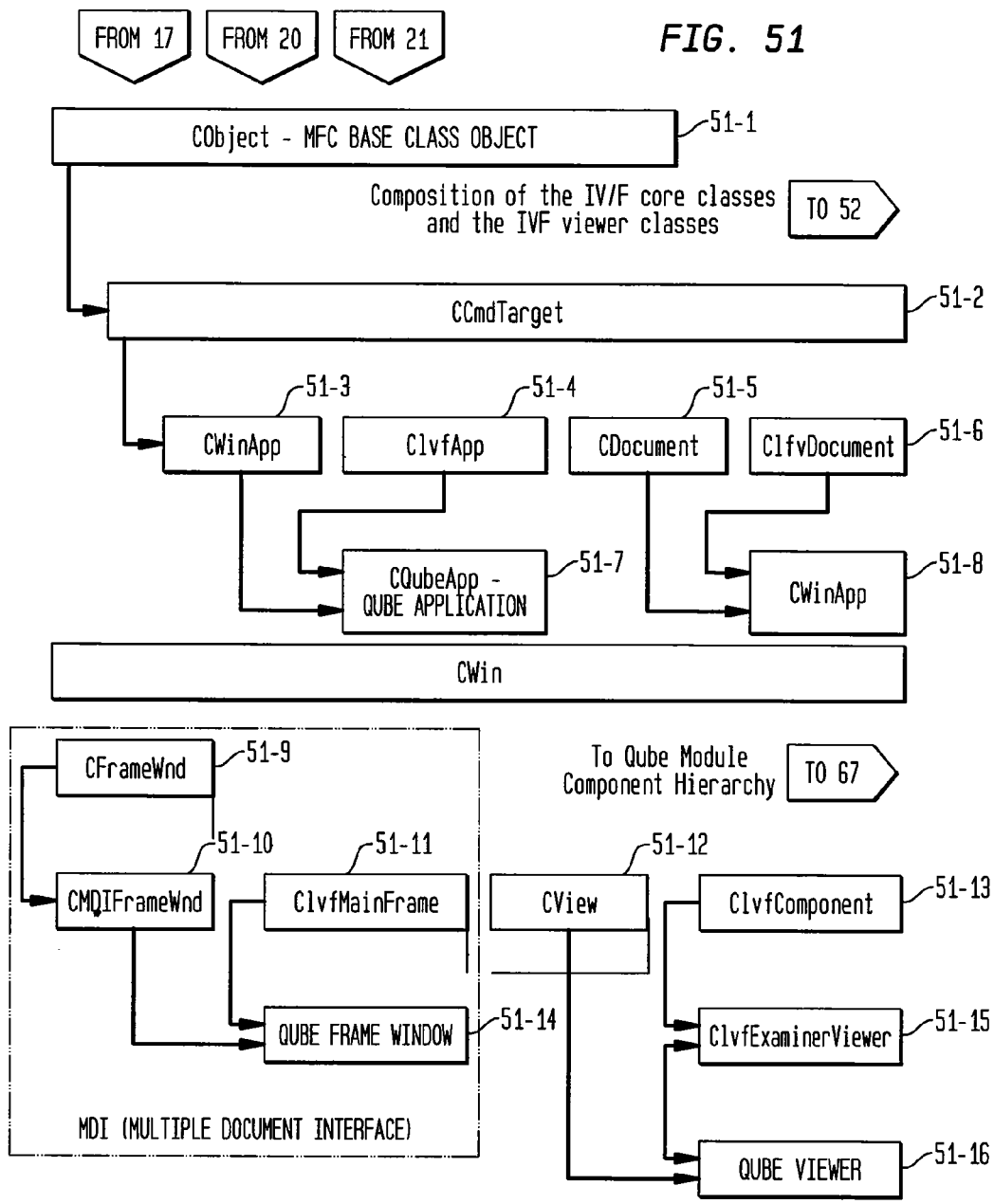

Figure 51 Objects in an IVF (Inventor) MDI Application. Arrows show direction of communication flow.

In an IVF application, the application, document, main frame window, and view objects have been endowed with additional functionality. The additional functionality enables the standard MFC (Microsoft Foundation Class) objects to interact appropriately with the core Open Inventor Library and the Open Inventor User Interface Component Library. The addition of functionality to the standard MFC objects is achieved through the use of multiple inheritances.

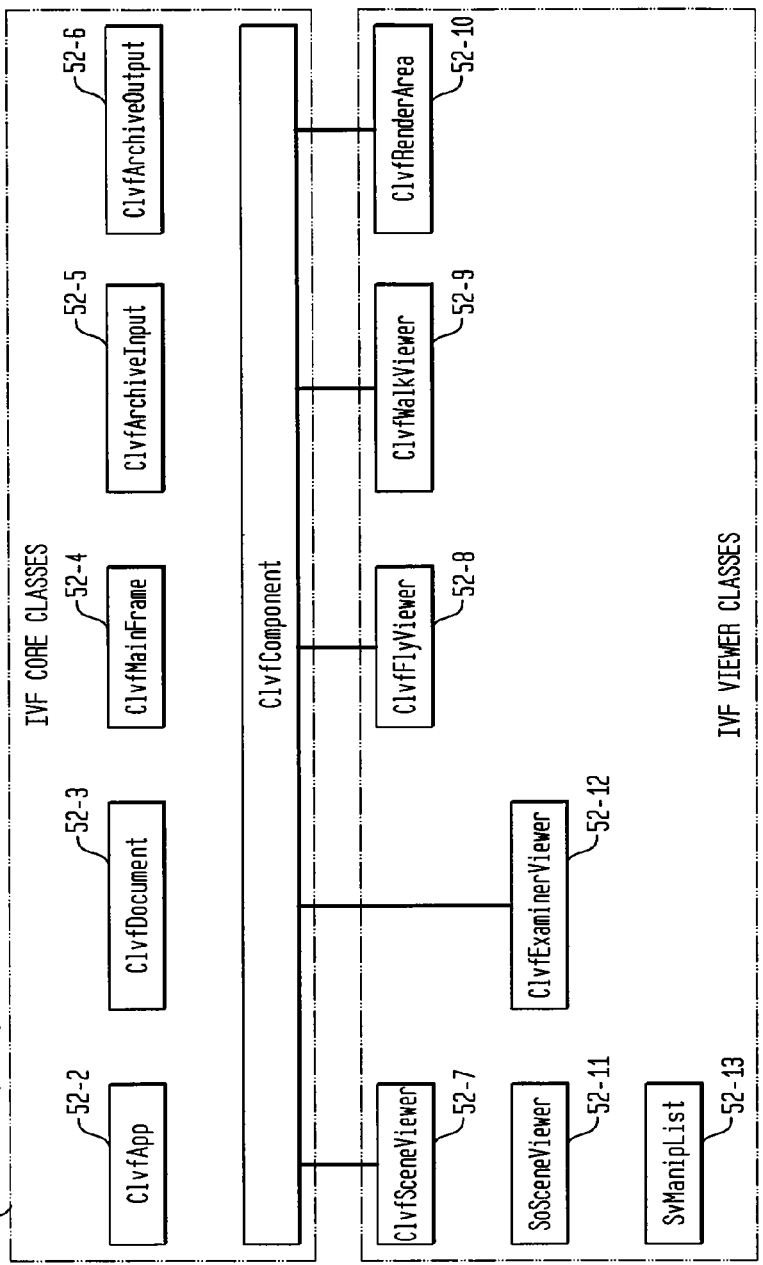

FIG. 62

THE AUDIO AND VIDEO APPLICATIONS REQUIRE A GRAPHICALLY SOPHISTICATED INTERFACE TO SIMULATE A REAL CD AND VIDEO PLAYERS. THE CROSE ACTIVEX COMPONENT ALLOWS ONE TO CREATE COMPLEX DIALOG BOX TYPE CONTROLS REQUIRED BY THE QUANTUM MATRIX PROGRAM

AUDIO DIALOG

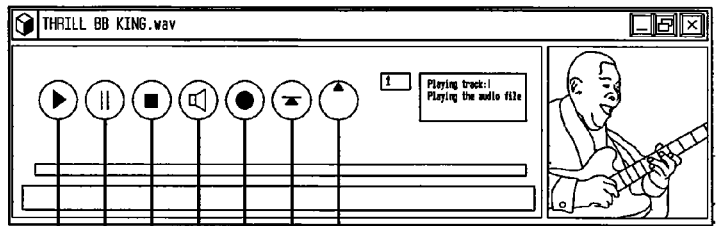

62-100

BUTTON PRESS EVENT CALLS FUNCTION IN AUDIO APPLET

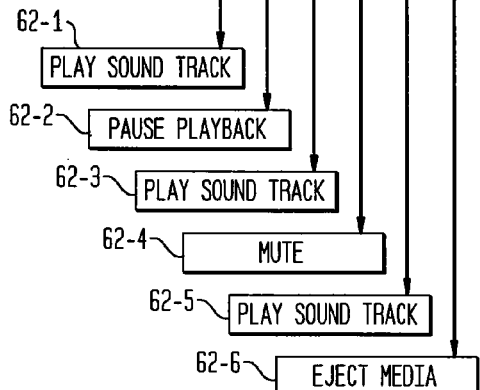

62-1 PLAY SOUND TRACK
62-2 PAUSE PLAYBACK
62-3 PLAY SOUND TRACK
62-4 MUTE
62-5 PLAY SOUND TRACK
62-6 EJECT MEDIA
62-7 VOLUME CONTROL

VIDEO DIALOG

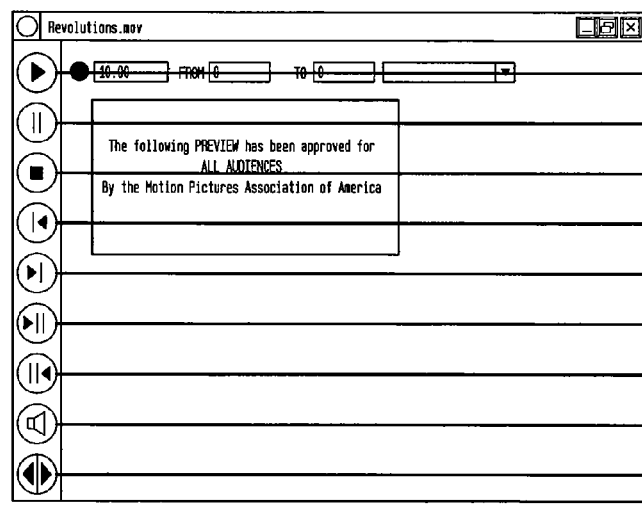

62-200

BUTTON PRESS EVENT CALLS FUNCTION IN VIDEO APPLET

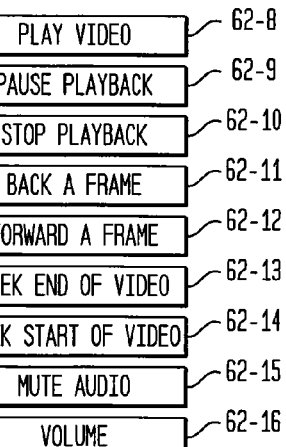

62-8 PLAY VIDEO
62-9 PAUSE PLAYBACK
62-10 STOP PLAYBACK
62-11 BACK A FRAME
62-12 FORWARD A FRAME
62-13 SEEK END OF VIDEO
62-14 SEEK START OF VIDEO
62-15 MUTE AUDIO
62-16 VOLUME

FIG. 63

COMPLETE LIST OF FUNCTIONS FOR THE CRose CLASS. THIS CLASS IS USED IN BOTH THE AUDIO AND VIDEO APPLETS.

FROM 62

63-1

CRose
EXTENDED DIALOG BOX ActiveX CONTROL

GetCIsid()
Create()

ATTRIBUTES

GetAutoButtonBorder()
GetBackColor()
GetBackgroundColor()
GetBackgroundMode()
GetBitmapPath()
GetBitmapResource()
GetButtonPolygonBorder()
GetColorBits()
GetCustomColorPalette()
GetDrawMode()
GetErrorDialogBox()
GetFillStyle()
GetFontBold()
GetFontItalic()
GetFontName()
GetFontSize()
GetFontStrikeout()
GetFontUnderline()
GetForeColor()
GetFullBackground()
GetHInstanceBitmapResource()
GetHWnd()
GetLabelAlignHorz()
GetLabelAlignVert()
GetLabelFontBold()
GetLabelFontItalic()
GetLabelFontName()
GetLabelFontSize()
GetLabelForeColor()
GetLabelMarginHorz()
GetLabelMarginVert()
GetLabelShadow()
GetLabelShadowColor()
GetObjectHeight()
GetObjectWidth()
GetPenStyle()
GetPenWidth()
GetPicture()
GetPolygonBorder()
GetPolygonBorderColor()
GetPolygonBorderWidth()
GetPolygonColor()
GetPolygonFill()
GetScreenHeight()
GetScreenWidth()
GetShowToolTip()
GetStatusbarAlignHorz()
GetStatusbarAlignVert()
GetStatusbarFontBold()
GetStatusbarFontName()
GetStatusbarFontSize()
GetStatusbarFontColor()
GetStatusbarH()
GetStatusbarMarginHorz()
GetStatusbarMarginVert()
GetStatusbarShadow()

63-2

CRose
EXTENDED DIALOG BOX ActiveX CONTROL

GetStatusbarShadowColor()
GetStatusbarW()
GetStatusbarX()
GetStatusbarY()
GetTextAlign()
GetToolTip3D()
GetToolTipBitmap()
GetToolTipFontBold()
GetToolTipFontSize()
GetToolTipForeColor()
GetToolTipTime()
GetVisible()
GetWallpaper()
long()
long()
SetAutoButtonBorder()
SetBackColor()
SetBackgroundColor()
SetBackgroundMode()
SetBitmapPath()
SetBitmapResource()
SetButtonPolygonBorder()
SetColorBits()
SetCustomColorPalette()
SetDrawMode()
SetErrorDialogBox()
SetFillStyle()
SetFontBold()
SetFontItalic()
SetFontName()
SetFontSize()
SetFontStrikeout()
SetFontUnderline()
SetForeColor()
SetFullBackground()
SetHInstanceBitmapResource()
SetHWnd()
SetLabelAlignHorz()
SetLabelAlignVert()
SetLabelFontBold()
SetLabelFontItalic()
SetLabelFontName()
SetLabelFontSize()
SetLabelForeColor()
SetLabelMarginHorz()
SetLabelMarginVert()
SetLabelShadow()
SetLabelShadowColor()
SetObjectHeight()
SetObjectWidth()
SetPenStyle()
SetPenWidth()
SetPicture()
tForm()
Toggle()
SetPolygonBorder()
SetPolygonBorderColor()
SetPolygonBorderWidth()
SetPolygonColor()

63-3

CRose
EXTENDED DIALOG BOX ActiveX CONTROL

SetPolygonFill()
SetScreenHeight()
SetScreenWidth()
SetShowToolTip()
SetStatusbarAlignHorz()
SetStatusbarAlignVert()
SetStatusbarFontBold()
SetStatusbarFontName()
SetStatusbarFontSize()
SetStatusbarForeColor()
SetStatusbarH()
SetStatusbarMarginHorz()
SetStatusbarMarginVert()
SetStatusbarShadow()
SetStatusbarShadowColor()
SetStatusbarW()
SetStatusbarX()
SetStatusbarY()
SetTextAlign()
SetToolTip3D()
SetToolTipBackColor()
SetToolTipBitmap()
SetToolTipFontBold()
SetToolTipFontSize()
SetToolTipForeColor()
SetToolTipShadowColor()
SetToolTipTime()
SetVisible()
SetWallpaper()
    OPERATIONS
AboutBox()
AddButton()
AddObject()
DeleteAnimation()
DeleteTimer()
DrawArc()
DrawChord()
DrawCircle()
DrawEllipse()
DrawLine()
DrawPicture()
DrawPie()
DrawRectangle()
DrawRoundRect()
DrawText()
DrawTranspPicture()
EnableAnimation()
EndForm()
StartForm()
Toggle()
GetButtonFrame()
GetButtonHeight()
GetButtonOn()
GetButtonState()
GetButtonStatusbar()
GetButtonValue()
GetButtonWidth()
GetButtonX()
GetButtonY()

63-4

CRose
EXTENDED DIALOG BOX ActiveX CONTROL

GetCharSetType()
GetContolInfo()
GetCurrentForm()
GetPolygonBound()
GetPrevForm()
GetTextHeight()
GetTextWidth()
IsButtonActive()
IsInsideButton()
LoadScript()
Maximize()
MoveControl()
OpenForm()
OpenPrevForm()
Paint()
PressButton()
Repaint()
ResetControl()
RunScript()
SaveBitmap()
SaveButtons()
SetAnimation()
SetButtonColor()
SetButtonFocus()
SetButtonFocus2()
SetButtonFrame()
SetButtonGroup()
SetButtonLabel()
SetButtonLabelColor()
SetButtonOn()
SetButtonPolygonBorderColor()
SetButtonState()
SetButtonStatusbar()
SetButtonToolTip()
SetButtonXY()
SetControlInfo()
SetCursor()
SetCustomColorPalette()
SetCustomFontName()
SetDesign()
SetFrameOrientation()
SetGauge()
SetGaugeValue()
SetKnob()
SetKnobValue()
SetMenu()
SetMeter()
SetMeterValue()
SetMovable()
SetNavigationKeys()
SetRampButton()
SetSlider()
SetSliderValue()
SetStatusbarAttribute()
SetTimer()
SetWallpaper()
ShowSubButtons()
StartForm()

THE CTabWindow AND CTabView WORK TOGETHER TO MANAGE THE TAB PAGE PANE OF THE QUBE'S VIEW. THE LEFT PANE OF THE SPLITTER WINDOW DISPLAYS THE GRAPHICS DATA TREE, THE QUANTUM MATRIX DATA TREE AND THE ACTIVE NODAL LINKS, ALLOWING THE USER TO EASILY MOVE BETWEEN DIFFERENT ASPECTS OF THE QUANTUM MATRIX'S DATABASE.

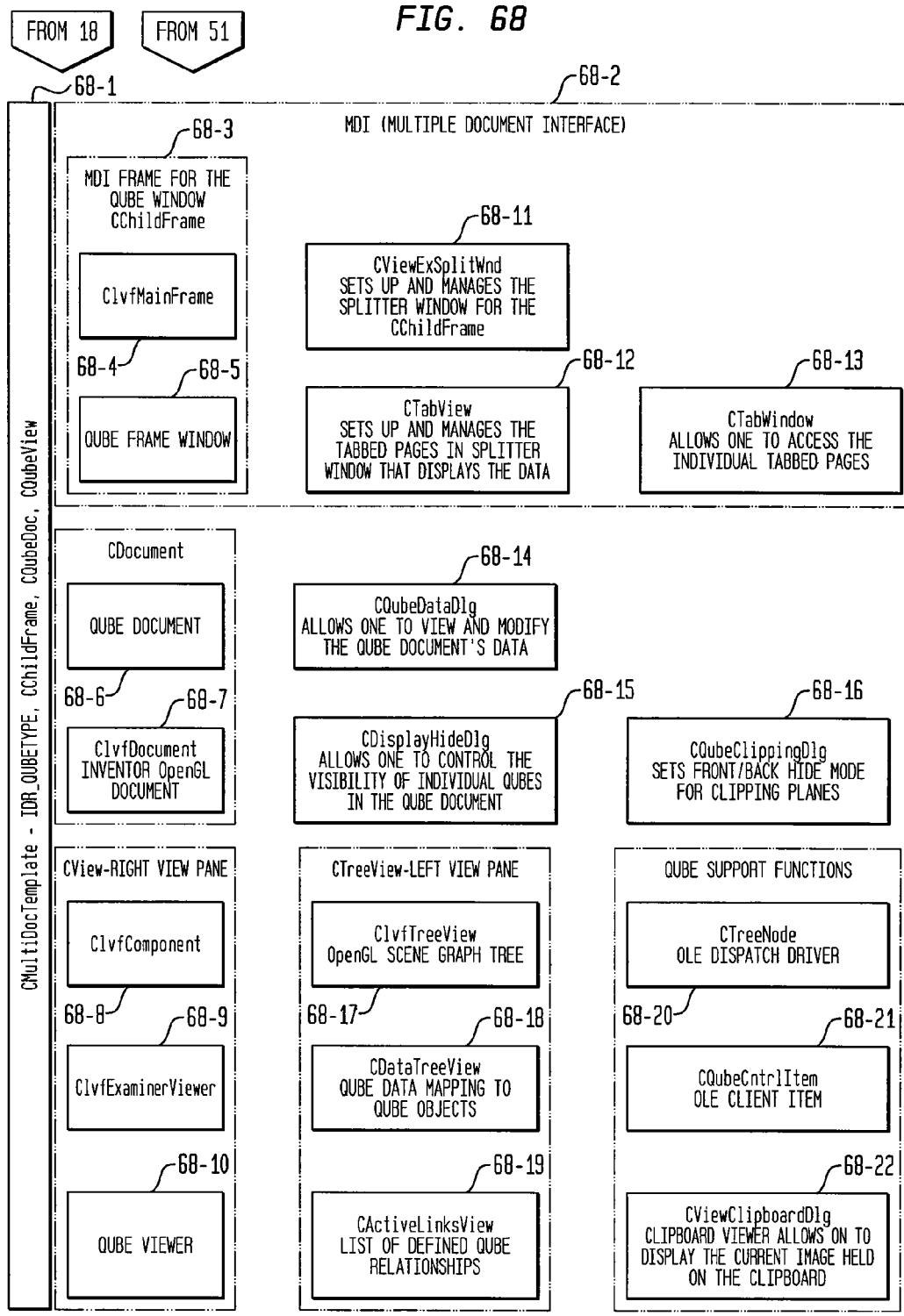

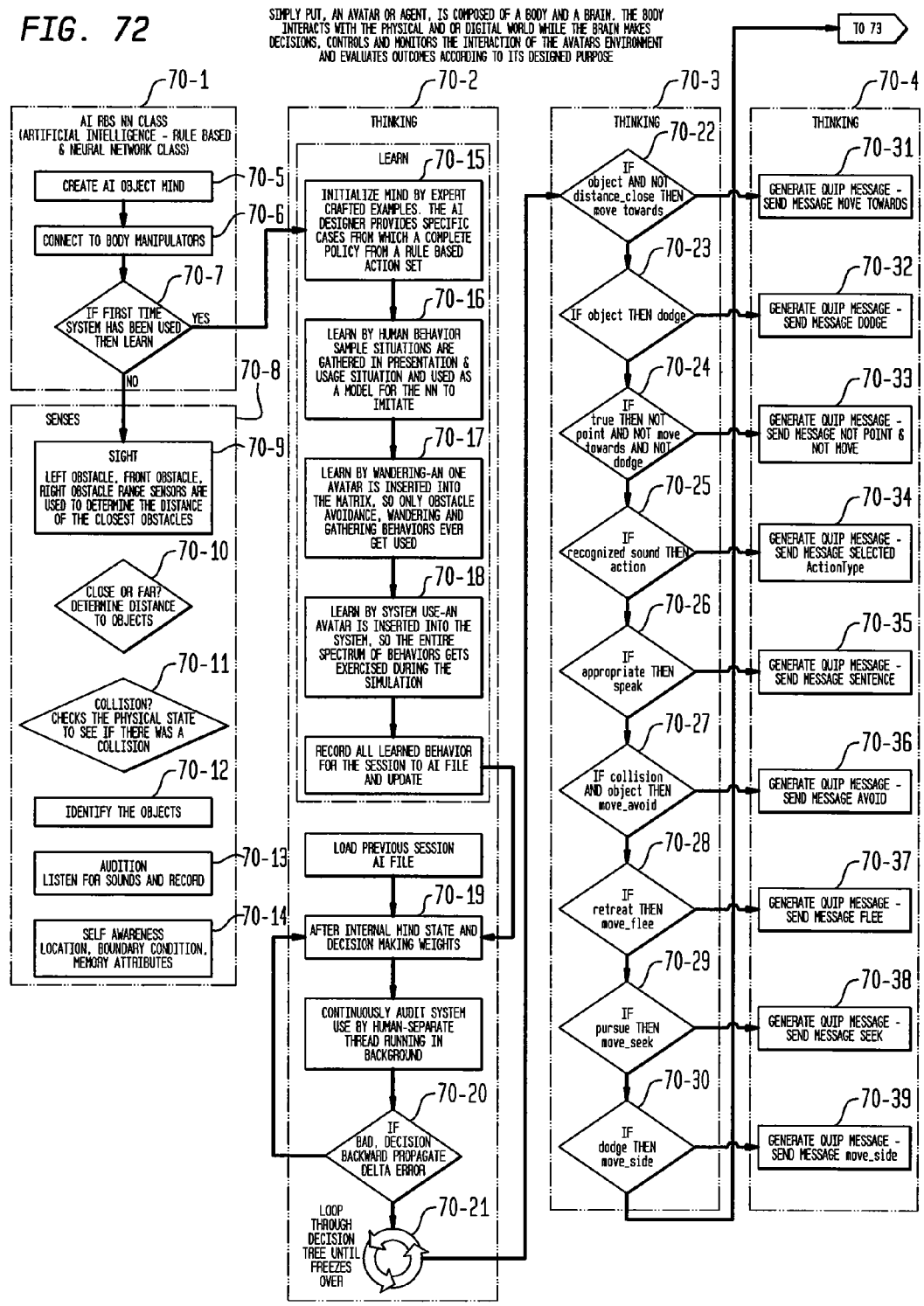

FIG. 87
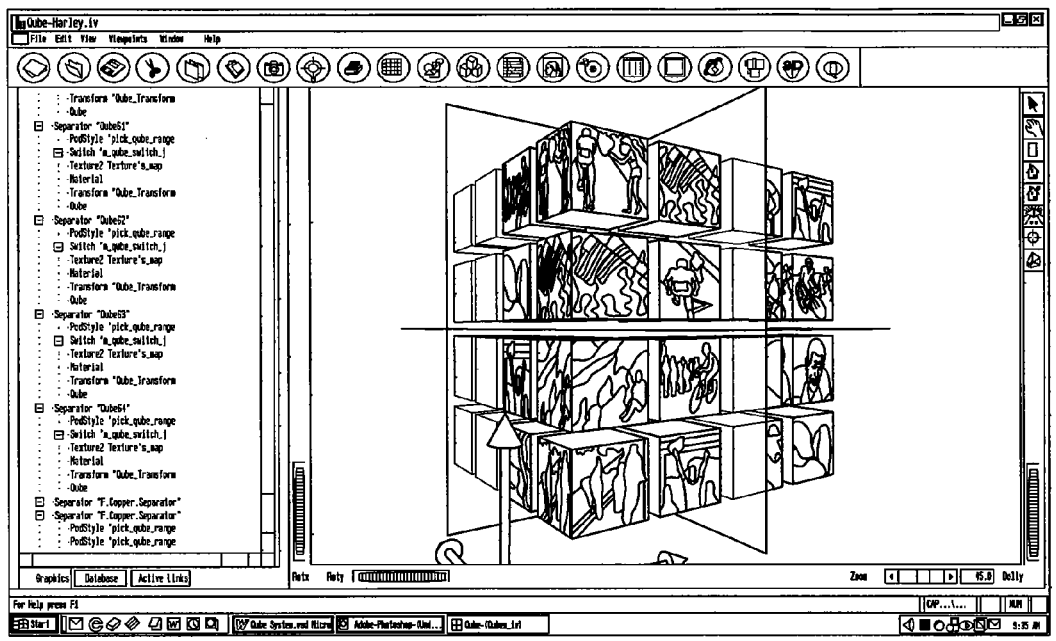
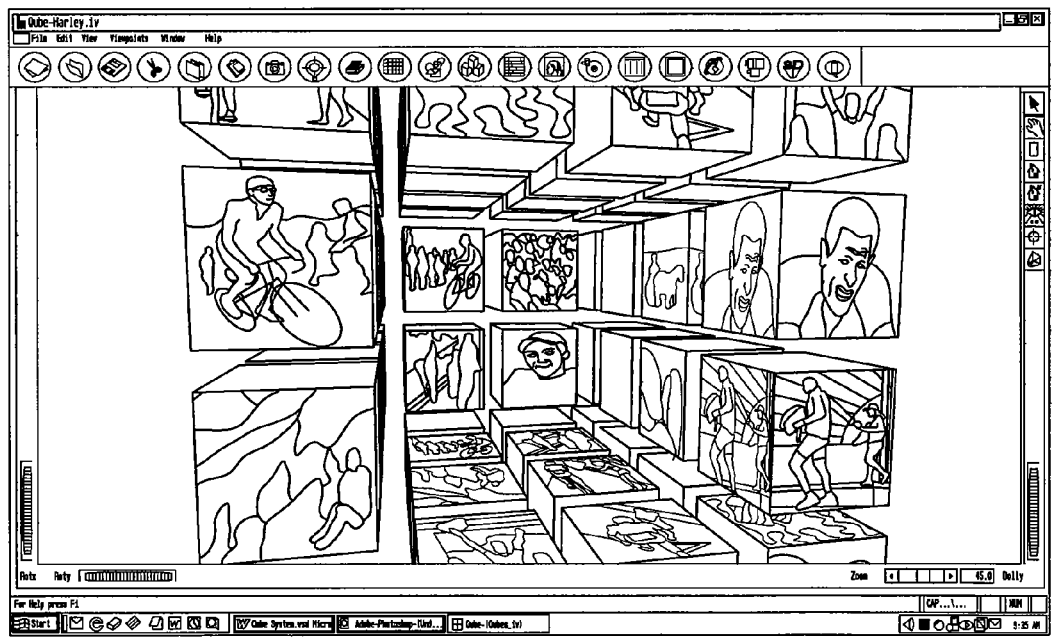
IN THE CAVE THE QUANTUM MATRIX ALLOWS ONE TO BE ACTUALLY IMMERSED
IN DATA AND INSIDE OF THE OBJECT DISPLAY SPACE FIG. 88
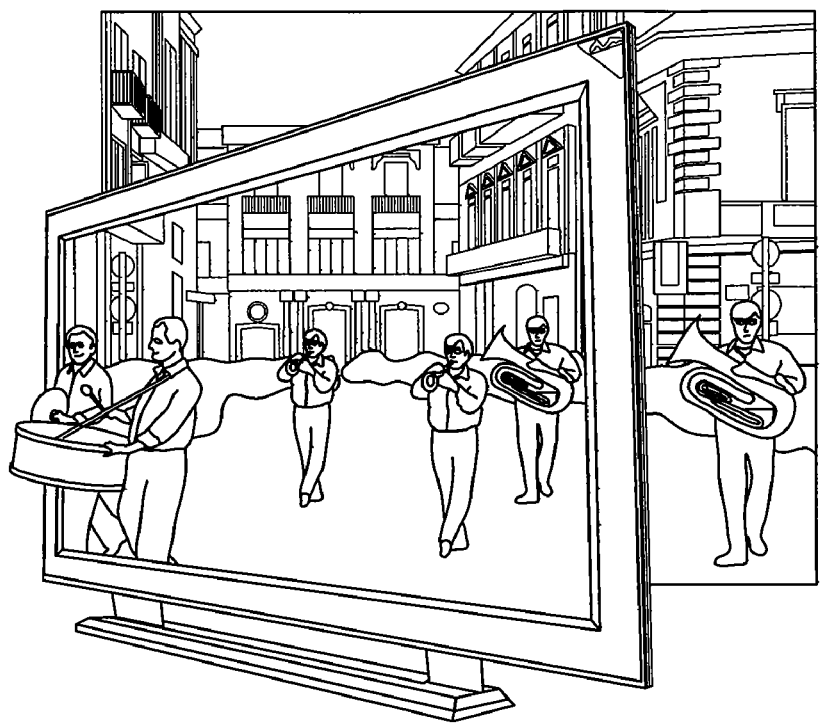
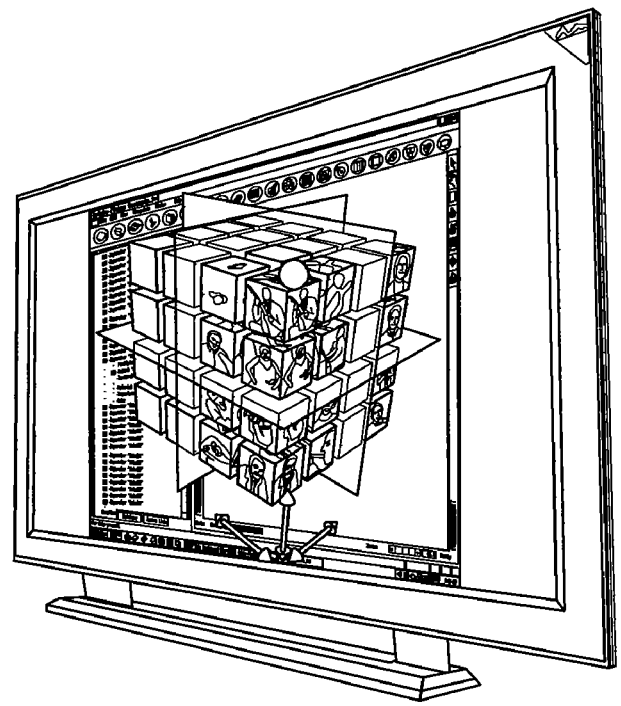

FIG. 89
CAVE STEREOSCOPIC DISPLAY
FROM 20
CAVE DNA MOLECULE
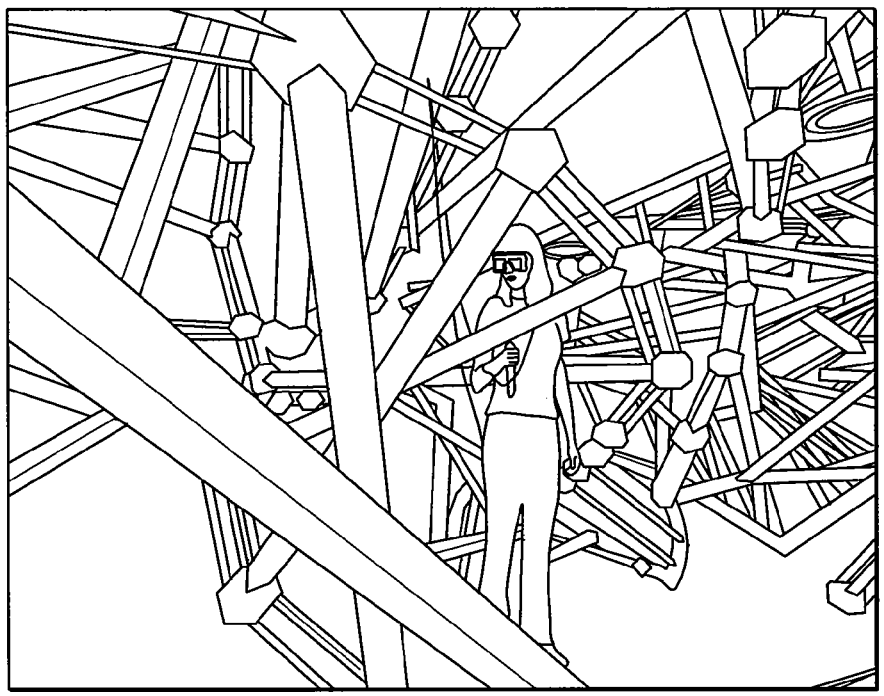
CAVE MODEL, SIMULATION OF HUBBLE TELESCOPE MB BROWN MATTER IMAGE
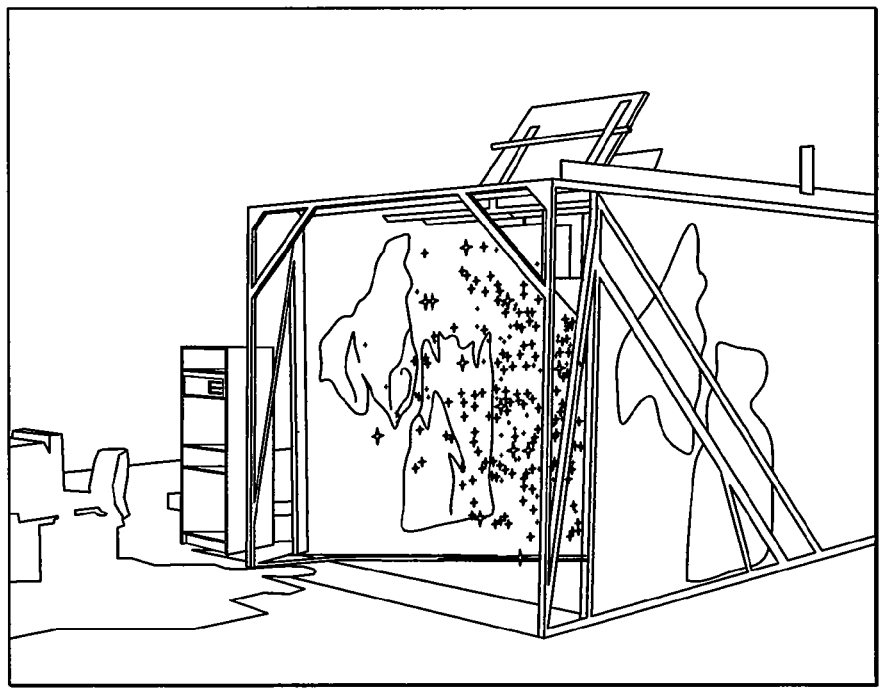

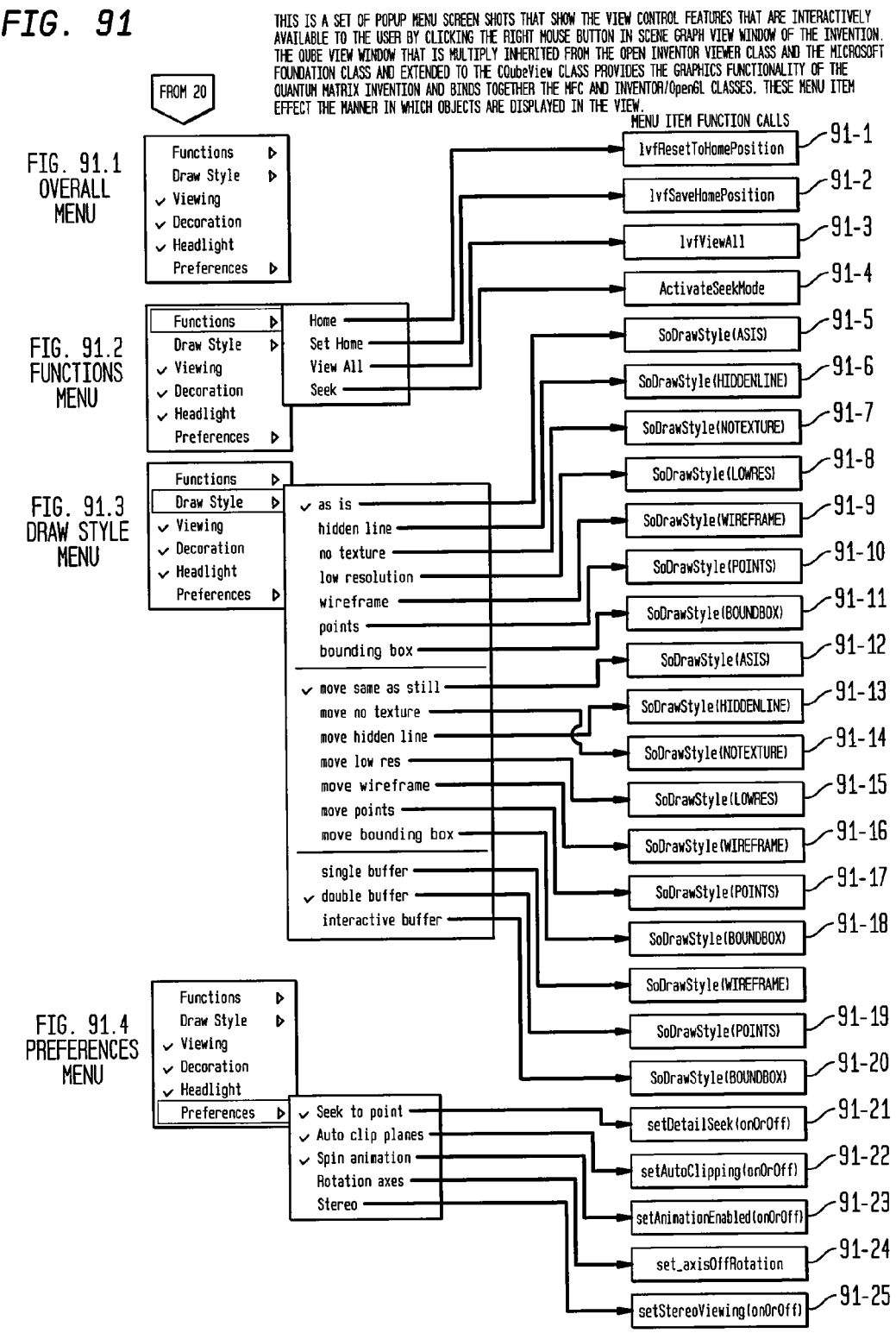

FIG. 92

REFERENCE

THE QScript ActiveX COMPONENT IS A FUNCTIONALLY COMPLETE BASIC PROGRAMMING LANGUAGE BUILT INTO THE QUANTUM MATRIX APPLICATION. IT HAS THE SAME SEVEN STRUCTURAL ELEMENTS AS ALL PROGRAMMING LANGUAGES AND IT INCLUDES A COMPLETE WINDOWS API (APPLICATION PROGRAMMER'S INTERFACE). IT PROVIDES THE FOLLOWING GENERAL PROGRAMMING CAPABILITIES:

1. DATA DECLARATIONS FOR CREATING VARIABLES
   STRINGS
   FLOATING-POINT NUMBERS
   INTEGERS
   ARRAYS
2. ARITHMETIC OPERATION AND MATHEMATICS FUNCTIONS
3. LOGIC-PROGRAM FLOW CONTROL (IF THEN ELSE & SWITCH)
4. LOOPING
5. SUBROUTINES-FUNCTIONS
6. INPUT-KEYBOARD AND MOUSE
7. OUTPUT-PRINTING AND FILE ACCESSING

QScript SCRIPTING CONTROL PROPERTIES, METHODS, EVENTS AND OBJECTS:
   PROPERTIES
   METHODS
   EVENTS
   HANDLER OBJECT
   HANDLERS COLLECTION
   MODULE OBJECT

| About | SHOW THE QScript ActiveX SCRIPTING CONTROL ABOUT BOX |
|---|---|
| ActiveSheet | GET/SET THE CURRENT MACRO/MODULE SHEET |
| AlwaysSplit | GET/SET THE SPLIT MODE |
| AttributeInstancing | GET/SET THE MODULE'S ATTRIBUTE INSTANCING |
| AttributeName | GET/SET THE MODULE'S ATTRIBUTE NAME |
| BackColor | GET/SET THE BACKGROUND COLOR OF THE NORMAL TEXT |
| BlockedKeywords | GET/SET THE LIST OF BLOCKED KEYWORDS |
| BorderStyle | GET/SET THE BORDER STYLE |
| Caption | GET/SET THE CAPTION |
| Changed | GET/SET THE CHANGED FLAG |
| Code | GET/SET THE MACRO/MODULE CODE |
| DebugHeight | GET/SET THE DEBUG WINDOW HEIGHT |
| DefaultDataType | GET/SET THE DEFAULT DATA TYPE FOR THE BROWSER |
| DefaultMacroName | GET/SET THE DEFAULT NAME FOR NEW MACROS |
| DefaultObjectName | GET/SET THE DEFAULT NAME FOR NEW OBJECT MODULES |
| DesignMode | GET/SET THE DESIGN MODE |
| DesignModeVisible | GET/SET THE DESIGN MODE VISIBILITY |
| EditTools | GET/SET THE EDIT TOOL VISIBILITY IN THE TOOLBAR |
| Enabled | GET/SET THE ENABLED FLAG |
| ErrorFile | GET THE ERROR'S FILE NAME |
| ErrorHelpContext | GET THE ERROR'S HELP CONTEXT |
| ErrorHelpFile | GET THE ERROR'S HELP FILE NAME |
| ErrorLimit | GET/SET THE SYNTAX ERROR LIMIT |

FIG. 93

| | |
|---|---|
| ErrorLine | GET THE ERROR'S LINE NUMBER |
| ErrorNumber | GET THE ERROR NUMBER |
| ErrorOffset | GET THE ERROR'S OFFSET IN THE LINE |
| ErrorSource | GET THE ERROR'S SOURCE |
| ErrorText | GET THE ERROR'S DESCRIPTION TEXT |
| Evaluate | EVALUATE OR ASSIGN THE EXPRESSION |
| EvaluateObject | EVALUATE THE EXPRESSION AND RETURN AN OBJECT |
| EventMode | GET/SET THE EXECUTION MODE |
| FileChangeDir | GET/SET THE FILE CHANGE CURRENT DIRECTORY FOR OPEN AND SAVE |
| FileDesc | GET/SET THE FILE TYPE DESCRIPTION FOR OPEN AND SAVE |
| FileDir | GET/SET THE FILE DIRECTORY FOR OPEN AND SAVE |
| FileExt | GET/SET THE FILE EXTENSION FOR OPEN AND SAVE |
| FileMenuVisible | GET/SET THE FILE MENU VISIBILITY |
| FileMRU | GET/SET THE FILE MRU |
| FileName | GET/SET THE MACRO/MODULE'S FILE NAME |
| FileTools | GET/SET THE FILE TOOLS VISIBILITY IN THE TOOLBAR |
| FixKeywords | GET/SET THE FIX KEYWORDS MODE |
| Font | GET THE DISPLAY FONT OBJECT |
| ForeColor | GET/SET THE FOREGROUND COLOR OF THE NORMAL TEXT |
| FullPopupMenu | GET/SET THE POPUP MENU FULL/SMALL |
| HeaderLineCount | GET THE NUMBER OF LINES IN THE HEADER |
| HelpMenuVisible | GET/SET THE HELP MENU VISIBILITY |
| Height | GET/SET THE WINDOW'S HEIGHT |
| HiddenCode | GET/SET THE HIDDEN CODE |
| HideSelection | GET/SET THE HIDE SELECTION MODE |
| HighlightBreak | GET/SET THE COLOR OF THE BREAK POINT LINES |
| HighlightBuiltin | GET/SET THE COLOR OF THE BUILT-IN KEYWORDS |
| HighlightComment | GET/SET THE COLOR OF THE COMMENT TEXT |
| HighlightError | GET/SET THE COLOR OF THE ERROR LINE |
| HighlightExec | GET/SET THE COLOR OF THE EXEC LINE |
| HighlightExtension | GET/SET THE COLOR OF THE LANGUAGE EXTENSIONS |
| HighlightReserved | GET/SET THE COLOR OF THE RESERVED KEYWORDS |
| Hwnd | GET THE WINDOW HANDLE |
| LargeIcon | GET/SET THE LARGE ICON OBJECT |
| Left | GET/SET THE WINDOW'S LEFT EDGE |
| Locked | GET/SET THE LOCKED MODE |
| ModuleKind | GET THE MODULE KIND |
| MultiSheet | GET/SET THE MULIPLE SHEET MODE |
| MultiThreadingSupport | GET/SET THE MULTIPLE THREADING SUPPORT MODE |
| NegotiateMenus | GET/SET THE MENU VISIBILITY |
| Pause | GET/SET THE PAUSED EXECUTION FLAG |
| ProcDisplayMode | GET/SET THE OBJECT/PROC LIST DISPLAY MODE |
| Run | GET/SET THE RUNNING EXECUTION FLAG |
| SelBackColor | GET/SET THE BACKGROUND COLOR OF THE SELECTED TEXT |
| SelForeColor | GET/SET THE FOREGROUND COLOR OF THE SELECTED TEXT |
| SelLength | GET/SET THE SELECTION'S LENGTH |
| SelStart | GET/SET THE SELECTION'S STARTING OFFSET |
| SelText | GET/SET THE SELECTION'S TEXT |
| SheetCount | GET THE NUMBER OF SHEETS |
| SmallIcon | GET/SET THE SMALL ICON OBJECT |
| StatusVisible | GET/SET THE STATUS LINE VISIBILITY |
| SyntaxCheck | RETURN TRUE IF THE MACRO/MODULE TEXT IS WITHOUT SYNTAX ERRORS |
| TabAsSpaces | GET/SET THE TAB AS SPACES MODE |
| TabWidth | GET/SET THE TAB WIDTH |
| TaskbarIcon | GET/SET THE TASK BAR ICON OBJECT |
| TaskbarIconMode | GET/SET THE TASK BAR ICON MODE |
| Text | GET/SET THE MACRO/MODULE TEXT |
| ToolbarVisible | GET/SET THE TOOLBAR VISIBILITY |
| Top | GET/SET THE WINDOW'S TOP EDGE |
| Visible | GET/SET THE WINDOW'S VISIBILITY |
| Width | GET/SET THE WINDOW'S WIDTH |
| WindowState | GET/SET THE WINDOW'S STATE |

FIG. 94

| ActivateWindow | SHOW THE MAIN IDE WINDOW |
|---|---|
| AddExtension | ADD AN OBJECT AS A LANGUAGE EXTENSION |
| AddExtensionWithEvents | ADD AN OBJECT WITH EVENTS AS A LANGUAGE EXTENSION |
| CloseSheet | CLOSE A SHEET |
| CreateHandler | CREATE A Handler_object THAT CAN INVOKE A MODULE SUB OR FUNCTION |
| CreateHandlers | CREATE A COLLECTION OF Handler_objects |
| CreateOverlappedWindow | CREATE THE MAIN IDE WINDOW |
| Disconnect | DISCONNECT LANGUAGE EXTENSIONS |
| ExecuteMenuCommand | EXECUTE THE MENU COMMAND (IF IT IS ENABLED) |
| FindOrCreateProc | FIND OR CREATE A PROCEDURE |
| FindSheet | RETURN A MACRO/MODULE'S SHEET NUMBER |
| FreezeEvents | FREEZE/UNFREEZE EVENT CALLS |
| IndexFromLine | RETURN THE INDEX FOR THE FIRST CHAR IN A LINE |
| Initialize | INITIALIZE THE NoUI OR IDE OBJECT |
| IsInitialized | RETURN TRUE IF THE NoUI OR IDE OBJECT IS INITIALIZED |
| IsMenuCommandChecked | RETURN TRUE IF THE MENU COMMAND IS CHECKED |
| IsMenuCommandEnabled | RETURN TRUE IF THE MENU COMMAND IS ENABLED |
| IsModuleLoaded | RETURN TRUE IF MODULE IS LOADED |
| LineFromIndex | RETURN THE LINE NUMBER OF THE LINE CONTAINING THE CHAR AT THE INDEX |
| LoadModule | LOAD A MODULE |
| MacroCaption | RETURN A MACRO/MODULE'S CAPTION |
| MainMessagePump | DO MESSAGE PROCESSING FOR THIS THREAD |
| ModuleInstance | GET OR CREATE AN INSTANCE OF AN OBJECT IMPLEMENTED BY A MODULE |
| RemoveExtensions | REMOVE MODULE SPECIFIC LANGUAGE EXTENSIONS |
| ReportError | REPORT AN ERROR GENERATED BY THE Handler_ OR Module_object |
| RunFile | RUN A MACRO BY NAME |
| RunThis | RUN THIS MACRO TEXT |
| SelectSheet | SELECT THE SHEET FOR THE NEXT OPERATION |
| SetCallback | SET THE CALLBACK OBJECT FOR USER-DEFINED EVENT PROCESSING |
| SetDialogIdle | SET THE CALLBACK OBJECT FOR USER-DEFINED DIALOG IDLE PROCESSING |
| Shutdown | SHUTDOWN SAX ActiveX SCRIPTING CONTROL AND PREPARE TO DISCONNECT |
| Trace | SET THE TRACING CATEGORIES |
| UnloadModule | UNLOAD A MODULE |

FIG. 95

| | |
|---|---|
| ActiveSheetChange | THE ACTIVE SHEET CHANGED |
| Begin | EXECUTION IS BEGINNING |
| Change | MACRO TEXT OR CAPTION HAS CHANGED |
| CloseSheet | A SHEET IS BEING CLOSED |
| CloseWindow | USER IS CLOSING THE MAIN IDE WINDOW |
| DebugClear | CLEAR THE WINDOW WHERE Debug.Print PRINTS |
| DebugPrint | Debug.Print INSTRUCTION TEXT TO BE PRINTED |
| DebugTrace | TRACE TEXT TO BE PRINTED |
| DoEvents | CALL VBs DoEvents |
| End | EXECUTION IS ENDING |
| EnterDesignMode | ENTER DESIGN MODE |
| ErrorAlert | A SYNTAX OR RUN-TIME ERROR HAS OCCURED |
| ErrorLog | A SYNTAX ERROR HAS OCCURED |
| FileExit | THE EXIT ITEM IN THE FILE MENU WAS SELECTED |
| FileMRUChange | FILE MENU'S MRU LIST HAS CHANGED |
| GetMacroCaption | GET A MACRO/MODULE'S CAPTION |
| GetMacroName | GET A MACRO/MODULE NAME TO OPEN OR SAVE |
| HandleError | AN UNHANDLED ERROR HAS OCCURRED |
| Help | SHOW HELP FOR TEXT (IF IT IS A LANGUAGE EXTENSION) |
| KeyDown | A KEY HAS BEEN PRESSED |
| KeyPress | A CHARACTER KEY HAS BEEN PRESSED |
| KeyUp | A KEY HAS BEEN RELEASED |
| LeaveDesignMode | LEAVE DESIGN MODE |
| MacroBegin | A MACRO HAS BEEN STARTED OR A MODULE HAS BEEN LOADED |
| MacroEnd | A MACRO HAS BEEN ENDED OR A MODULE HAS BEEN UNLOADED |
| MapMacroName | MAP A MACRO/MODULE NAME |
| ModalDialog | A MODAL DIALOG IS ABOUT TO BE DISPLAYED OR HAS BEEN REMOVED |
| ModalIdeDialog | A MODAL IDE DIALOG IS ABOUT TO BE DISPLAYED OR HAS BEEN REMOVED |
| MouseDown | A MOUSE KEY HAS BEEN PRESSED |
| MouseMove | THE MOUSE HAS MOVED |
| MouseUp | A MOUSE KEY HAS BEEN RELEASED |
| NewInstance | A NEW INSTANCE FROM AN OBJECT OR CLASS MODULE IS BEING CREATED |
| OverrideMenuCommand | OVERRIDE A MENU COMMAND ISSUED BY THE CONTROL |
| OpenSheet | A SHEET HAS BEEN OPENED |
| OverrideModalWindowOwner | OVERRIDE THE WINDOW HANDLE FOR A MODAL DIALOG |
| ParseProperties | AN OBJECT MODULE'S PROPERTIES NEED TO BE PARSED |
| Pause | EXECUTION IS PAUSING |
| Pending | A PAUSE IS PENDING |
| ReadMacro | READ A MACRO/MODULE FROM STORAGE |
| Resume | EXECUTION IS RESUMING |
| SelChange | SELECTION CHANGED |

FIG. 96

HANDLER OBJECT REFERENCE

SYNTAX

DIM HANDLER AS HANDLER

PROPERTIES

- Exists RETURN TRUE IF THE HANDLER'S MODULE IS LOADED AND ITS SUB/FUNCTION EXISTS.
- IsModuleLoaded RETURN TRUE IF THE HANDLER'S MODULE IS LOADED.
- ProcName RETURN THE HANDLER'S SUB/FUNCTION NAME.
- Prototype RETURN THE HANDLER'S PROTOTYPE.
- StepInto SET OR RETURN THE HANDLER'S STEP INTO MODE.

METHODS

- Call[PA] CALL THE HANDLER'S SUBROUTINE.
- Evaluate[PA] EVALUATE THE HANDLER'S FUNCTION.
- Start[PA] START THE HANDLER'S SUBROUTINE.

DESCRIPTION

A HANDLER OBJECT PROVIDES ACCESS TO A SINGLE QScript ActiveX SCRIPTING CONTROL SUB OR FUNCTION.

- VB: THE HANDLER OBJECT'S PROPERTIES AND METHODS ARE DESCRIBED BELOW.

HANDLER'S COLLECTION REFERENCE

SYNTAX

DIM HANDLERS AS HANDLERS

PROPERTIES

- Count RETURN THE NUMBER OF HANDLERS IN THE COLLECTION.
- Item RETURN HANDLER FOR THE SPECIFIED INDEX. THIS IS THE DEFAULT PROPERTY.

DESCRIPTION

A HANDLER'S COLLECTION IS A COLLECTION OF HANDLER OBJECTS

- VB: THE HANDLER'S COLLECTION'S PROPERTIES ARE DESCRIBED BELOW.

REMARKS

THE HANDLER'S COLLECTION ALSO SUPPORTS FOR EACH.

SEE ALSO

CreateHandlers METHOD, HANDLER OBJECT

FIG. 97

MODULE OBJECT REFERENCE

SYNTAX
   DIM MODULE AS OBJECT

PROPERTIES

- VB: xyz SET OR RETURN THE xyz PROPERTY OF THE MODULE OBJECT.

METHODS

- Call CALL THE MODULE'S MEMBER SUBROUTINE (OR FUNCTION).
- Evaluate EVALUATE THE MODULE'S MEMBER FUNCTION (OR PROPERTY GET).
- Let ASSIGN A VALUE TO THE MODULE'S MEMBER USING PROPERTY LET.
- Set SET THE REFERENCE OF A MODULE'S MEMBER USING PROPERTY SET.
- VB: xyz SET OR RETURN THE xyz PROPERTY OF THE MODULE OBJECT.

DESCRIPTION

THE MODULE OBJECT PROVIDES ACCESS TO A SAX ActiveX SCRIPTING CONTROL MODULE'S PUBLIC SUBS, FUNCTIONS AND PROPERTIES.

- VB: THE PROPERTIES AND METHODS OF THE MODULE ARE ACCESSIBLE USING NORMAL object.prop OR object.method SYNTAX.

DoEvents

IF YOU DON'T DEFINE THE DoEvents EVENT YOUR APPLICATION WON'T ALLOW USER INPUT WHILE BASIC CODE IS EXECUTING. ANY BREAK POINT, UNHANDLED ERROR OR STOP INSTRUCTION DURING A MODULE CALL WILL FREEZE THE APPLICATION PERMANENTLY.

SEE ALSO
   ModuleInstance METHOD

FIG. 98

THESE PREDEFINED CONSTANTS ARE USED BY IsMenuCommandChecked, IsMenuCommandEnabled, ExecuteMenuCommand AND OverrideMenuCommand EACH CONSTANT REFERS TO A SPECIFIC MENU ITEM IN THE CONTROL'S INTERNAL MENU SYSTEM.

| | |
|---|---|
| sbcFileNew 0 | A NEW MACRO |
| sbcFileNewCodeModule -47 | A NEW CODE MODULE |
| sbcFileNewObjectModule -48 | A NEW OBJECT MODULE |
| sbcFileNewClassModule -49 | A NEW CLASS MODULE |
| sbcFileOpen -1 | AN EXISTING MACRO/MODULE |
| sbcFileClose -33 | THE CURRENT MACRO/MODULE |
| sbcFileSave -2 | THE CURRENT MACRO/MODULE |
| sbcFileSaveAs -3 | THE CURRENT MACRO/MODULE WITH A NEW NAME |
| sbcFileSaveAll -34 | ALL THE MACROS/MODULES |
| sbcFilePrint -4 | THE CURRENT MACRO/MODULE |
| sbcFilePrintSetup -5 | THE PRINTER AND OPTIONS |
| sbcFileMRU1...sbcFileMRU9 (77...85) | THIS MOST RECENTLY USED FILE |
| sbcEditUndo -22 | THE LAST EDIT |
| sbcEditRedo -63 | THE LAST EDIT |
| sbcEditCut -23 | THE SELECTED TEXT TO THE CLIPBOARD |
| sbcEditCopy -24 | THE SELECTED TEXT TO THE CLIPBOARD |
| sbcEditPaste -25 | THE CLIPBOARD TEXT |
| sbcEditDelete -30 | THE SELECTED TEXT |
| sbcEditSelectAll -31 | ALL OF THE TEXT |
| sbcEditIndent -51 | THE SELECTED LINES RIGHT |
| sbcEditOutdent -52 | THE SELECTED LINES LEFT |
| sbcEditTabAsSpaces -65 | TAB AS SPACES ON/OFF |
| sbcEditFind -26 | A TEXT STRING |
| sbcEditReplace -27 | AND REPLACE A TEXT STRING |
| sbcEditAgain -28 | THE LAST FIND/REPLACE |
| sbcEditCompleteWord -75 | WORD |
| sbcEditParameterInfo -76 | INFO |
| sbcEditUserDialog -32 | A UserDialog |
| sbcEditReferences -64 | REFERENCES |
| sbcEditProperties -50 | THE OBJECT OR CLASS MODULE PROPERTIES |
| sbcViewMacro -54 | THE MACRO EDITING WINDOW |
| sbcViewImmediate -55 | THE IMMEDIATE EVALUATION WINDOW |
| sbcViewWatch -56 | THE WATCH EXPRESSION WINDOW |
| sbcViewStack -57 | THE CALL STACK WINDOW |
| sbcViewLoaded -58 | THE LOADED MACROS/MODULES WINDOW |
| sbcViewToolbar -59 | TOOLBAR ON/OFF |
| sbcViewStatusBar -60 | STATUS BAR ON/OFF |
| sbcViewEditButtons -61 | EDIT BUTTONS ON/OFF |
| sbcViewAlwaysSplit -62 | THE SPLIT ON/OFF |
| sbcViewFont -29 | UP THE FONT SELECTION DIALOG |
| sbcViewTabWidth1...sbcViewTabWidth8 (66...73) | TAB DISPLAY WIDTH |
| sbcMacroRun -6 | OR RESUME THE CURRENT MACRO/MODULE |
| sbcMacroPause -7 | THE CURRENT MACRO/MODULE (CAN RESUME) |
| sbcMacroEnd -8 | THE CURRENT MACRO/MODULE (CAN'T RESUME) |
| sbcMacroDesignMode -74 | THE MACRO DESIGN MODE |
| sbcDebugStepInto -9 | INTO THE NEXT STATEMENT |
| sbcDebugStepOver -10 | OVER THE NEXT STATEMENT |
| sbcDebugStepOut -35 | OUT OF THE CURRENT PROCEDURE |
| sbcDebugStepTo -11 | TO THE STATEMENT UNDER THE CURSOR |
| sbcDebugToggleBreak -12 | BREAK POINT ON THE CURRENT LINE |
| sbcDebugClearAllBreaks -53 | ALL THE BREAK POINTS |
| sbcDebugQuickWatch -13 | VARIABLES AND EXPRESSIONS IN THE IMMEDIATE WINDOW |

FIG. 99

| sbcDebugAddWatch -14 | VARIABLES AND EXPRESSIONS TO THE WATCH WINDOW |
|---|---|
| sbcDebugBrowse -15 | THE SELECTED OBJECT'S METHODS AND PROPERTIES |
| sbcDebugSetNext -16 | CURRENT LINE AS THE NEXT STATEMENT |
| sbcDebugShowNext -17 | THE NEXT STATEMENT |
| sbcSheetOpenUses -36 | '#USES MODULES IN THE CURRENT MACRO/MODULE |
| sbcSheetCloseAll -37 | ALL THE MACROS/MODULES |
| sbcSheet1...sbcSheet9 (38...46) | THIS MACRO/MODULE |
| sbcHelpApp -18 | HELP |
| sbcHelpLanguage -19 | HELP FOR THE BASIC LANGUAGE |
| sbcHelpTopic -20 | HELP FOR THE SELECTED WORD |
| sbcHelpAbout -21 | BOX |
| sbcHelpBrowser -86 | HELP FOR ActiveX AUTOMATION MEMBERS DIALOG |
| sbcHelpReferences -87 | HELP FOR REFERENCES DIALOG |
| sbcHelpUserDialog -88 | HELP FOR UserDialog EDITOR DIALOG |
| sbcShowHoverValue (&H7FF9) | THE HOVER VALUE |
| sbcShowSplashScreen (&H7FFA) | THE SPLASH SCREEN |
| sbcShowForm (&H7FFB) | THE FORM CONTAINING THE IDE |
| sbcPopupNoMouse (&H7FFC) | MENU AT TOP LEFT |
| sbcShowError (&H7FFD) | THE CURRENT ERROR LINE |
| sbcNewModulePopup (&H7FFE) | MODULE POPUP MENU |
| sbcPopup (&H7FFF) | MENU AT MOUSE |

SYSTEM AND METHOD FOR MULTI-DIMENSIONAL ORGANIZATION, MANAGEMENT, AND MANIPULATION OF DATA

CROSS-REFERENCE TO RELATED APPLICATIONS

This application is a Nonprovisional application of Provisional Application No. 60/529,174, filed Dec. 15, 2003, which is incorporated herein by reference in its entirety.

FIELD OF THE INVENTION

The field of this invention includes three-dimensional graphics, data management data and application integration, and process-to-process communication across networks.

BACKGROUND OF THE INVENTION

Current methods of accessing and navigating data on a computer system are generally limited to querying mechanisms or two-dimensional visualizations. For example, data stored on a relational database are accessed through the use of a query language such as SQL or by listing the contents of the database in the form of two-dimensional tables. Files in a file system are accessed through the use of two-dimensional hierarchical browsers or through command line queries. Furthermore, data on the Internet is accessed through the use of two-dimensional web browsers and hyperlinks. All of these methods for accessing and visualizing data make it difficult for users to develop an intuitive feel for how the data are interconnected when the inter-relationships between the data are complex.

For example, data relating to each component of the space shuttle can be stored and accessed through two-dimensional hierarchies. However, navigating through such two-dimensional representations can hide from the user an intuitive feel for how the data of each component is interrelated with each other. If the data relating to the components were organized and visualized to correspond to a three dimensional image of the space shuttle assembly, the user could easily determine how the data relating to the components are interrelated in the space shuttle.

Furthermore, in database system design, data must be able to represent two types of objects, namely, "entitles and relationships." It is in fact the case that fundamentally there is no real difference between the two; a relationship is merely a special type of entity. The Quantum Matrix embraces the three database architectures of contemporary data management system design; hierarchical, network and relational concepts. The three approaches differ in the manner in which, they permit the user to view the data. In the hierarchical approach, data relationships are explicit and rely heavily on the items position in the data organization. In the network approach, relationships are represented explicitly by means of pointers, but entities and relationships are considered as two separate things. In the relational approach, relationships are again represented explicitly, however they are represented exactly the same way as the entities, i.e. by means of tuples. A tuple is in relational calculus terms simply a notation for expressing the definition of a relationship which is to be derived from the data model. In other words, relationships and entities are the same kind of object. The advantage of the relational approach is that it is data-independent and requires no representational form. However, relational databases, do not allow one to have a visual mapping of the implicit nature of real world objects nor to intuitively comprehend their data's relationships. In a relational database, there still exists a schema or some overriding formal organization.

What is needed is a system to organize, visualize and access data n-dimensionally to make it more intuitive for users to identify how data with complex interrelationships are interconnected.

What is needed is an application which bridges visual-hierarchical, relational-calculus and the network approach through object oriented design.

BRIEF SUMMARY OF THE INVENTION

The present invention is directed to systems and methods for multi-dimensional organization, management, and manipulation of data. In accordance with an aspect of the present invention, the Quantum Matrix system is a multi-dimensional, multi-threaded exchange environment for DCOM execution and integration, and in that respect is a multimedia, document, data management, integration and application execution tool that is agnostic to data type. In a further aspect, the Quantum Matrix extends stereoscopic technologies to allow the user to become immersed in data. The Quantum Matrix system further allows the user to exercise creativity by interactively placing and organizing data either in two dimensions or three dimensionally, navigating through and viewing data and documents in multiple dimensions.

In accordance with an aspect of the present invention, data is organized into a multi-dimensional structure of nodes. Nodes may represent data, absence of data, or another set of nodes. In an embodiment, all or portions of the multi-dimensional structure can be stored on remote computers and storage devices. In addition, all or portions of the multi-dimensional structure may be accessed and manipulated remotely allowing for a dynamic and distributed multi-dimensional structure. The data represented by the nodes may be both static and dynamically changing values.

In a further aspect, the multi-dimensional structure or portions of it can be automatically created from a file system. The file hierarchy of the file system is mimicked in the multi-dimensional structure.

In an aspect of the invention, one or more associations are defined for the multi-dimensional structure. An association indicates a relationship between a node and another node, data, or a set of nodes. The multi-dimensional structure is displayed three-dimensionally. The multi-dimensional structure can be displayed, for example, using standard computer displays, stereoscopic displays and virtual reality environments.

In a further aspect, the multi-dimensional structure is navigated. Relational logic, Boolean algebra, or a scripting language can be applied to the nodes, data, and associations to produce a resultant set of nodes. Furthermore, portions of the multi-dimensional structure can be isolated with the use of planes to ease navigation. Planes, one for each axis (x,y,z), can divide the multi-dimensional structure into two parts. One part can be selected for further navigation and the other part can be hidden to focus the navigation on the selected part. In this manner, the multi-dimensional structure can be diced until a resultant set of nodes is remaining. Furthermore, an Avatar may be displayed and used to automate the navigation of the multi-dimensional structure.

These and other objects, advantages and features will become readily apparent in view of the following detailed description of the invention.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1, The Quantum Matrix Kernel Framework, is a block diagram depicting an exemplary system architecture, according to an embodiment of the invention.

FIG. 2, The Qube Interface and Major Features, is an exemplary cubic structure for the Quantum Matrix Qube, according to an embodiment of the invention.

FIG. 3, Qube Planar Display Mode, is an exemplary planar stack structure for the Quantum Matrix Qube, according to an embodiment of the invention.

FIG. 4, Qube Panoramic Display Mode, is an exemplary panorama structure for the Quantum Matrix Qube, according to an embodiment of the invention.

FIG. 5, Strepinski Display Mode is an exemplary three-dimensional Strepinski triangular structure for the Quantum Matrix Qube, according to an embodiment of the invention.

FIG. 6, Planar GIS Display Mode, is an exemplary Planar GIS structure for the Quantum Matrix Qube, according to and embodiment of the invention.

FIG. 7, Qube Program Architecture and Concept diagram, is an exemplary block diagram of the Quantum Matrix system architecture, according to an embodiment of the invention.

FIG. 8, Qube Application Interface Concept Diagram, is an exemplary block diagram of the Quantum Matrix system architecture, according to an embodiment of the invention.

FIG. 9, Quantum Matrix Qube Program Event Processing Diagram, is an example of the manual Qube event processing, filtering and message dispatching system, which interfaces with the windows messaging system, and which is an alternative block diagram of the system, according to an embodiment of the invention.

FIG. 10, Qube Mouse Events Diagram, depicts exemplary handling process that the Quantum Matrix thread follows when the mouse is positioned over a Qube object, according to an embodiment of the present invention.

FIG. 11, Quantum Matrix—Qube Hardware Configurations, represents exemplary hardware configuration for the Quantum Matrix system, according to an embodiment of the present invention.

FIG. 12, Quantum Matrix—Qube Program Organization & Relationship to Data Sources, is an exemplary block diagram depicting the programmatic structure and its relationship to data storage structures, according to an embodiment of the invention.

FIGS. 13 and 14, Main Window Frame—MDI Multi Document Interface Continued, (MDI), Multi Document Interface, are exemplary flow diagrams and event driven diagrams programmatically depicting the startup sequence for the display of the Quantum Matrix system's main window, according to an embodiment of the invention.

FIGS. 15-35, Overriding Program—Qube Application Module, are exemplary flow charts depicting how the Quantum Matrix creates a Qube application object, Qube view, and Qube document that inherit data and functional attributes from the parent windows application and the open inventor application class, according to an embodiment of the invention.

FIGS. 36-39C, are exemplary process flow charts showing the Quantum Matrix Windows message handler, menu item identifiers and Qube application message routing systems, according to an embodiment of the invention.

FIG. 40, Main Window Frame—Toolbar, is an exemplary representation of the Quantum Matrix system's main window frame toolbar, according to an embodiment of the invention.

FIG. 41 CIVTreeView, is an exemplary block diagram of a module that maps applications to Qubes, hides Qubes, and determines whether a Qube has been mapped to an application or data, according to an embodiment of the invention.

FIG. 42, Qube Data View—CDataTreeView, is an exemplary data tree diagram of the data associated with the graphical state in time of each graphical data node (or Qube), according to an embodiment of the invention.

FIG. 43, Node to Node Link Relationship View—CActiveLinksView Class, is an exemplary block diagram and process flow for actively linking nodes as in a relational database, according to an embodiment of the invention.

FIGS. 44 and 45, Quantum Matrix—Qube Data Management Class CQubeBase and Qube Data Storage Structures & Field Layouts, are exemplary process flows and block diagrams showing the array template for storage of the data referenced in the nodes as well as the data storage structures, according to an embodiment of the invention.

FIG. 46, Program Quantum Matrix Associated Files Types, is an exemplary process flow chart showing the relationship between application modules and their associated file types, according to an embodiment of the invention.

FIG. 47, QUIP Qube User Interface Protocol for Automated Script Control, is an exemplary process flow chart depicting an event driven script parsing system, according to an embodiment of the invention.

FIG. 48, RPC Remote Procedure Call Module for Online Collaboration, is an exemplary process flow chart depicting the remote procedure call functionality that enables two or more programs to communicate with one another and execute commands on other Qube applications resident on another computer across a network, according to an embodiment of the invention.

FIG. 49, Quantum Matrix—Qube View Class Graphical Navigation Features, is an exemplary process flow chart showing the Qube navigation interface, according to an embodiment of the invention.

FIG. 50, Anatomy of a Microsoft Foundation Classes—OpenGL Inventor Classes, is an exemplary block diagram illustrating the bridge in the Quantum Matrix between Microsoft foundation classes and open GL classes, according to an embodiment of the present invention.

FIG. 51 is an exemplary communicative flow chart illustrating the additional functionality and the interface between standard Microsoft foundation class objects, the core Open Invention library and the Open Inventor user Interface Component library, achieved through multiple inheritance, according to an embodiment of the invention.

FIG. 52, Composition of the IVF core classes and the IVF viewer classes, is an exemplary block diagram illustrating the graphical nature of the Quantum Matrix system, featuring a composition of the IVF core classes and the IVF viewer classes, according to an embodiment of the invention.

FIGS. 53-58, CParse Class Parses Equations & Logic, are exemplary process flow charts illustrating the equation and logic parser for the Qube application, according to an embodiment of the invention.

FIGS. 62 and 63 illustrate the graphical nature and the messaging system of the invention featuring the audio and video dialog boxes that operate like the Quantum Matrix toolbar, according to an embodiment of the invention.

FIG. 68, Qube Module Component Hierarchy, is an exemplary block diagram showing the template for creating an instance of the Qube object, according to an embodiment of the invention.

Figure 69:
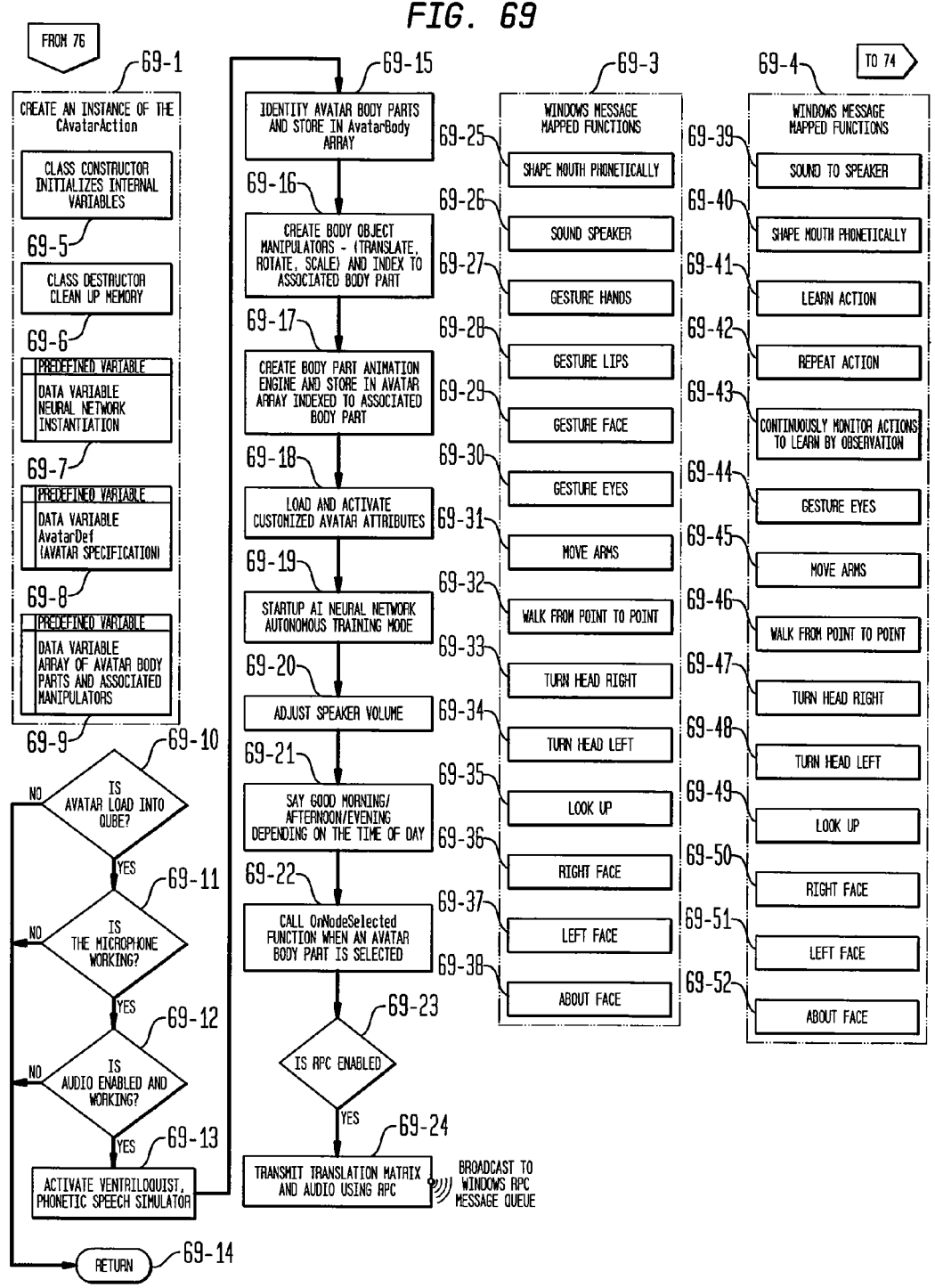

FIG. 69, Avatar Action & Manipulation Class, is an exemplary process flow chart showing the manipulation class for moving an Avatar, according to an embodiment of the invention.

Figure 70:
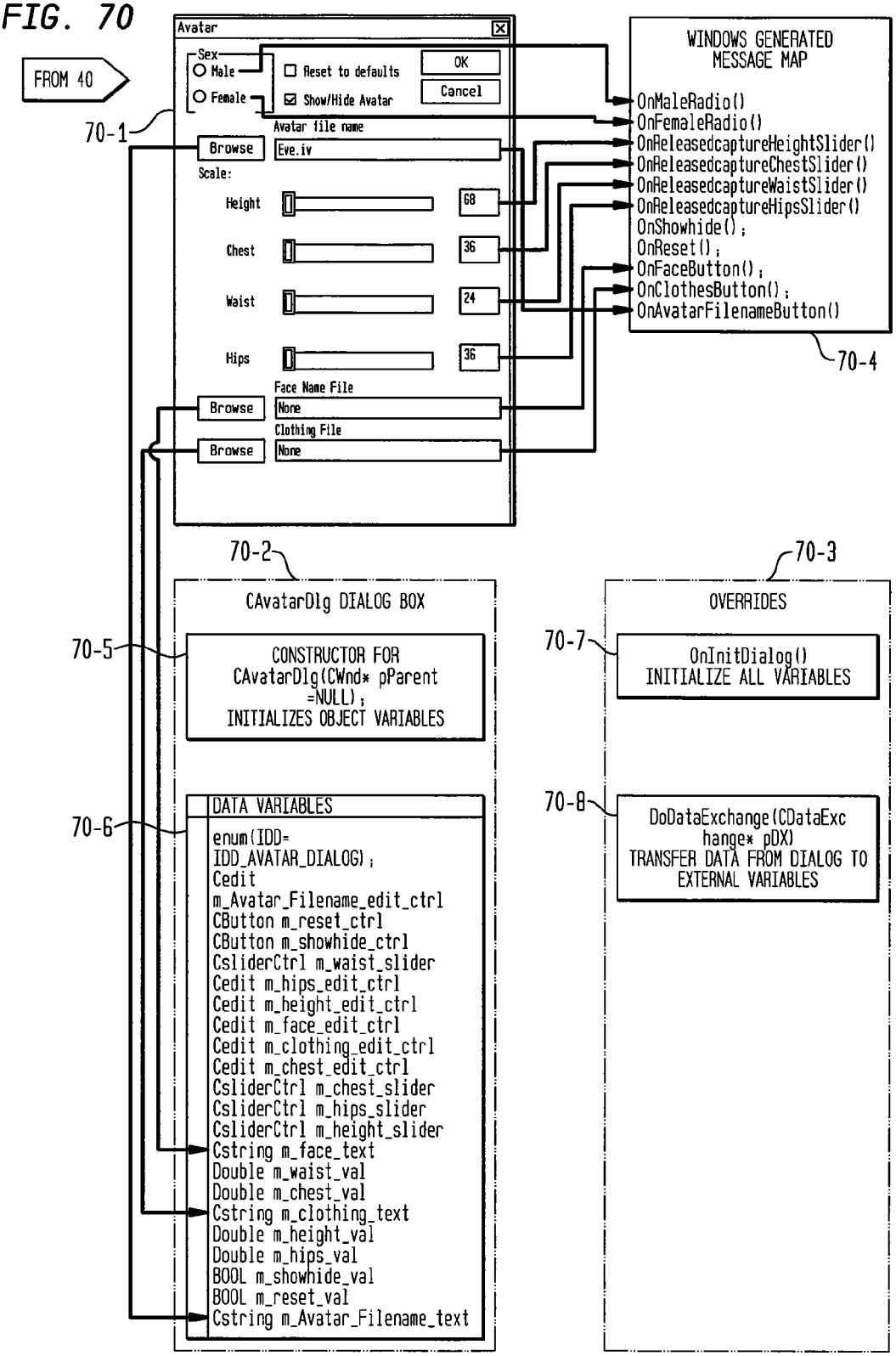
Figure 71A:
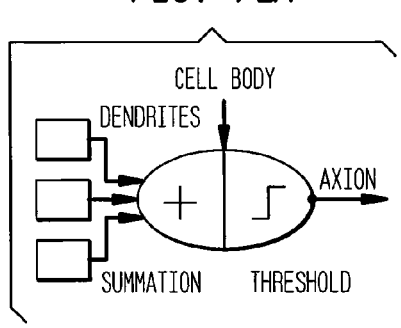
Figure 71B:
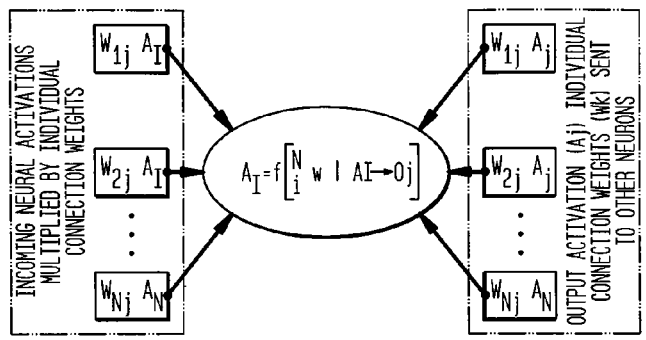
Figure 71C:
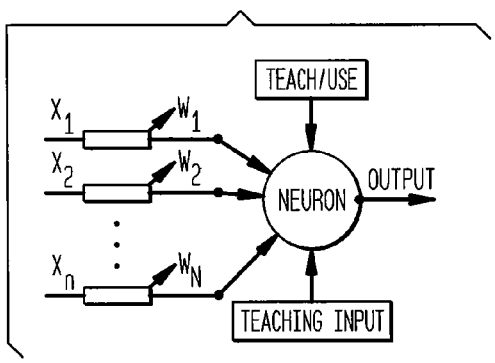
Figure 71D:
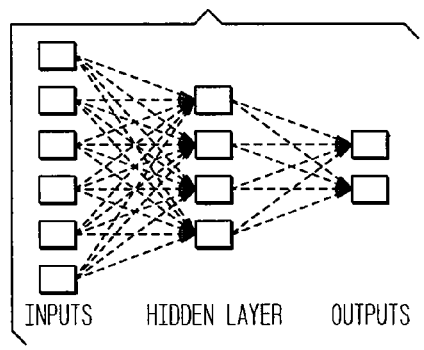
Figure 71E:
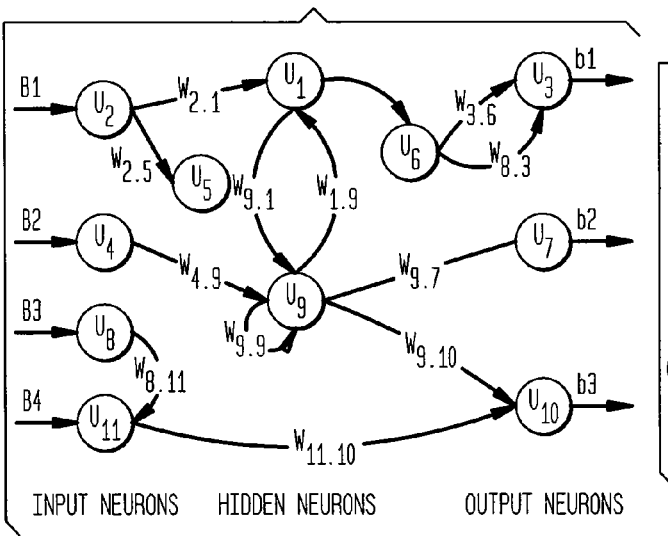
Figure 71F:
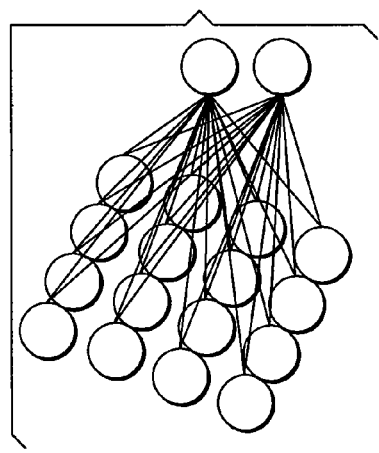

FIG. 70, Avatar Editor Dialog Box, is a pictorial representation of an Avatar editor dialog box, according to an embodiment of the invention.

FIGS. 71-74, Avatar Neural Net Work Class Architecture and Concepts, are exemplary diagrams and process flow charts showing the framework for the artificial intelligence of the Avatar, according to an embodiment of the invention.

Figure 75:
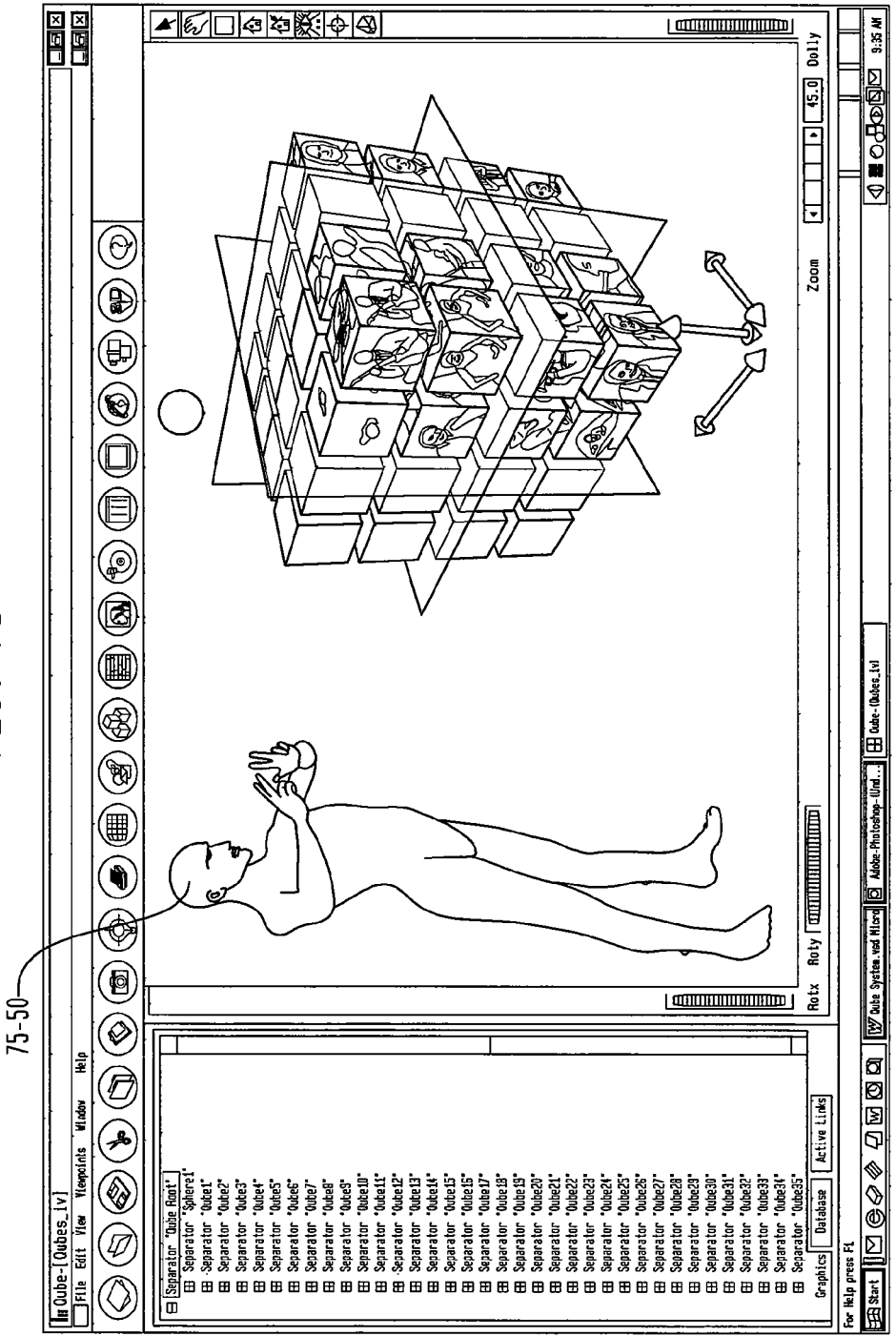
Figure 76:
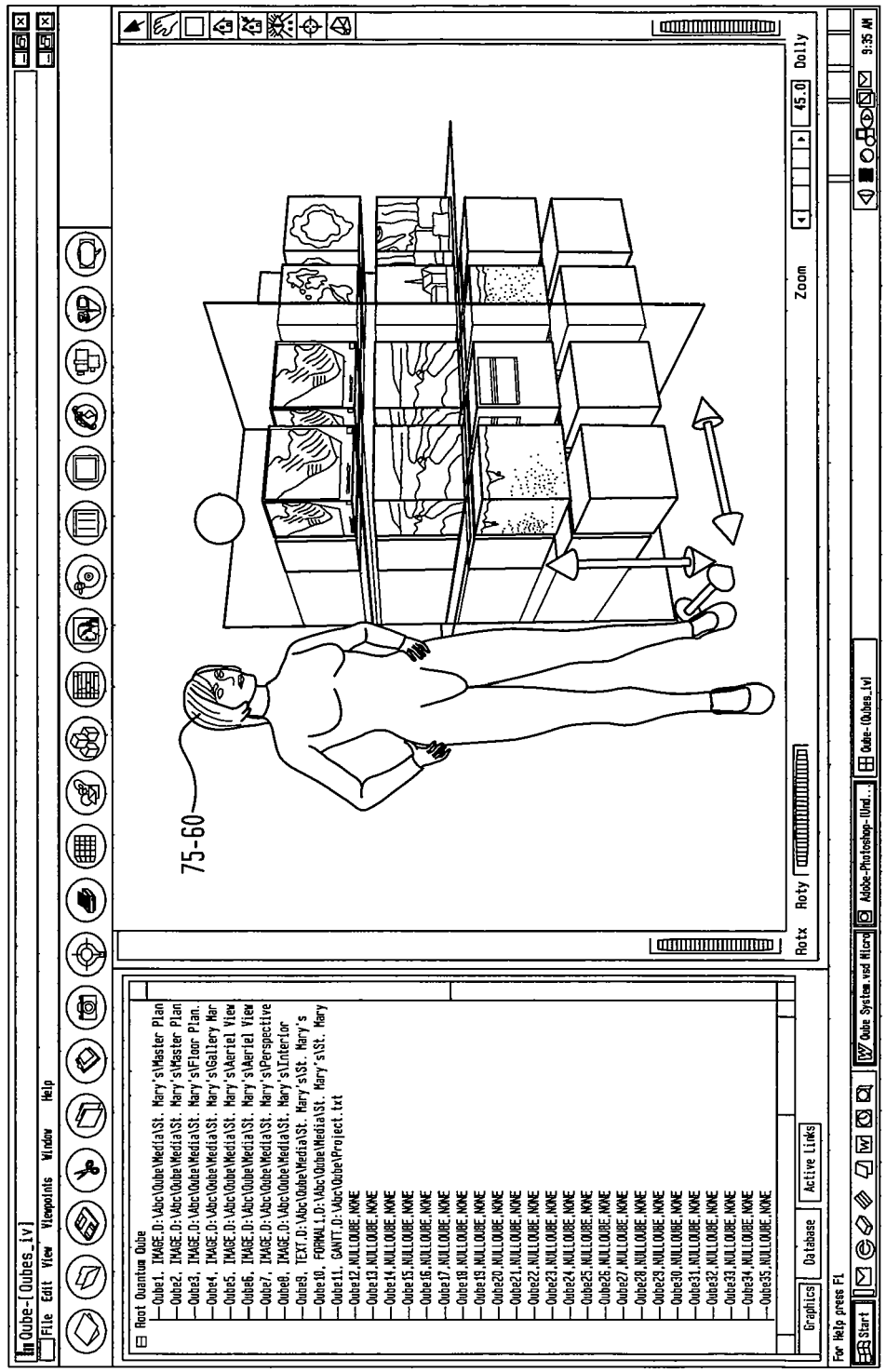

FIGS. 75 and 76, Male and Female Avatar—Virtual Clones, are pictorial representations of Avatars (virtual humans), according to an embodiment of the invention.

Figure 77:
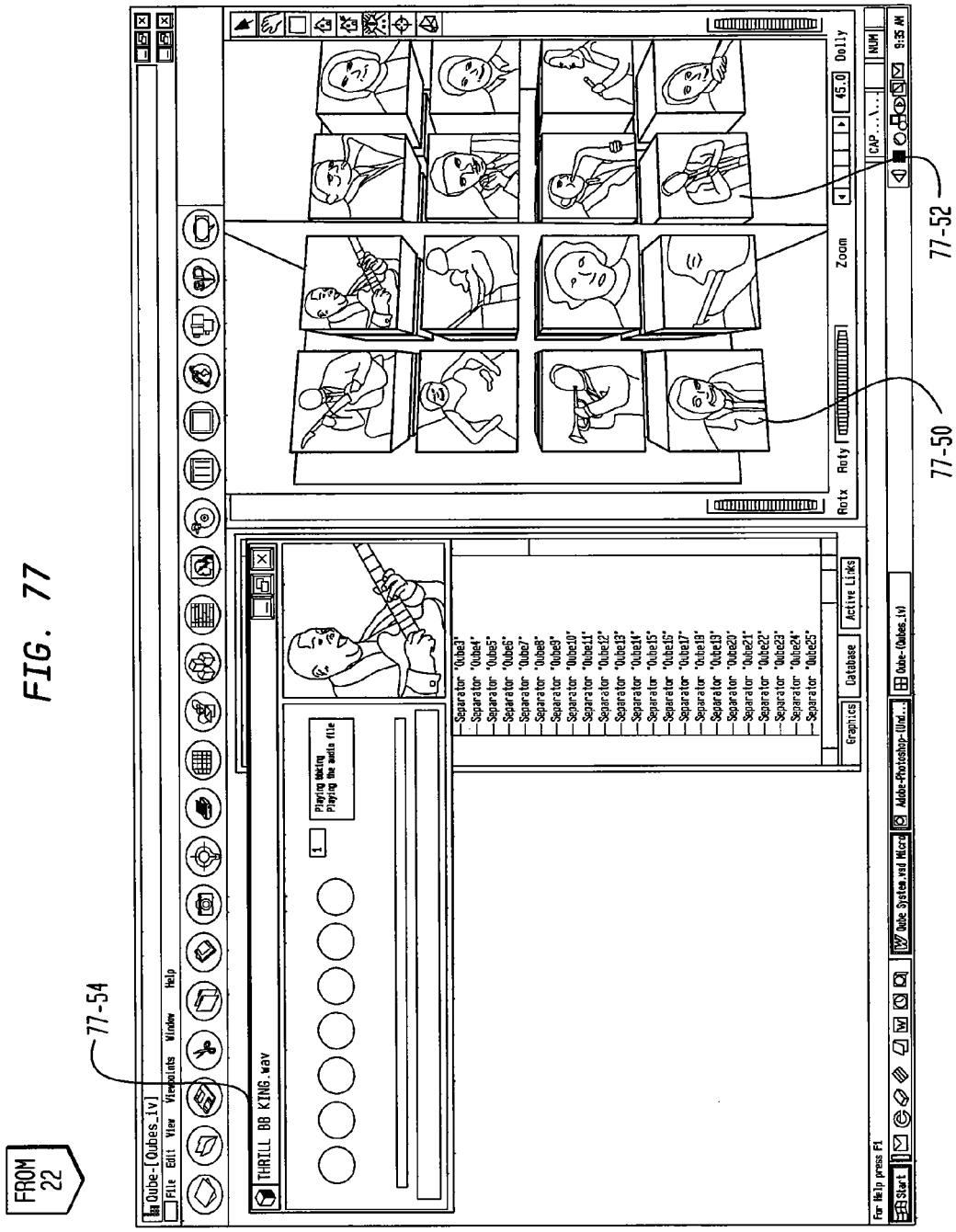

FIG. 77, Audio Player App, is a graphic representation of an illustrative audio player application running in the Qube display mode, according to an embodiment of the invention.

Figure 78:
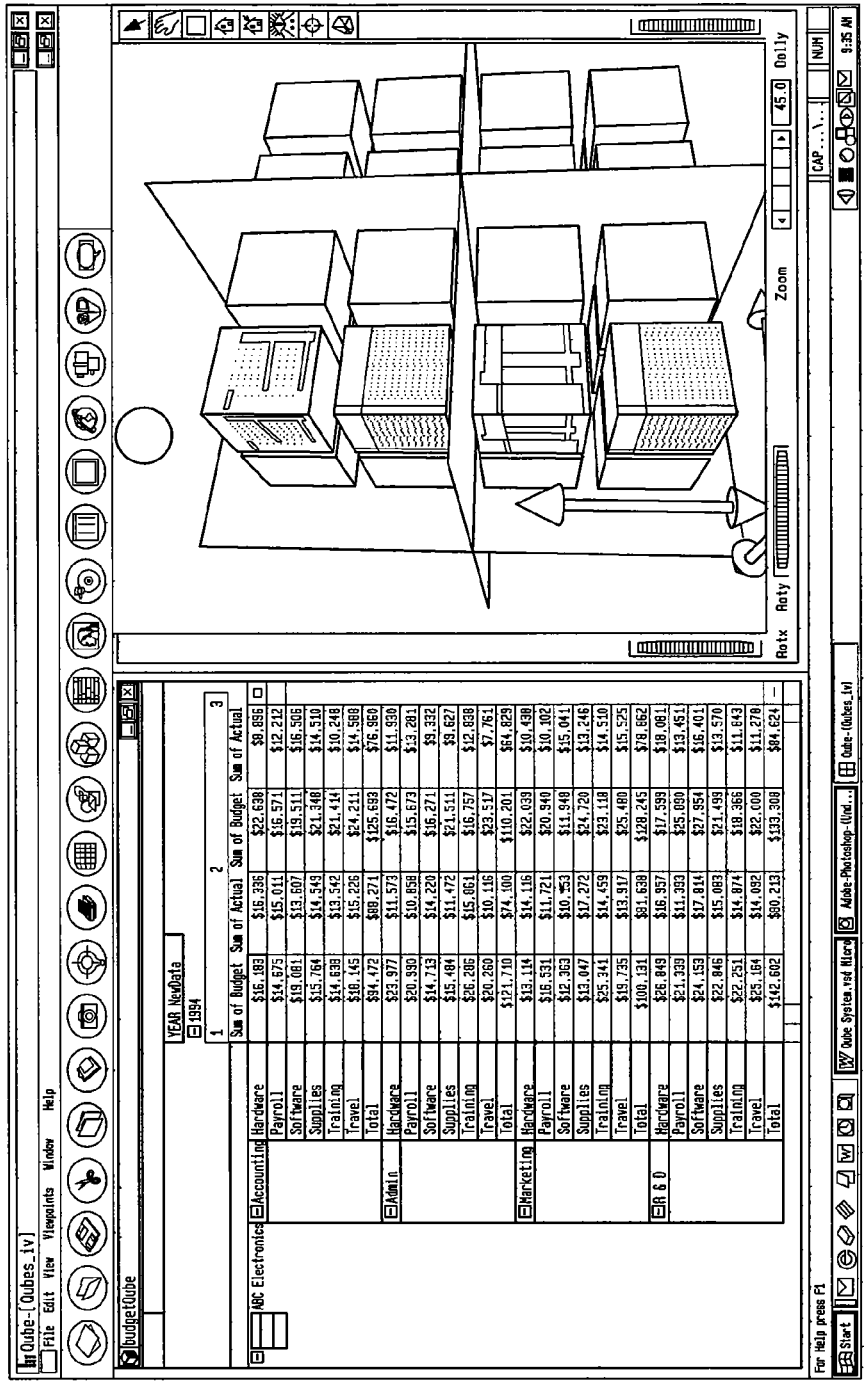

FIG. 78, Database Access Application, is a graphic representation of the database applet that allows users to access most common database types and file formats, according to an embodiment of the invention.

Figure 79:
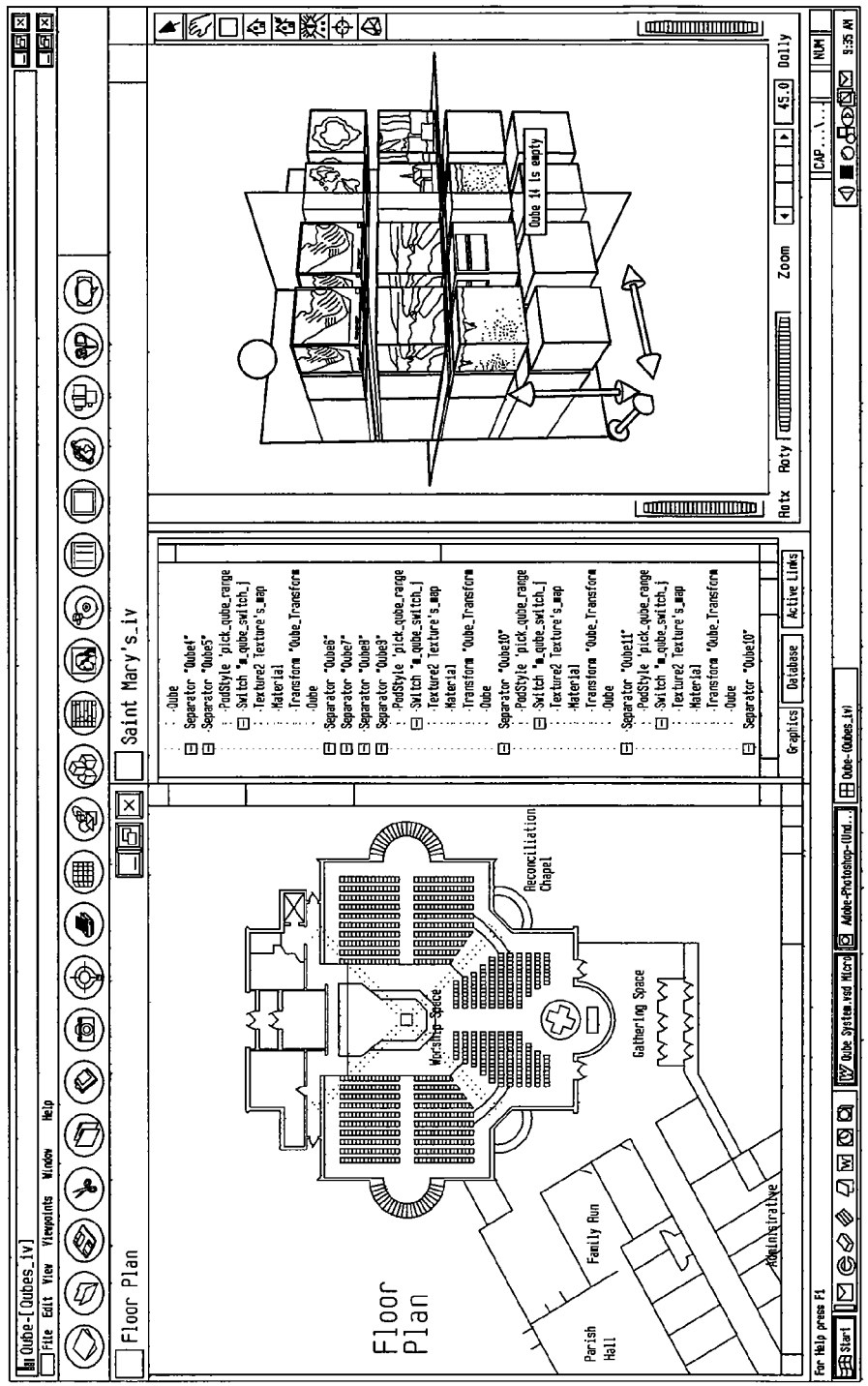

FIG. 79, CAD Viewer App, is graphic representation of an illustrative computer aided design application tool running in the Qube display mode, according to an embodiment of the invention.

Figure 80:
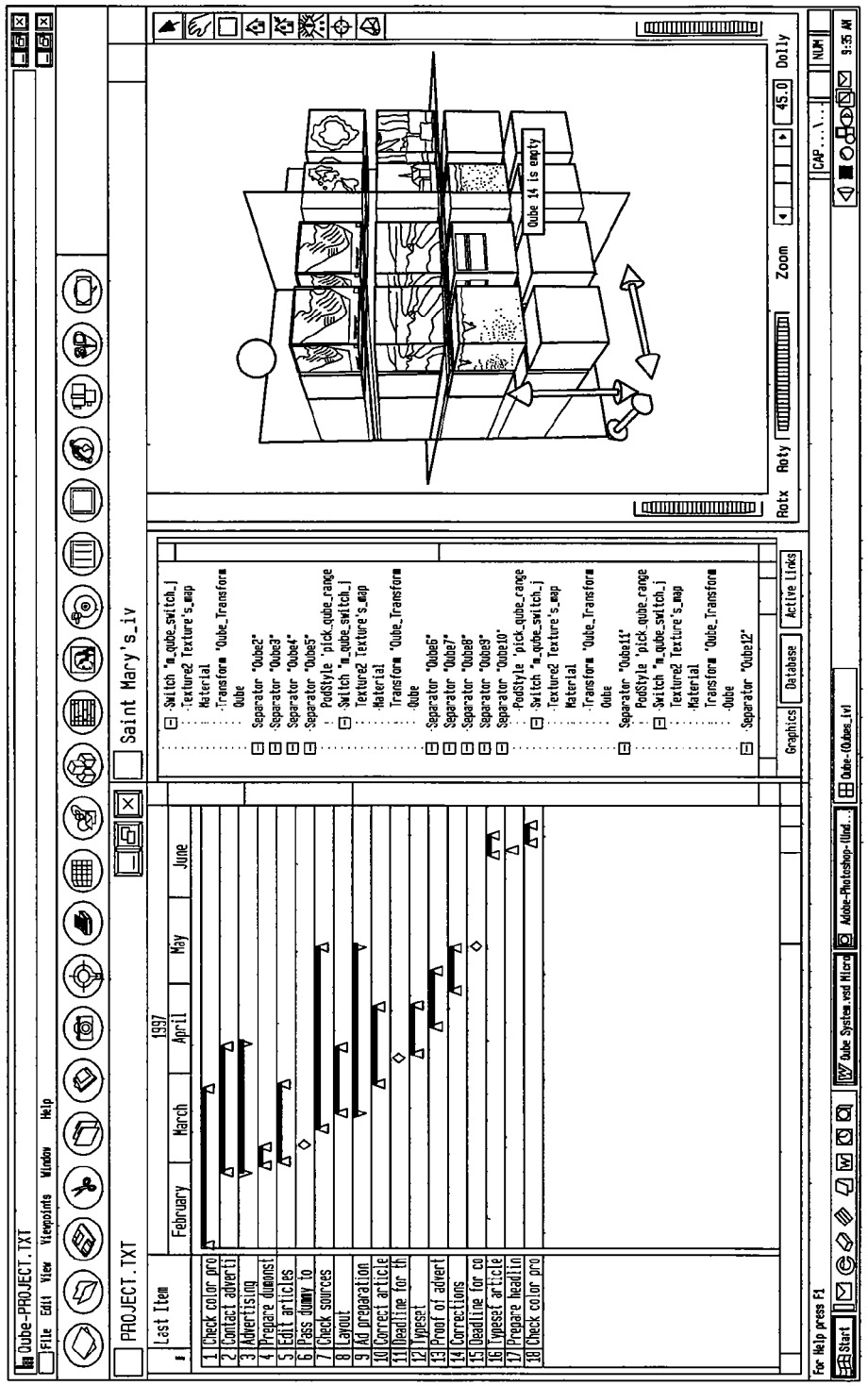

FIG. 80, Gantt Project Scheduling App, is a graphic representation of an illustrative Gantt project scheduling application running in the Qube display mode, according to an embodiment of the invention.

Figure 81:
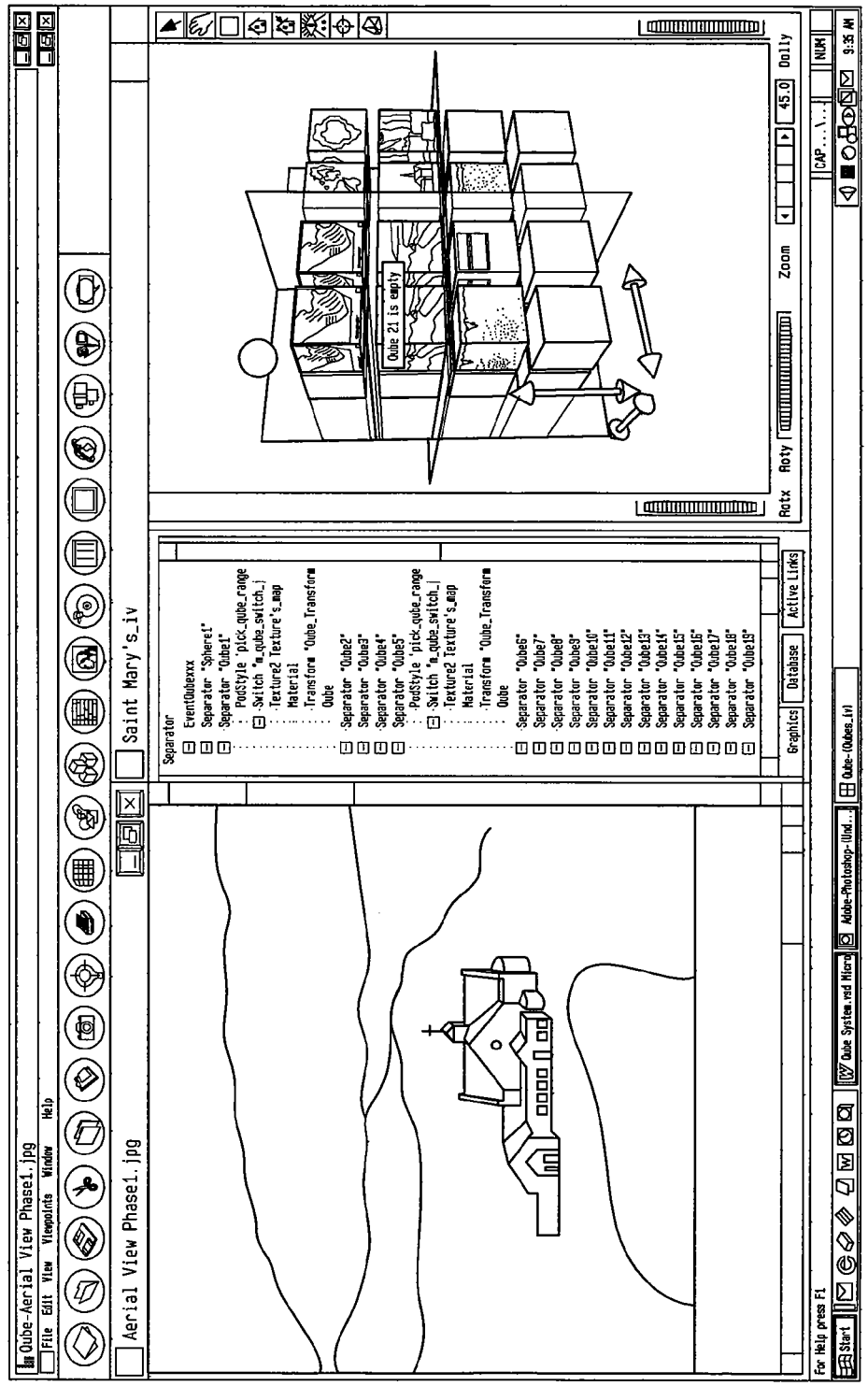

FIG. 81, Image Processor/Viewer App, is a graphic representation of an illustrative image processor/viewer application running in the Qube display mode, according to an embodiment of the invention.

Figure 82:
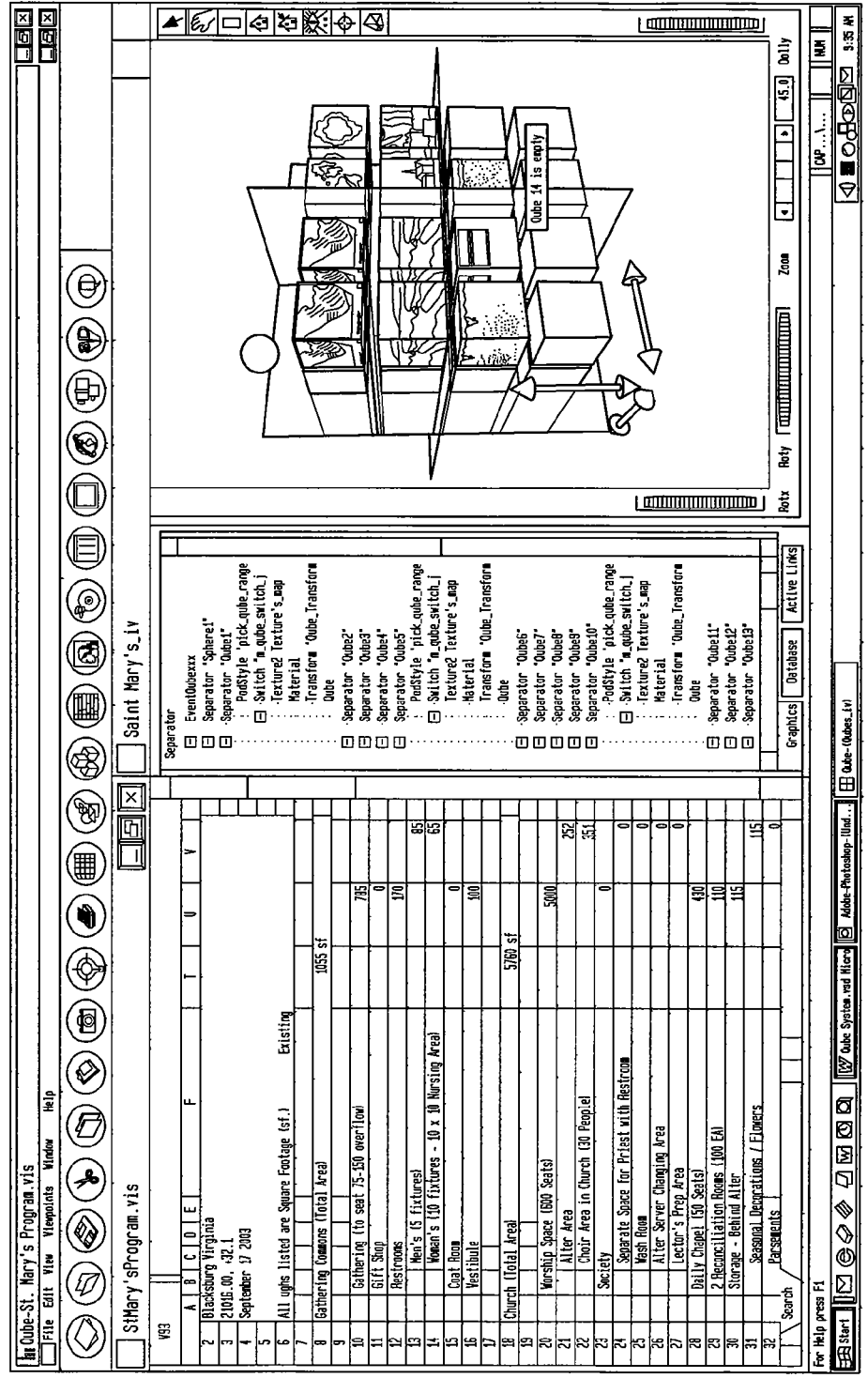

FIG. 82, Spreadsheet App, is a graphic representation of an illustrative spreadsheet application running in the Qube display mode, according to an embodiment of the invention.

Figure 83:
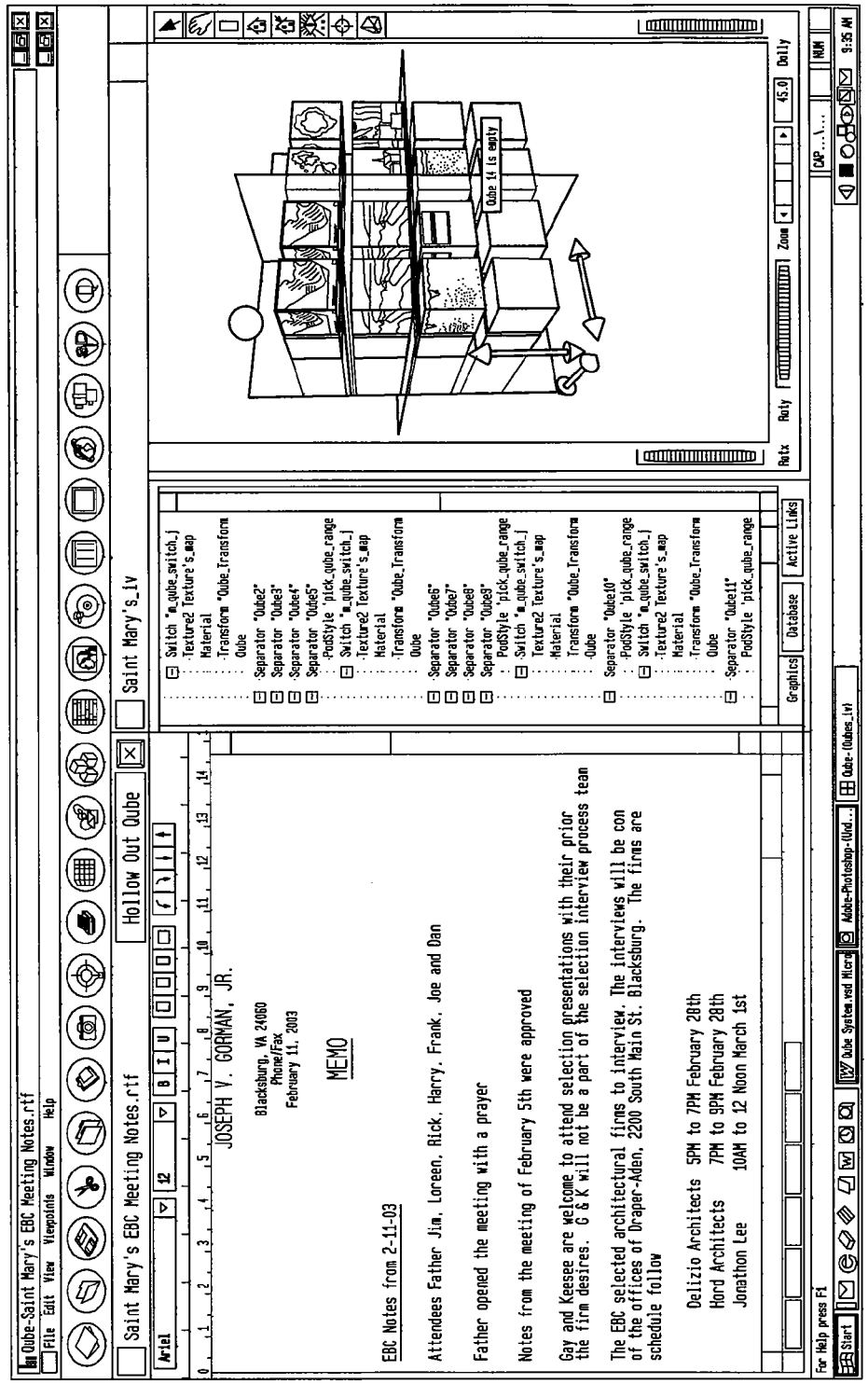

FIG. 83, Word Processor App, is a graphic representation of an illustrative word processor application running in the Qube display mode, according to and embodiment of the invention.

Figure 84:
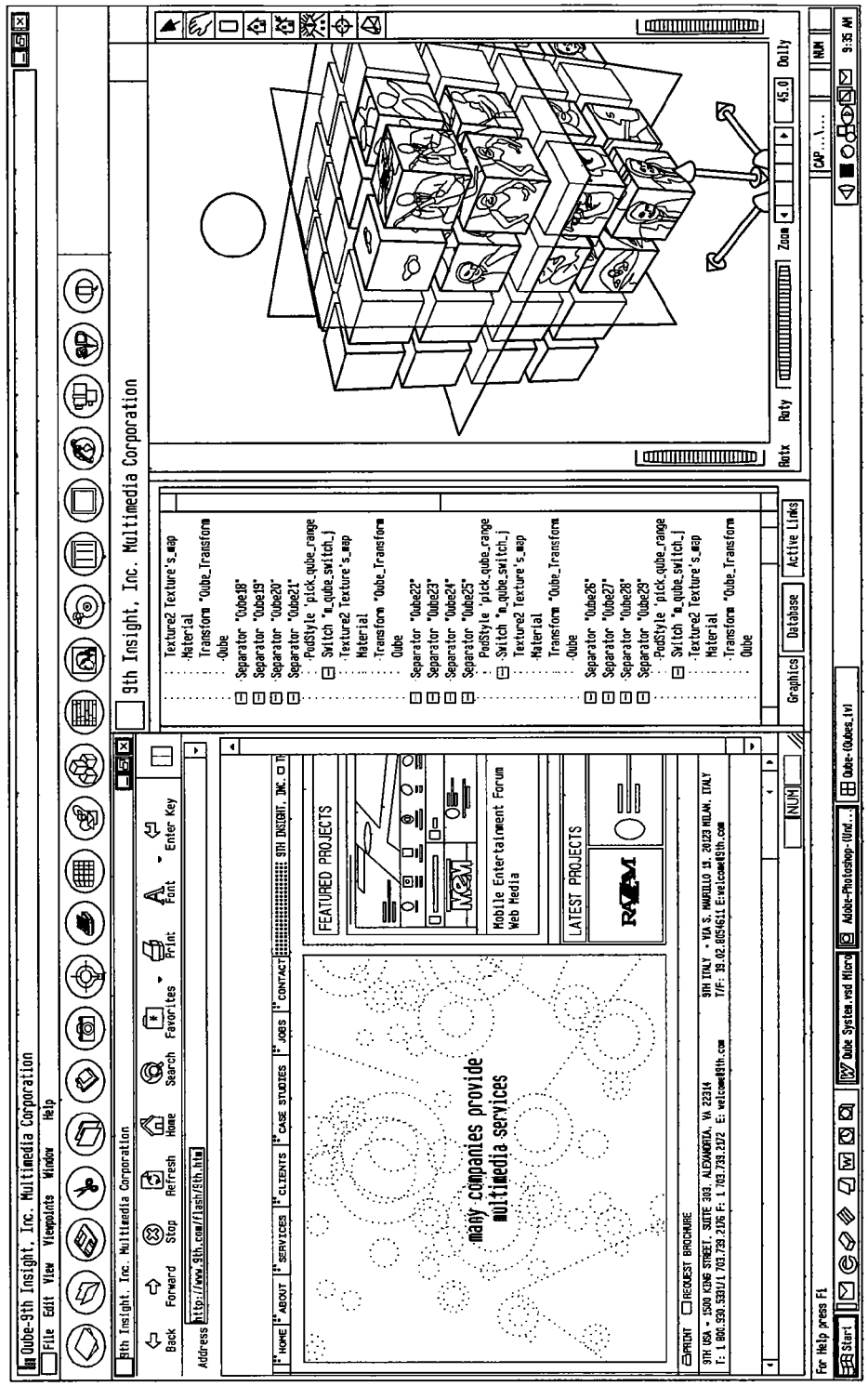

FIG. 84, Internet Browser App, is a graphic representation of an illustrative internet browser application running in the Qube display mode, according to an embodiment of the invention.

Figure 85:
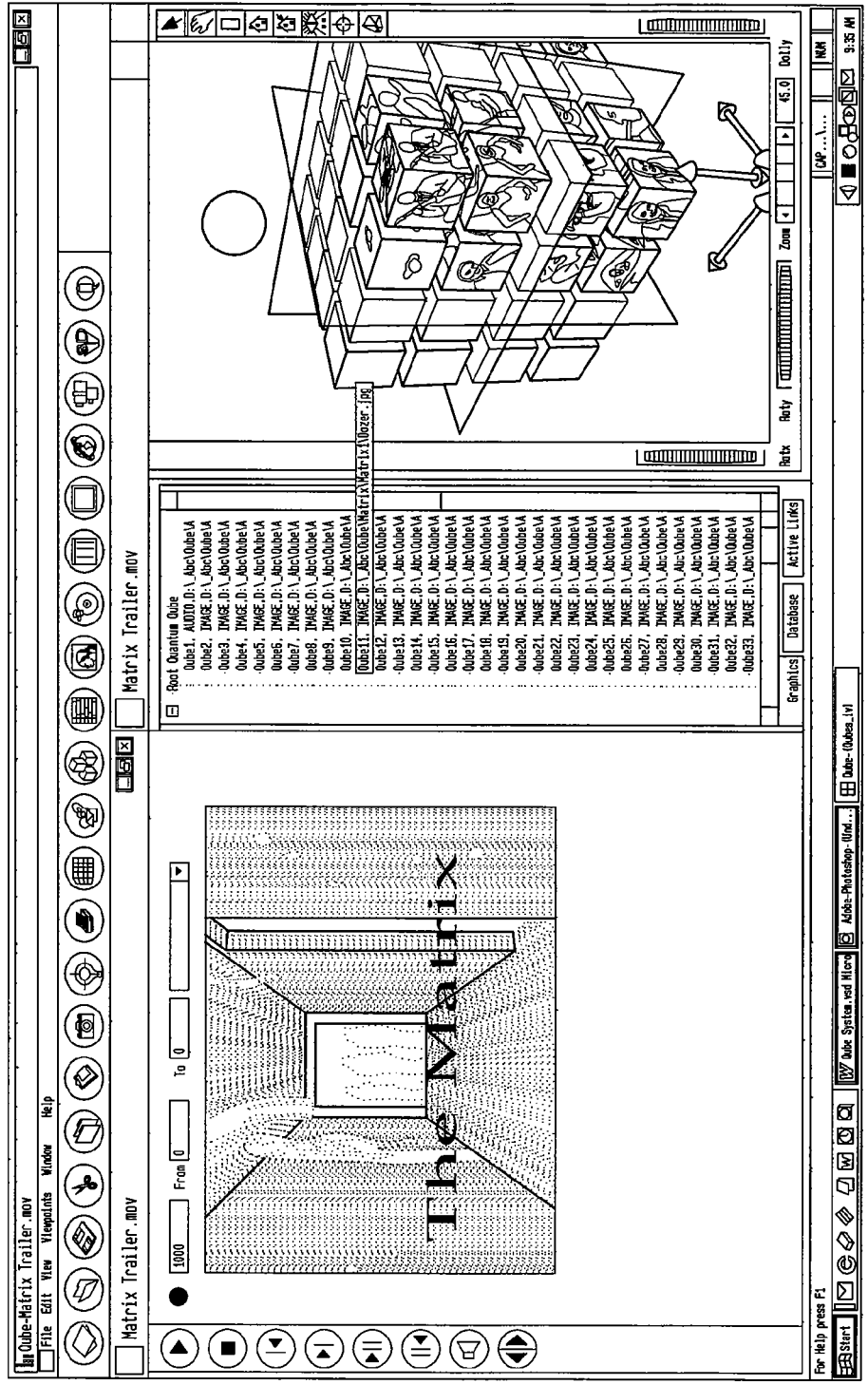

FIG. 85, Video Player App, is a graphic representation of an illustrative video player application running in the Qube display mode, according to an embodiment of the invention.

Figure 86:
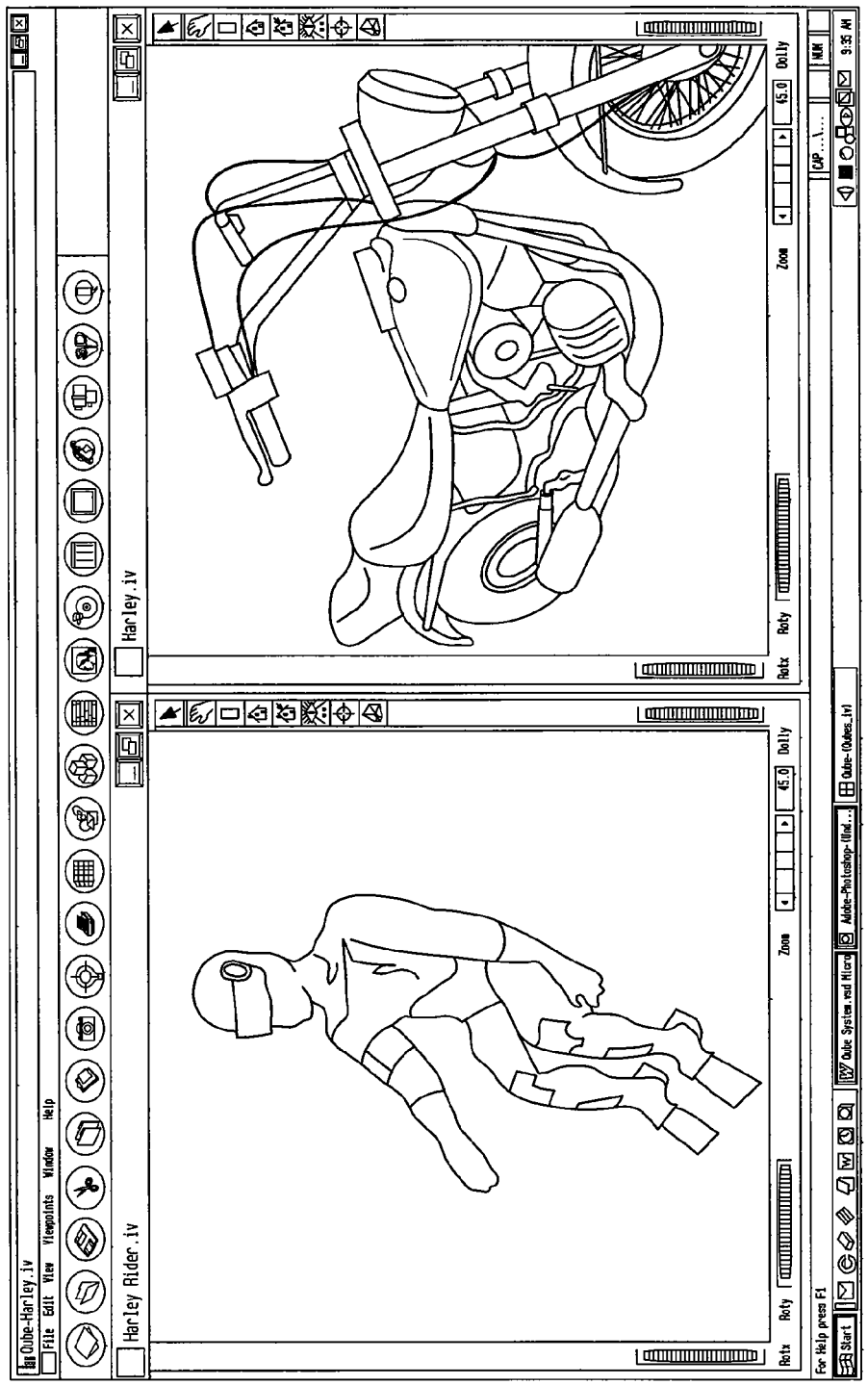

FIG. 86, OpenGL/VRML Model Viewer App, is a graphic representation of an illustrative Open GL/VRML model viewer application, according to an embodiment of the invention.

FIG. 87, Immersive Virtual Display Tour De France 2004, is a graphic representation of the immersive feature of the Quantum Matrix display of pictorial data, according to an embodiment of the invention.

FIG. 88, Lenticular Stereoscopic Display, is a graphic representation of the stereoscopic display feature, according to an embodiment of the invention.

FIG. 89, CAVE Stereoscopic Display, is a graphic representation of the CAVE™ stereoscopic display feature, according to an embodiment of the invention.

Figure 90:
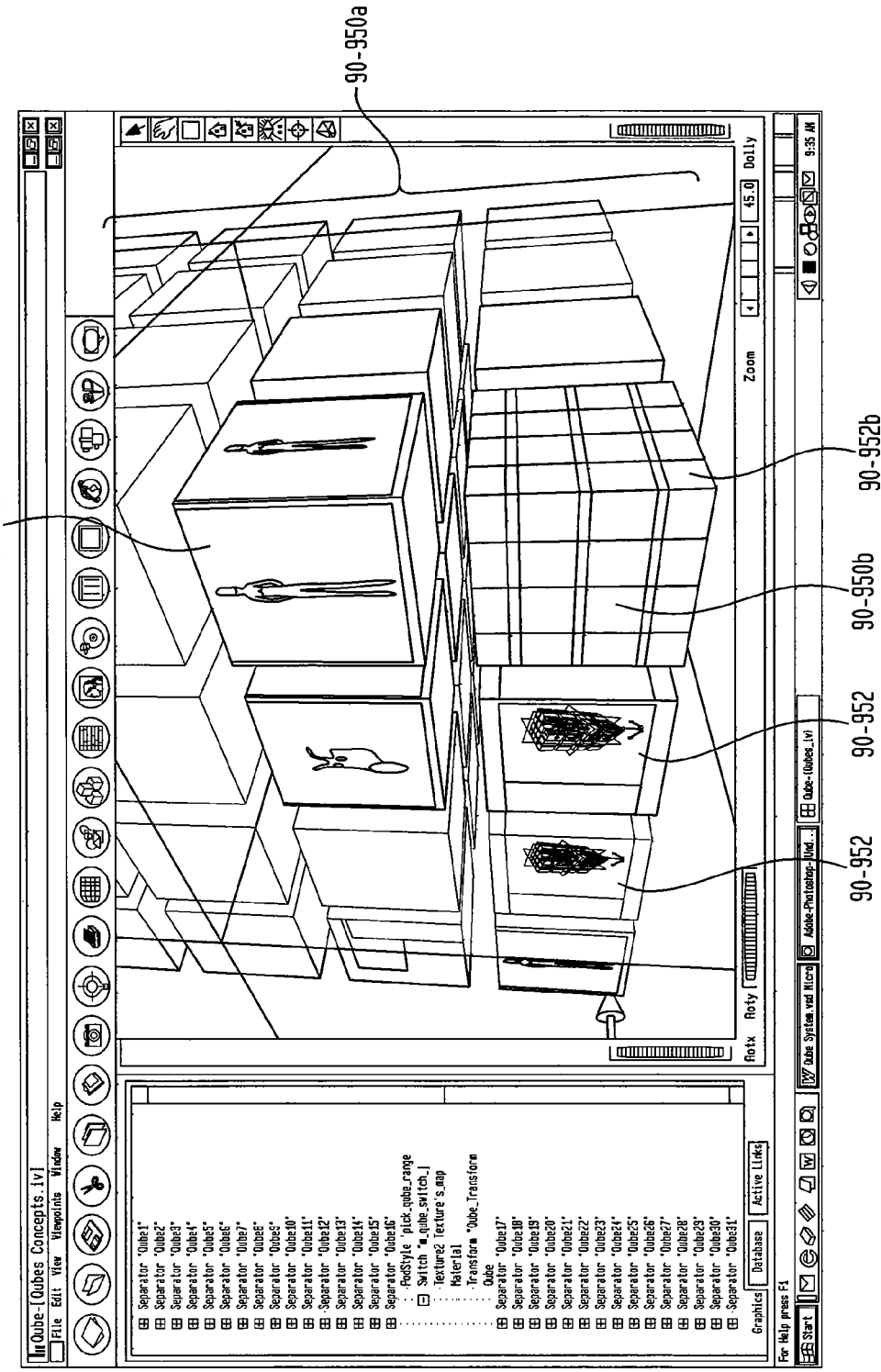

FIG. 90, Qube in Qube for Data Drilling, is a graphic representation of the node in node data drilling and associative link features, according to an embodiment of the invention.

FIG. 91, Qube View Module Graphics User Interface Popup Menu, is a screenshot of the pop-up menu showing view control features, according to an embodiment of the invention.

FIGS. 92-99, QScript Properties Reference, is a table showing the QScript ActiveX programming language and property entries for invention users creating execution scripts, according to an embodiment of the invention.

Figure 100:
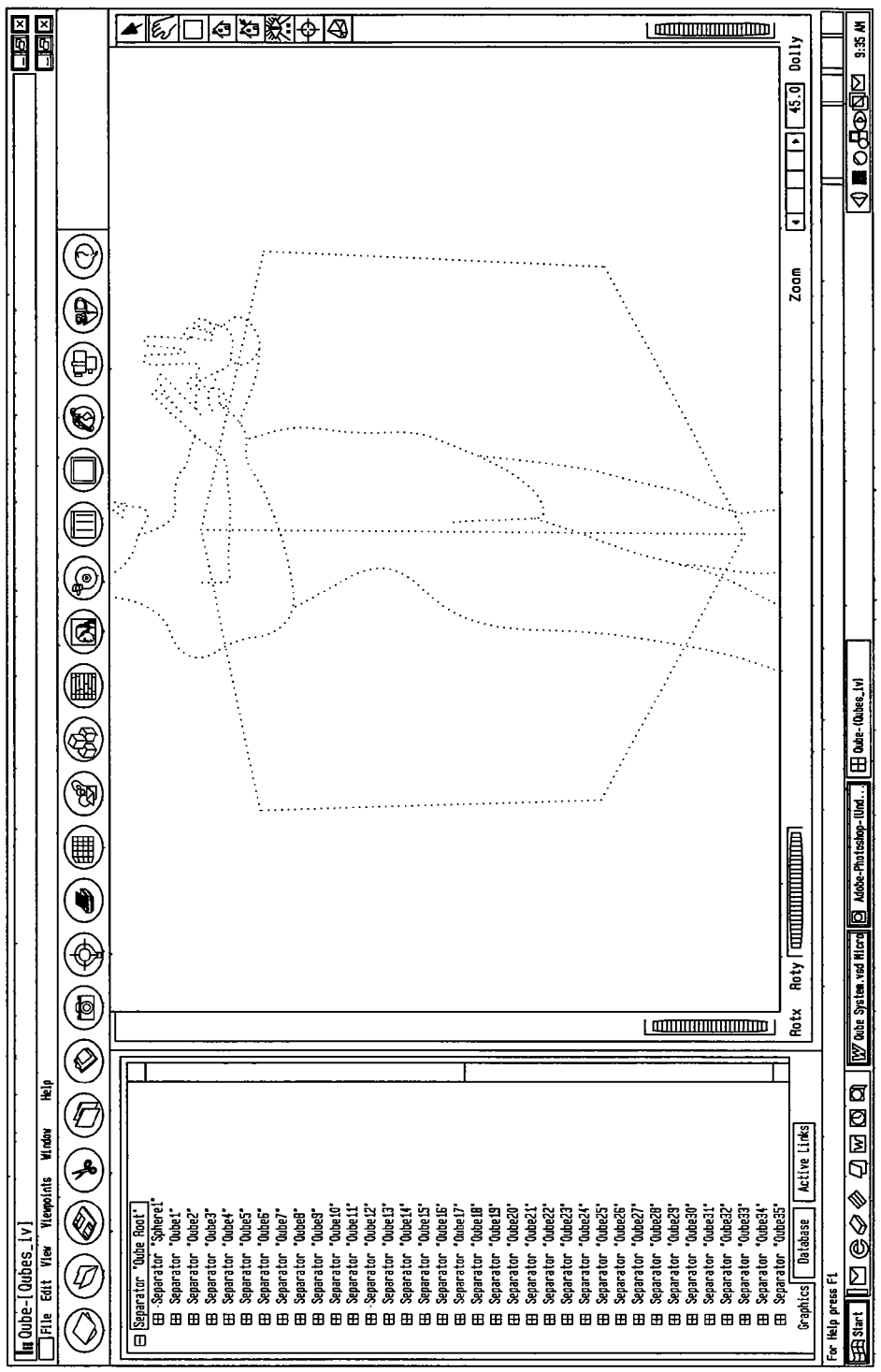

FIG. 100 is a screenshot of a Qube displaying an exemplary binary large object point cloud structure, according to an embodiment of the present invention.

Figure 101:
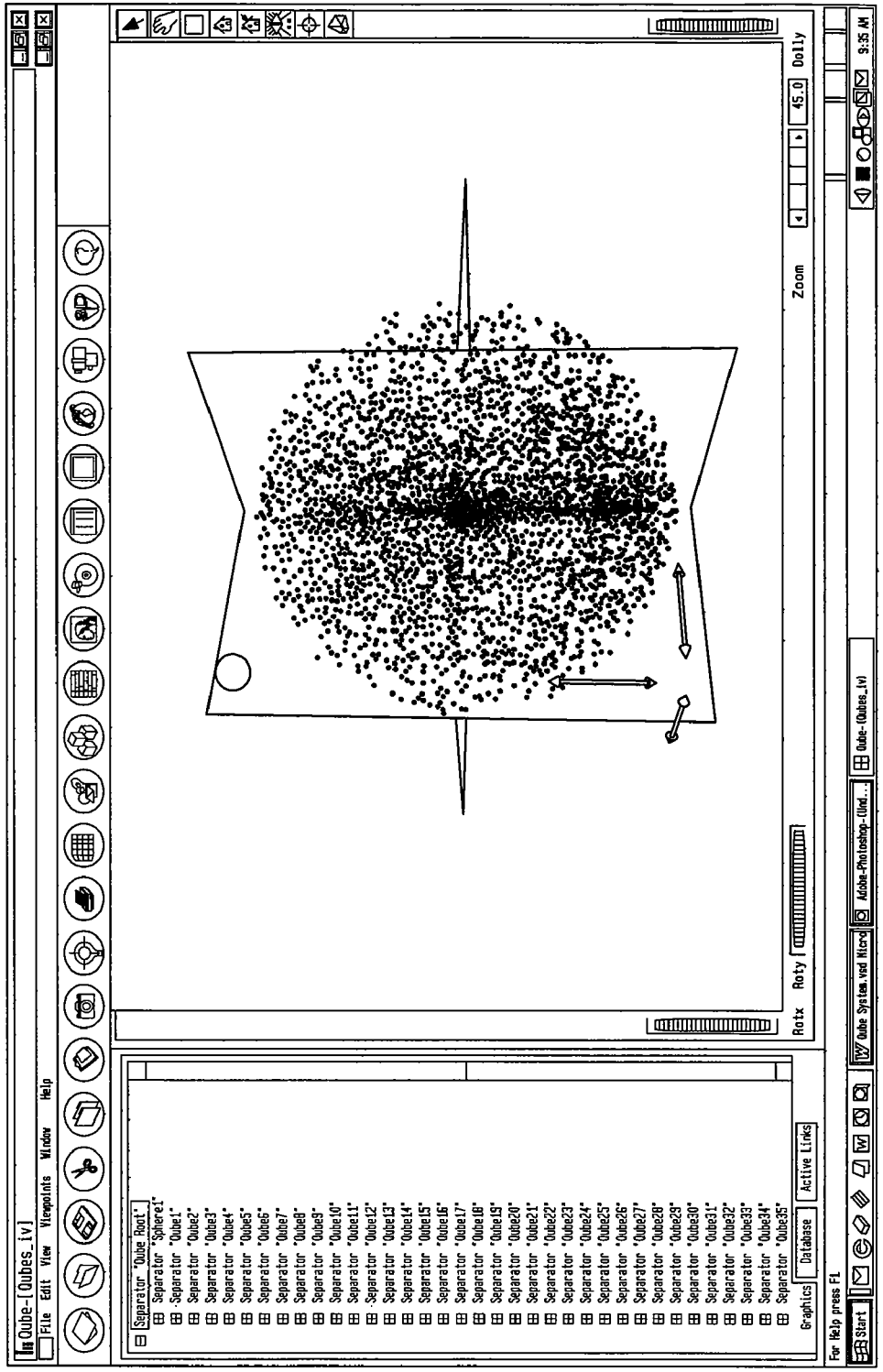

FIG. 101 is a screenshot of a Qube displaying an exemplary binary large object point cloud structure, according to an embodiment of the present invention.

Figure 102:
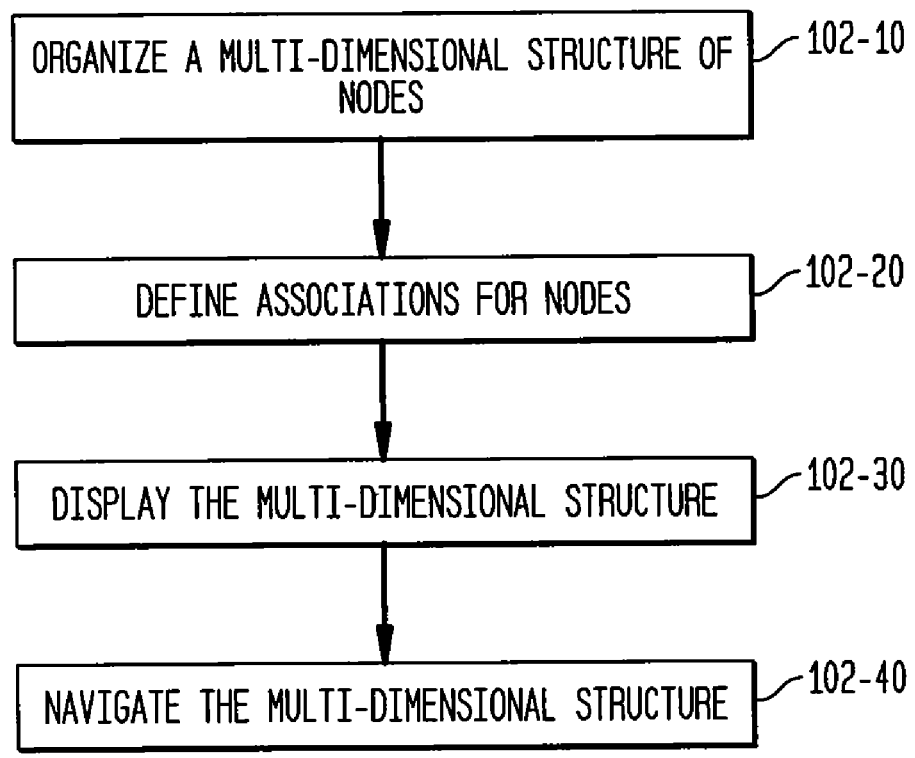

FIG. 102 is an exemplary flowchart of a method for manipulating data in a multi-dimensional structure.

Figure 103:
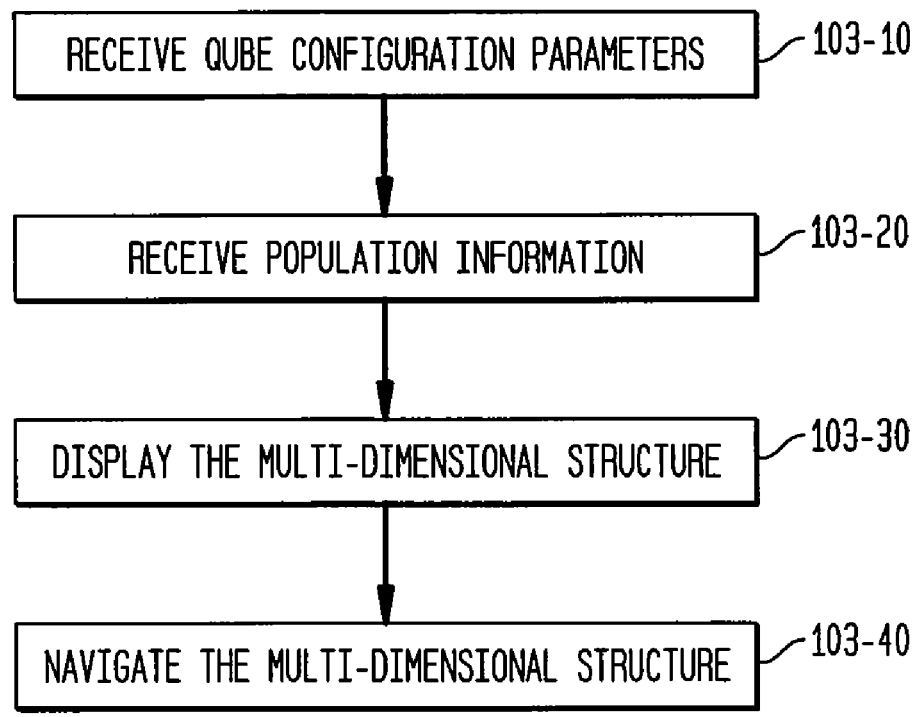

FIG. 103 is an exemplary flowchart of a generic application of the Quantum Matrix application, according to an embodiment of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Aspects of the Quantum Matrix System

The Quantum Matrix system is a multi-dimensional multimedia and document management and integration tool. The Quantum Matrix system converges electronic media into one consistent environment for analysis, representation and integration. In a further embodiment, the Quantum Matrix system uses technologies that allow a user to be immersed in their data in environments such as Cinerama, IMAX and Virtual Reality Environments. The Quantum Matrix system allows a user to interactively place and organize data multi-dimensionally, and to navigate and view data in multiple dimensions (for example, monocular and binocular—stereo). The term data, as used herein is intended in its broadest sense and includes, but is not limited to, color, numerical information, visual objects, documents, processes, associations between documents and processes, and links between data elements.

Figure 2:
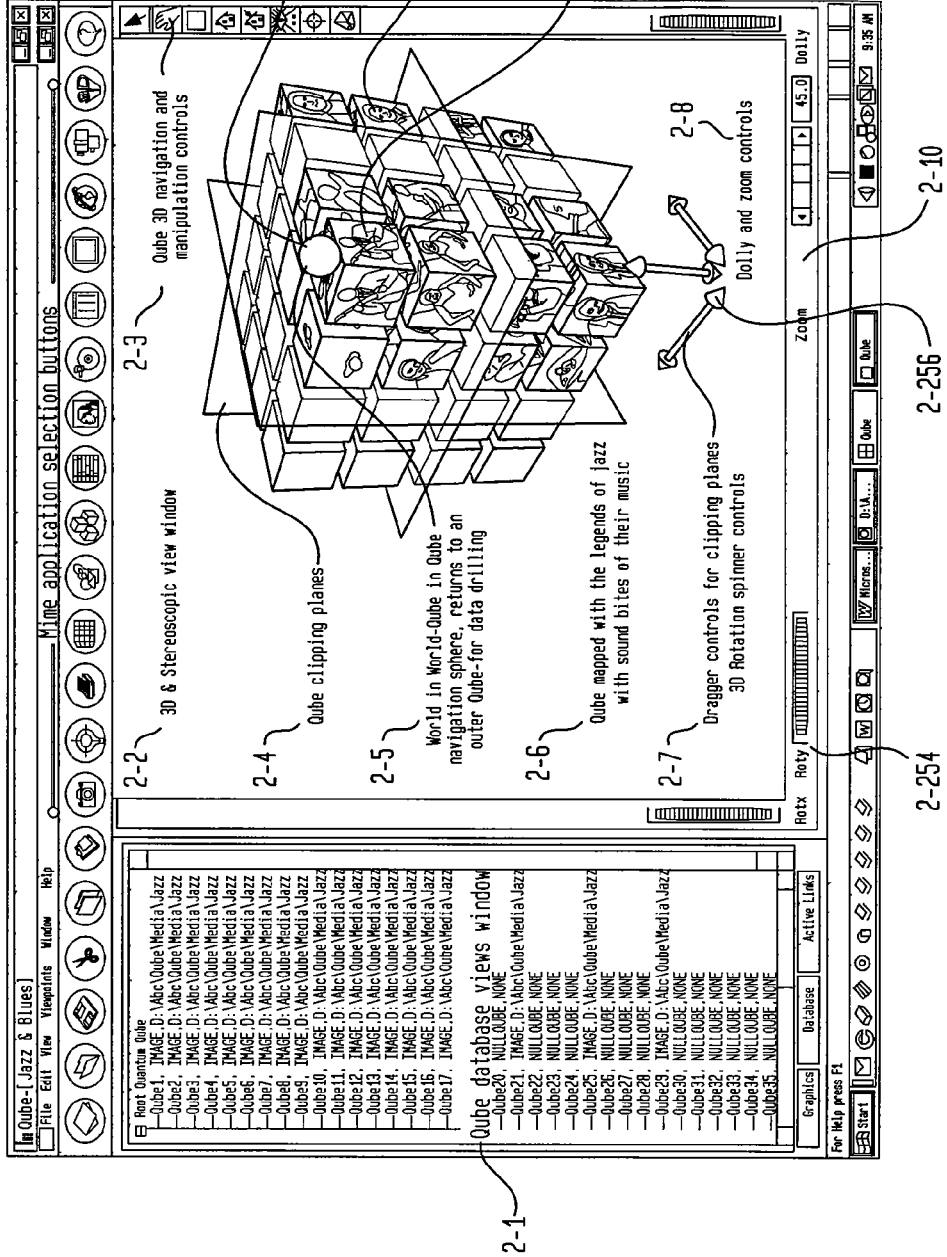

FIG. 2 depicts a screenshot showing an exemplary screen 2-200 displayed to a user by the Quantum Matrix system, in accordance with an embodiment of the present invention. Exemplary screen 2-200 includes a text display panel 2-1 and a Quantum Matrix Qube graphical display panel 2-10. A Quantum Matrix Qube 2-250 is included in Quantum Matrix graphical display panel 2-10. A Quantum Matrix Qube 2-250 is a multi-dimensional structure. Quantum Matrix Qube 2-250 includes a plurality of nodes 2-252 (or nodal objects) in a multidimensional arrangement. Quantum Matrix Node 2-252 is an element of the Quantum Matrix Qube 2-250 which may be associated with data. Although Quantum Matrix Qube 2-250 is depicted as a Qube, any multidimensional shape can be used in the invention.

In an embodiment, any node 2-252 can be another Quantum Matrix Qube 2-252. In addition, any node 2-252 in the sub-Qube can be another Quantum Matrix Qube 2-250, and so on. Because a node can itself become a Quantum Matrix Qube 2-250, the Quantum Matrix is more aptly described as an N-dimensional Cartesian grid in which any point can itself become another N-dimensional grid.

In an embodiment, any node 2-252 can also be mapped as an executable object or data object. For example, a node 2-252 can be, among other things, a real-time signal processing object, performing such real-time tasks as providing voice/telephony communications, television/cable reception, Internet/intranet URL links, and IEEE 488.2 GPIB (general purpose interface bus) links to physical devices such as gauges, switches and instruments. In an embodiment, a node can be modified to encapsulate the specific functionality and data storage requirements for a particular real-time task. This attribute enables such functions as remote meter reading, reading gauge positions and switch toggling. Exemplary real-time objects supported as node object types include date (e.g., system date), time (e.g., system time), process (e.g., multitasking thread), data polling channel, and communications channel. As would be appreciated by persons skill in the art, other types of objects can be used as node object types.

FIGS. 77-87 depict screenshots of an exemplary Quantum Matrix showing examples of various data that may be associated with the Quantum Matrix. For example, FIG. 77 depicts a screenshot showing an exemplary Quantum Matrix Qube 77-50, a Quantum Matrix Node 77-52 associated with audio data, and an application 77-54 capable of playing the audio data.

The Quantum Matrix system, in part or in whole, may be stored locally or distributed among one or more networked computers or storage devices.

1.1 Visual Organization

The Quantum Matrix system organizes data visually and multi-dimensionally. Although FIG. 2 depicts the Quantum Matrix Qube 2-250 as a cube, in alternate embodiments Quantum Matrix Cube 2-250 can take various other structural forms. In an embodiment, the shape of the Quantum Matrix Qube 2-250 can be selected by the user to fit a problem set or the subjects of study. The chosen three-dimensional structure forms the fundamental organizing element for the user's data. The visual dataset of the Quantum Matrix Qube 2-250 may be thought of as a Binary Large Object—"BLOb" or a point cloud. In this disclosure, the BLOb is also described as a grid in which any node in the grid can be any executable object, including the replication of the grid itself.

In an embodiment, data is stored and associated with volume metric picture elements (voxels) and visually displayed and organized by the user. As used herein, a voxel is synonymous with a node. The graphical rendering of these volumetric elements is the primary method for accessing data and acts as a visual cue and in some cases, the actual data.

A voxel has positional vector information and rendering information associated with it, in addition to the data mapped to it. For example, in an embodiment, a node/voxel is a three-dimensional object located in space at a specific Cartesian (x,y,z) coordinate. An exemplary node/voxel can include a single point of no dimension or a more complex object geometric shape such as a cube, sphere or platonic solid, another Qube, a point cloud, or similar. A set of elemental point nodes are referred to as a point cloud or binary large object (BLOb). Each node has one or more associated properties such as color transparency, reflectivity, refractivity and data such as associated program, document, and logical and computed links.

This three-dimensional array is an example of a Quantum Matrix Qube. This allows the user to navigate through the data using spatial navigation control analogous to airplane control with six degrees of freedom of movement: allowing the user to move the Quantum Matrix Qube in three axis (x, y, z) and to rotate in all three axis as well (roll, pitch, and yaw). The user is thus able to view the various data and documents held at the nodal points of the Quantum Matrix Qube and to access the data visually. Seeing the actual data allows the user to intuitively recognize its purpose as well as to discover relationships that naturally occur because the data are organized visually. The form that the visual display takes is configurable by the user.

Figure 3:
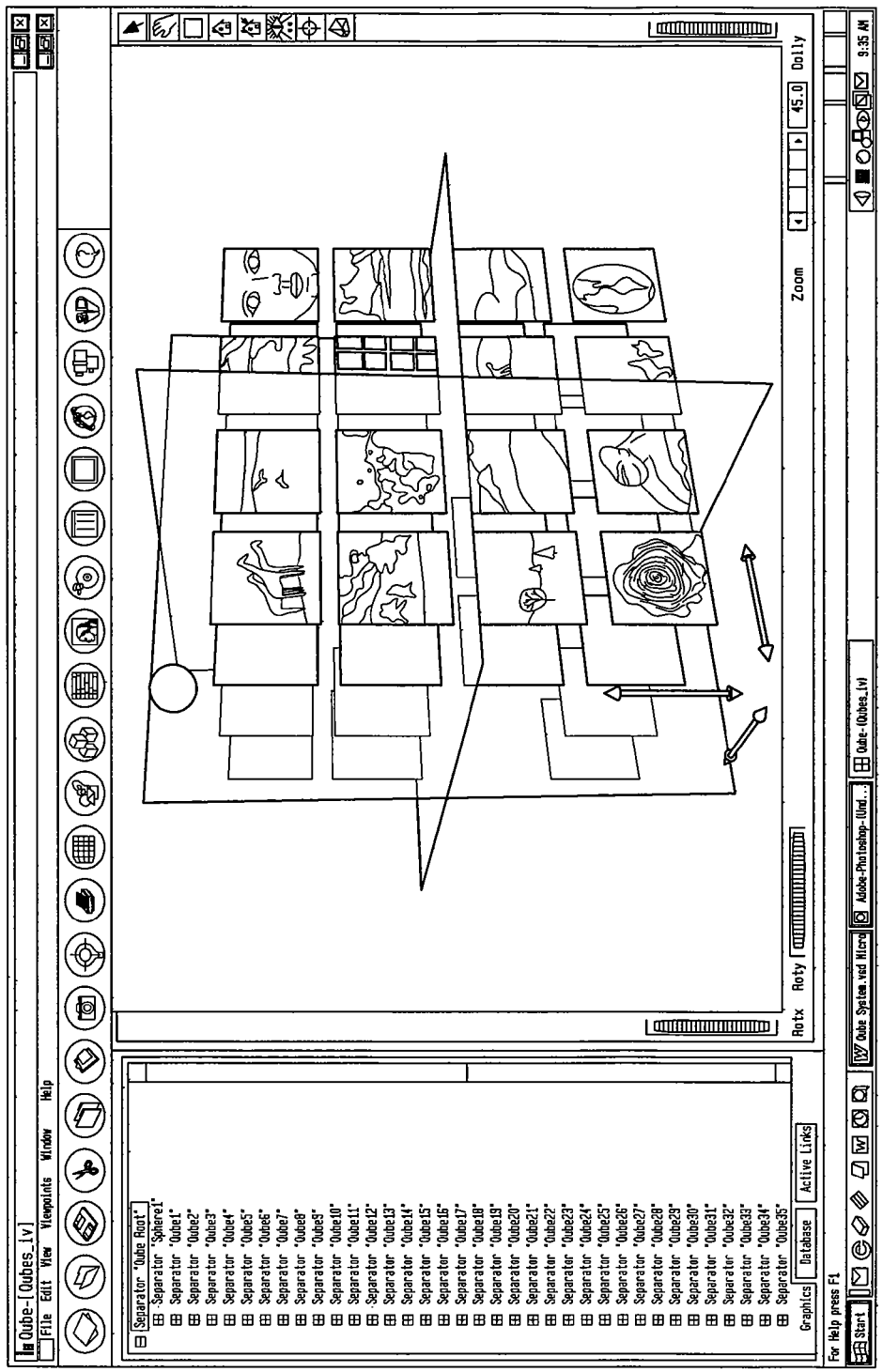
Figure 4:
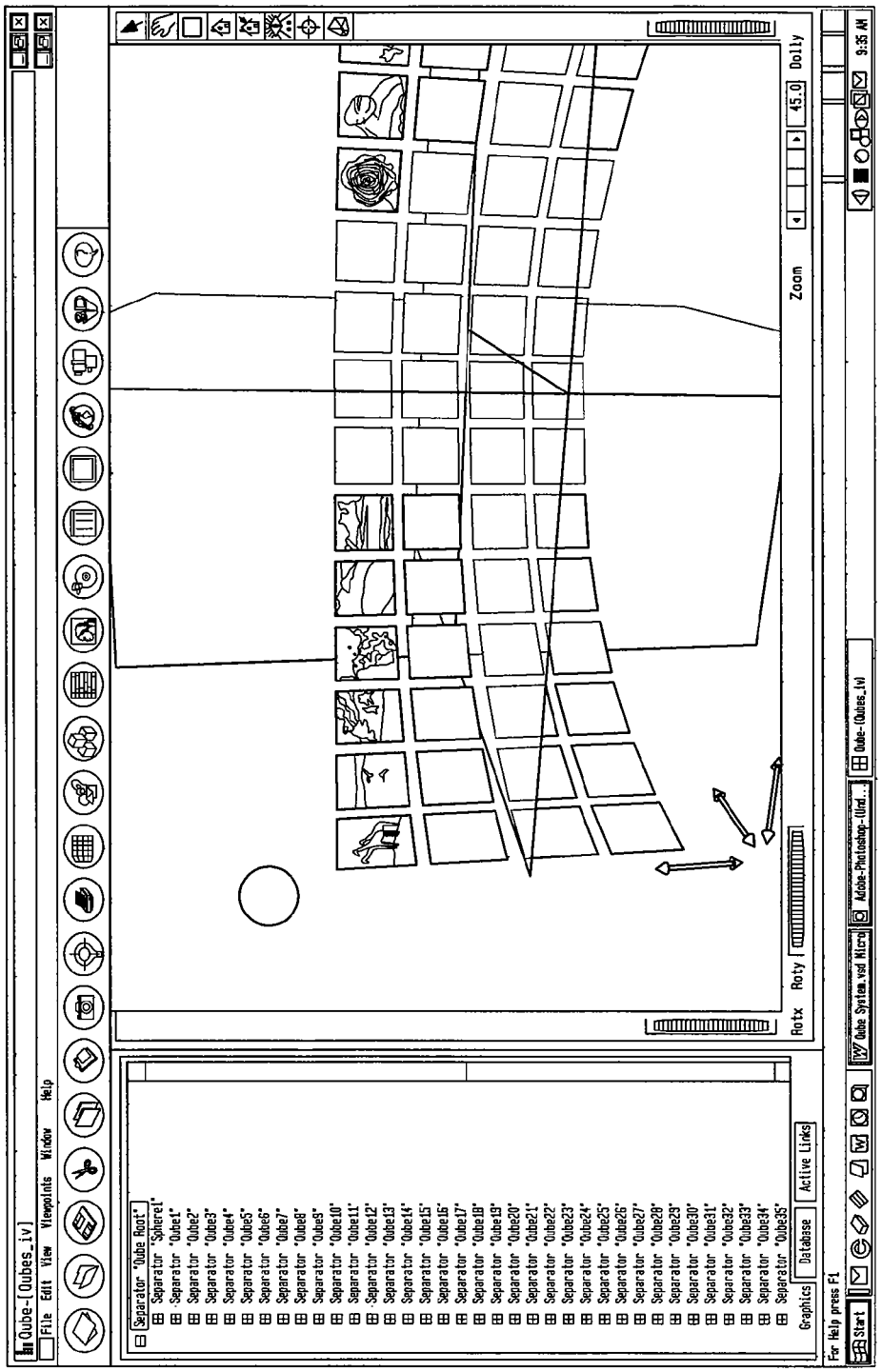
Figure 5:
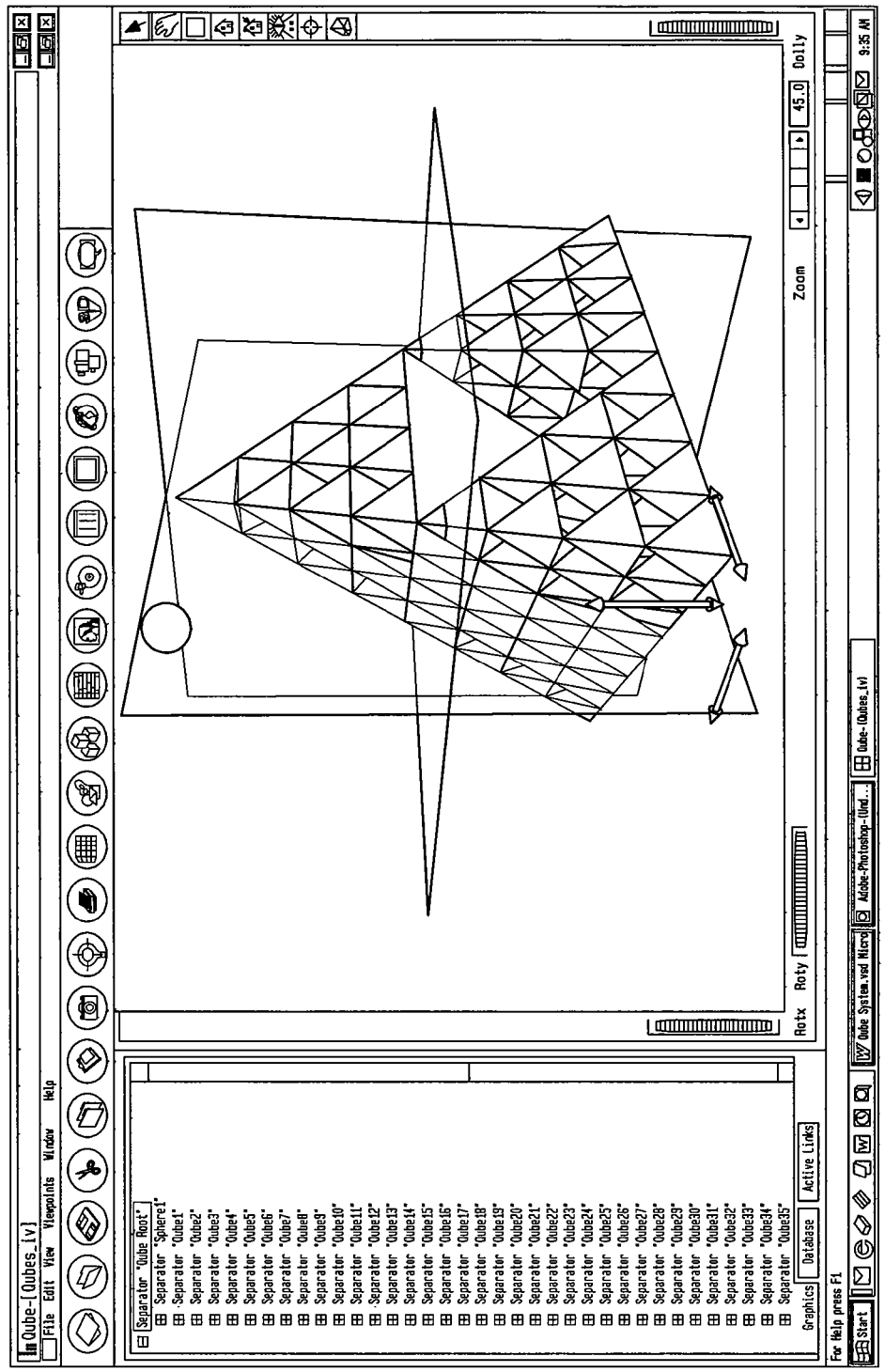
Figure 6:
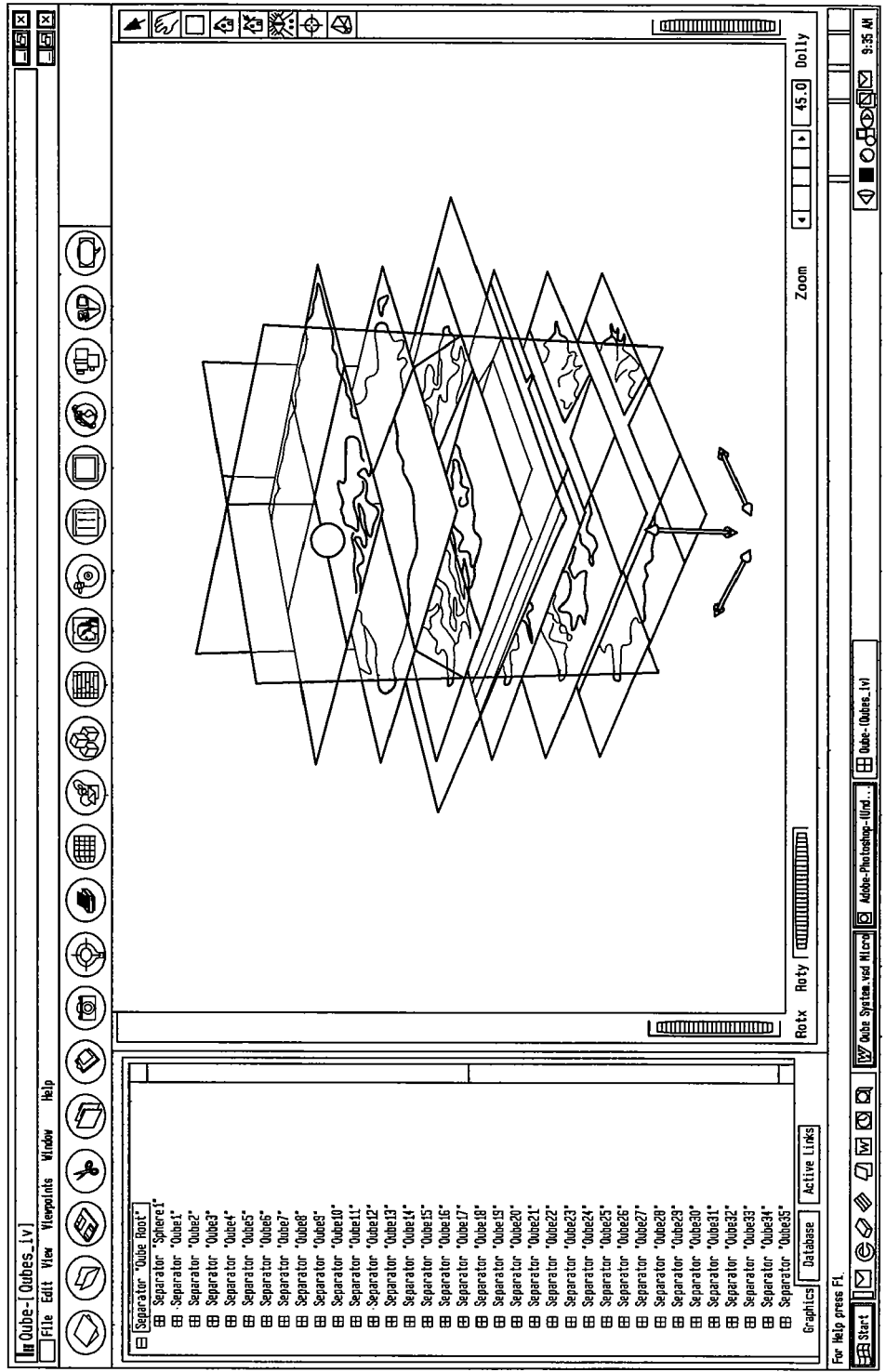

For example, FIGS. 100 and 101 depict examples of the Quantum Matrix Qube arranged as a point cloud. FIGS. 2-6 depict examples of the Quantum Matrix Qube arranged as a cube, panorama, triangular pyramid, and stack of planes. FIG. 3 depicts an exemplary Quantum Matrix Qube arranged as a planar stack, in accordance with an embodiment of the present invention. The planar stack offers the familiar metaphor of a stack of papers or documents. For example, data drilling can be thought of in this paradigm as being bibliographical or as footnotes which lead a user to more detail on a subject in the main data node. These references can in turn lead to more data and so on. FIG. 4 depicts an exemplary Quantum Matrix Qube arranged in a panoramic view, in accordance with an embodiment of the present invention. The panoramic viewer is a powerful three-dimensional representation of data, allowing the view to be completely surrounded by their data. This viewing mode is particularly effective when coupled with stereoscopic display technologies such as the CAVE and similar. FIG. 5 depicts an exemplary Quantum Matrix Qube arranged as a three-dimensional Stepinski triangle. The Stepinski triangle is a fractal object that inherently possesses the idea of an object in objects. The three-dimensional Strepinski triangle is created recursively by placing a smaller tetrahedron drawn from mid-point to mid-point of the four faces of the parent tetrahedron thus, creating smaller tetrahedrons. FIG. 6 depicts an exemplary Quantum Matrix Qube arranged in a planar GIS display mode, in accordance with the present invention. Each pixel of the plane is a node and has associated with it color and layer information. In this embodiment, a node is synonymous with a pixel. The analytical capabilities of a GIS system are inherent in the Quantum Matrix system. For example, color coded pixels can be counted, percentages computed relative to an area, and statistical correlations can be made. The same data structure that allows an image or other data to be associated with a node object also allows pseudo color to be mapped.

Furthermore, the Quantum Matrix Qube may take a shape of any multi-dimensional object such as a building, a human body, or an aircraft. For example, a user could create a data structure that conforms visually to the human body. In this example, a node could be the equivalent of a body system (e.g., an eye). The node in node concept could be to further expand on details related to the individual system (e.g., the eye node could contain a Qube having papers on topics related to conditions of the eye, data on the retina, real-time nodes for connection to specialists, etc.).

1.2 Worlds in Worlds-Nodes in Nodes

The Quantum Matrix can be described as an n-dimensional data space. That is, nodes can be placed inside other nodes. FIG. 90 depicts a screenshot of an exemplary portion of a Quantum Matrix Qube 90-950a containing a plurality of nodes 90-952, in accordance with an embodiment of the present invention. Node 90-952b is a node that includes a Quantum Matrix Qube 90-950b. In an embodiment, data is stored in a node and is organized visually by the user, placing associated or related objects adjacent to one another and categorizing information hierarchically by placing sets of similar data inside a node. In this embodiment, the organization is entirely the choice of the user. There is no requirement for a schema or data map. The Quantum Matrix system automatically extracts a visual data tree showing paths to data and the hierarchy or relationships that the user has created. This structure allows natural hierarchies to be modeled, real world parallels to be represented, and efficient searching of the database.

1.3 Relational Nodes and Associative Links

In addition to the node in node hierarchical construct, the Quantum Matrix introduces a new visual relational database feature. Relationships between nodes in the Quantum Matrix Qube are established by assigning links between the nodes.

The Quantum Matrix system allows the user to access matrices and nodes based on relational logic and computed associative links that support quantum leaps between nodes and even whole matrices based upon formulae and Boolean algebra that are derived from computed values of links and data represented by the nodes. The data variables in the formulae can be either static or changing values coming from a real-time signal processing source or a polled web connection. The Quantum Matrix provides a complete macro language based on the BASIC programming language called QScript. The QScript scripting language allows the user to create associative relational links formulae and logic that can be executed by the Quantum Matrix to access the desired matrices and nodes.

Figure 44:
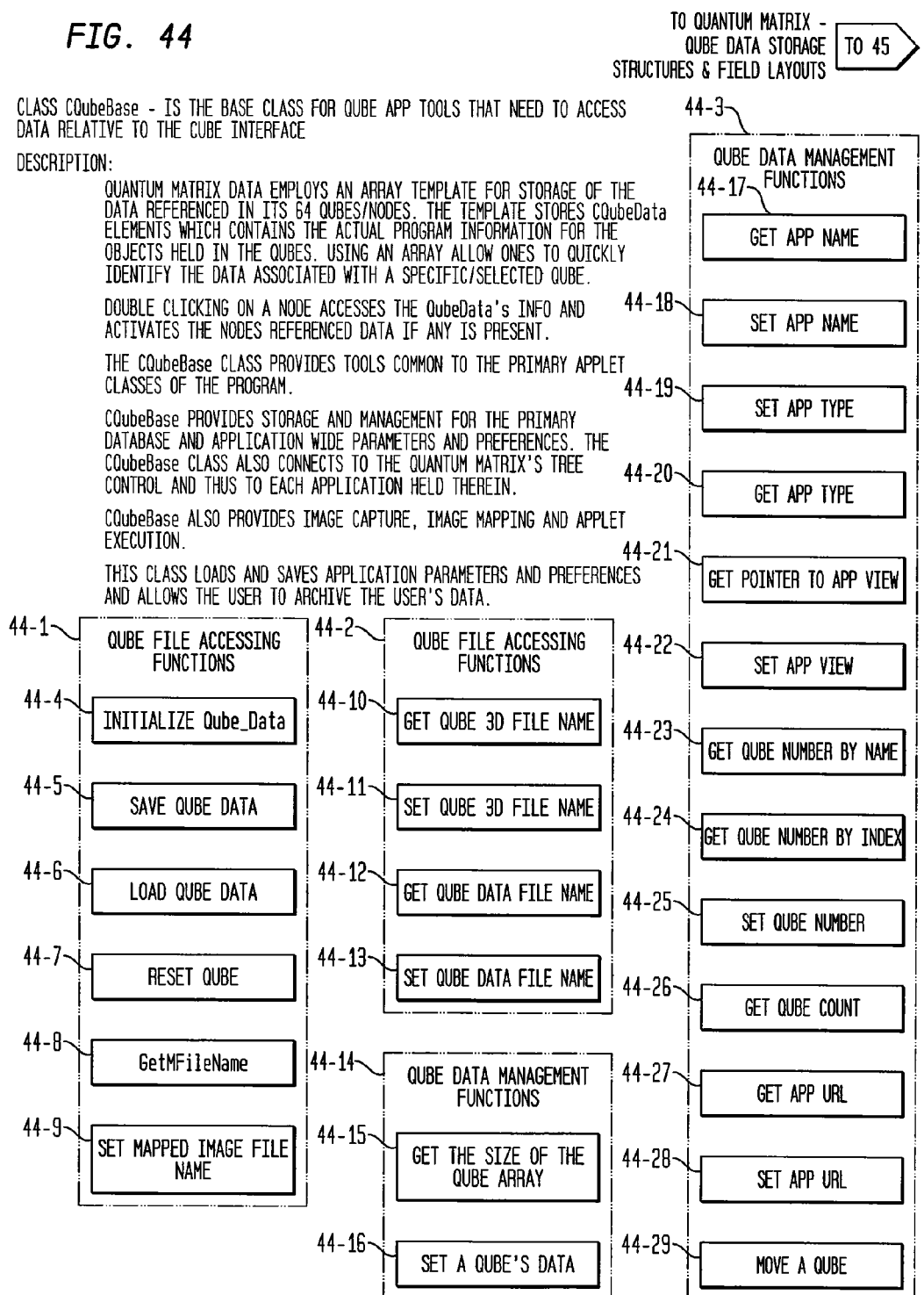
Figure 46:
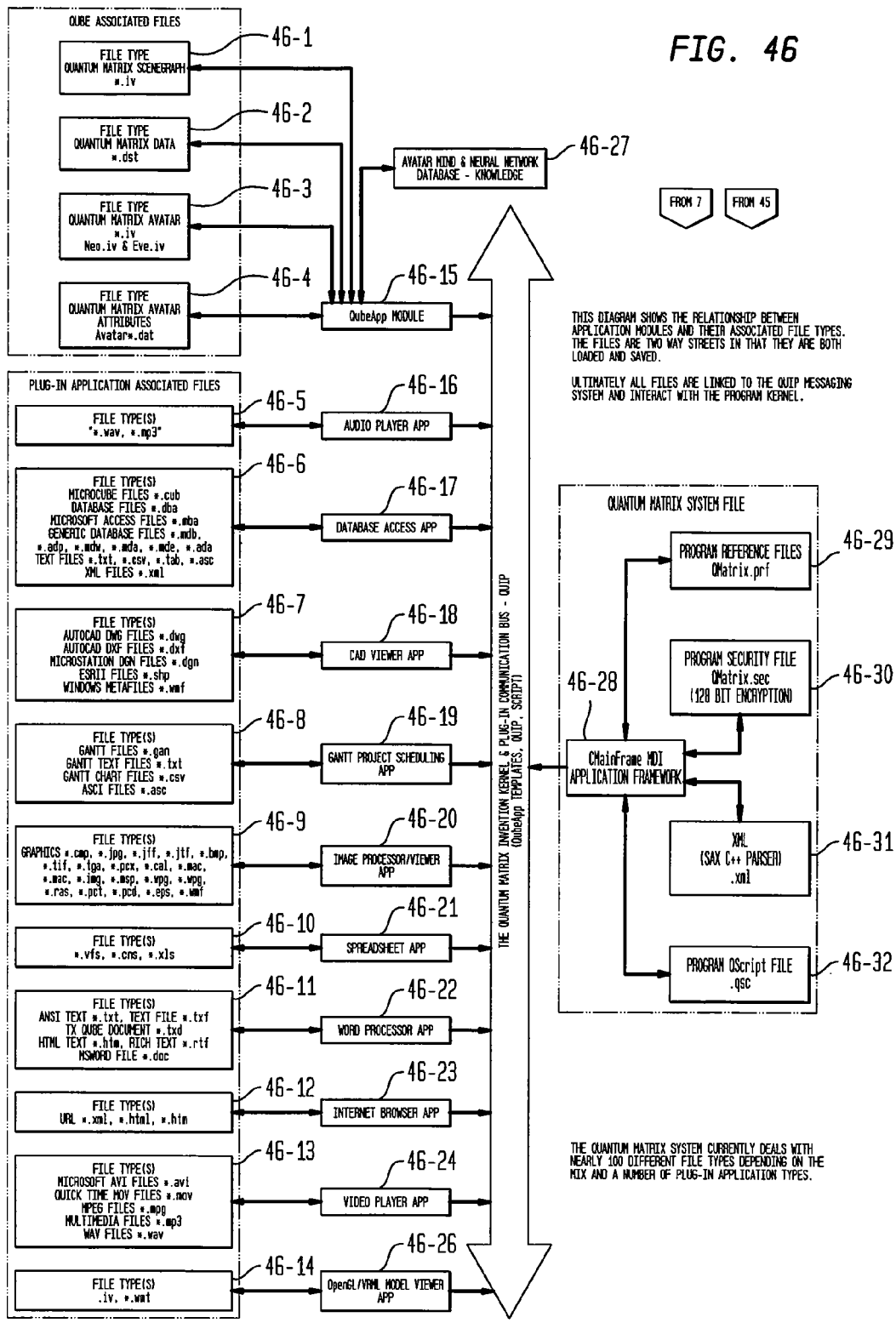

The Quantum Matrix database is "both and," rather than "either or." The Quantum Matrix system uses pointers to classes of objects that allow visual hierarchies to be formed but data can be accessed through intelligent indexed objects that provide relational calculus. The Quantum Matrix database employs a dynamic array template for the storage of the classes of application objects associated with its matrix nodes. The template (CVector) stores CQubeData elements, which contain the actual application program information for the objects held in the nodes. Using a dynamic array allow ones to quickly identify the data associated with a specific selected node. The CVector class allows for a variable sized array of database class objects while at the same time providing rapid and simple indexed access. The use of dynamic arrays allows for any number of nodes to be created and stored, and for the data to expand dynamically as required. The Quantum Matrix node in node feature is implemented by a pointer between dynamic arrays, as depicted in FIGS. 44 and 46.

1.4 Navigation in Three-space

The Quantum Matrix has a set of unique navigation controls that are designed to allow a user to move quickly and intuitively in the Quantum Matrix environment. All navigation in the Quantum Matrix is animated real-time to give the user instant feed back as to where the user has navigated. In an embodiment, a user can perform data drilling by making a mouse click on a Quantum Matrix node. For example, double clicking the mouse button on an object in the matrix activates that object. As would be appreciated by persons of ordinary skill in the art, other methods of activating a node to perform data drilling can be used with the present invention.

Figure 40:
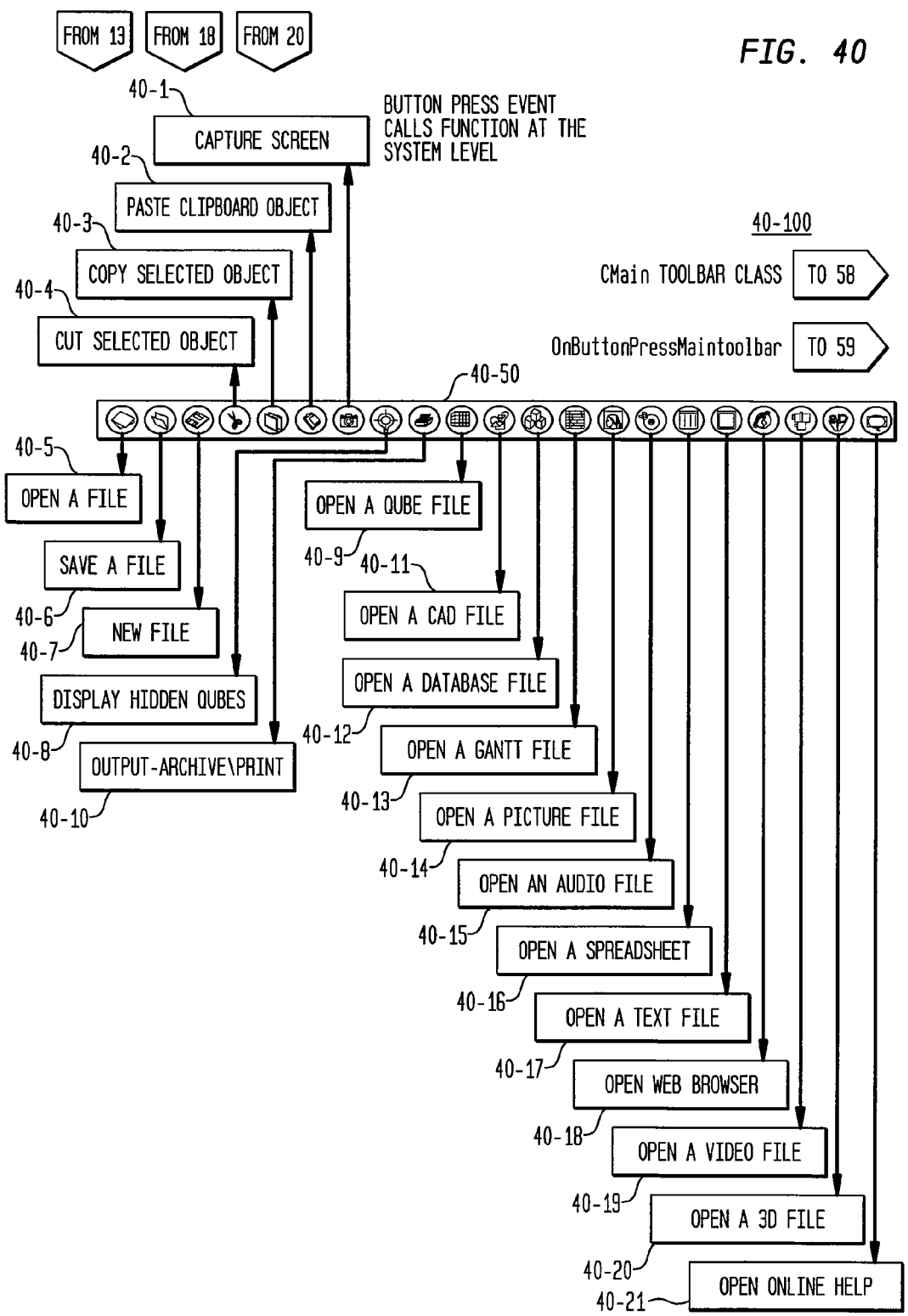

Clipping planes and draggers are examples of Quantum Matrix view control objects that allow the user to turn off groups of nodes within the Quantum Matrix. This feature allows the user to cull out nodes as sets to see and select nodes that are internal to the Quantum Matrix's space. In large data spaces, this method acts like a visual binary search, eliminating large sets of nodes and thus reducing the number of objects for finer examination to those objects that are visible. Hiding nodes also allows the user to see and discover new relationships in the data. The clipping planes and draggers work together. FIG. 2 depicts a screenshot of an exemplary Quantum Matrix with an exemplary clipping plane 2-254 and exemplary dragger 2-256. In an embodiment, a user may select a dragger arrow with the mouse to move the clipping plane associated with the dragger arrow. For example, there may be three draggers and three clipping planes operating in pairs and corresponding to the X, Y, and Z-axis of the Cartesian coordinate system. In an embodiment, selecting a clipping plane with a mouse button may hide the cubes in front or behind the clipping plane. Furthermore, in an embodiment, nodes may be individually hidden by selecting a node with the hide node mode on. FIG. 40 depicts a screenshot of an exemplary toolbar interface used in the Quantum Matrix that provides a button 40-50 to turn on nodes individually, in sets, or all at once. In an embodiment, this feature when combined with the security features of the Quantum Matrix allow sensitive documents to be hidden and encrypted by supplying a password. As would be appreciated by persons of ordinary skilled in the art, other methods of culling nodes, hiding nodes, displaying nodes, and securing documents can be used with the present invention.

1.5 Visual Data Drilling

An outstanding and powerful feature of Quantum Matrix, particularly for business and scientific applications, is that a node/voxel in the Quantum Matrix Qube can be another Quantum Matrix Qube (a sub data space within a data-space). Because a node can itself become a Quantum Matrix Qube, the Quantum Matrix escapes the simple three-dimensional definition and is more aptly described as an n-dimensional Cartesian "Grid" in which any point can itself become an N dimensional Grid (data drilling).

As mentioned before in the Quantum Matrix's n-dimensional data space, nodes can be placed inside other nodes. There is no requirement for a schema or data map. Quantum Matrix automatically extracts a visual data tree showing paths to data and the hierarchy or relationships that the user has created.

Activating data drilling (e.g., clicking the mouse on the embedded node) takes the user into the data space of the embedded object and allows the user to explore its data. This process makes data drilling a more understandable and powerful process. Since any node can, itself be another nodal object.

In an embodiment, the Quantum Matrix can access 1.15 quintillion (1,150,000,000,000,000,000) objects in just 10 levels of recursion. Hence, an embodiment of the Quantum Matrix can be used to organize the contents of the library of Congress which has an estimated 128 million items or even the World Wide Web which is currently estimated to have 320 million indexed pages. The data drilling capabilities of the Quantum Matrix would allow a user to easily navigate and access this data.

FIG. 2 depicts a screenshot of an exemplary Quantum Matrix showing an exemplary homing navigational interface 2-258 for data drilling. For example, a user may click on the homing navigational interface 2-258 to back up one level or double click the homing navigational interface 2-258 to return to the top level. As would be appreciated by persons of ordinary skilled in the art, other methods of navigating the Quantum Matrix Qube can be used with the present invention.

A real world example of the application of this feature is NASA's space shuttle engineering design manual. All of the major components of the space shuttle assembly could each be mapped to a Quantum Matrix node. For example the Saturn booster engine can be represented as a node. Inside this node would be all of the sub assemblies of the engine, and each of these in-turn could contain further sub assemblies. Each inner node would could show a picture, movie or other document of this assembly allowing one to examine every part in the space shuttle down the smallest screw.

In another real world example of the application of this feature, the Quantum Matrix Qube may be mapped to the human body. The nodes at the root level of the Quantum Matrix Qube can represent major parts of the body such as the head, abdomen, arms, and legs. The node representing the head can further contain another Quantum Matrix Qube with nodes representing the inner parts of the head such as the eyes, brain, tongue, and ear drums.

1.6 Populating Quantum Matrix Nodes

In an embodiment, the Quantum Matrix allows the user to manage and to view data three dimensionally. For example, data are positioned in the 3D grid of nodes that are positioned at ordinal Cartesian coordinates. A bitmap image snapshot of a data element may be captured and texture mapped onto a three-dimensional surface associated with a node. The user experiences the data stored in the Quantum Matrix by moving through the data-space and viewing the objects stored therein, employing three space graphics and orthogonal projection conventions.

The business functionality of the Quantum Matrix incorporates a set of impersonator application components that allow the user to view and manipulate a broad range of data types and mimic applications that deal with the particular data types without the necessity of having the native software for these applications.

These "applets" read, write and manipulate the data of various file types in their native format. FIGS. 77-86 depict screenshots of an exemplary Quantum Matrix showing examples of various applets such as an audio player and spreadsheet program. While similar to Internet MIME, these tools offer more extensive capabilities and functionality beyond just viewing. MIME stands for Multipurpose Internet Mail Extensions, and refers to an official Internet standard that specifies how messages must be formatted so that they can be exchanged between different email systems. MIME is a very flexible format, permitting the user to include virtually any type of file or document in an email message. Specifically, MIME messages can contain text, images, audio, video, or other application-specific data. The Quantum Matrix, however, does not currently use the MIME protocols for its messaging. However, the MIME protocol may be utilized with the Quantum Matrix.

1.7 Manual Population of a Node

An example of manually populating the nodes of the Quantum Matrix is described below. As would be appreciated by persons of ordinary skill in the art, other methods for manually populating nodes can be used with the present invention.

As discussed above, any data can be mapped to a node. Data may be mapped by the point and click method or by drag and drop. For example, these actions may be executed in the client area of an application window. By point and clicking the mouse in the application window, the Quantum Matrix system captures the application's name, location and a snapshot image of the application to the Matrix clipboard.

Next, the user may move back to an embodiment of the Quantum Matrix by, for example, clicking on the window displaying the Quantum Matrix to give it the focus. Next, the user may click the mouse button on the node to which the application is to be mapped. The user may visually organize the data to define where items should be placed in the Matrix.

In another example, dropping a document on a node may cause it to appear as a mapped image on all surfaces of the selected node. Simultaneously the document is automatically inserted into the Qube's data tree as another view of the organizational structure that the user has created.

Once data has been mapped to a node, clicking the node will activate the data. For example, if the data represents an application, the application may be started. The subsequent application window and its document can then be viewed and worked with.

Furthermore, the user may delete a node, delete an association between a datum and a node, create new nodes, create new matrices and reposition the nodes.

1.8 Auto Population of a Quantum Matrix

An example of automatically populating the nodes of the Quantum Matrix is described below. As would be appreciated by persons of ordinary skill in the art, other methods of automatically populating nodes can be used with the present invention.

The manual process of populating a Quantum Matrix database can be a long a labor-intensive proposition where large numbers of documents need to be loaded into a Quantum Matrix. In order to alleviate this problem the Quantum Matrix can be auto-populated. The auto-populate feature may be used in conjunction with the manual process.

To automatically populate the Quantum Matrix, the user may, for example, designate a directory from which the documents are to be loaded into the Quantum Matrix. The Quantum Matrix may assume that the legacy file structure should be duplicated. The Quantum Matrix automatically analyzes the directory structure and creates a nodes in nodes hierarchy corresponding to the existing file folder organization. The Quantum Matrix then determines the types of documents held in each folder and opens each in turn, capturing, for example, an application image, the document name and file path and then maps the document/application sequentially to a node in the nodal hierarchy. The Quantum Matrix may sequence the documents, for example, by application type and alphabetically.

Once the documents have been automatically loaded into Quantum Matrix, their organization can be manually edited and reconfigured to move document/applications to different nodes within the same Quantum Matrix Qube or between Quantum Matrix Qubes.

1.9 Avatars AI User Surrogates 1.9.1 Overview

In an embodiment, the Quantum Matrix system uses digital Avatars in conjunction with a visual data management and organization system. An Avatar is an autonomous synthetic creature. Avatars in the Quantum Matrix system differ from standard humanoid simulations found in games in that they are embodied with Artificial Intelligence and are used to facilitate active, remote collaboration among users that wish to display their likeness as part of the collaborative use of the Quantum Matrix system across networks.

FIGS. 75 and 76 depict screenshots of an exemplary Quantum Matrix with Avatars 75-50 and 76-50. Avatars greatly enhance the collaborative capability of the program. A digital Avatar assumes the identity of the user; it is the "body" the user "wears" in a virtual community. It is an animated, articulated representation of a human, which represents the user, in any virtual environment. The Avatar is employed in the invention to facilitate active, remote collaboration among users that wish to display their likeness remotely as part of the collaborative use of the invention across networks. The Avatars are complete digital model humanoids with all the moving parts. An Avatar can form his mouth phonetically to speak. The Avatars can therefore mimic any language, and are anatomically correct in all respects. The Avatars can be mapped with clothing and with any face, and they can be morphed to any body shape or size. FIG. 70 provides more detail on configuring an Avatar. The female digital Avatar while the same as the male Avatar in its AI capabilities is both different in body form but has different attributes and behavior. The gesture set, clothing and the personality are more feminine. In the case of both male and female Avatars, the initial gesture set and behavior are modifiable. Agent Avatars can take on the characteristics of the user by observation of their behavior. In addition, Avatars can be modified by direct user intervention.

The male and female Avatars can be displayed in the Quantum Matrix, moved, resized, and morphed. FIG. 69-70 provides more detail on manipulating an Avatar. They are implemented utilizing the OpenGL animation engines and manipulated by calculators similar to the ones that move the dragger arrows and the clipping planes. By selecting a body part and dragging it with the mouse the humanoid can be manipulated using, for example, inverse kinematics to simulate actual body movement. This too allows the user to make them point and touch other objects in the Quantum Matrix's interface to activate various functions and features of the program.

The male and female Avatars have artificial intelligence based on neural network technology that allows them to learn and to be trained by trial and error and rule sets. FIGS. 71-74 provide more information on the artificial intelligence of the Avatars. The Avatars can also be controlled by the QScript language. FIG. 47 and FIGS. 92-99 provide more information on QScript. The Avatars can also be controlled remotely by using the Quantum Matrix's remote procedure call capability. FIG. 40 provides more information on the Quantum Matrix's remote procedure call capability.

All actions that can be performed by the user on the Quantum Matrix such as navigation, data drilling, populating of the matrix, and identifying relational nodes may be achieved by utilizing QScript or Avatars.

An Artificial Neural Network (ANN) is an information-processing paradigm that is inspired by the information processing of biological nervous systems, such as the brain. The information processing system is composed of a large number of highly interconnected processing elements (neurones) working in unison to solve specific problems. ANNs, like people, learn by example. The Quantum Matrix AI mind is an ANN configured for the Quantum Matrix application environment, specifically to deal with pattern recognition and data classification, through a learning process. Learning in biological systems involves adjustments to the synaptic connections that exist between the neurones. This is true of the Quantum Matrix ANNs as well. In addition to their autonomous capabilities, Avatars also have a number of deterministic capabilities that allow the user to control their actions. For example, the user may instruct the Avatar to move forward, to seek towards an object, to flee or move away from an object, to move laterally or in a strafing motion, to avoid obstacles, to move in the direction normal from a collision, to select a prop such as a laser pointer, flash light, lightening flash, directed explosion, and to use the selected prop. Furthermore, the Quantum Matrix neural network technology allows Avatars, for example, to recognize speech and speakers in communications, recognize faces, replicate user patterns of use, provide help in using the Qube, search and retrieve content independently, organize the Qube content logically, make presentations, act as a user surrogate, and speak intelligently by constructing sentences regarding a subject.

1.9.2 Structural Process Flow for the Operation of Avatars

In the Quantum Matrix system, several types of actions are performed by the computer (e.g., explicitly anticipated, planned for, and coded by a programmer). In an embodiment, the Quantum Matrix Avatars can decide what they need to do in order to satisfy their design objectives.

Figure 73:
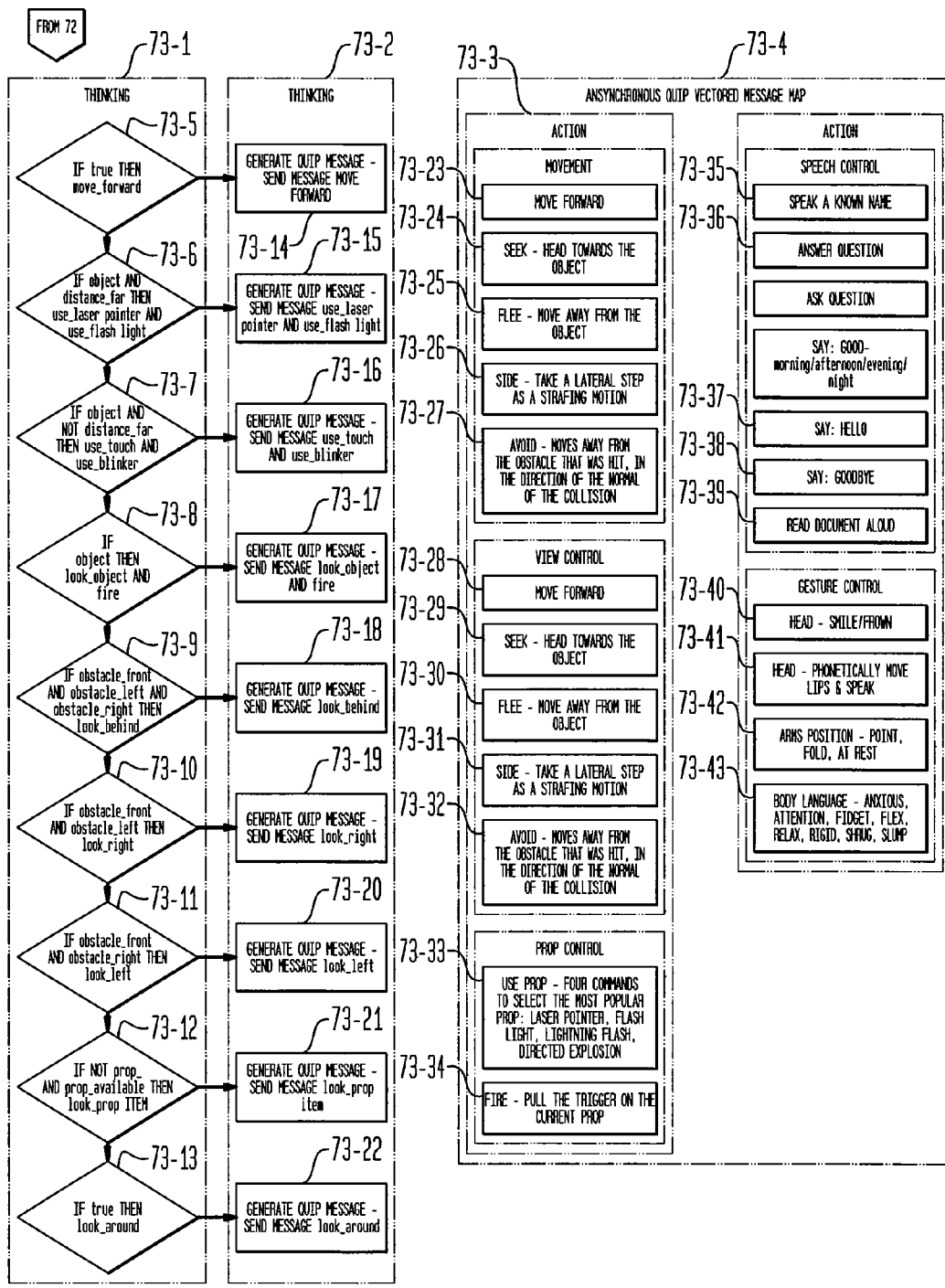

As with the rest of the Quantum Matrix system, the Artficial Intelligence features (AI) capability is based on component architecture. The AI components are self-contained units of data and code that provide the AI functionality. They are designed to work together, with the body of other components that form the Quantum Matrix software system invention. This can be understood as an object-oriented approach to AI system design (FIGS. 72-73).

In the Quantum Matrix system, AI control systems are defined by three different forms of abstraction that define the system. These components types include, but are not limited to: behaviors (e.g., gesturing, searching, listening, looking, guarding), abilities (e.g., touch, aim, point, move, avoid, gather), and functionality (e.g., decision making, pattern recognition, function approximation). Functionally, Avatars are a sub component of the QubeApp module and are loaded from the QubeApp module File menu. The Avatars graphics attributes are stored in two Open Inventor files one of the male Avatar and one for the female Avatar, "Neo.iv" and "Eve.iv" respectively. They also each have a nueronic database, which embodies the current state of the Avatar mind. This is a binary data set of the synaptic state of the previous session's neural network state.

Figure 74:
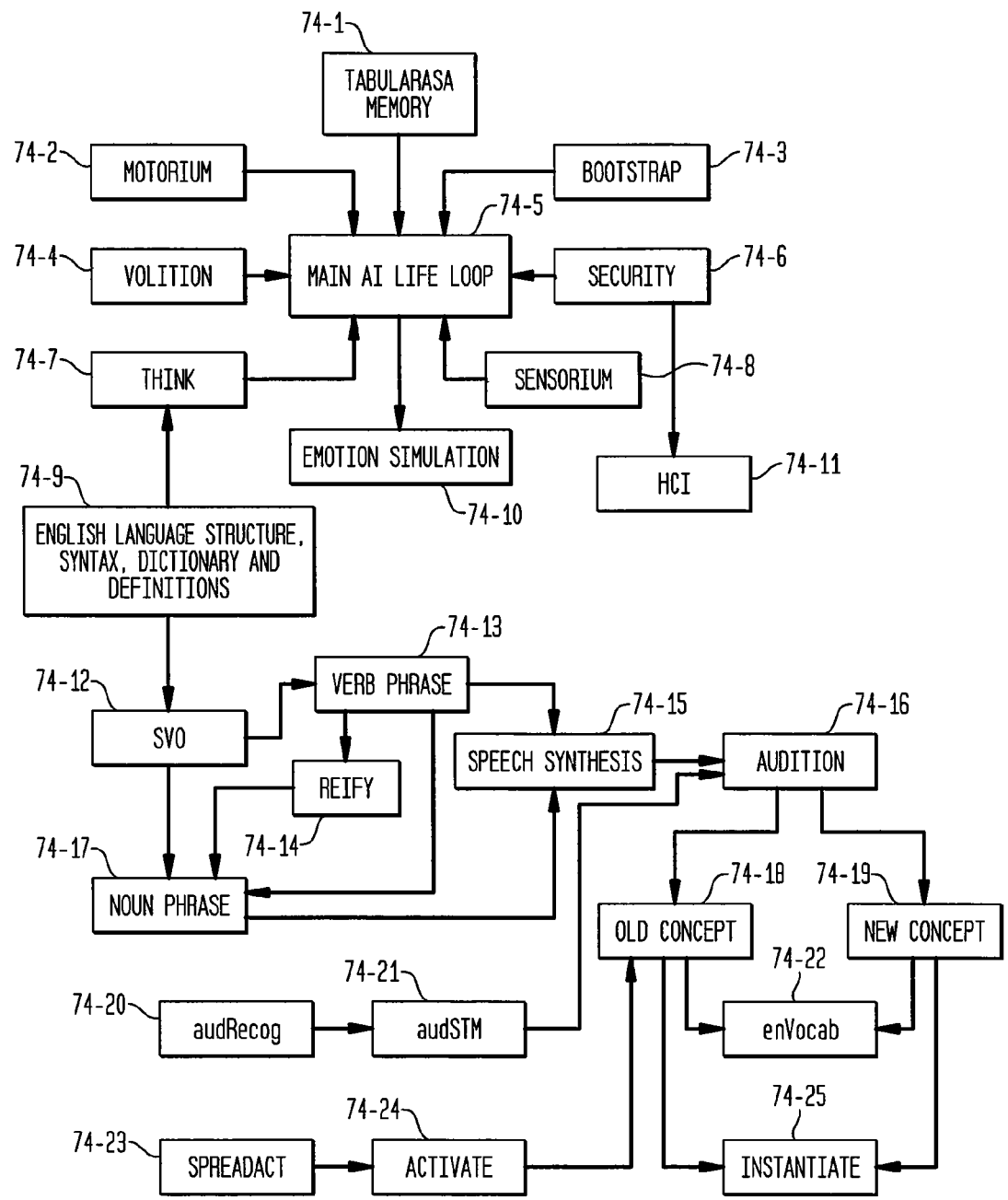

Once the Avatar graphics are set and the nueronic database are loaded, the Main AI Life Loop begins execution and continues through out the user session or until the Avatar is removed from the Quantum Matrix environment. FIG. 74 depicts exemplary programmatic elements associated with AI Avatar mind, according to an embodiment of the present invention. The user can modify the Avatars through a dialog box interface that allows various attributes of the Avatar to be changed.

Avatars are visually and interactively a part of the Quantum Matrix scene graph similar to other three-dimensional objects in the Quantum Matrix graphics environment. The male and female Avatars can be interactively moved, rotated, resized, scaled and morphed. They are connected to OpenGL animation engines and calculators objects similar to the ones that move the dragger arrows and the clipping planes. By selecting a body part and dragging it with the mouse the humanoid can simulate human movement. The various parts of the Avatar body are connected by bones and joints, which maintain connectivity and allow movement in a coordinated manner using the principles of inverse kinematics. This too allows the user to make them point and touch other objects in the Quantum Matrix's interface and to activate various functions and features of the program. Basic Avatar actions and motion paths can be recorded and chained together to simulate more complex actions such as walking or dancing, throwing, etc. then stored in scripts for reuse.

Figure 48:
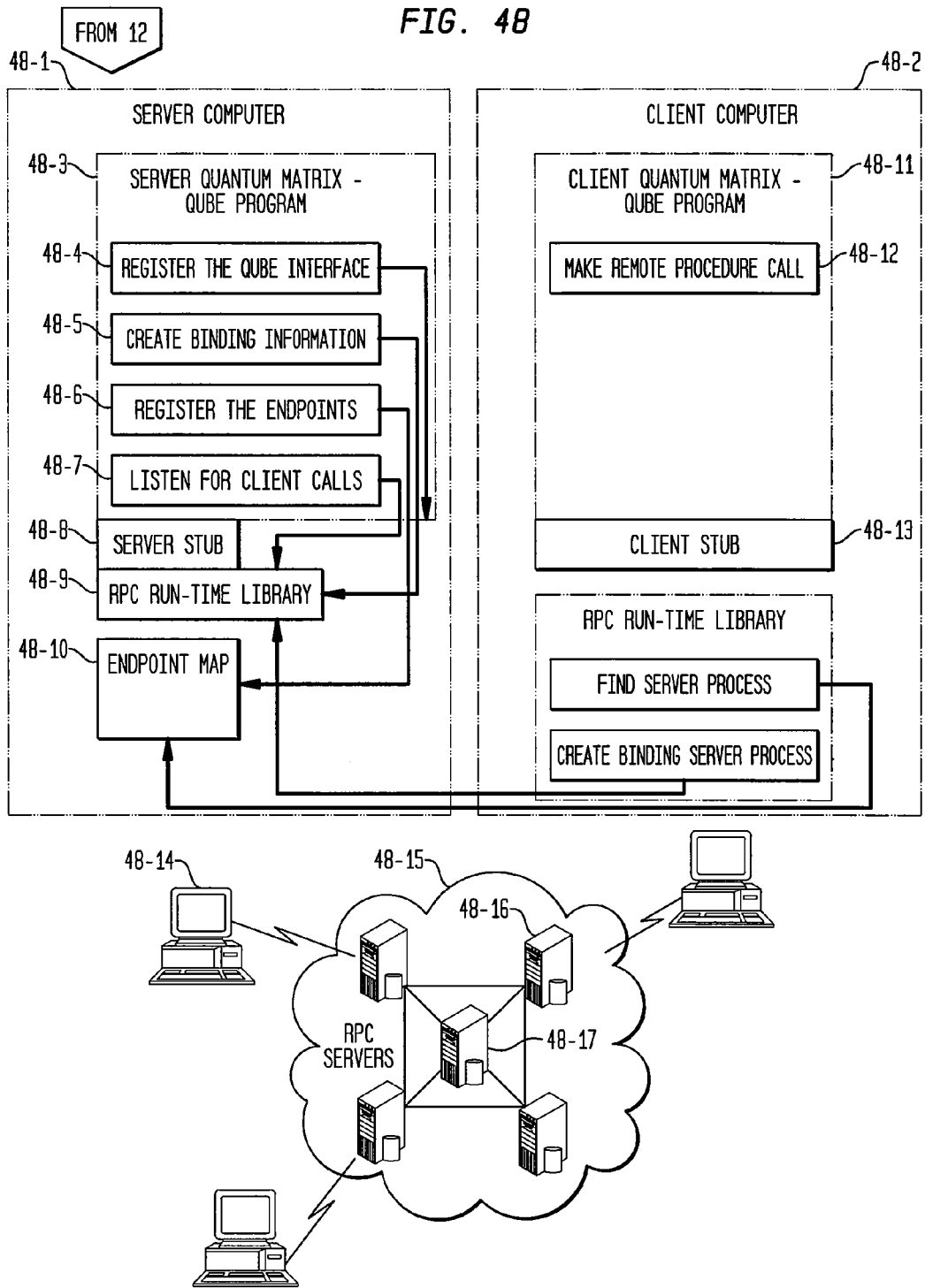

Avatars like other components of the Quantum Matrix system operate through the QUIP messaging system, generating messages that are connected programmatically to action functions in the program. Avatars in addition to being able to be manipulated interactively can also be controlled by scripting their behavior. As with other functionality in the Quantum Matrix system, Avatars can be controlled interactively remotely across a network by RPCs (Remote Procedure Calls) emanating from another computer (e.g., as shown in FIG. 48).

1.10 Virtual Environments and Stereoscopic Immersive Display 1.10.1 Overview

Another aspect of the Quantum Matrix system is the ability to display the Quantum Matrix Qube and its data and documents stereoscopically. Through his feature, the Quantum Matrix system data management and organization system is operable in immersive environments such as the CAVE. This feature can be used for various applications including military and defense, intelligence, space exploration, medicine, architectural design, engineering, and any application benefiting from visualization. The Quantum Matrix system can be combined with applications that employ these sophisticated simulation and display environments to display non three-dimensional documents in an immersive environment. FIGS. 87-89 depict examples of an exemplary Quantum Matrix utilizing different display environments, according to embodiments of the present invention. Through this feature, a user can be literally surrounded by their data, and examine the documents, objects and the overall Quantum Matrix system in virtual environments.

A Quantum Matrix user can choose to execute stereographic 3D projection, creating new representational alternatives for data analysis. Functionally, the Quantum Matrix may also serve as a desk top interface to and/or proxy for a supercomputer based CAVE. Stereoscopic/binocular vision, for example, may be employed for visual emersion. The Quantum Matrix system allows, for example, the desktop and the boardroom to become a virtual environment through its built in ability to produce stereo image pairs interactively and in real-time.

In an embodiment, virtual environments are created in the CAVE. The term "CAVE" refers to a multi person, room sized, high resolution, three-dimensional environment. The Quantum Matrix contains built in CAVE capabilities that can produce pairs of images of any program display and map those image pairs onto a three-dimensional plane. This 3D plane can in turn be projected into a 3D emmersive environment or desktop screen to allow the user to experience the third dimension of data representation in real-time. The mapped data are automatically updated when changes are made to a data element by means of the QEA (Qube Embedded Application) associated with the data element.

Adapting the concept of stereovision, the right and left eye each sees a slightly different image. The inter-ocular distance between the eyes allows us to see depth. This technique allows us to create projected images that more closely approximate actual vision. As applied in the Quantum Matrix, 3D stereoscopic images incorporate depth cues expected by the human eye and mind when viewing real three-dimensional objects.

The three-dimensional scenegraph is rendered twice, once for each image pair. These images are then transmitted to a dual channel graphics card, one image to the right and left channel. The stereoscopic technology for displaying binocular images currently exists in three forms.

Active stereo, which uses infrared emitters to synchronize liquid crystal eyewear to right and left images, this is the tool most commonly used for viewing in CAVEs, theaters and immersive environments. This system connects to multiple graphics output devices, each of which produces two images. In one embodiment, six CRT or DLP projectors corresponding to the six surfaces of a cube are projected. The images are projected on semitransparent Mylar surfaces surrounding the viewers, giving an immersive stereoscopic experience.

Passive Stereo, which uses a stereoscopic graphics card that has two output connectors connected to a pair of projectors that display the images simultaneously onto a special silver coated screen. Viewers wear simple polarized sunglasses to experience the stereoscopic affect.

Auto-stereoscopy technology has all of the characteristics of conventional stereoscopic images but without the need for special eyewear. The auto-stereoscopy system consists of monitors, content creation means, and playback means. Monitors are offered in a variety of desktop models from 15-inch Active matrix flat screens to super-high resolution, large plasma panels for presentation and public space displays. On-the-fly stereo-izing processes in firmware or software embodiments allow for interactive real-time interactive stereo production. This technology uses a lenticular screen or lens sheet technology (lenslets or miniature lenses arrayed on a flat sheet). The system requires a playback program to display a composite array of images.

The Quantum Matrix uses the inter-ocular distance (distance between the eyes) of approximately 2.5 inches to create pairs of images, one for each eye. However, there is nothing limiting the Quantum Matrix from using a different inter-ocular distance to enhance the stereo effect. The Qube produces the image pairs by creating a left and right image where the focus of each eye/camera is looking at the same point. The stored three-dimensional scene graph data of the Qube is then projected and passed through two homogeneous transformation matrices to produce the image pairs. What is unique to the Quantum Matrix is the use of this technique to stereoscopically view all manner of imagery from 3D models to movies as well as more conventional information found in databases, text files, spreadsheets, Gantt charts, etc.

1.10.2 Structural Process Flow for Stereoscopic Projection

In an embodiment, the graphics window of the Quantum Matrix interface is an Open Inventor/OpenGL display space that is capable of displaying both monocular and stereoscopic—binocular imagery. The Quantum Matrix Qube Application (as depicted in FIGS. 16 through 20) allows the user to selectively display database objects either in 3D perspective mode or in a Stereoscopic mode in which one can move in and around the objects of the scene interactively.

Figure 20:
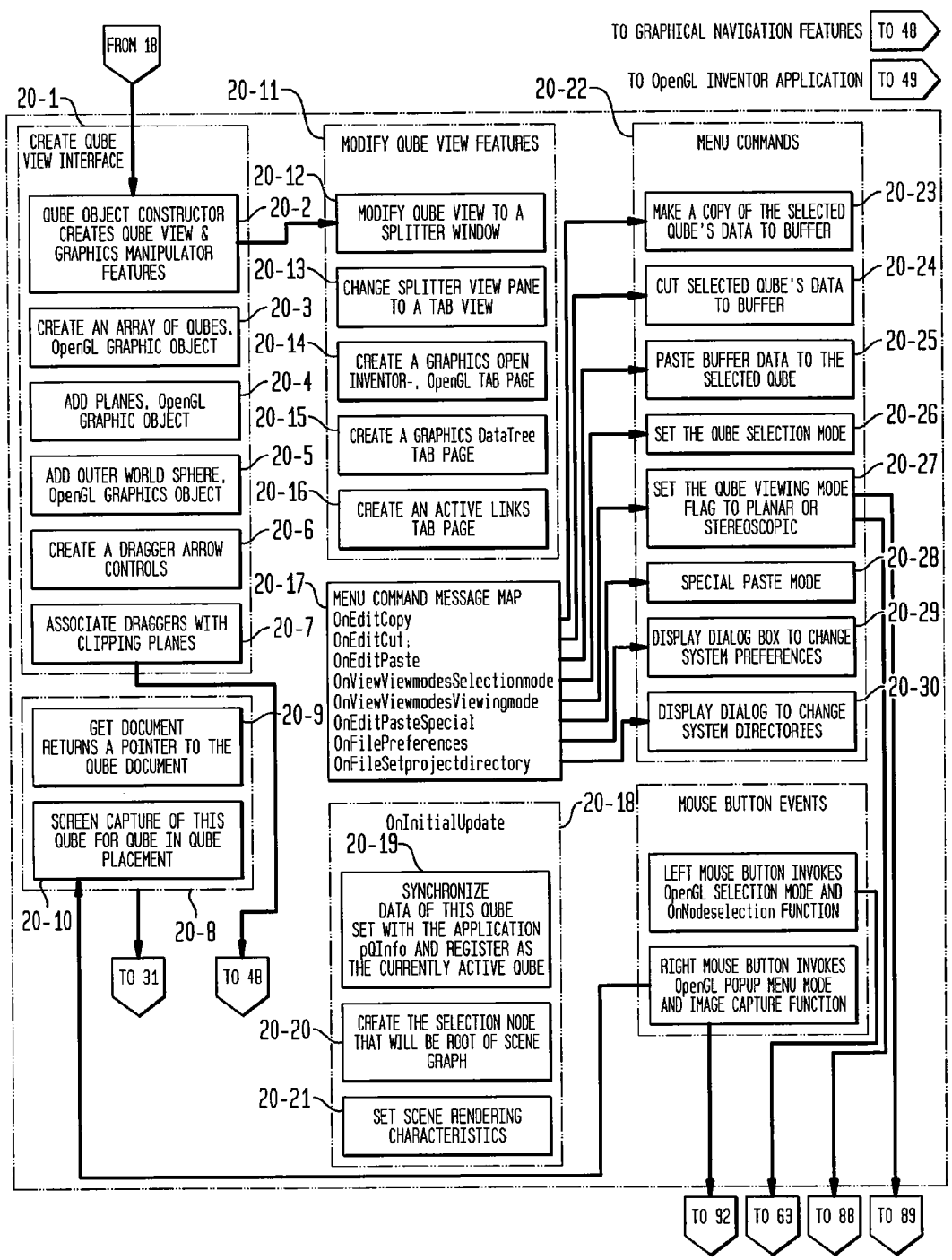

The Stereoscopic display mode is a part of the Qube Application module and is accessed through the Qube Application View menu, the structural process flow for which is shown in FIG. 20, element 20-21 and element 20-27 and in FIGS. 88 and 89. When the viewing mode flag is toggled to stereo, the Quantum Matrix system displays the scenegraph as a pair of simultaneous images defined by a vector originating at the camera/eye position of the viewer and terminating at the viewer's eye target position in the object space. In an embodiment of the invention, the two images are computed at a four-degree angular rotation one image to the other. As the viewer position moves interactively, new image pairs are computed, tracking the viewer's position.

Figure 50:
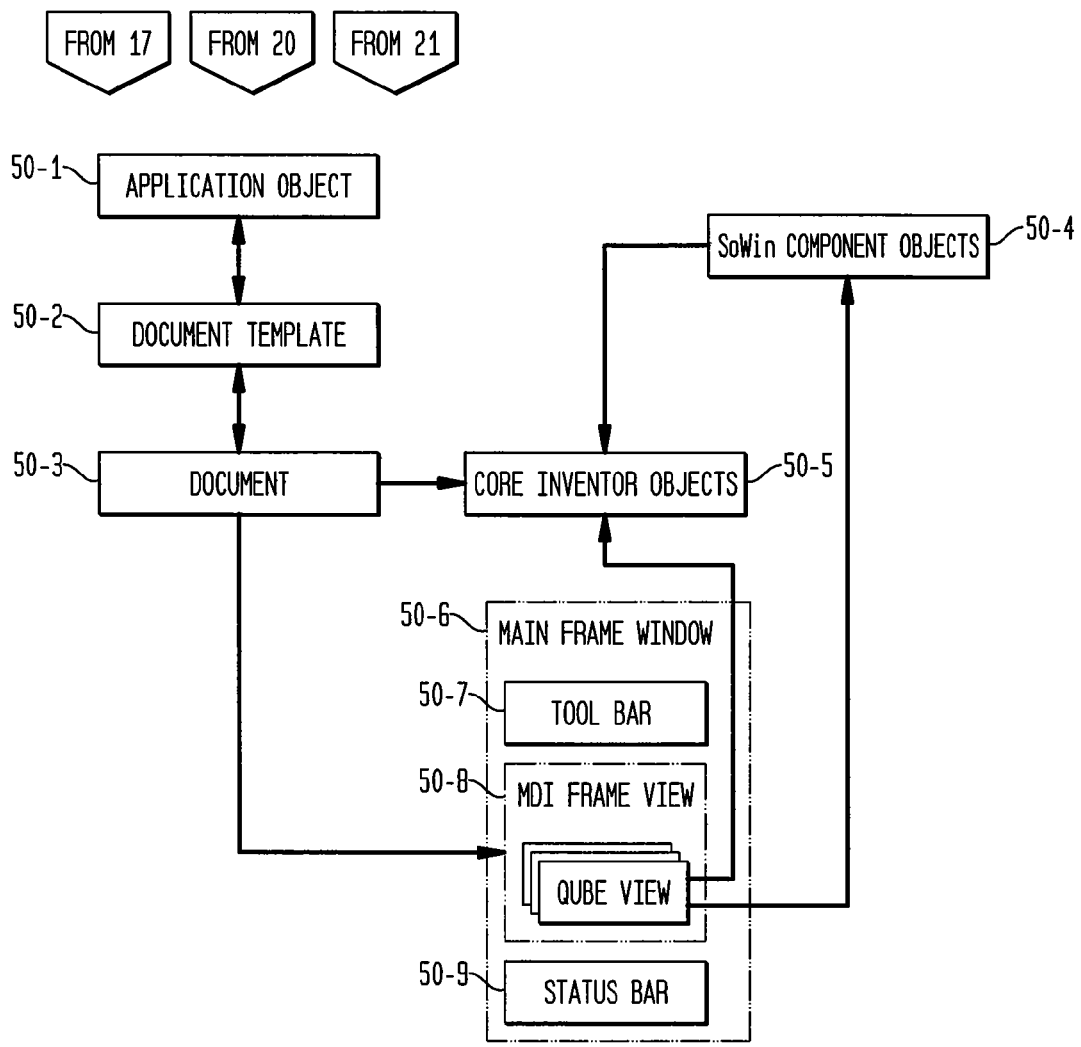
Figure 53:
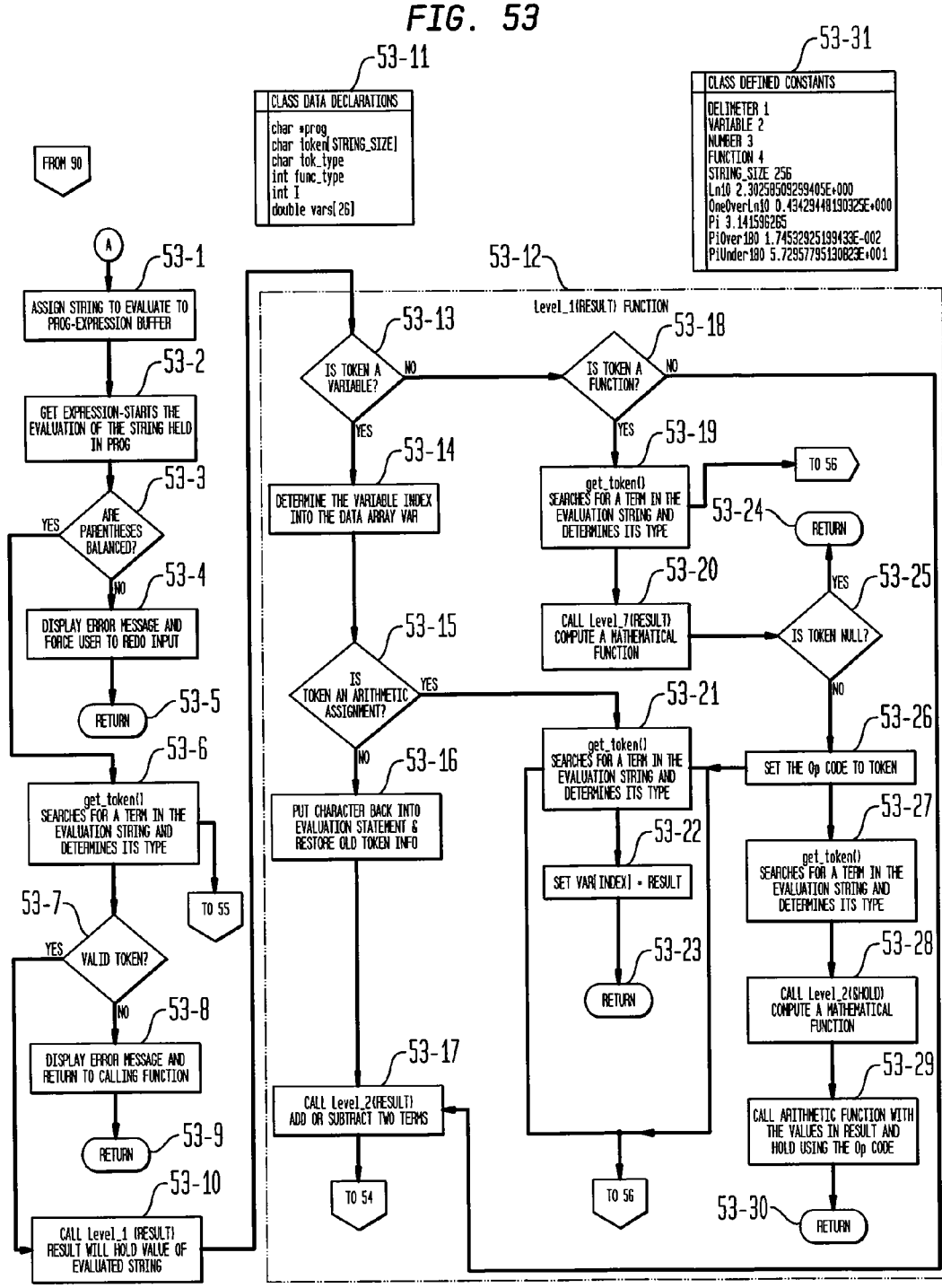
Figure 54:
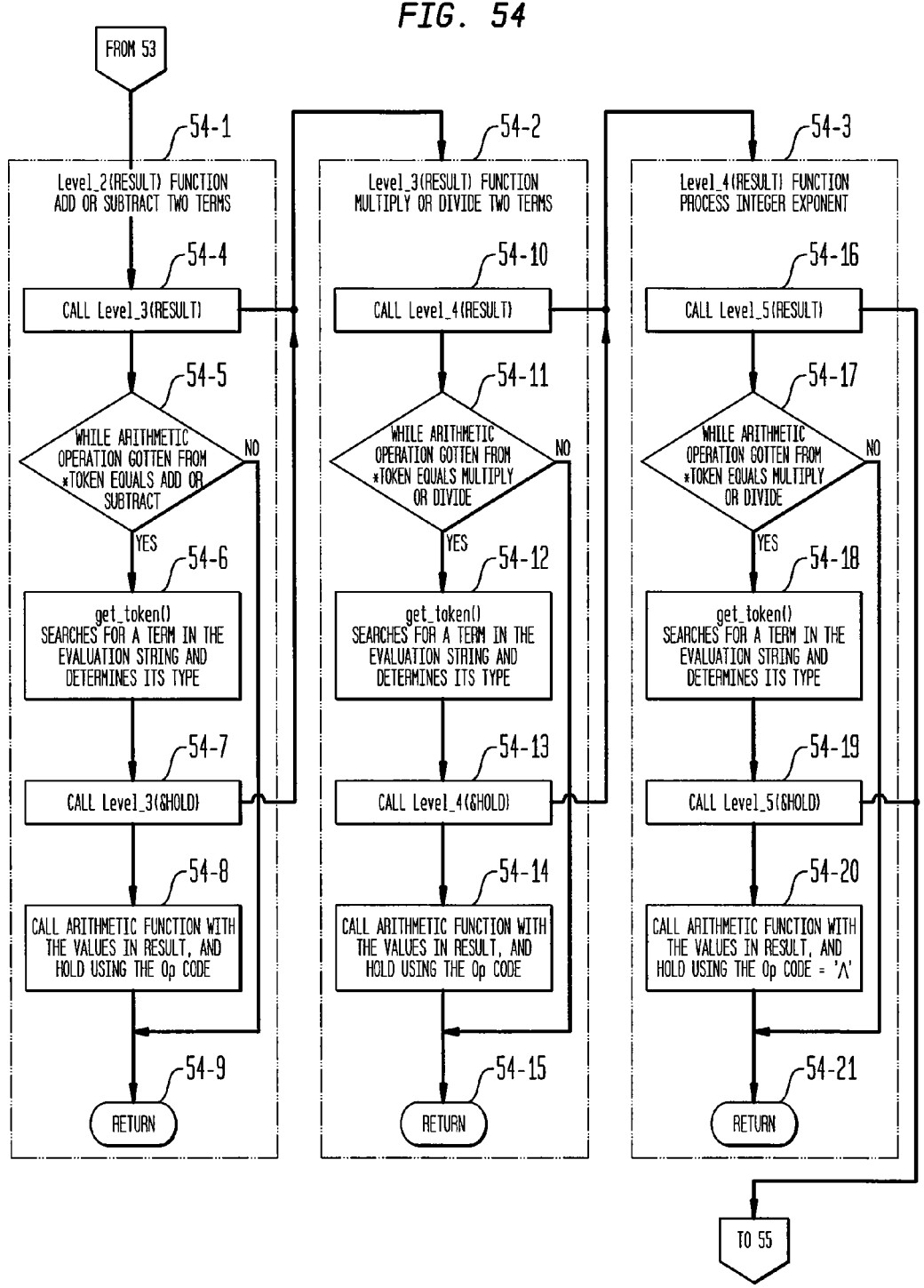
Figure 55:
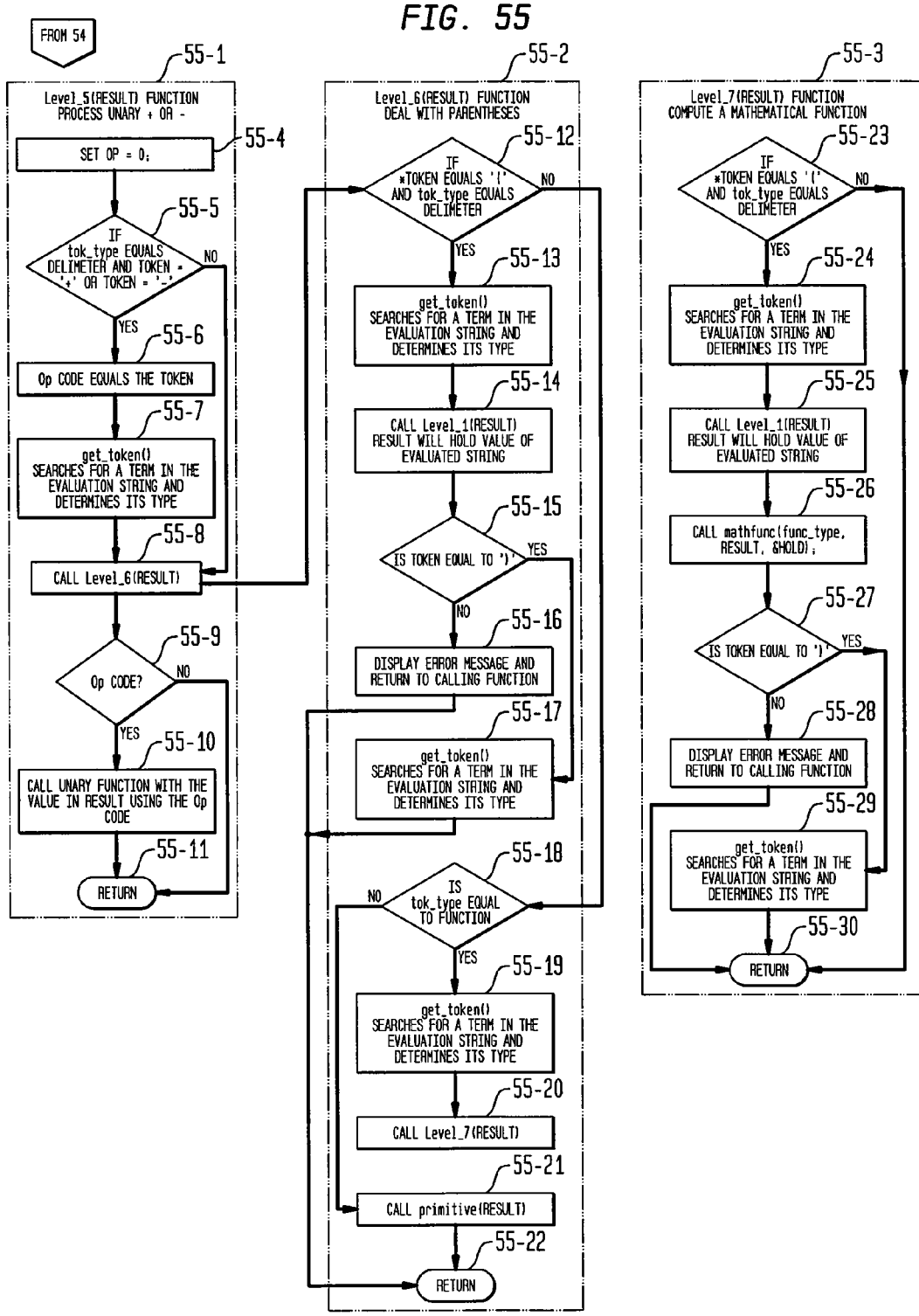
Figure 56:
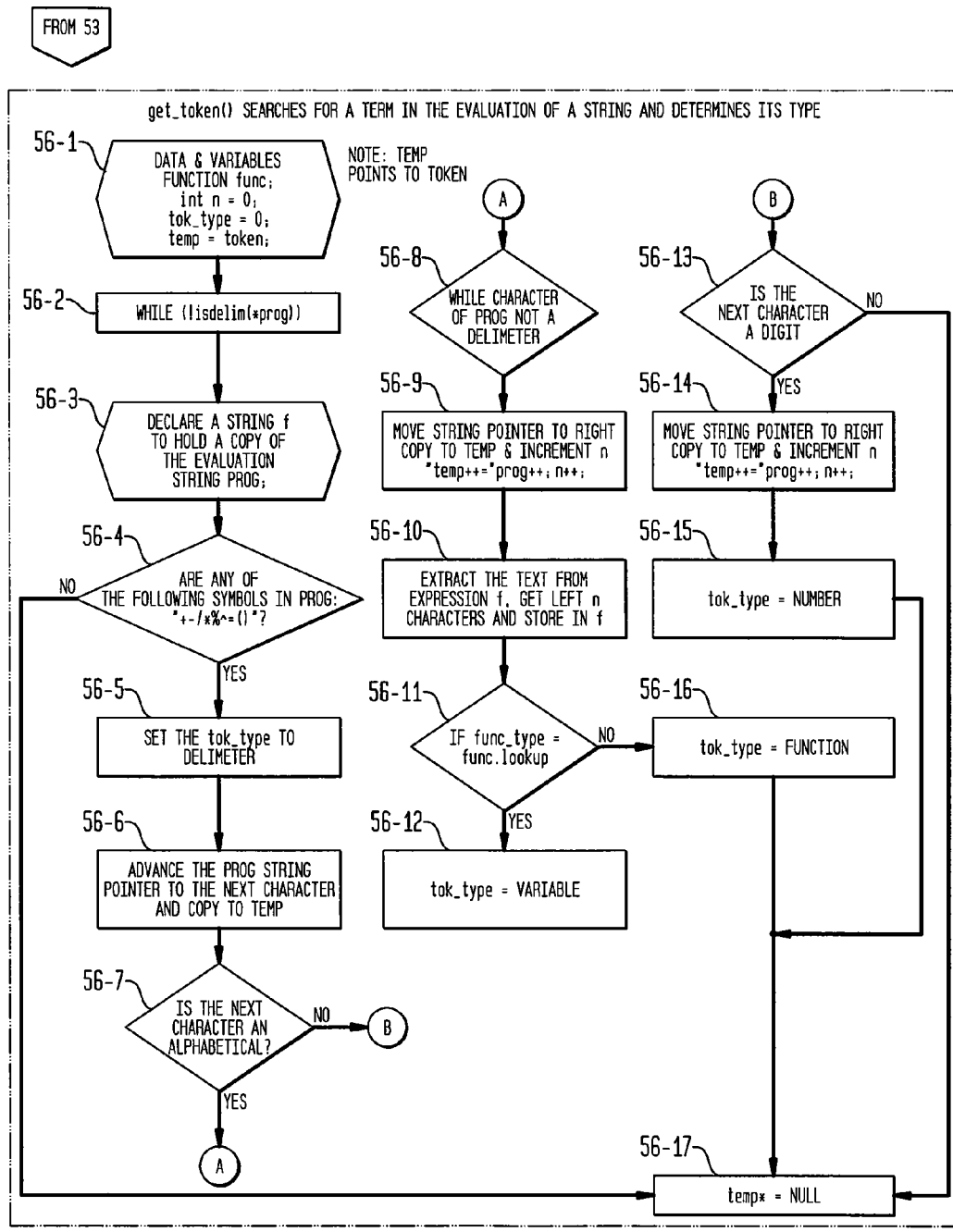
Figure 57:
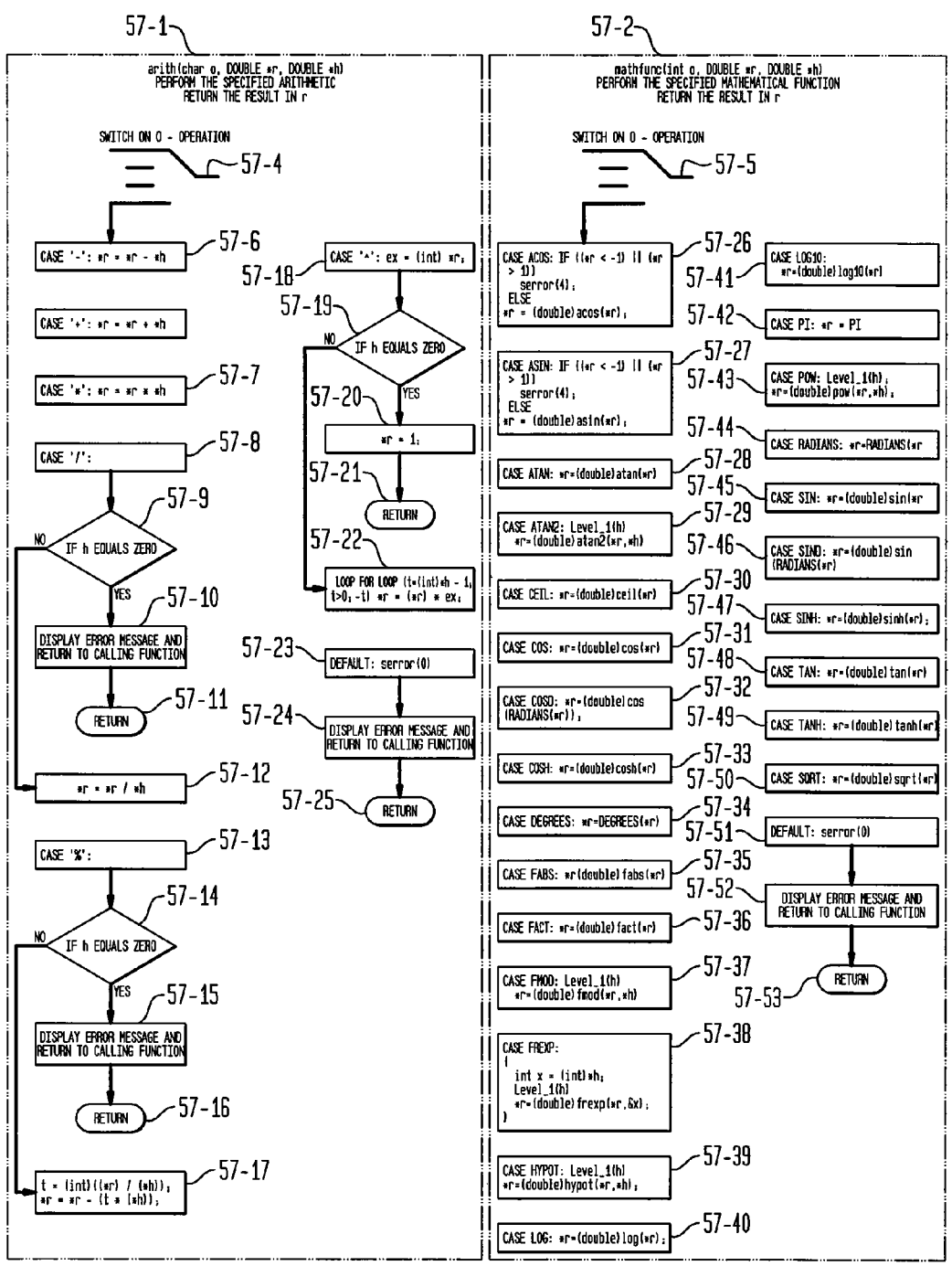
Figure 58:
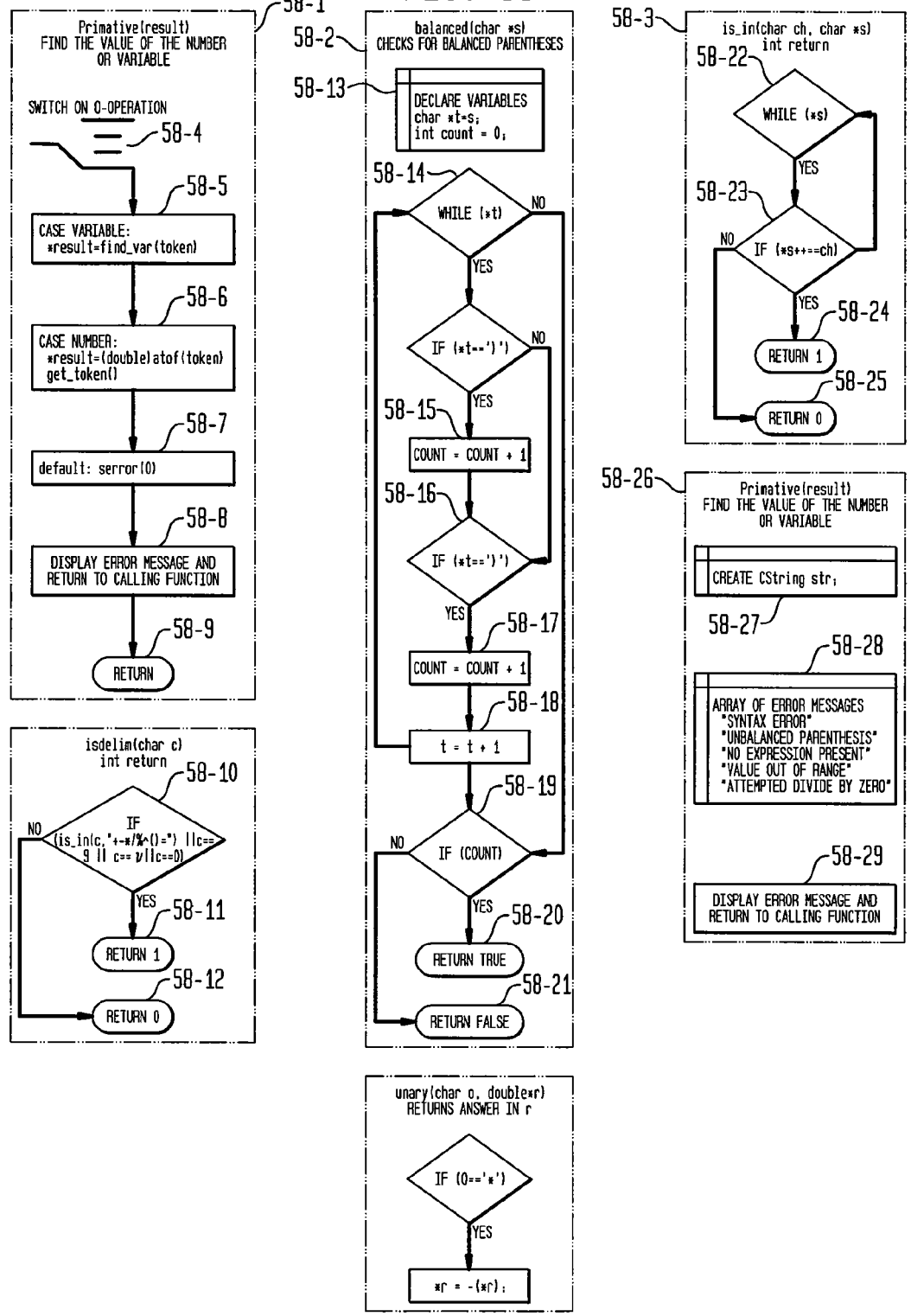

In an embodiment, the Open Inventor DLL (Dynamic Link Library) has an integrated CAVE library that is a plug-in to the Quantum Matrix system. Exemplary programmatic elements of the OpenGL Inventor class are illustrated in FIGS. 50, 51, and 52. The Quantum Matrix system inherits the behavior of the CAVE class and extends its capabilities so that these capabilities are integrated into the Quantum Matrix system to display the Quantum Matrix scenegraph object set. In an IVF application, the application, document, mainframe window, and view objects have been endowed with additional functionality. The additional functionality enables the standard MFC (Microsoft Foundation Class) objects to interact appropriately with the core Open Inventor Library and the Open Inventor User Interface Component Library. The addition of functionality to the standard MFC objects is achieved through the use of multiple inheritances.

The Quantum Matrix set of objects forms a scenegraph, that is a set of three-dimensional object data composed of a name object, with the attributes of a point vertex set, point to point edge sets which form surfaces, color and or texture map files associated with each surfaces, and a transformation matrix defining the position of each elemental objects point set found in the projected scene. All of the graphics information is held in either a VRML (wrl) or Inventor (.iv) file type.

On start-up the Quantum Matrix Application creates a default scenegraph database corresponding to one of Quantum Matrix's graphic display structures as selected by the user. The default display structure database form is a Qube. This form is then used by the user to map and organize their database content graphically. The graphical content is subject to continual modification and updating by the user.

An image snap shot of the current user selected document is taken and is then mapped to the surface of a user selected object, providing a visual reminder of the document content and the means to re-access that same document in the future. All of this graphical data is stored and saved in the scene graph file. Simultaneously a second data file type a (.dat) containing the non-graphical data corresponding to and synchronized with the scenegraph file is also saved. Together these two files may be re-loaded by the user to come back to a Quantum Matrix database in the state of the previous user session and to access the information and documents stored therein.

It is the scenegraph that is the key to both the Quantum Matrix invention's monocular and binocular (stereoscopic) three-dimensional display. The Quantum Matrix system can alternately display in either a monocular or binocular mode.

When the Quantum Matrix application is operated in a CAVE environment, the Open Inventor CAVE library provides an interface to the CAVE system graphics processors. The CAVE has up to six graphics display boards. Each board is in turn connected to a high-resolution color projector that projects images pairs onto a semi-transparent surface again corresponding to the sides of the a cube. The CAVE software corrects the images for distortions that would be inherent in projection onto a flat surface of a cube and creates a perfect spherical image, continuous and seamless space.

Within the CAVE, the viewer wears either shutter glasses or polarized glasses, which allow the right and left eye to view slightly different views of the scenegraph. In addition, the glasses of the primary viewer has a tracking device that allows the CAVE to constantly track their movements in the CAVE and to compute 12 simultaneous images projected in pairs onto the six surfaces of the CAVE walls every $120^{th}$ of a second. This gives the user the illusion of actually be immersed in the Quantum Matrix's scenegraph and among his data/documents. Avatars are also a part of the Quantum Matrix scenegraph, further enhancing the realism of the immersive experience by providing a humanoid presence giving scale and a collaborator.

The Quantum Matrix system has extended the Open Inventor/OpenGL class capabilities by creating the ability to texture map objects in real-time to graphical shapes. As a consequence of this feature of the Quantum Matrix system, documents of all types can be projected in three-space and shown stereoscopically; particularly two-dimensional objects such as paper documents (text documents, spreadsheets, databases report and images) which cannot be projected in the CAVE using conventional systems. In addition two-dimensional movies and video can be dynamically mapped to three-dimensional surfaces and projected stereoscopically in CAVE or on a desktop stereo capable system in real-time. All of these features of the invention permit CAVE display on a desktop stereo capable system, eliminating the supercomputer power now required for CAVE projection.

2. Method of Manipulating Data Visually

FIG. 102 illustrates a high level description of an exemplary method for manipulating data visually, in accordance with an embodiment of the present invention. In step 102-10, data is organized into a multi-dimensional structure of nodes. Nodes may represent data, absence of data, or another set of nodes. Since nodes may be nested inside other nodes, a multi-dimensional structure can be formed.

All or portions of the multi-dimensional structure can be stored on remote computers and storage devices. In addition, all or portions of the multi-dimensional structure may be accessed and manipulated remotely allowing for a dynamic and distributed multi-dimensional structure. The data represented by the nodes may be both static and dynamically changing values.

Furthermore, the multi-dimensional structure or portions of it can be automatically created from a file system. The file hierarchy of the file system is mimicked in the multi-dimensional structure. For example, nodes may represent files and directories. When a node represents a file, there is one to one mapping between the node and the file. When a node represents a directory, the node represents both the directory and a set of nodes that represent the contents of the directory.

In step 102-20, one or more associations are defined. An association indicates a relationship between a node and another node, data, or a set of nodes. For example, when a node is contained within another node, an association may be defined to indicate a parent and child relationship. Nodes that are adjacent to each other may define an association indicating a neighbor relationship. As another example, the association between a data and its application may also be defined to indicate a file and program relationship. Furthermore, associations to indicate any type of relationship may be defined.

In step 102-30, the multi-dimensional structure is displayed three-dimensionally. The multi-dimensional structure can be displayed, for example, using standard computer displays, stereoscopic displays and virtual reality environments.

In step 102-40, the multi-dimensional structure is navigated. Relational logic, Boolean algebra, or a scripting language can be applied to the nodes, data, and associations to produce an extracted resultant set of nodes. Furthermore, portions of the multi-dimensional structure can be isolated with the use of clipping planes to cull out visually un-wanted portions of the multi-dimensional structure, reducing the view's complexity to only those nodes of interest thus easing navigation and focusing on only the data of interest. The clipping planes can divide the multi-dimensional structure into two parts. One part can be selected for further navigation and the other part may be hidden to focus the navigation on the selected part. In this manner, the multi-dimensional structure can be diced until a resultant set of nodes is remaining. Furthermore, an Avatar may be displayed and used to automate the navigation of the multi-dimensional structure.

As would be appreciated by persons of ordinary skill in the art, other methods of organizing a multi-dimensional structure, defining associations, displaying the multi-dimensional structure, and navigating the multi-dimensional structure can be used with the present invention.

3. System Overview

This section provides a description of the overall program structure of the Quantum Matrix system. There are various ways of describing the Quantum Matrix system from a software application point of view. The program can be described as an information flow and structure. Additionally, the program can be described as a set of inter-relatable program modules. This overview introduces these two ways of describing and understanding the Quantum Matrix application. In addition, this section provides a cross reference to the system diagrams and their more detailed programmatic attributes as they relate to the overall structure of the program.

3.1 System Bus Architecture

Figure 1:
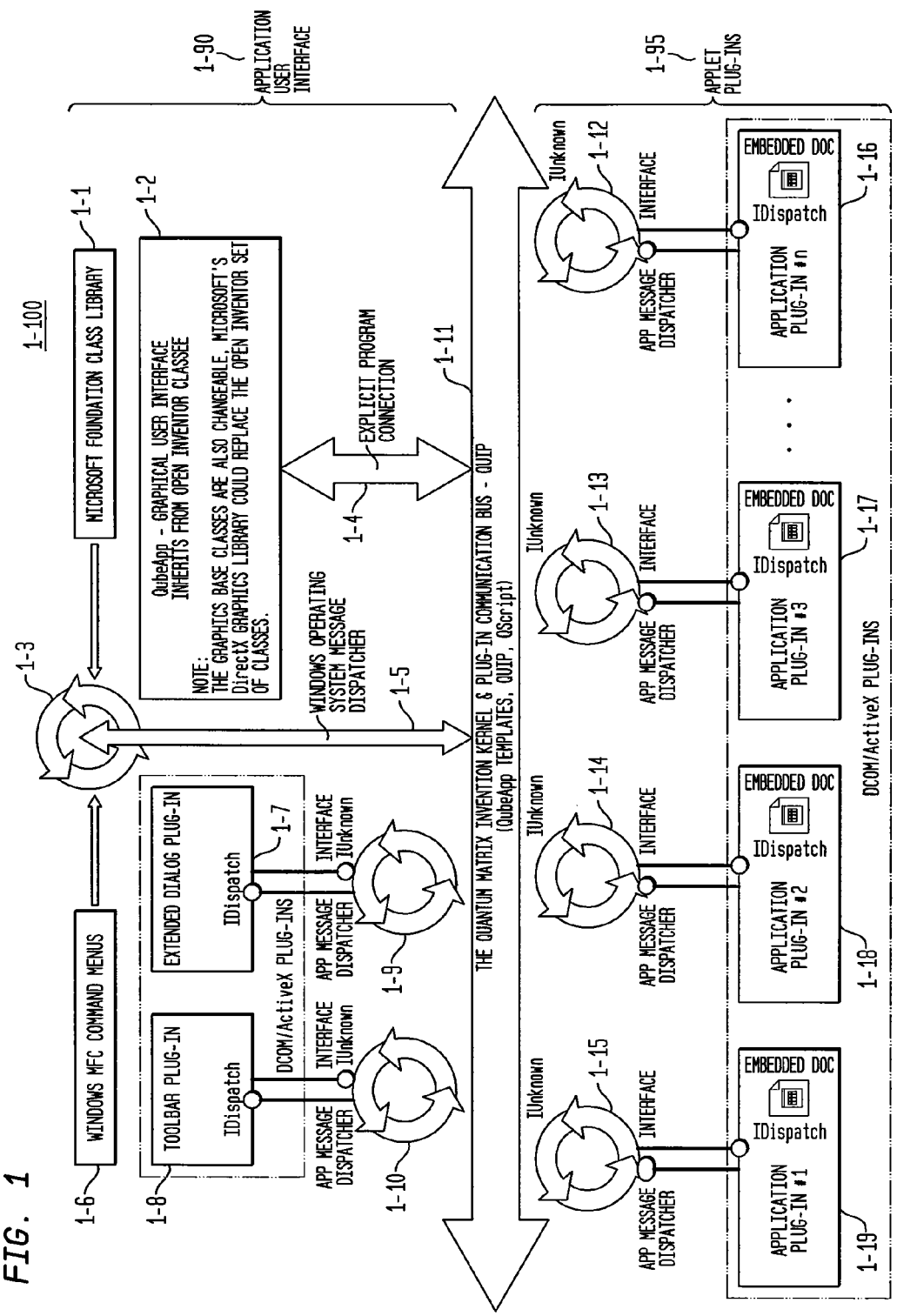

FIG. 1 is an exemplary block diagram of the Quantum Matrix Kernel Framework 1-100, according to an embodiment of the present invention. Quantum Matrix Kernel Framework includes an Application User Interface Components 1-90, a Quantum Matrix Kernel & Plug-In Communication Bus 1-11, and Applet Plug-In Components 1-95. As depicted in FIG. 1, through the use of plug-in component technology, the Quantum Matrix application can be adapted to enhance, replace and/or add new features or capabilities to the Quantum Matrix application.

The structural robustness, longevity and flexibility of the personal computer (PC) are due in major part to its system bus architecture. The system bus allows new devices and upgrades to be made to a PC on an ad hoc basis, thus allowing a PC to be completely changed and rebuilt from nearly the ground up. The Quantum Matrix system applies this hardware concept to its software design. The Quantum Matrix Kernel and Plug-In communication Bus 1-11 is the equivalent to this element of the PC's design.

Continuing the analogy, the PC bus serves as a communication channel between the various devices plugged into it, including the CPU, RAM, graphics card, hard disk controller, etc. Messages are passed from device to device by address. Similarly in the Quantum Matrix system, software components are plugged into the Matrix kernel and messages are processed through the Qube User Interface Protocol (QUIP) module to connect one program component to another program component and to the overall program.

The Quantum Matrix system includes two basic types of plug-ins: interface components 1-90 and application components 1-95. The interface components 1-90 provide the user with a mechanism for interacting with the program and controlling various aspects of the program. Application components 1-95 provide functional features and different built-in program application capabilities.

The QubeApp-Graphical User Interface (GUI) 1-2 is an interface component 1-90. Paralleling the hardware analogy, QubeApp-GUI 1-2 plugs into Quantum Matrix kernel 1-11. The GUI is comparable to the graphics card of the PC. Similarly, the database is similar to the RAM (Memory) in that each can plug into the Quantum Matrix Kernel, having an address or in the case of the Matrix, a pointer (a variable address).

The Quantum Matrix applets can be thought of as peripheral devices each plugged into the kernel and each with a distinct purpose and function. In the PC hardware world, the specific configuration of peripherals can vary as a function of the operating system version and machine type. In the case of the Quantum Matrix system, the total functionality from a features perspective is dependent on the installed set of applets. In an embodiment, the Quantum Matrix system has twelve application component plug-ins 1-95. However, as would be appreciated by a person of skill in the art, the number and kind of specific programs, document types, and the functionality of the components, are variable and dynamically changeable by both the end user and the program developer.

All plug-ins applications follow a pattern for installation in the Quantum Matrix system, whether it is the QubeApp itself or other application plug-ins. In an embodiment, a pointer is first declared to a document template (e.g., CMultiDocTemplate* pDocTemplate) and then an instance/object of the CMultiDocTemplate class (new CMultiDocTemplate) is allocated. As arguments to the class constructor one or more of the following are passed:

| | |
|---|---|
| IDR_QUBETYPE | A unique symbolic name constant identifier of the plug-in |
| RUNTIME_CLASS(CQubeDoc) | Runtime macro to register the document type on the-fly |
| RUNTIME_CLASS(CChildFrame) | Runtime macro to register a custom MDI child frame |
| RUNTIME_CLASS(CQubeView) | Runtime macro to register a plug-in-view |

A plug-in's template container information is set by passing in a reference to the menu resource associated with the plug-in so that messages can be seamlessly routed to the plug-in through the Windows operating system (e.g., by pDocTemplate->SetContainerInfo(IDR_QUBETYPE_CNTR_IP)). Finally the new document is identified, and added into the Windows list of plug-ins (e.g, by AddDocTemplate (pDocTemplate).

Figure 15:
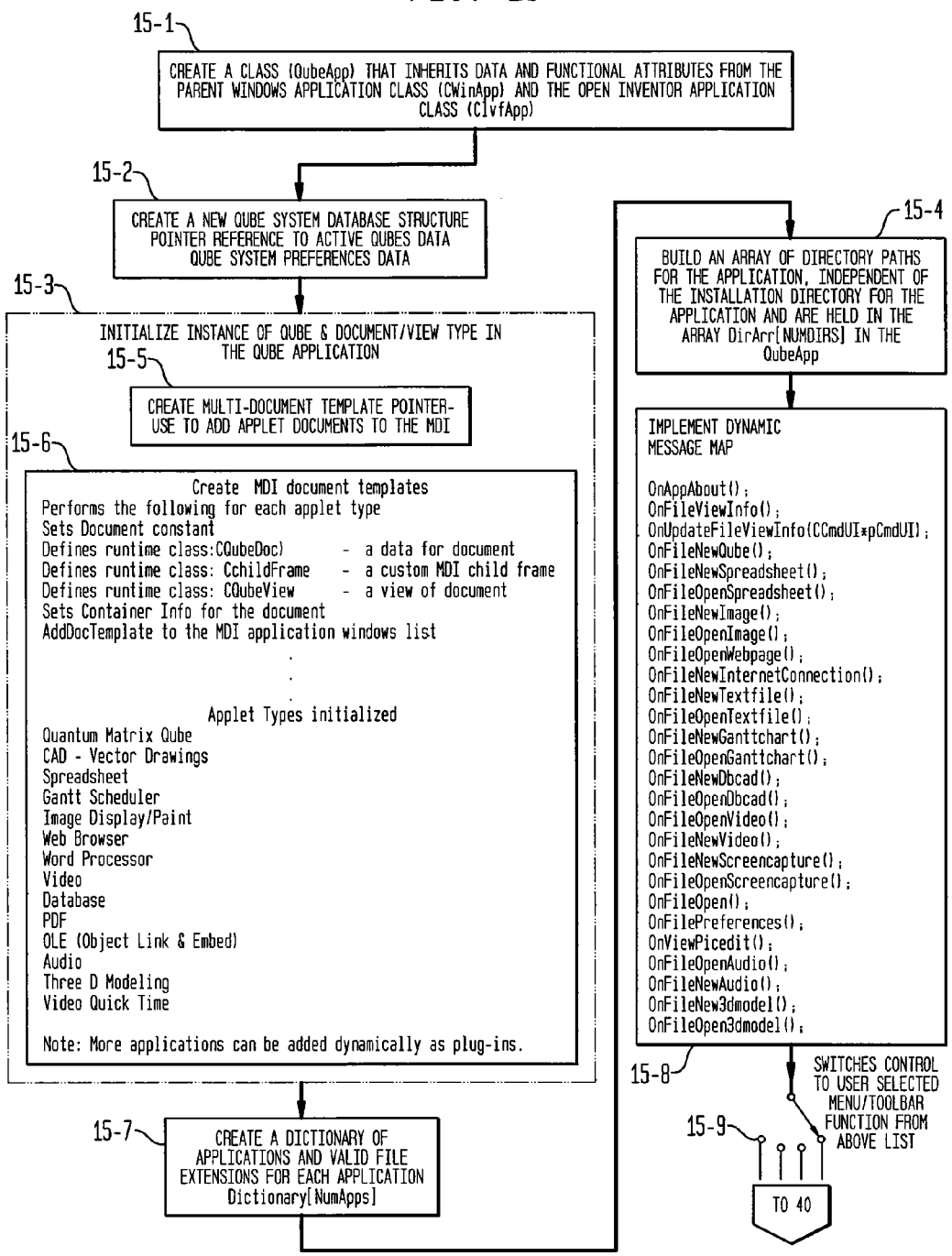

FIG. 15, Overriding Program—Qube Application Module, provides additional details on how an application plug-in is instantiated in the Quantum Matrix program. In addition, a user can install non-Quantum Matrix plug-ins to extend the capabilities of the Quantum Matrix using QScript and the windows API to perform calls to the same procedures. As would be appreciated by persons of ordinary skill in the art, other methods for installing plug-in applications can be used with the present invention.

The software architecture of the Quantum Matrix Kernel has very powerful implications for the program's functionality, maintenance, upgradeability and the addition of new capabilities. The ActiveX/DLL installation and registration of an applet allows the invention to run a program type (e.g., CAD, word-processor, image processor, audio and or video player, etc.) without the original source program being resident on the invention end user computer workstation. The Applet plug-in concept allows the system to be updated and modified online, and for new and more powerful features to be added as they are developed. Custom features can be added, and aftermarket developers can create plug-in modules.

The Kernel & Plug-in Communication Bus 1-11 includes two program modules, the Mainframe Window module and the QubeApp module, that operate in tandem. Various user interface features (e.g., menus and toolbars) are coupled to the Mainframe Window or the application's main window. The Qube Application module serves as the Multi-Document receptacle for the program content and feature set. Also encapsulated in the Quantum Matrix kernel are the QUIP and QScript modules, which allow the user to automate various program features of the Quantum Matrix and to customize the program to address specific user requirements and programmatic needs.

The Quantum Matrix Kernel Framework further includes menus 1-6 and toolbars 1-8, which provide the mechanism for a user to control the program.

FIG. 36 shows the main menu and the relationship between the file menu items, menu item identifiers, and function names. An example of the main menu 36-1 and file menu 36-3 presented to a user are depicted in FIG. 36. When a user "clicks on" or activates an item in the menu by keyboard input, a windows message event is produced that sends three arguments to the windows event dispatcher: the source window handle, the type of event, and the value associated with the menu item selected. The Quantum Matrix windows message handler recognizes and receives all messages sent to the Quantum Matrix application and routes them according to their message type (e.g., menu command, mouse event, keyboard event, or system message). The various Quantum Matrix MDI applications each has its own message map of function identifiers and function name pairs. The message map acts like a lookup table, searching the list for a matching identifier and executing the associated function when a match is found. Thus, selecting a menu item executes the user-selected command.

Figure 37A:
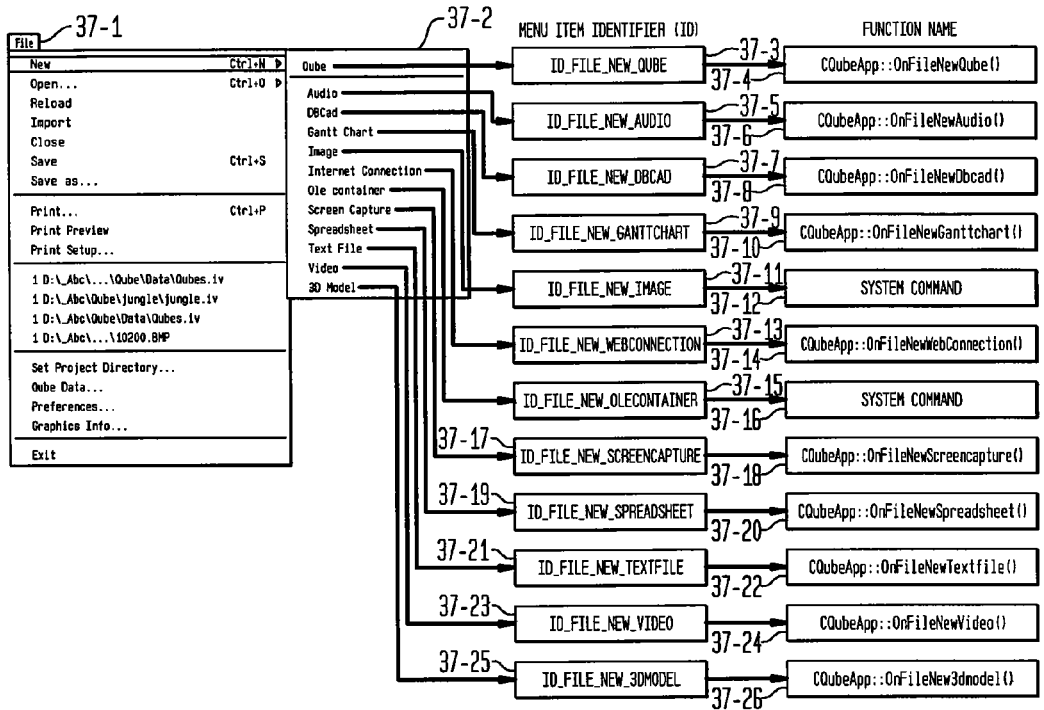
Figure 37B:
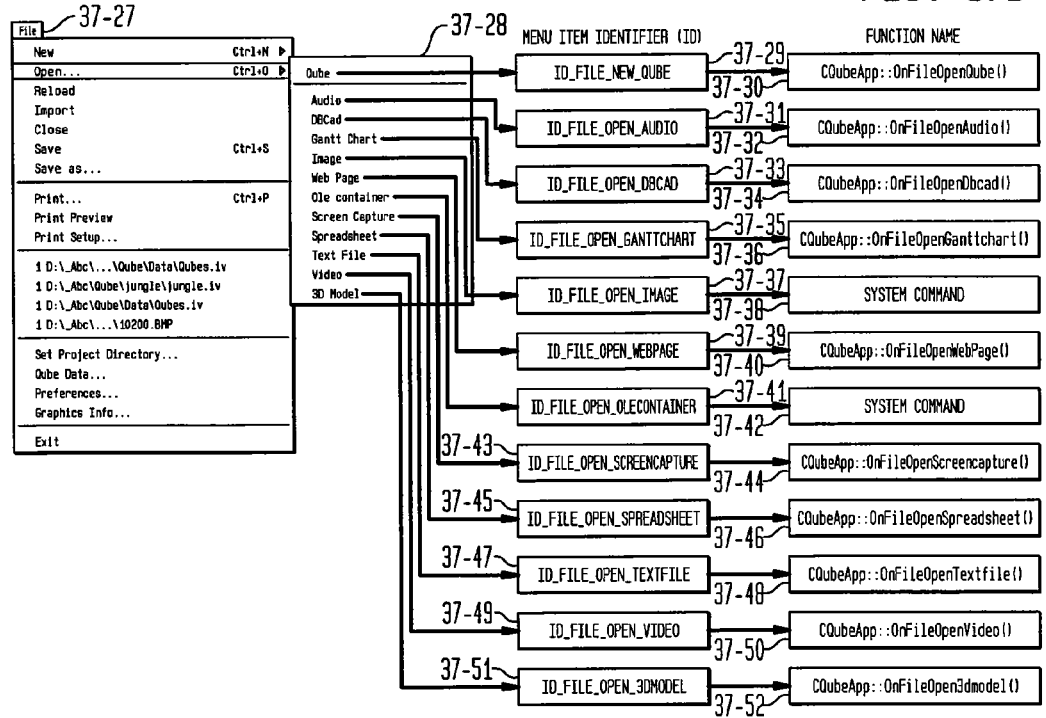
Figure 38A:
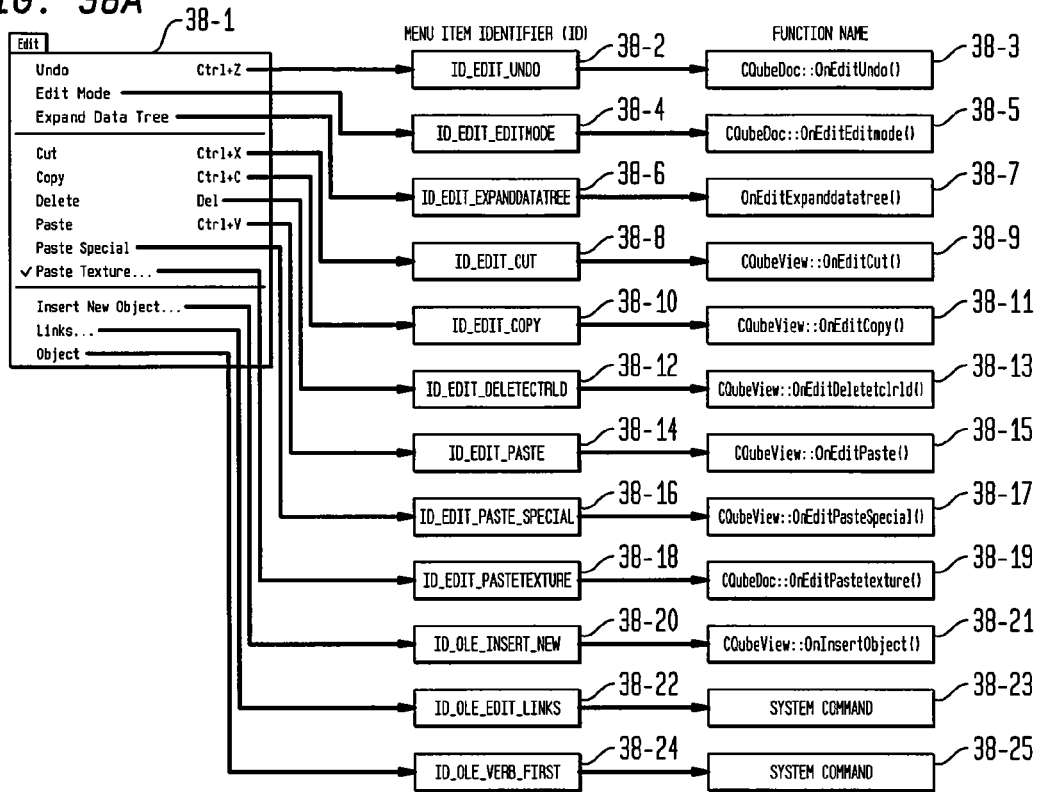
Figure 38B:
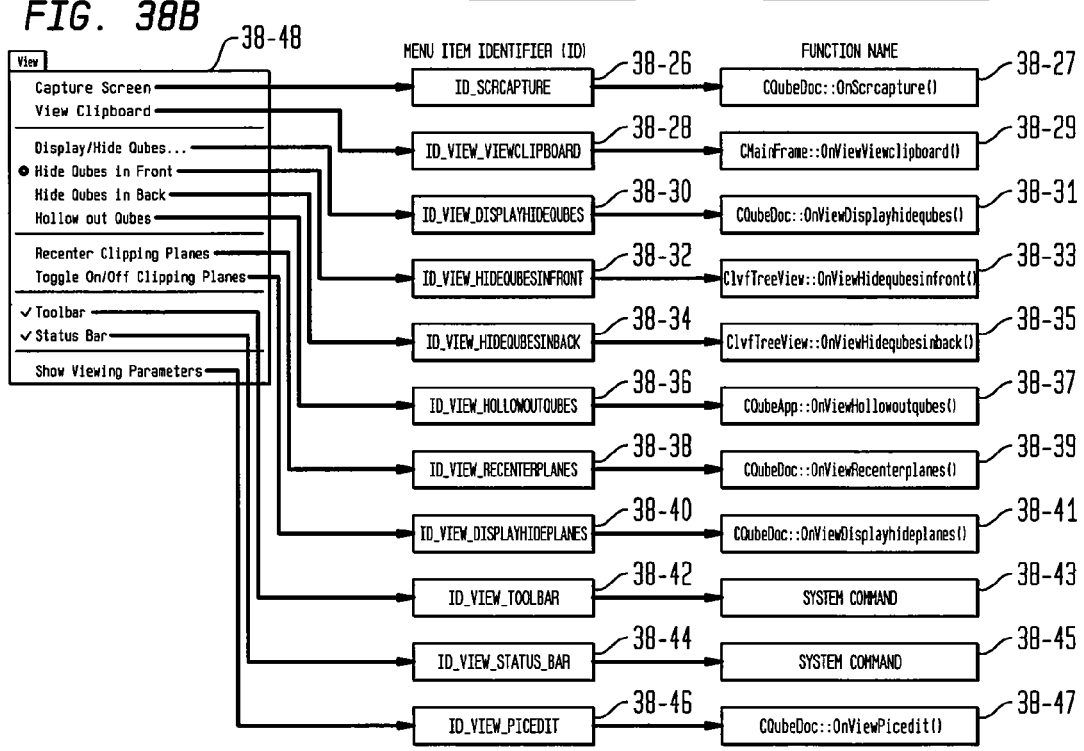
Figure 39A:
Figure 39B:
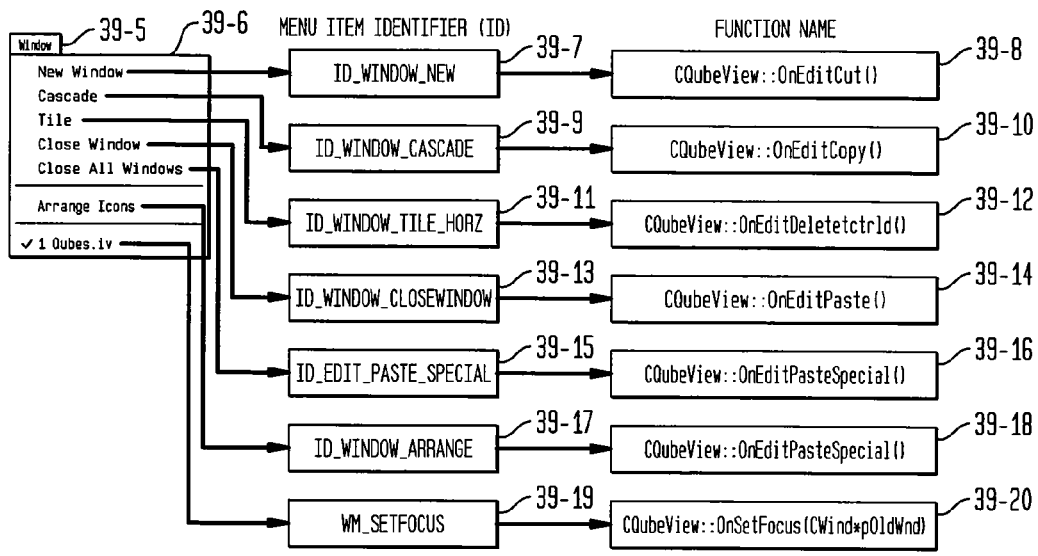
Figure 39C:
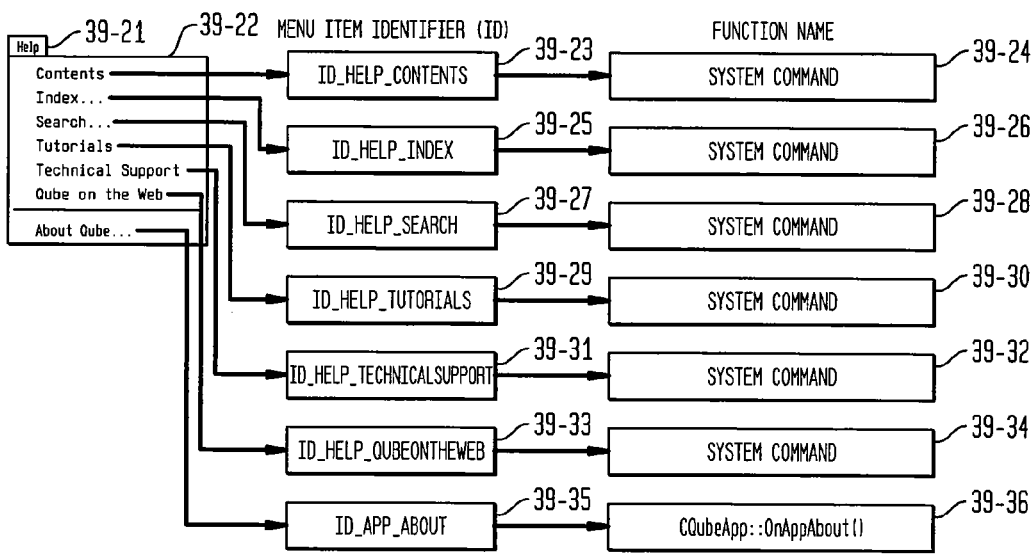

Further exemplary menus are depicted in FIGS. 37-39. Each figure depicts the menu as would be presented to the user and illustrates the relationship between the menu items, menu item identifiers, and function names. FIGS. 37A and 37B depict an exemplary Main Menu-File New Applet menu 37-1 and Main Menu-File Open Applet 37-27, respectively. FIG. 38A depicts an exemplary Main Menu-Edit menu 38-1. FIG. 38B depicts an exemplary Main Menu-View Menu 38-48. FIGS. 39A-C depict exemplary Viewpoints Menu 39-1, Window Menu 39-5, and Help Menu 39-21, respectively.

The Quantum Matrix toolbar replaces the standard windows toolbar and provides an extended range of features and a more rich visual display capability supporting the use of millions of colors, phased fly-over features, irregularly shaped buttons and the use of mapped bitmaps for buttons and background skins. FIG. 40 depicts an exemplary Main Window Frame—Toolbar 40-100. The toolbar 40-100 is one of the primary user interface components. It provides quick access to program applets and basic system level features such as printing and archiving. Activating a button (icon, item, etc.) on the toolbar 40-100 generates a windows event message and sends a constant value associated with the button (icon, item, etc.) that was activated. This, in turn, is received by the associated dynamic windows message map.

The toolbar buttons (icons, items, etc) 40-1 to 40-21 have some unique visual characteristics. The buttons (icons, items, etc.) are ray traced spheres having a shiny photo-realistic appearance. When the user rolls over (or drag a pointer over) a button, a glow ring surrounds the button and a hint is displayed advising the user regarding the function of the button. In an embodiment, the buttons are grouped by color. For example, yellow could be used for file functions, magenta for editing functions, blue for control functions, green for output, red for applets, and chrome for help. The toolbar varies in size depending upon the screen resolution of the computer. For example, additional buttons can be displayed on higher resolution displays. In an embodiment, the buttons included on the toolbar can be customized by the user. As would be appreciated by persons of skill in the art, other methods for implementing and presenting the toolbar to a user can be used with the present invention.

Figure 59:
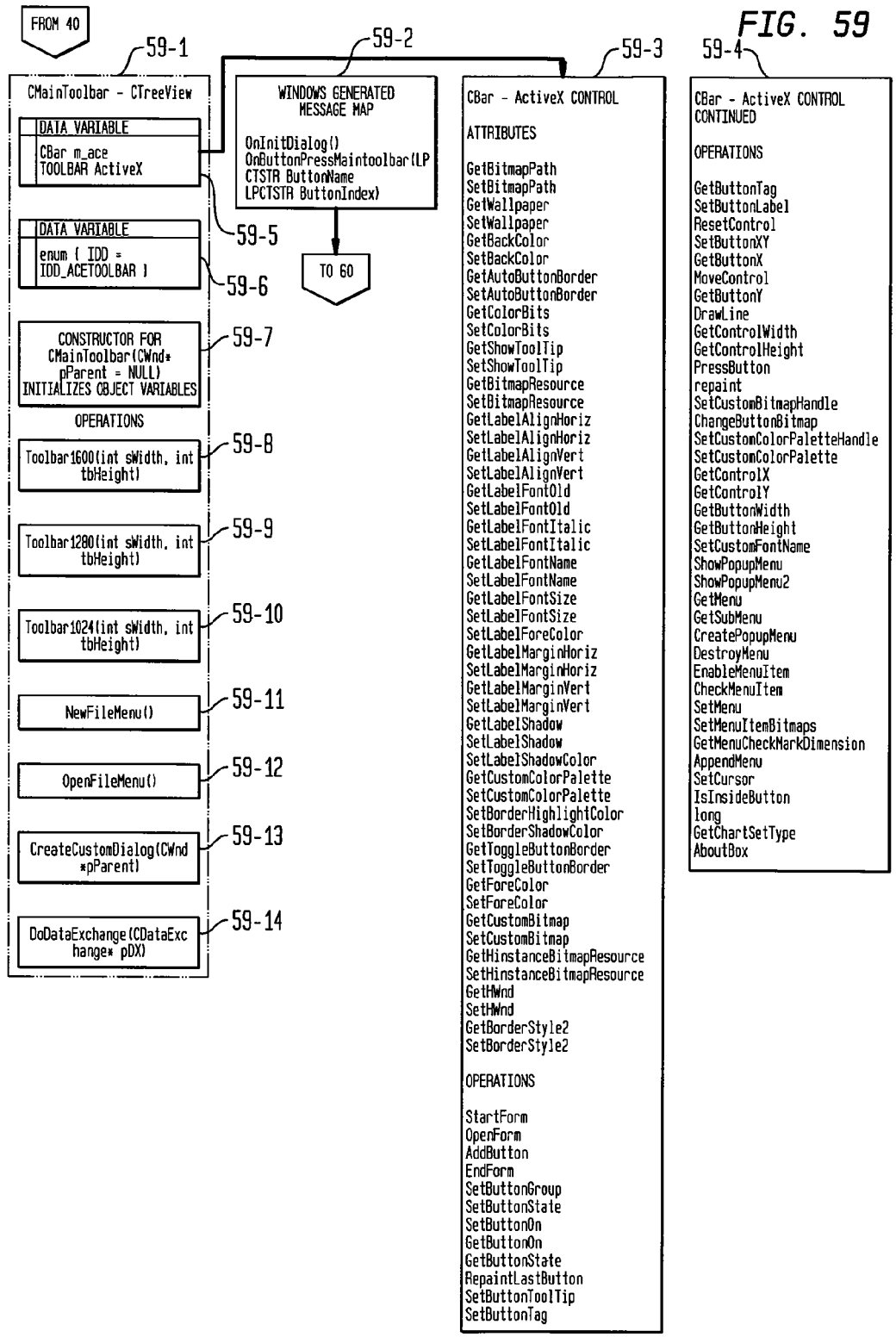
FIGS. 59-61 depict exemplary program structure feature set and process flow after selection of a button from the Qube toolbar that overrides the Microsoft foundation class toolbar, according to an embodiment of the invention.
Figure 60:
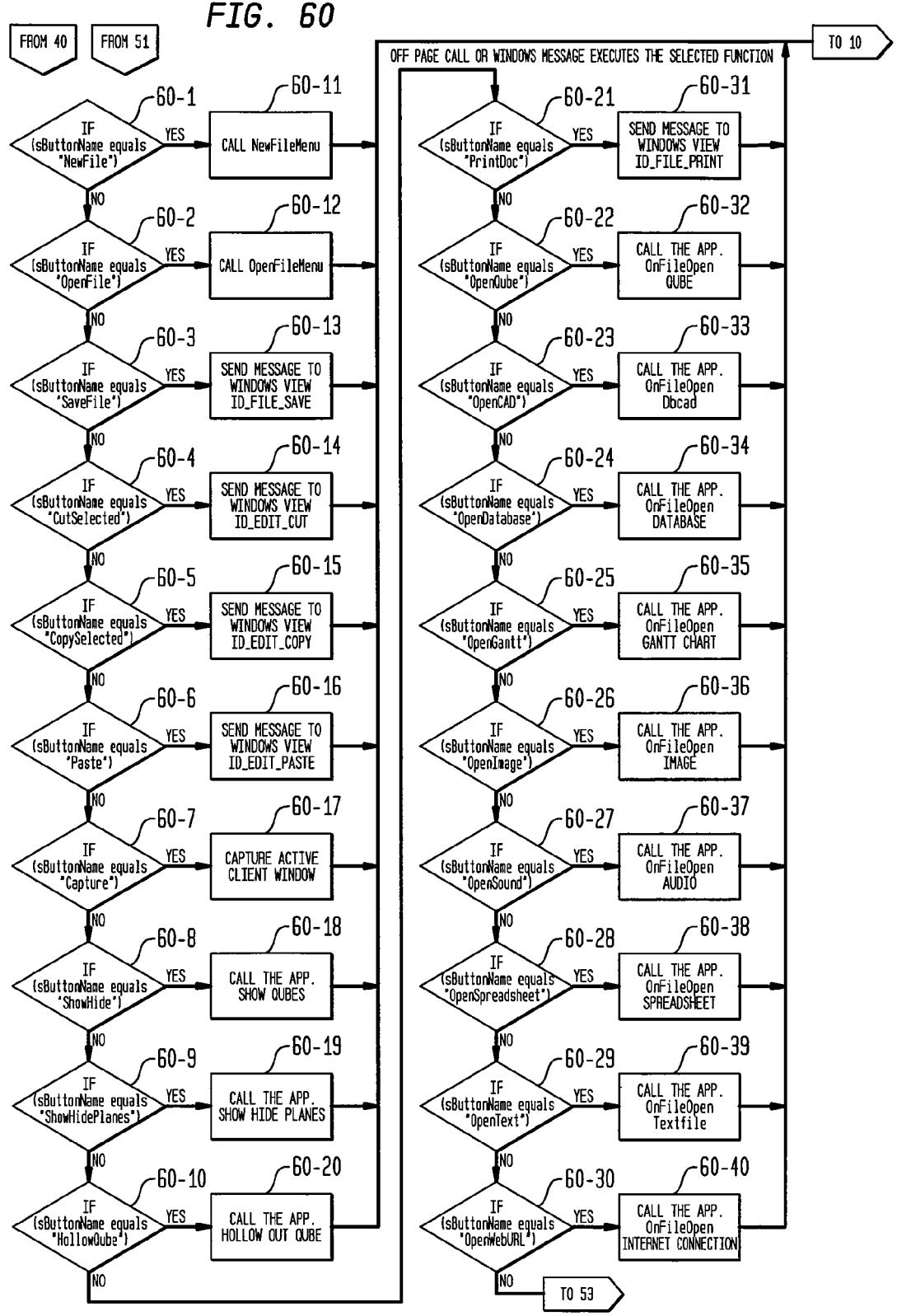
Figure 61:
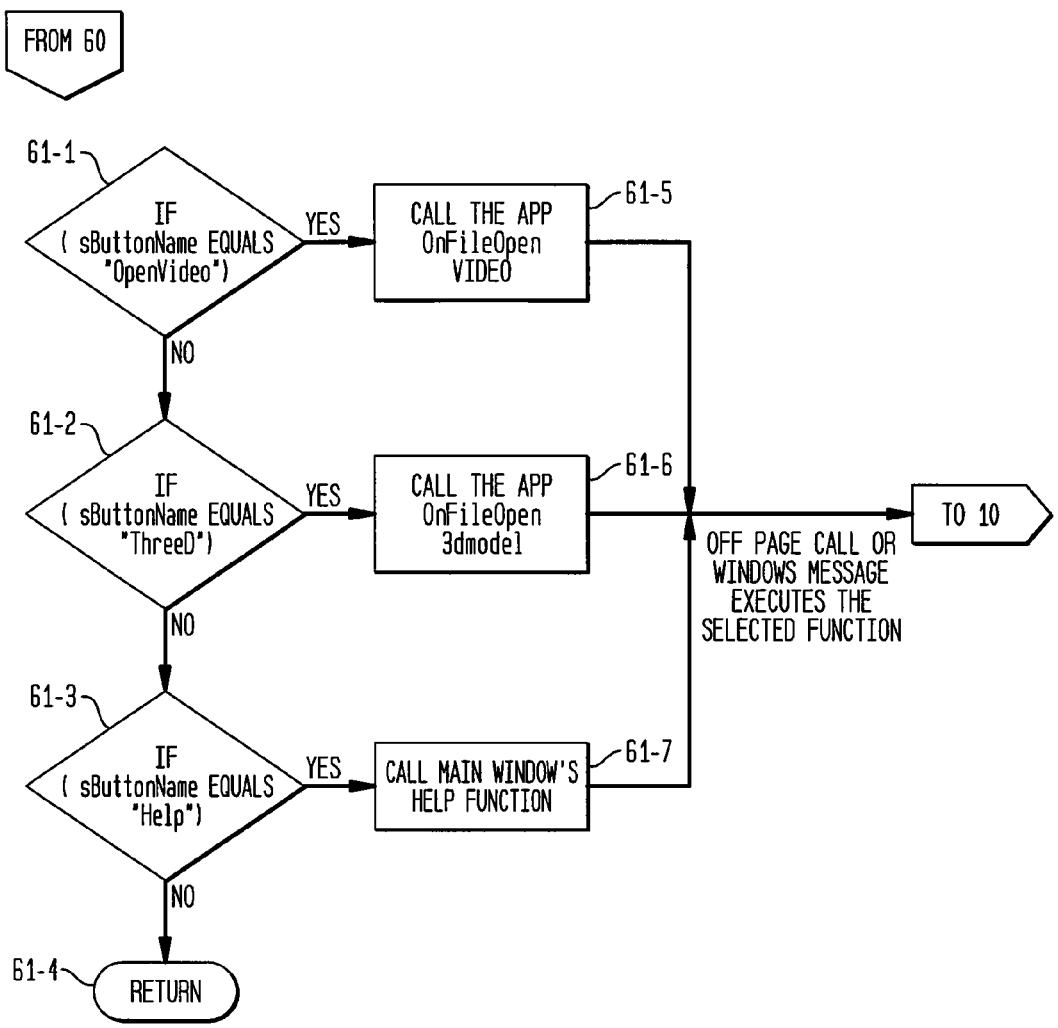

FIGS. 59-61 depict exemplary details associated with toolbar 40-100. FIGS. 60-61 depict details on the method for processing a user toolbar selection. For example, as shown in FIG. 60, in step 60-1, if a user activates the NewFile button 40-7, operation proceeds to step 60-11 where NewFileMenu is called. If the user did not activate the NewFile button 40-7, operation proceeds to step 60-2 where a determination is made whether the user activated the OpenFile button 40-5. This process continues until the button activated by the user is determined.

The Quantum Matrix Kernel Framework depicted in FIG. 1 further includes an extended dialog plug-in 1-5. The Quantum Matrix Dialog class extends the standard dialog box feature set to allow the application to create graphically sophisticated interface elements to simulate a real CD, video players and other real world objects that are required by the Quantum Matrix program. In an embodiment, both the toolbar and dialog box extensions are ActiveX/DCOM components that are instantiated in the Mainframe Windows module. In this embodiment, the toolbar and dialog boxes ActiveX controls each have an automated interface 1-10, 1-9 providing a user interface and message application dispatcher that plugs into the Mainframe Windows module.

FIG. 62 depicts an exemplary Audio Dialog 62-100 and Video Dialog 62-200. In general, audio and video applications require a graphically sophisticated interface to simulate real CD and video players. In an embodiment, the CRose ActiveX component allows a user to create complex dialog box type controls required by the Quantum Matrix program. FIG. 63 includes an exemplary list of functions for the CRose class. This class is used for both Audio and Video applets and other graphically demanding applications requiring digital representation of real world devices with dials, buttons, slider, gauges, etc.

The dialog boxes created with the above mentioned tools provide the means by which the user interacts with and modifies the various persistent attributes of the program that configure system security, type of display, system default conditions and direct access to the Quantum Matrix's data. The Microsoft Foundation Class library 1-1, depicted in FIG. 1, provides access to the Microsoft operating system API (Application Programmer Interface and other generic program features common to all Windows applications). Specific details of the Microsoft Foundation Class library 1-1 are well known to those skilled in the art and need not be further explained herein.

In an embodiment, industry standard API, OpenGL (Open Graphics Language) and its C++ implementation, and Open Inventor are employed in the Quantum Matrix system as tools to create a three-dimensional interface, a graphics display and its Quantum Matrix scenegraph. The Inventor Class features are provided through a Dynamic Link Libraries linked into the Window Mainframe module.

The Quantum Matrix kernel frame further includes a set of applet plug-ins 1-16 to 1-19. Each applet plug-in provides a different type of content feature allowing one to access and manipulate various types of documents and databases. In an embodiment, each applet plug-in is associated with a user interface and message application dispatcher that plugs into the Qube Application module 1-12 to 1-15.

3.2 Program as a Set of Software Modules

Figure 7:
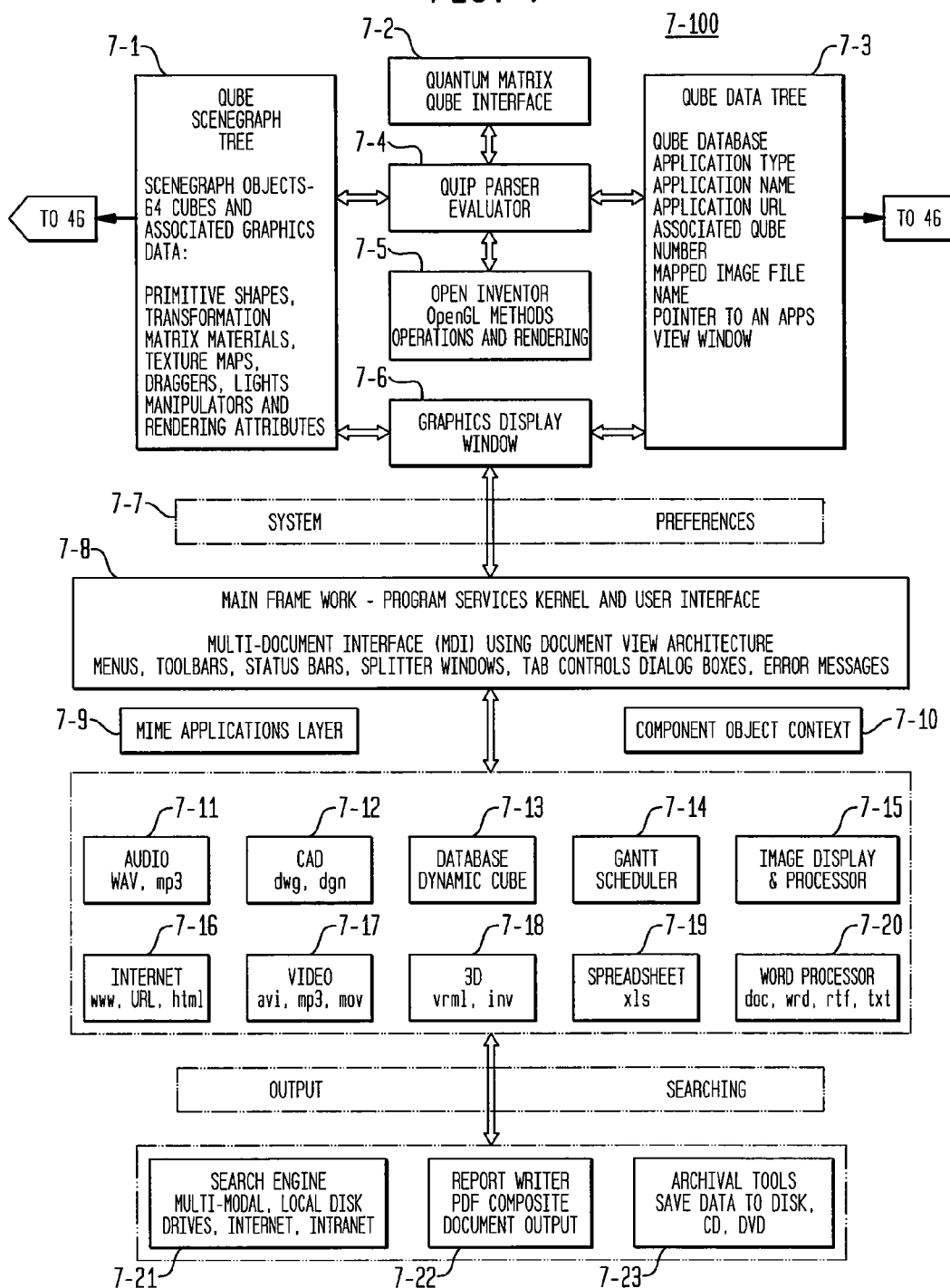

The Quantum Matrix application can also be described as a set of software modules. FIG. 7 depicts a block diagram of the program architecture and concept 7-100, according to an embodiment of the present invention. The program architecture 7-100 includes a QUIP parser/evaluator 7-4 coupled logically to Qube interface 7-2, Open Inventor module 7-5, Qube Scenegraph Tree 7-1 and Qube Data Tree 7-3. The program architecture 7-100 also includes a Main Frame Work-Program Services Kernel and User Interface 7-8. The Program Services Kernel and User Interface includes a multi-document interface (MDI) using document view architecture, menus, toolbars, status bars, splitter windows, tab controls dialog boxes, and error messages. The application modules 7-11 to 7-20 are logically coupled to the program services kernel and user interface 7-8.

Figure 8:
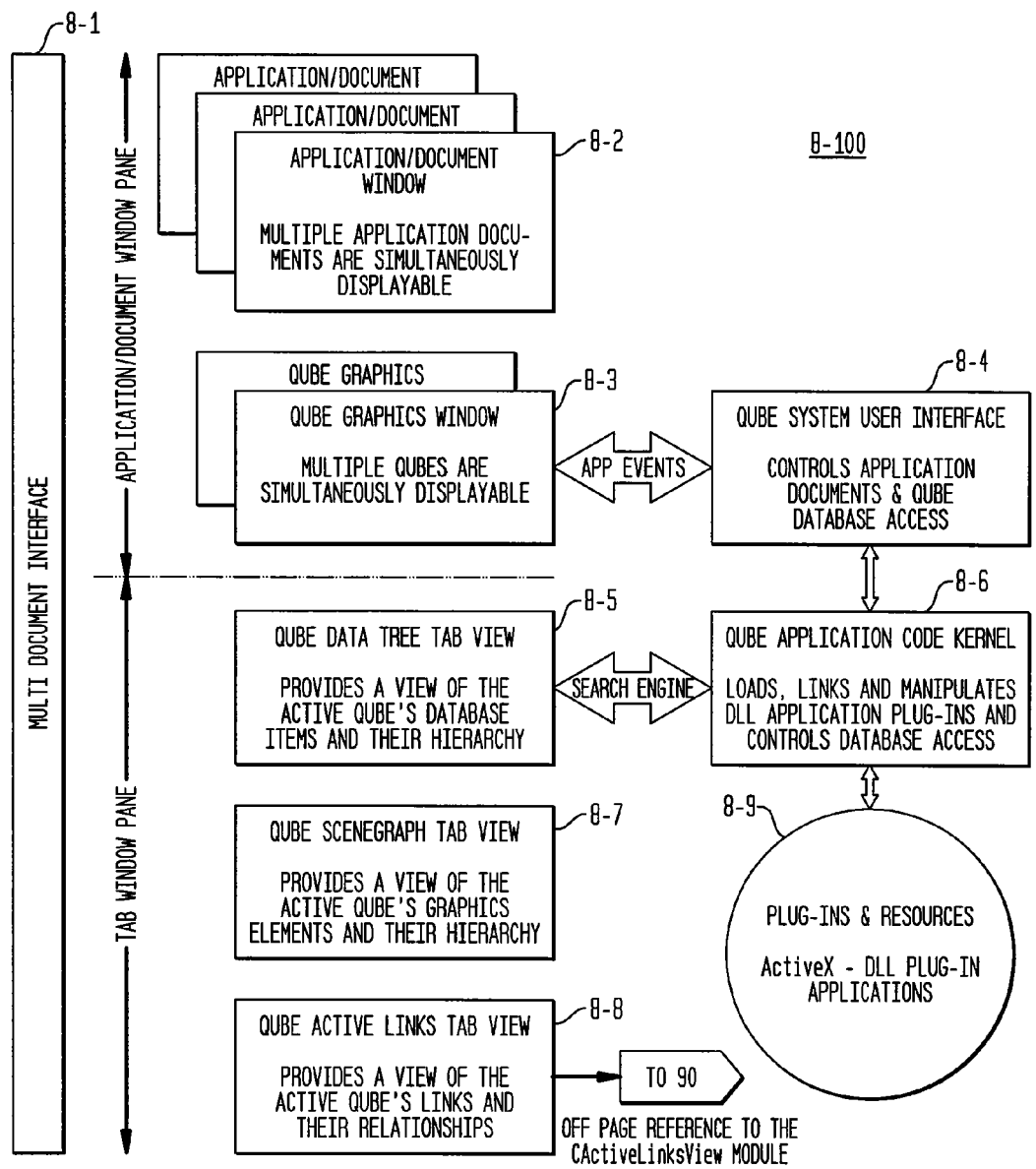

FIG. 8 depicts a block diagram of the application interface concept 8-100, according to an embodiment of the present invention. The interface concept 8-100 includes an application/document window panes 8-2 and 8-3, tab window panes 8-5, 8-7, and 8-8. The window panes interact with multi-document interface 8-1. Window panes also interact with the Qube System User Interface 8-4 and Qube Application Code Kernel 8-6. The Qube Application Code Kernel 8-6 interfaces with Plug-Ins and Resources 8-9.

Figure 9:
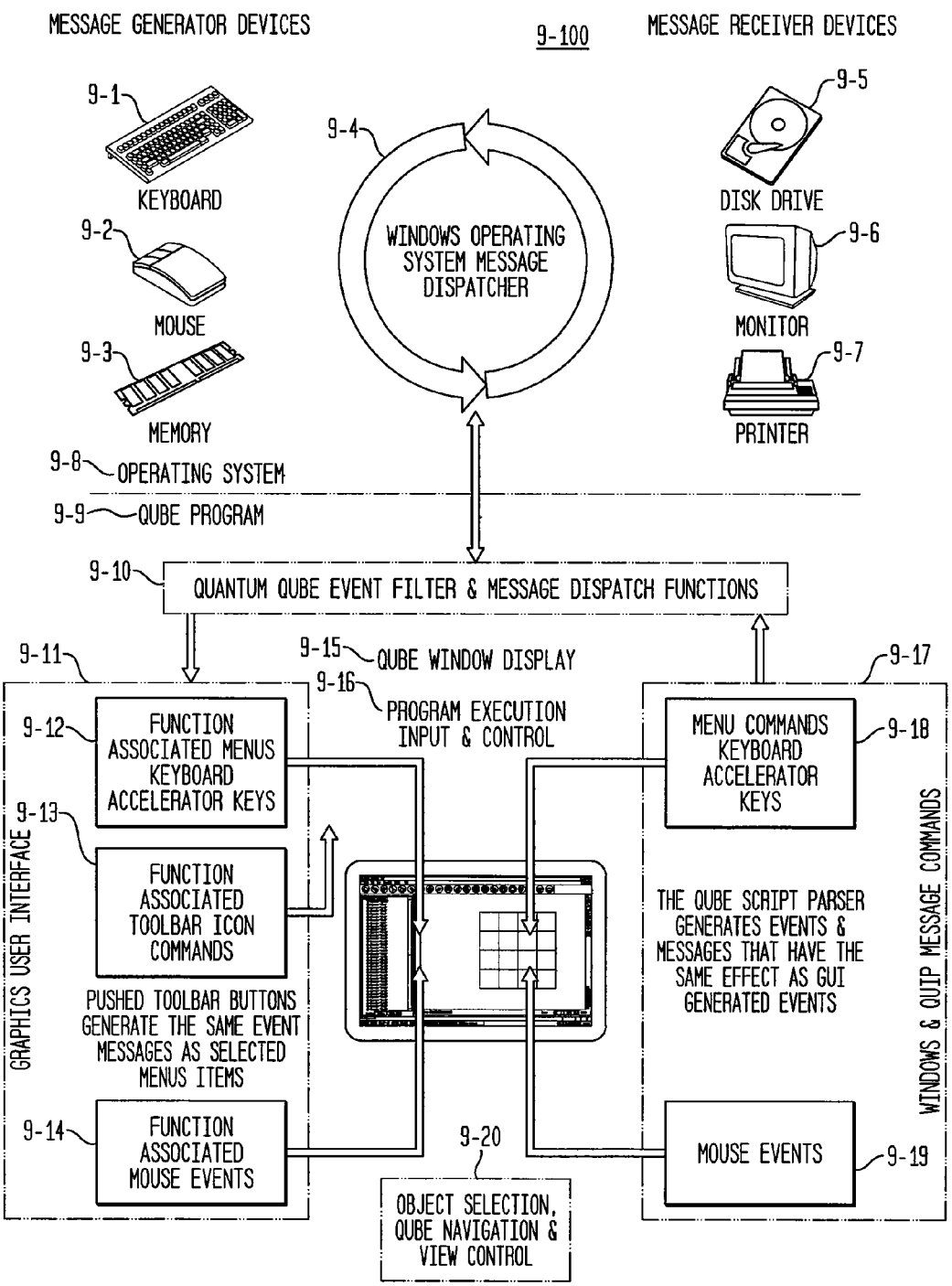

FIG. 9 depicts a block diagram of event processing 9-100, according to an embodiment of the present invention. The event processing 9-100 includes components handled by the operating system 8-8 and by an exemplary Quantum Matrix 9-10. The operating system 8-8 includes message generator devices 9-1, 9-2, and 9-3, an operating system message dispatcher 9-4, and message receiver devices 9-5, 9-6, and 9-7. The exemplary Quantum Matrix 9-10 includes a Quantum Qube Event Filter and message dispatch functions 9-10, Qube Window Display 9-15, program execution input and control 9-16, graphic user interface 9-11, windows and QUIP message commands 9-17, and object selection, Qube Navigation and view control 9-20.

Figure 10:
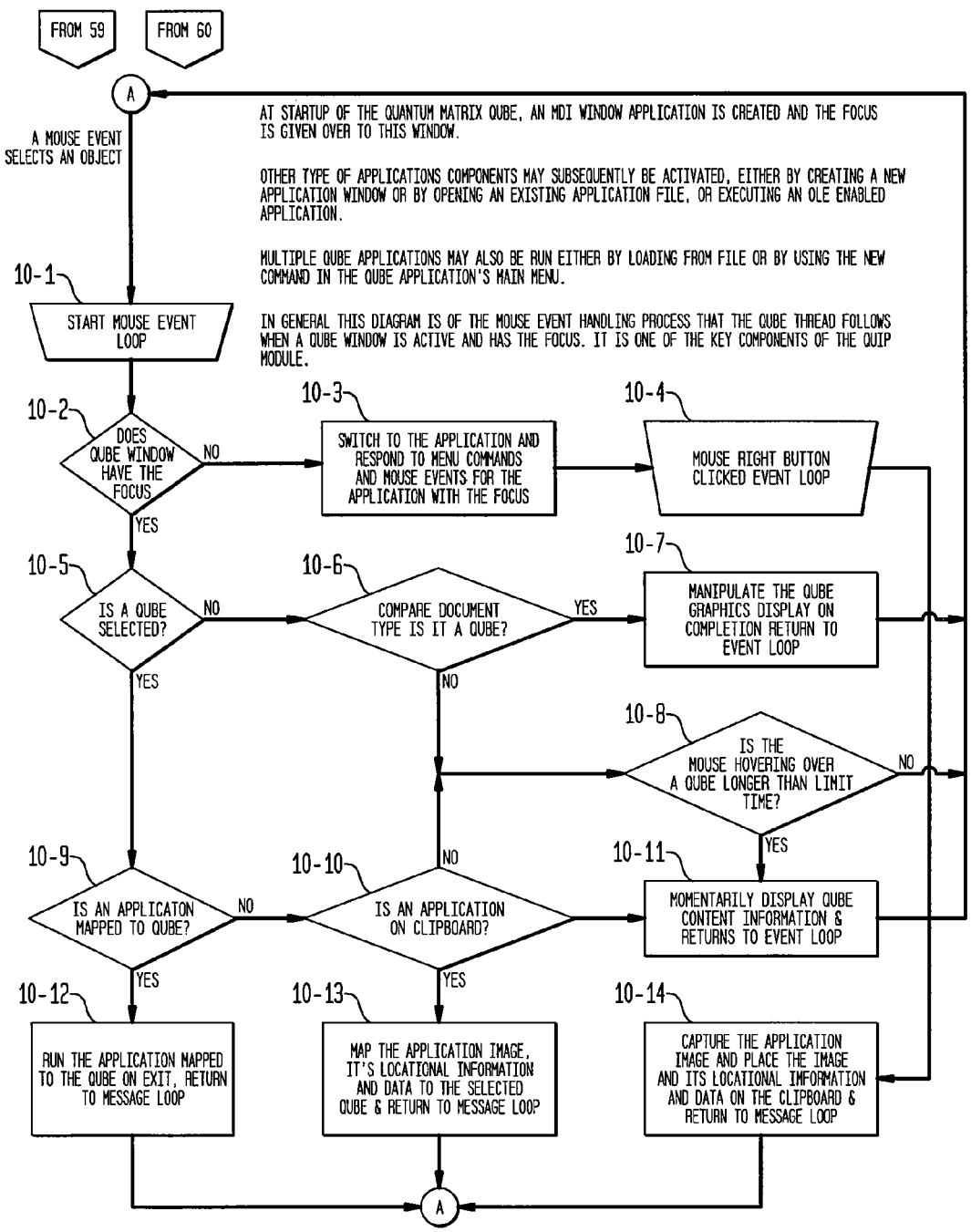

FIG. 10 depicts a flow chart of how mouse events are handled, according to an embodiment of the present invention.

Figure 11:
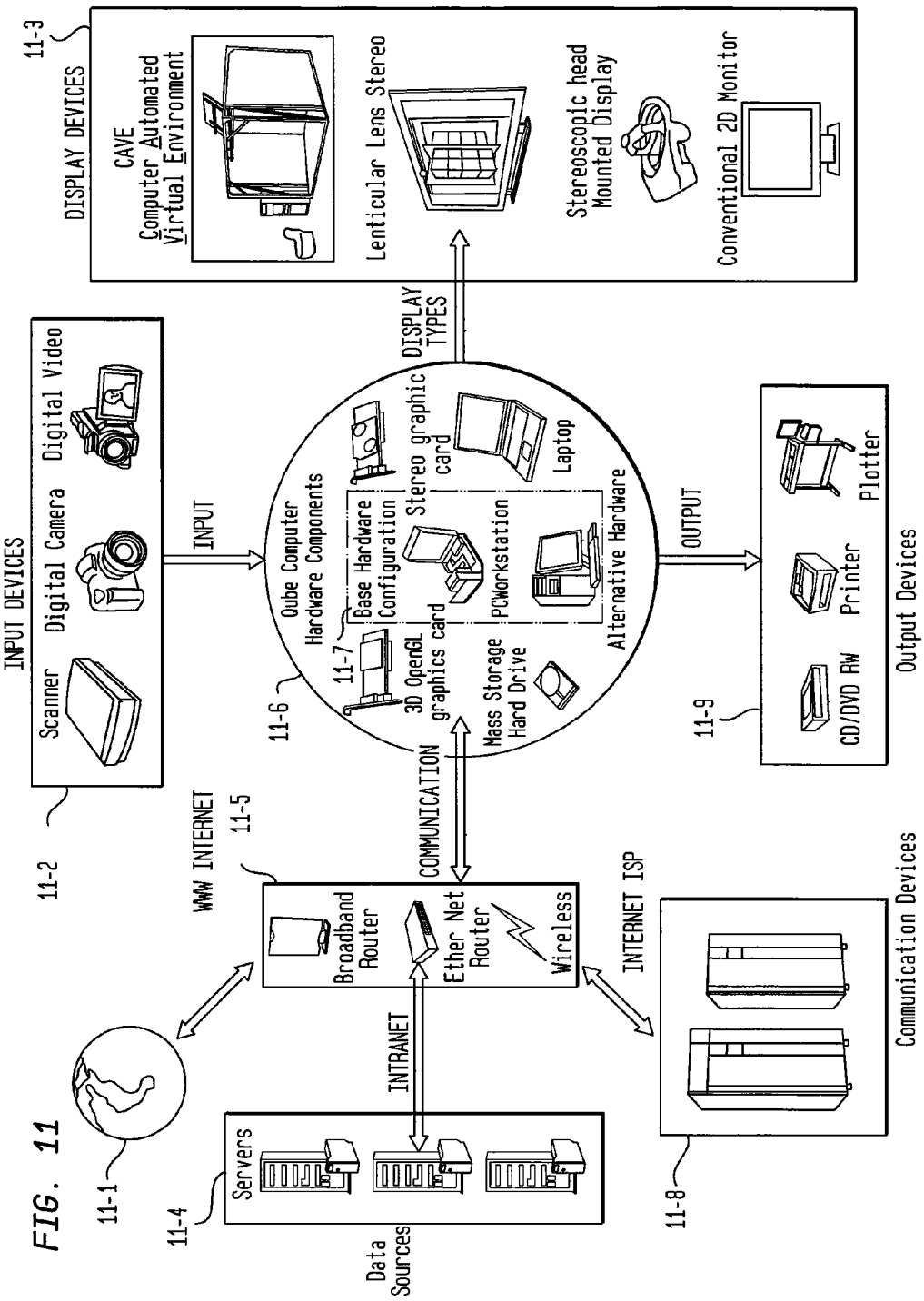

FIG. 11 depicts examples of hardware, which may be utilized by the Quantum Matrix, according to an embodiment of the present invention.

Figure 12:
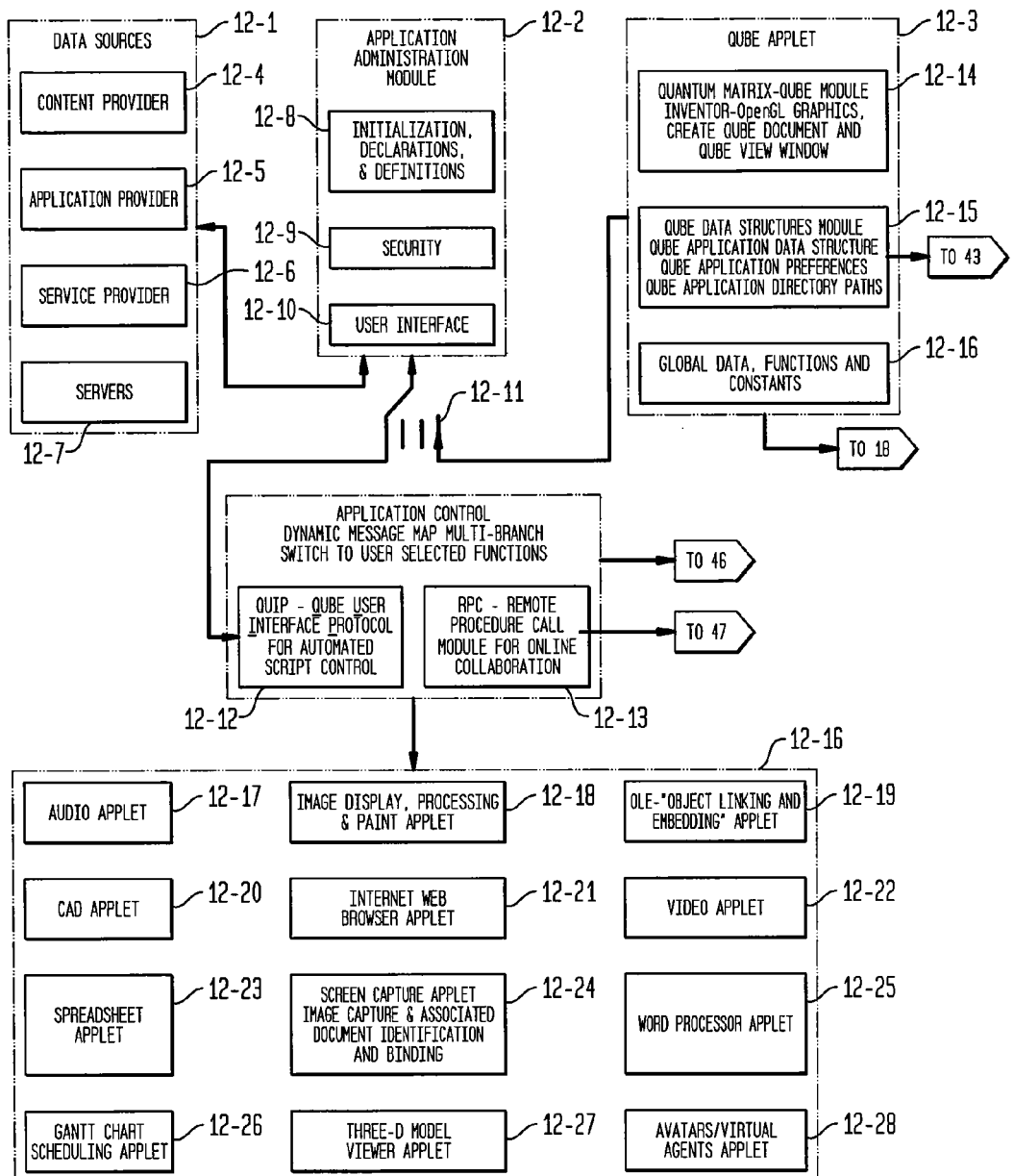

FIG. 12 depicts a block diagram of the interaction between applets and data sources, according to an embodiment of the present invention.

Figure 13:
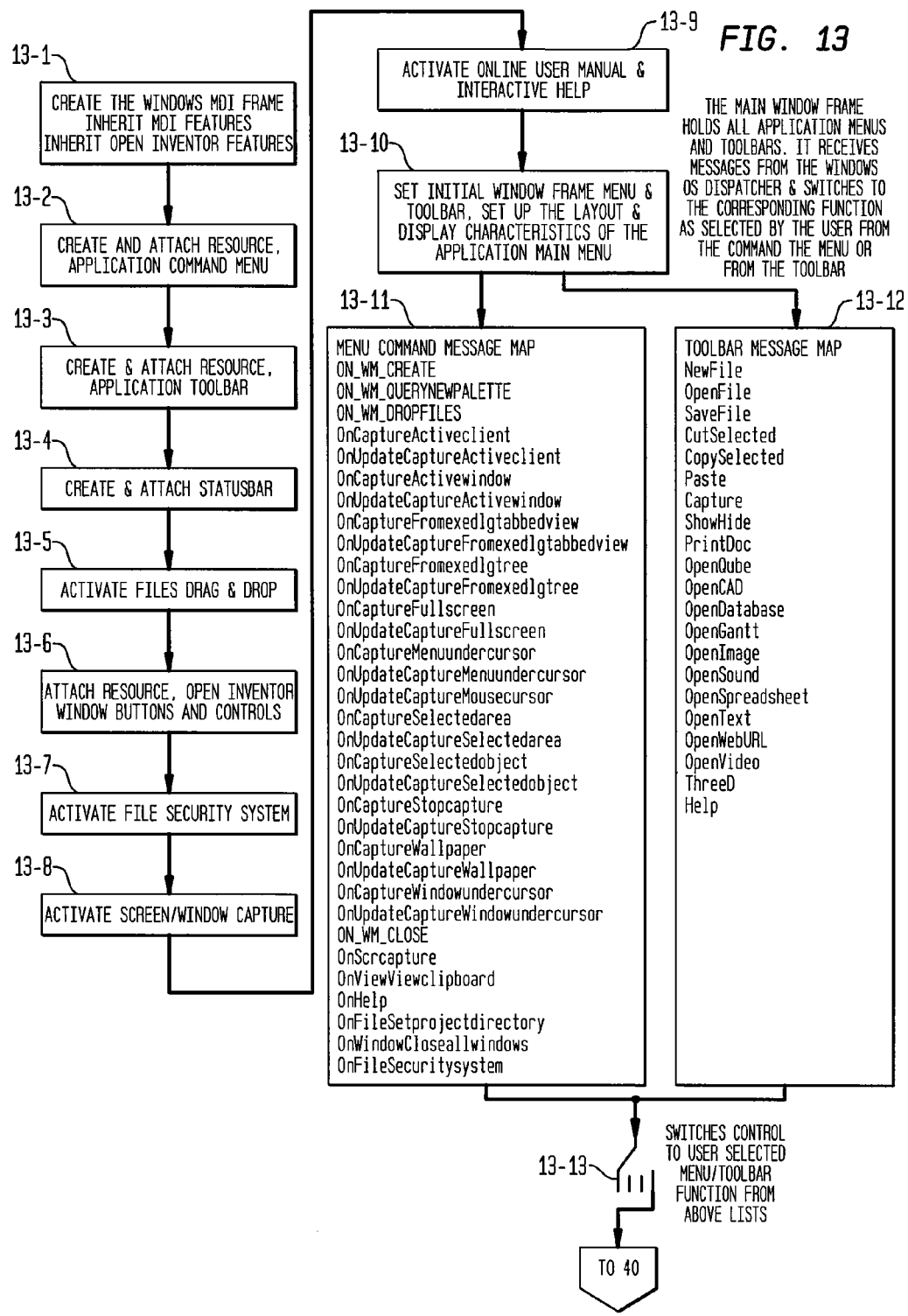
Figure 14:
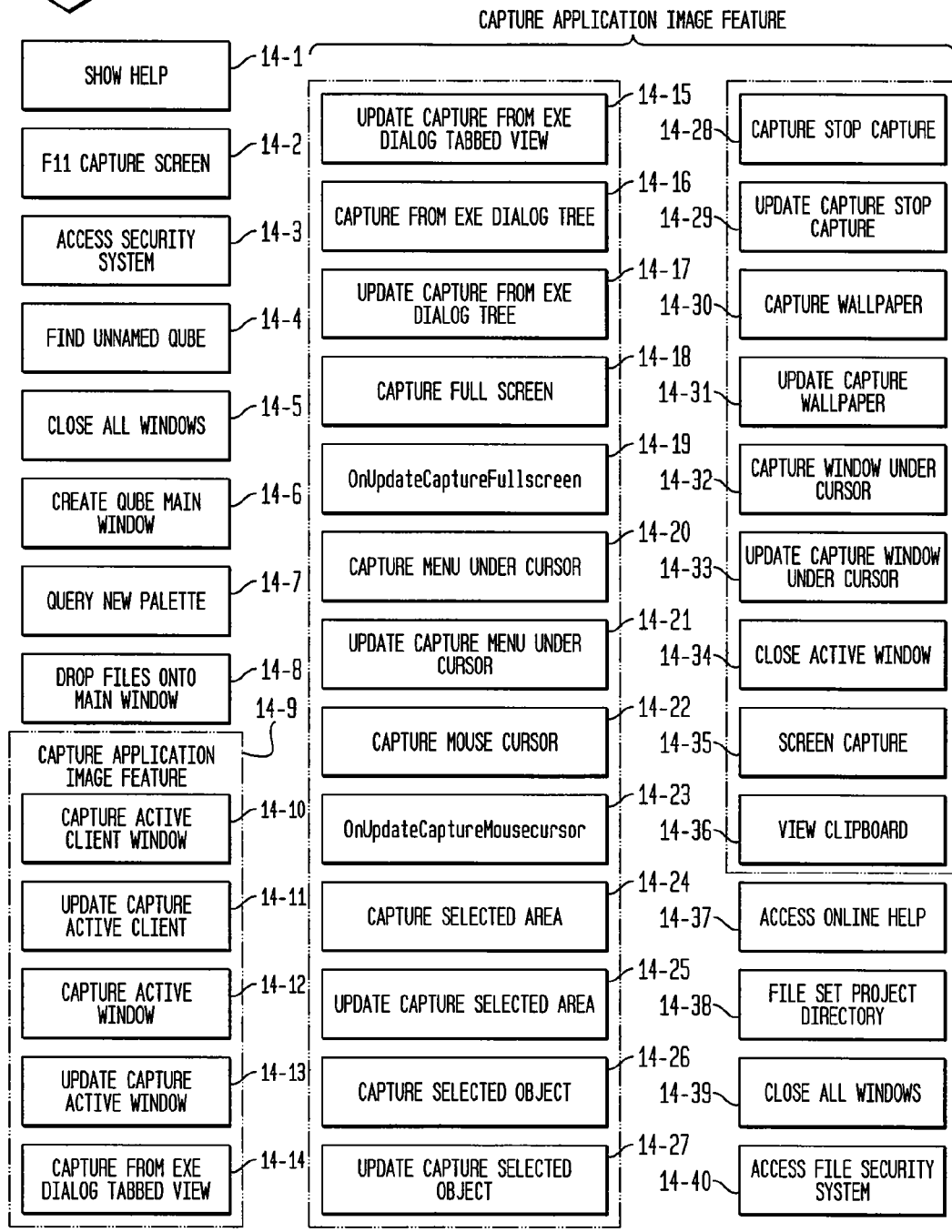

FIGS. 13 and 14 depict exemplary programmatic elements for the main window frame—MDI. The main window frame holds all the application menus and toolbars. It receives messages from the Windows OS dispatcher and switches to the corresponding function as selected by the user from the menu or toolbar. The procedures illustrated in FIGS. 13 and 14 are message-mapped procedures and are therefore event driven. The procedures do not have a flow relationship. They are selected by the user from the user interface menu/toolbar system. They return on completion to the OS WinProc (Windows Procedure event loop), awaiting more user selected events.

3.2.1 Program Structural Categories

In an embodiment, the Quantum Matrix system includes multiple general programmatic element categories. These categories are sets of computer code, which are similar in structure and abstract purpose. The programmatic element categories include but are not limited to the application kernel, Quantum Matrix modules, Global functions and variables, Quantum Matrix data structures, application modules, and utility components. These categories are further broken down into the system's functional modules. The programmatic element categories can be considered as a structural hierarchy of the relationship between the program flow and overview of the relationship between their respective sub category functional modules.

3.2.1.1 Application Kernel

The application kernel forms the application underpinnings on which the Quantum Matrix application is built. The kernel further acts as the location where all other program modules and entities have their genesis. In an embodiment, the application kernel includes, but is not limited to, the following modules and classes: main window frame, main toolbar, Qube application, system preferences, security system, split window control and view extension, and the about function.

Figure 16:
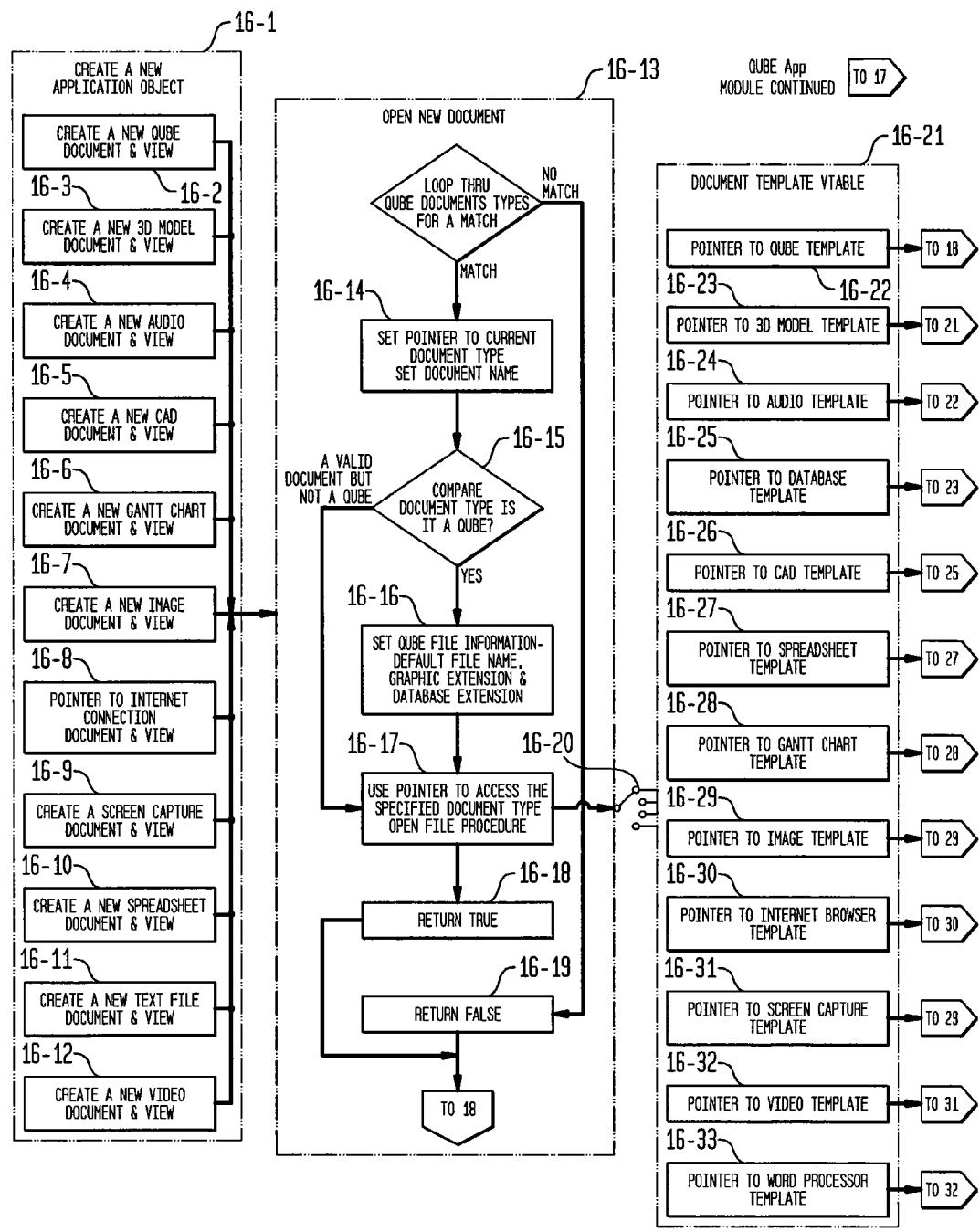
Figure 17:
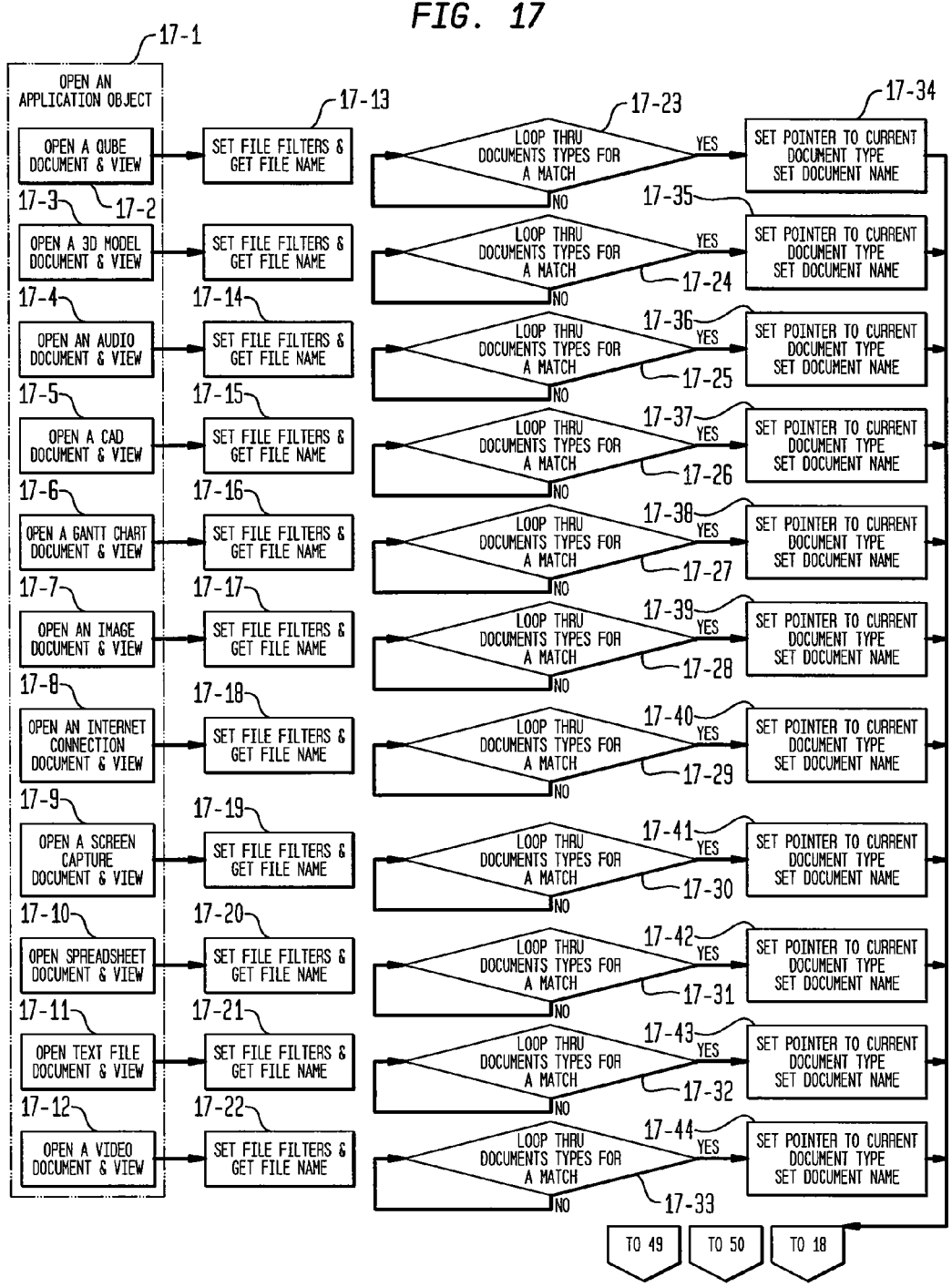
Figure 18:
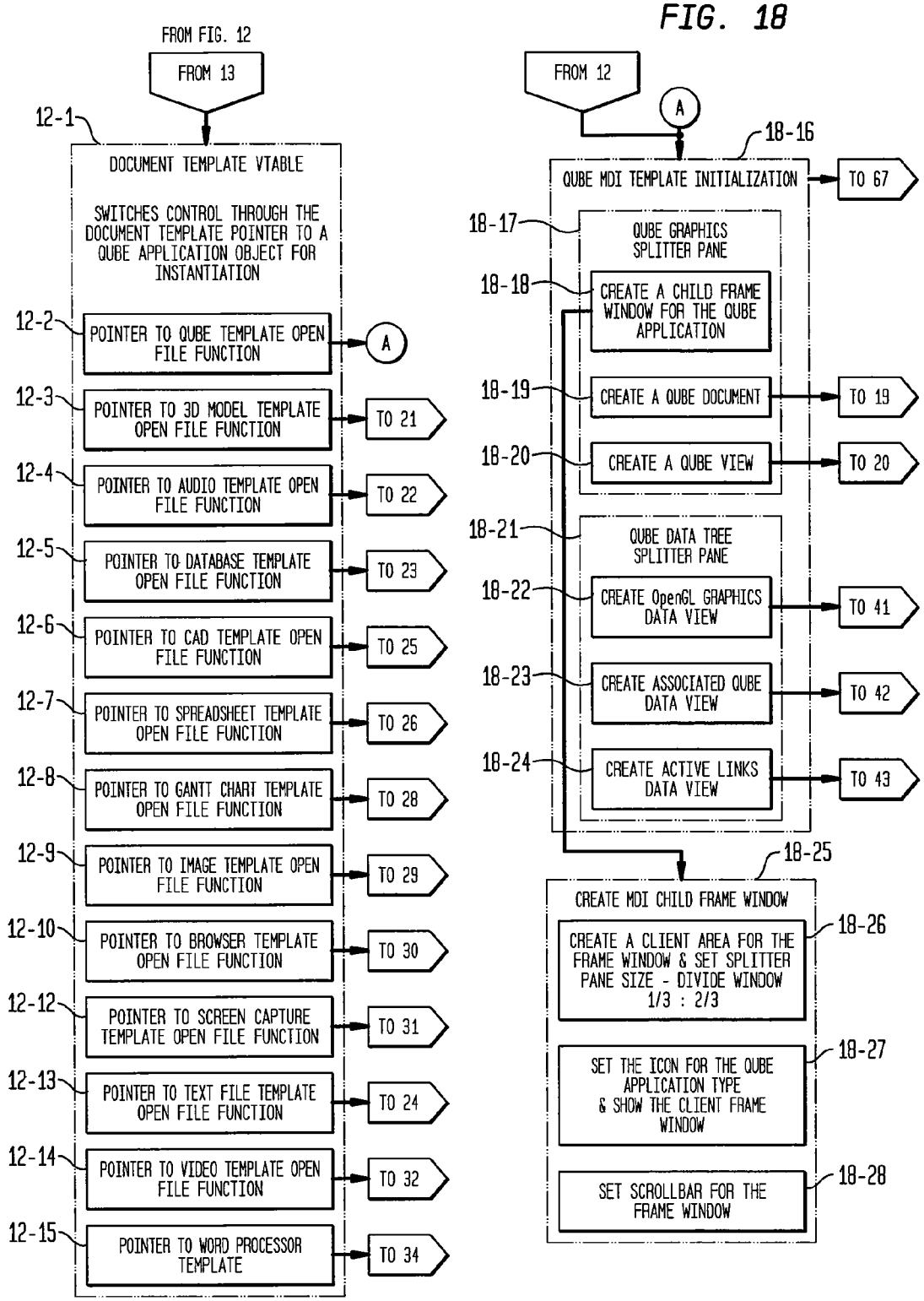

FIGS. 16 and 17 depict exemplary programmatic elements associated with the Qube Application module and also depict system preferences, according to an embodiment of the present invention. For example, FIGS. 16 and 17 include create a new application object elements 16-1, open new document elements 16-13, document template elements 16-21, and open application object elements 17-1. The document template elements 16-21 switch control through the document template pointer to a Qube application object for instantiation.

FIG. 59 depicts exemplary programmatic elements associated with the main toolbar, according to an embodiment of the present invention. The CMain Toolbar includes CMainToolbar-CTreeView elements 59-1, Windows Generated Message Map 59-2, and CBar-ActiveX Control 59-3 and 59-4. In an embodiment, the CBar-ActiveX component is used to create the main window's toolbar and its unique visual appearance.

The security system is programmatic element 13-7 included in the main window frame—multi document interface depicted in FIG. 13. The split window control and view extension is a programmatic element 18-17 included in the Qube MDI Template initialization module 18-16 of the Qube View and Document Architecture depicted in FIG. 18. The about module is a function identifying the program author, copyright and patent notice, and other information regarding the program and system authorship and corporate ownership. Specific details of the about function are well known to those skilled in the art and need not be further explained herein.

3.2.1.2 The Qube Modules

A Qube is a Quantum Matrix node. A node is a three-dimensional object located in space at a specific Cartesian (x,y,z) coordinate that is linked to data.

The Qube module operates on a dynamic array of Qubes and includes a set of application modules (or components) that provide the core functionality of the Quantum Matrix system. The Qube module includes, but is not limited to, an Active Links View module, a Child Frame, a Data Tree View, a Display Hide Qube module, a Scenegraph Data Tree View module, a Qube Clipping Dialog, a Qube Control Item module, a Qube Document module, a Qube view module, a Tab View module, a Tab Window module, and a TreeNode module.

Figure 43:
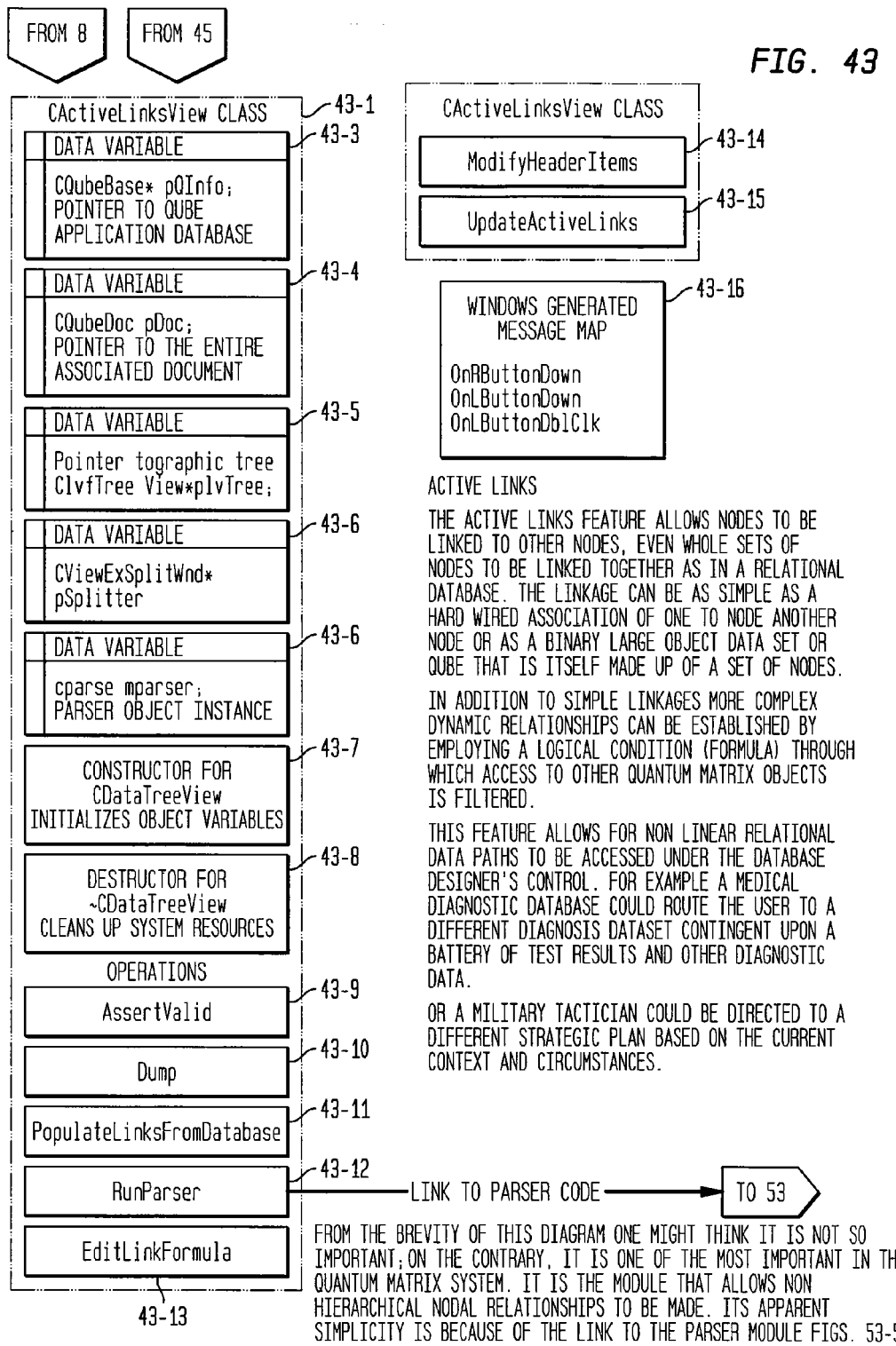

FIG. 43 provides additional details related to the Active Links View module. The active links feature allows nodes to be linked to other nodes and sets of nodes to be linked together. The linkage can be as simple as a association of one node to another node or as complex as a Binary Large Object data set or Qube that is made up of a set of nodes. In addition to simple linkages, more complex dynamic relationships can be established by employing a logical condition (formula) through which access to other objects is filtered.

Figure 41:
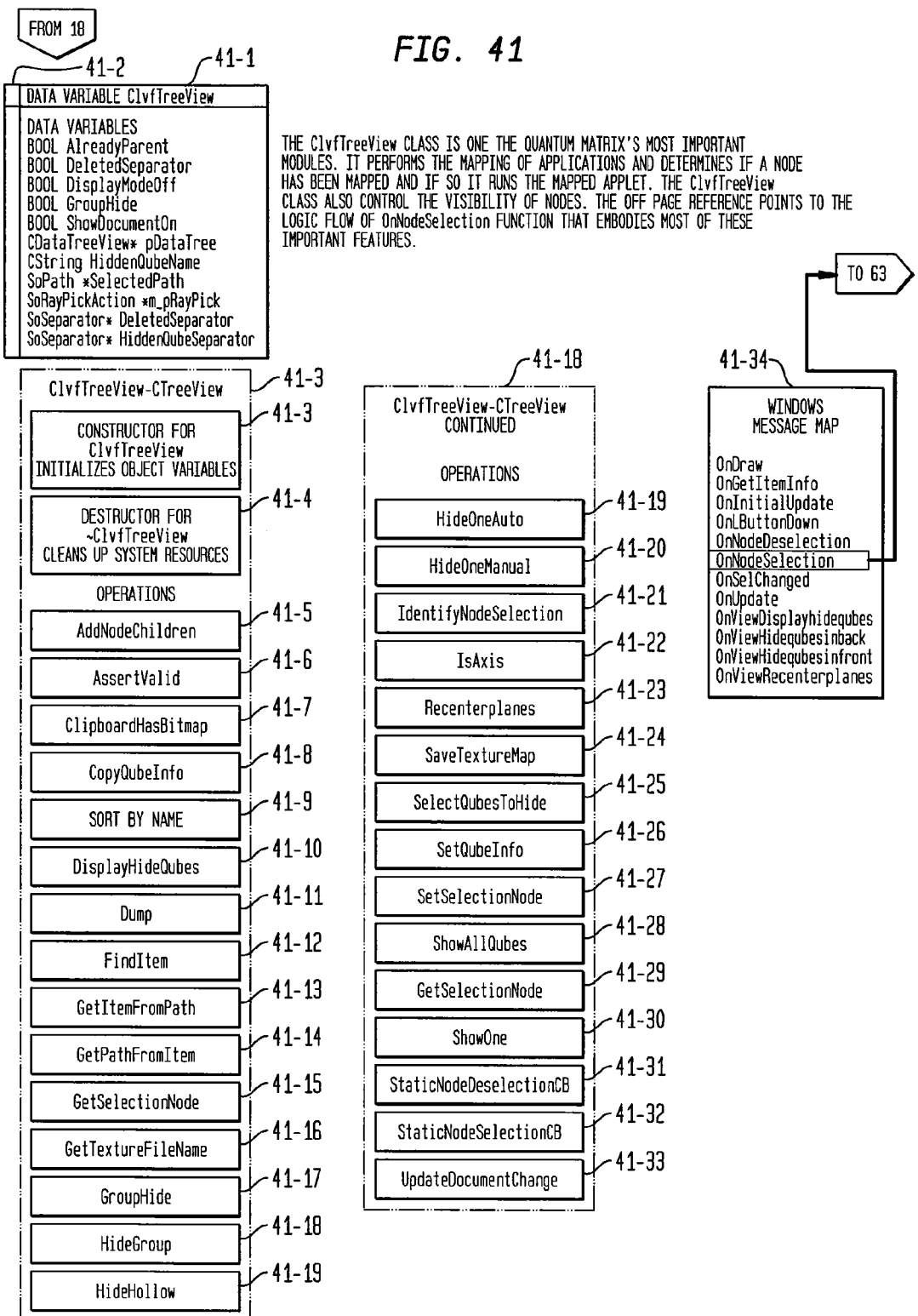

FIG. 41 provides additional details related to the Scenegraph Data Tree View module. The associated Tree View class performs mapping of applications and determines whether a node has been mapped. If a node has been mapped, the module runs the mapped applet. The class also controls the visibility of nodes.

Figure 64:
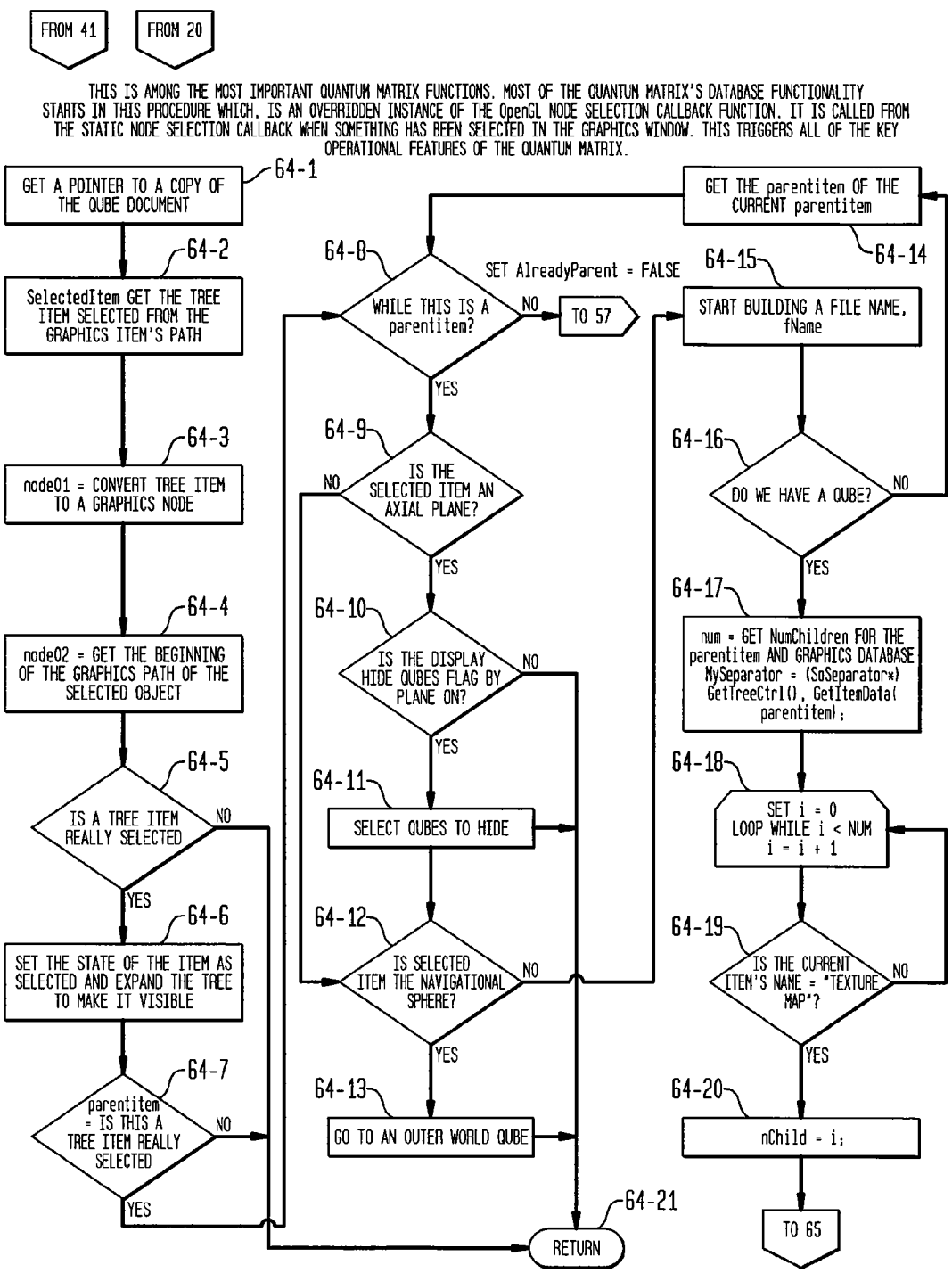
FIGS. 64-66 are exemplary process flow charts showing an overridden instance of the Open GL OnNodeSelection call back function that triggers the operational features of the invention when the user selects a graphical object, according to an embodiment of the invention.
Figure 65:
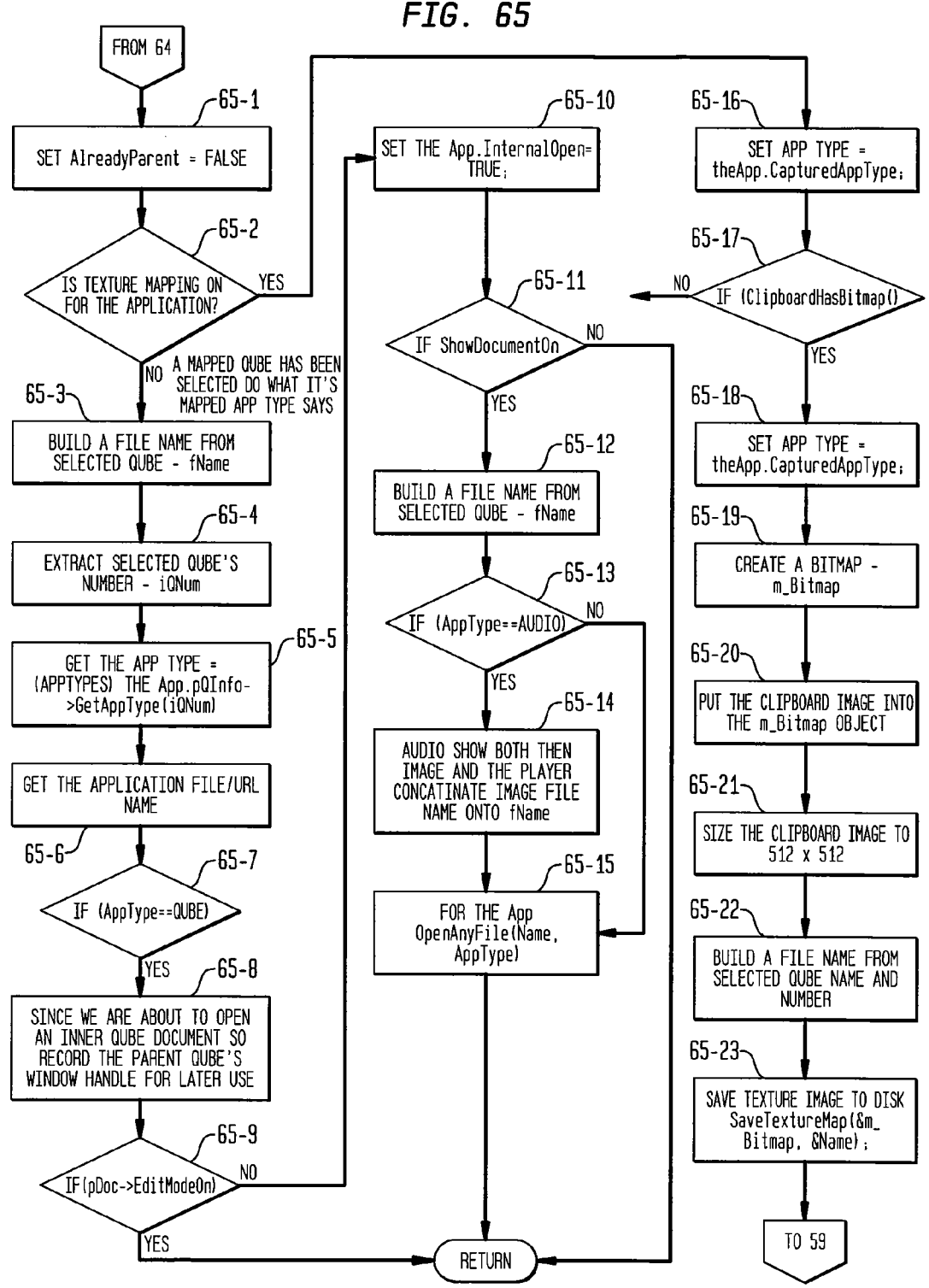
Figure 66:
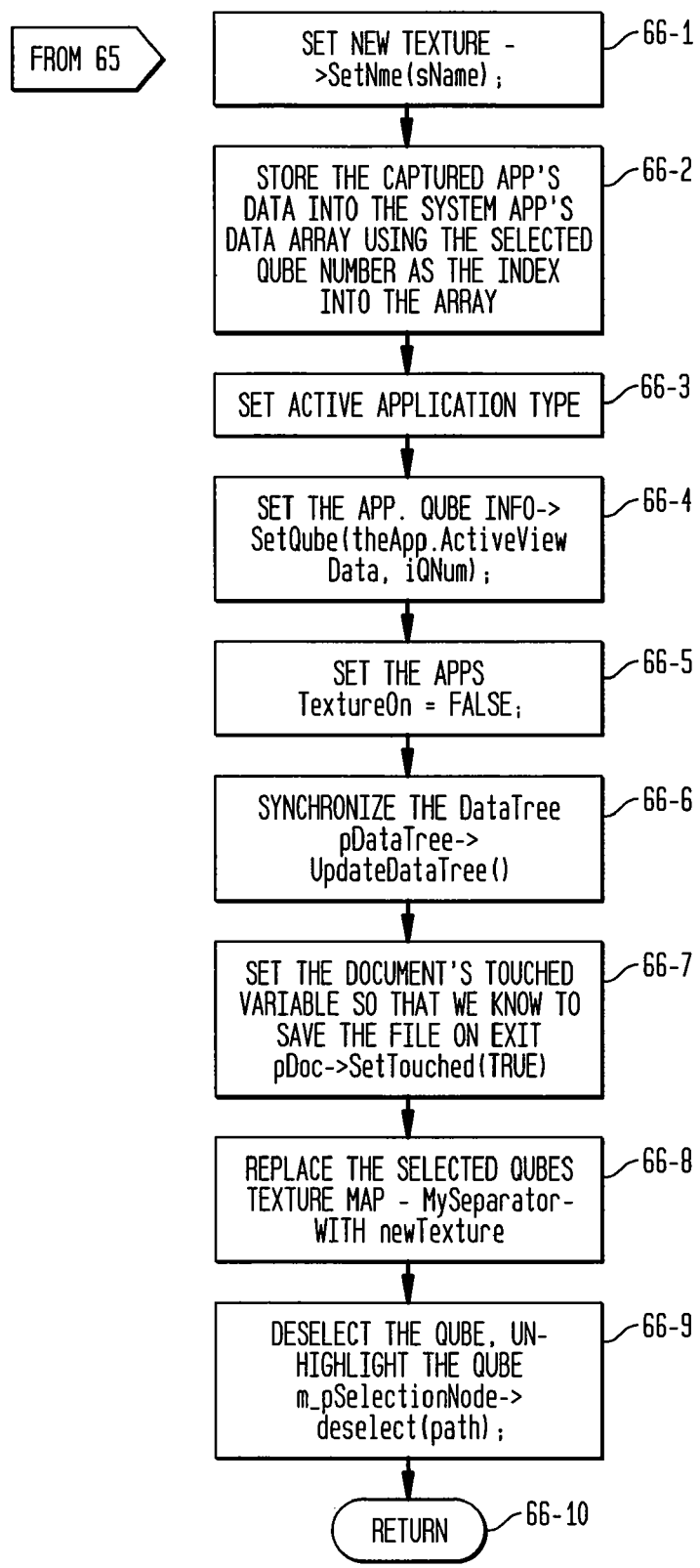

FIGS. 64-66 depict the logic flow of the OnNodeSelection function shown in FIG. 41. A portion of the Quantum Matrix's database functionality starts in this procedure, which is an overridden instance of the OpenGL node selection callback function. The procedure is called from a static node selection callback when something has been selected in the graphics window. This triggers key operational features of the Quantum Matrix system.

Figure 67A:
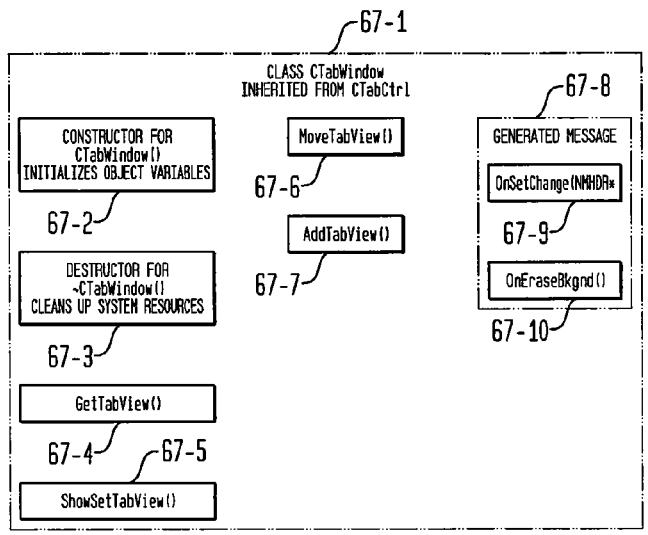
FIGS. 67A and 67B are exemplary block diagrams showing the CTab Window and CTab View which allow the user to move between different views of the Quantum Matrix's database, according to an embodiment of the invention.
Figure 67B:
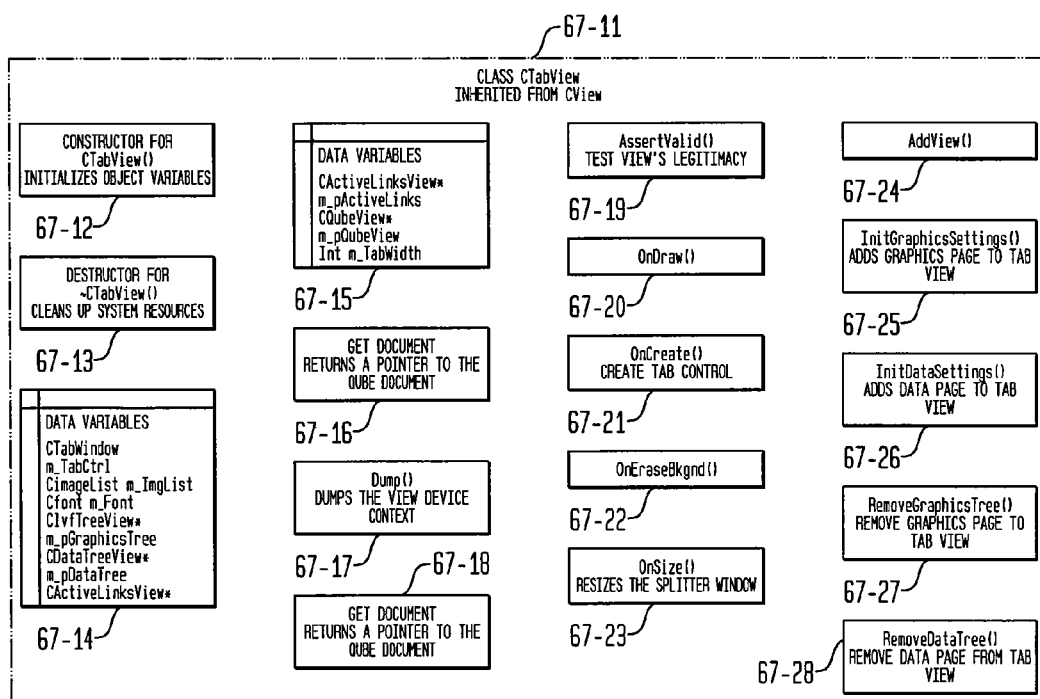

FIGS. 67A and B provide additional details related to the Tab View and Tab Window modules, respectively. The Tab Window and Tab View work together to manage the tab page pane of the Qube's view. The left pane of the splitter window displays the graphics data tree, the Quantum Matrix data tree, and the Active nodal links, allowing the user to easily move between different aspects of the Quantum Matrix database.

Figure 19:
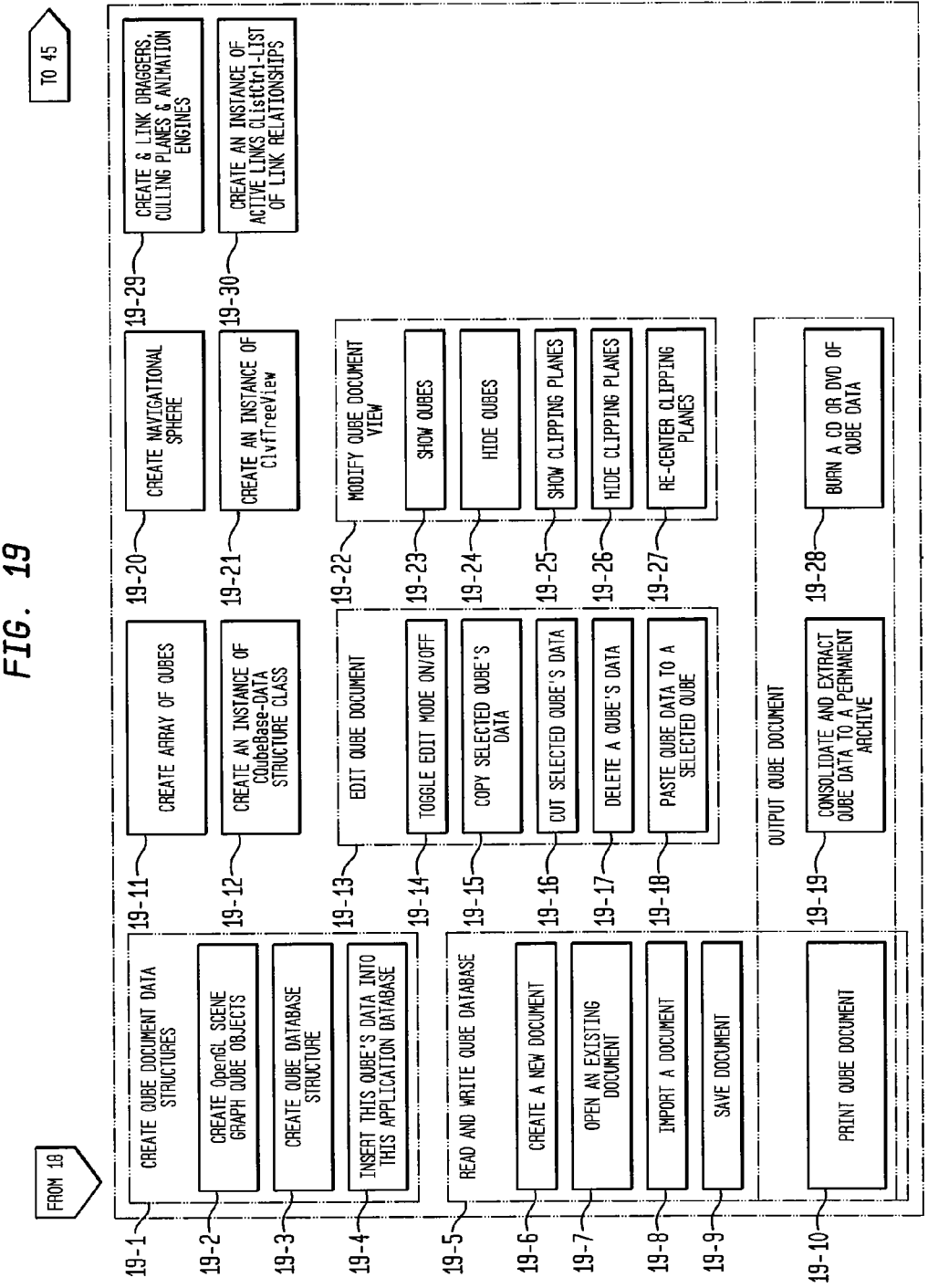
Figure 42:
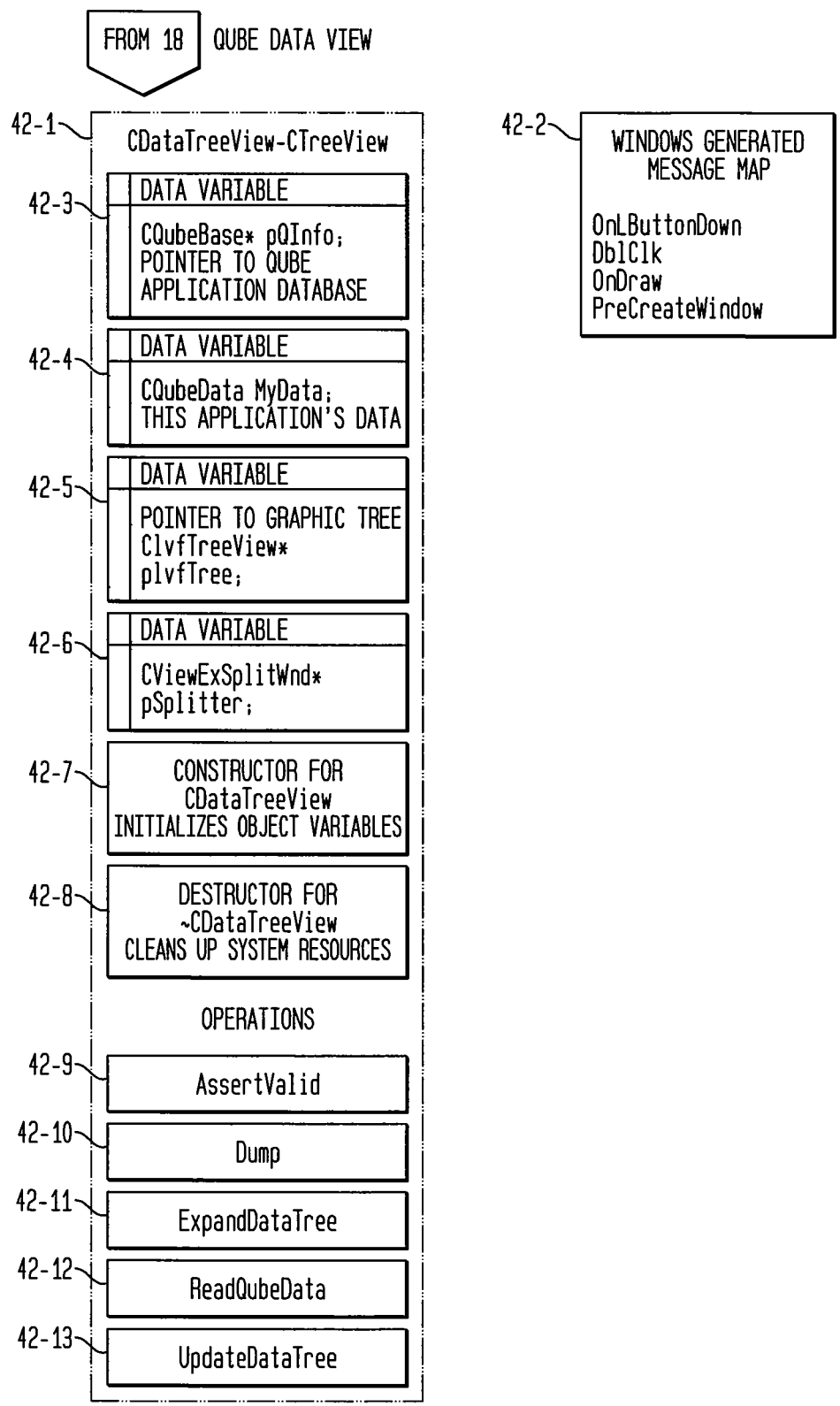

FIG. 42 provides additional details related to the Data Tree View module. FIG. 19 provides additional details related to the Qube Document module/class. FIG. 20 provides additional details related to the Qube View module/class.

3.2.1.3 Global Functions and Variables

The global functions and variables are program entities through which all program modules can communicate, store data, manipulate data and have access to all modules of the entire application. Other program modules use and have access to the global functions and variables. In an embodiment, the Quantum Matrix system includes, but is not limited to, WStr class globals that provide extended string functionality through symbolic operators, system volume control, pointed to Internet view, Pointer to the Internet Views WNDPROC, StereoMode (stereo display on/off flag), and TheApp (a global pointer to the application).

3.2.1.4 Quantum Matrix Data Structures

Figure 45:
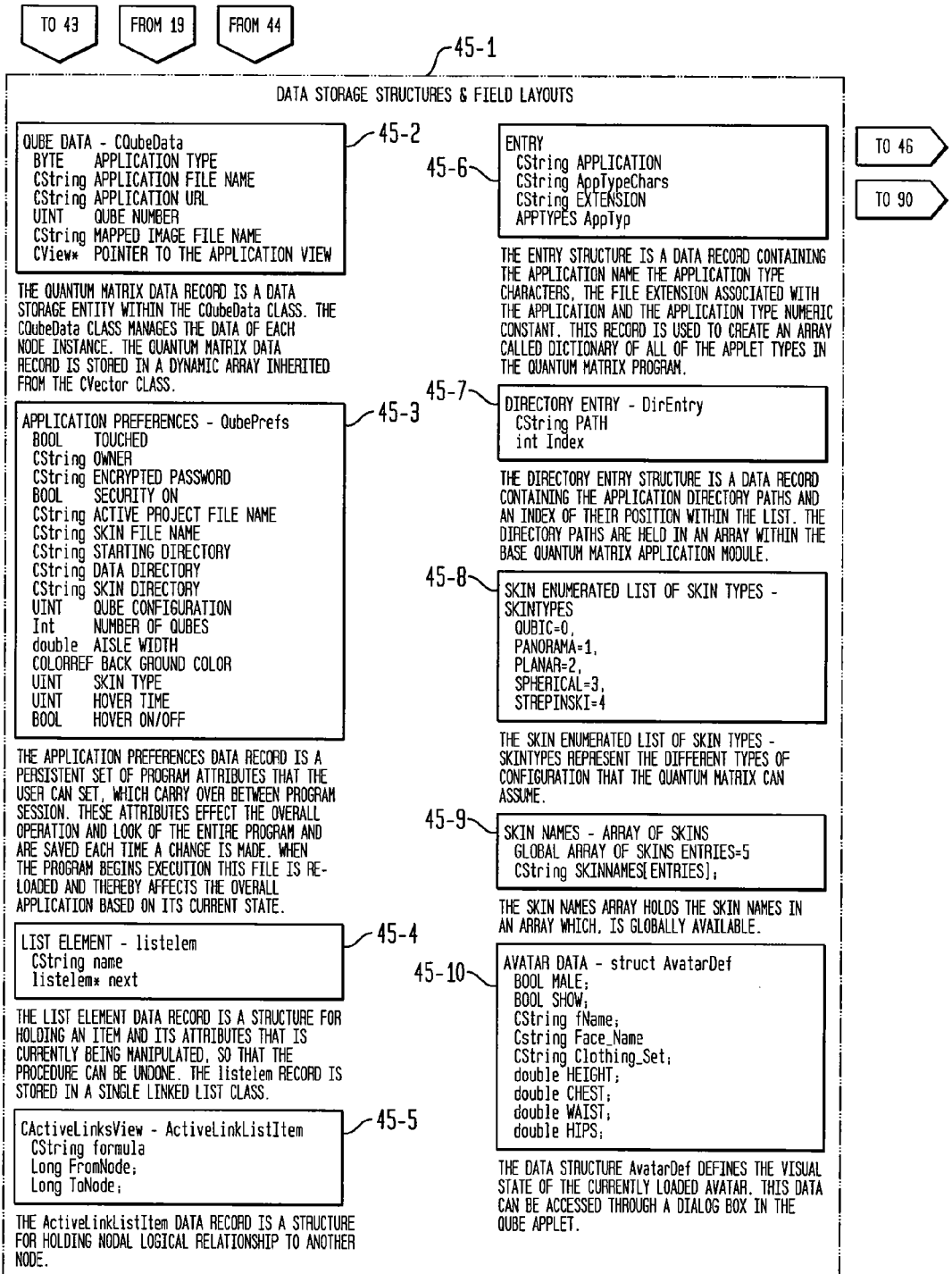

Quantum Matrix data structures are the data storage classes and data storage entities that hold system information. These data structures are the mechanism through which information is persistent across program user sessions and those sets of data that record the state of the system upon termination of a user session. FIG. 45 depicts exemplary programmatic details related to data storage structures and field layouts 45-1.

The data storage structures and field layouts 45-1 include an entry structure 45-6. The entry structure 45-6 is a data record describing an application type. It contains the application name, the application type characters, the file extension associated with the application and the application type numeric constant. This structure is used to create an array called Dictionary of applet types in the program.

The data storage structures and field layouts 45-1 also include a Quantum Matrix (or Qube) data record 45-2. The Quantum Matrix data record 45-2 is a data storage entity within the CQubeData Class. The CQube Data class manages the data of each node instance. In an embodiment, the Quantum Matrix data record 45-2 is stored in a dynamic array inherited from the CArray class.

The data storage structures and field layouts 45-1 also include an Application Preferences data record 45-3. The application preferences data record 45-3 is a persistent set of program attributes that the user can set which carry over between program sessions. These attributes effect the overall operation and look of the entire program and are saved each time a change is made. When the program begins execution, this file is loaded and thereby affects the overall application based on its current state.

The data storage structures and field layouts 45-1 also include a List Element data record 45-4. The list element data record 45-4 is a structure for holding an item and its attributes that is currently being manipulated so that the procedure can be undone. The list element data record 45-4 is stored in a single linked list class.

The data storage structures and field layouts 45-1 also include an Active Links data record 45-5. The Active Links data record 45-5 is a structure for holding the nodal key used in logical relationships to other nodes.

The data storage structures and field layouts 45-1 also include a Directory Entry data record 45-7. The directory entry data record 45-7 is a data record containing the application directory paths and an index of their position within the list. The directory paths are held in an array within the base Quantum Matrix application module.

The data storage structures and field layouts 45-1 also include a Skin enumerated list of skin types 45-8 and Skin names array 45-9. List of skin types represents the different types of configurations that the Quantum Matrix can assume. The Skin names array 45-9 holds the skin names in an array, which is globally available.

FIG. 44 provides additional details on the CQubeBase class that manages Quantum Matrix applet data.

The data storage structures and field layouts 45-1 also include CQubeDataDlg class used to modify nodal data and the sList class for managing linked list data. In an embodiment, the Avatar data structure 45-10 is included. This structure 45-10 defines the visual state of the currently loaded Avatar. This data can be accessed through a dialog box in the Qube applet.

3.2.1.5 Quantum Matrix Application Modules

Application modules are components that provide the content features and document type set for the Quantum Matrix system. In an embodiment, the Quantum Matrix system includes, but is not limited to, the following applet types: audio, Avatar, database, CAD, spreadsheet, Gantt scheduler, image viewer, internet browser, screen capture, 3D model viewer, video player, word processor. As would be appreciated by persons of skill in the art, any type of application module can be used with the present invention, as required by the user and/or application.

Each application module allows a different set of file types and/or documents to be accessed and manipulated. Each application module has basically the same structure including a multiple document interface (MDI) template structure that includes a child frame window, an applet document module, and an applet view. The child frame is a window that is a child of the application's main frame window, and whose client area contains the applet view. The document class gives access to document data and can be displayed simultaneously in the multiple document interface view.

Figure 22:
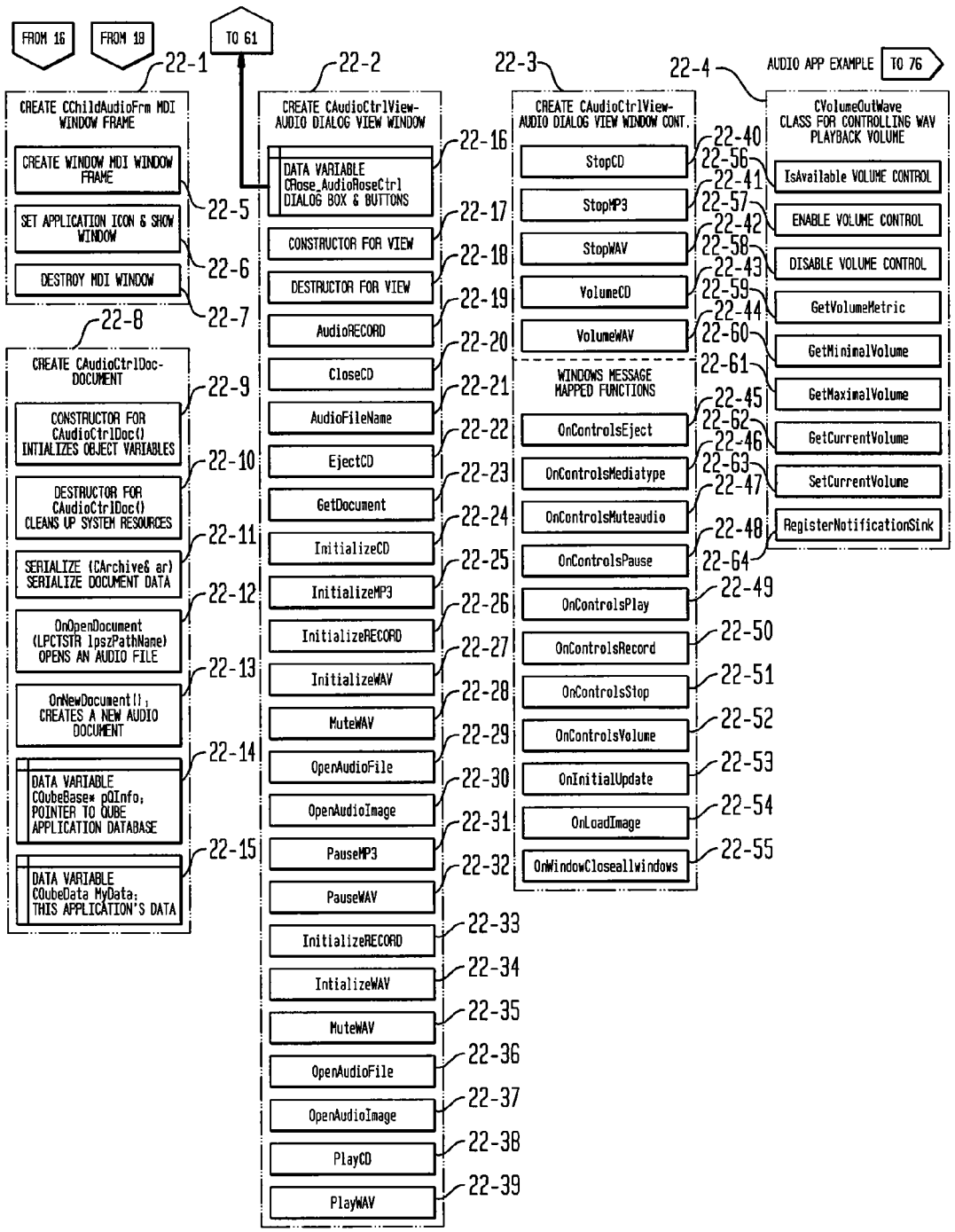

FIG. 22 depicts exemplary programmatic elements associated with an audio player application module, according to an embodiment of the present invention. In an embodiment, the audio application inherited from the Microsoft multimedia control interface to implement its functionality using the windows SendMessage command. The functionality is extended to give fine volume control and other sound control features. FIG. 77 depicts an exemplary screen shot of a screen with the audio player application.

FIG. 69 depicts exemplary programmatic elements associated with Avatar action and manipulation application module, according to an embodiment of the present invention. As discussed above, the digital Avatar is the 'body' which a user wears in the virtual community. It is an animated, articulated representation of a human, which represents the user, in any virtual environment. FIG. 75 is a screenshot of an exemplary male Avatar that can be used with in the Quantum Matrix system. FIG. 76 is a screenshot of an exemplary female Avatar that can be used in the Quantum Matrix system.

Figure 23:
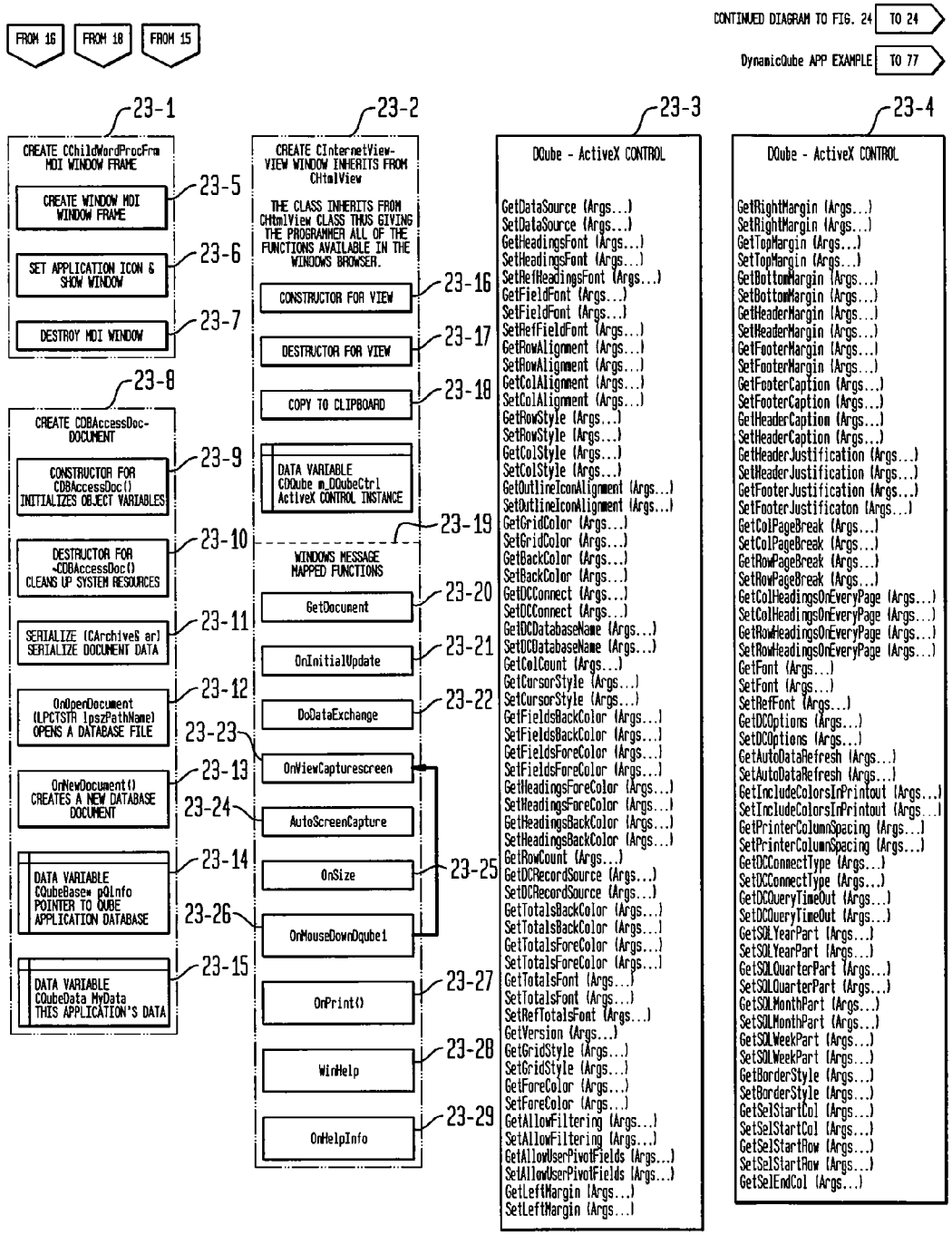

FIGS. 23 and 24 depict exemplary programmatic elements associated with a database access application module, according to an embodiment of the present invention. The database application module (also referred to as the Dynami Cube) allows the user to access most common database types and many file formats. In an embodiment, the database application module provides SQL query path to any ODBC, ADO, DAO, RDO, BDE, or OLAP data source. The database application builds and displays results. Users can perform interactive analysis locally, including data filtering, drill-down, roll-up, data marking, dimensional pivoting, calculations, ranking, print/preview and graphing. This module also provides flexible analytical interaction with large databases and gives a user the advantage of multi-dimensional database and enhanced multi-dimensional database data mining. In an embodiment, the database application features native Excel and HTML importing and also has built-in OLAP support with an MDX query wizard. As would be appreciated by persons of skill in the art, other architectures and implementations could be used for the database application module. FIG. 78 depicts an exemplary screenshot with the database module, in accordance with an embodiment of the present invention.

Figure 25:
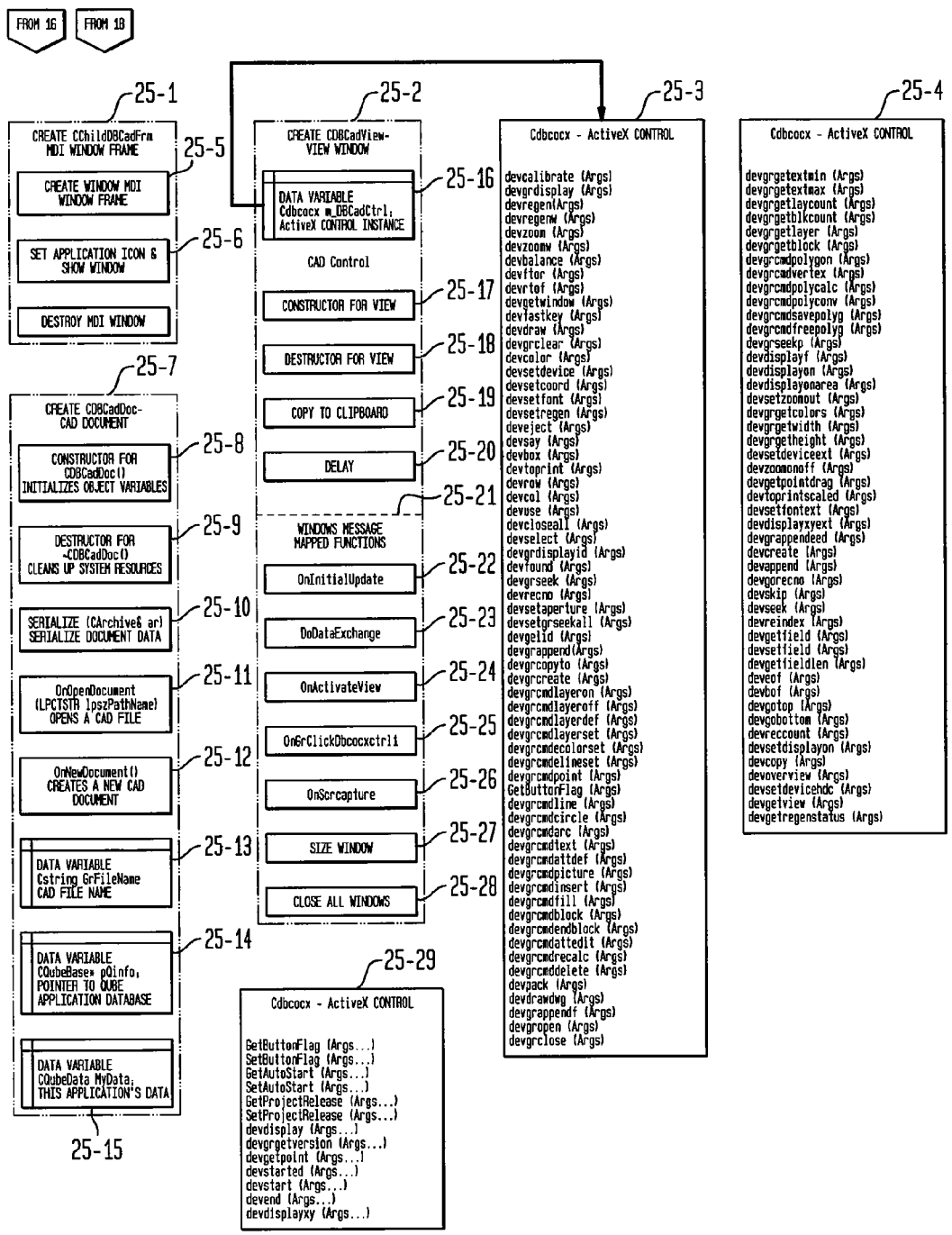

FIG. 25 depicts exemplary programmatic elements associated with a CAD application module, according to an embodiment of the present invention. FIG. 79 depicts an exemplary screenshot with the CAD application, in accordance with an embodiment of the present invention. This application allows the user to access, view and to modify CAD documents.

Figure 26:
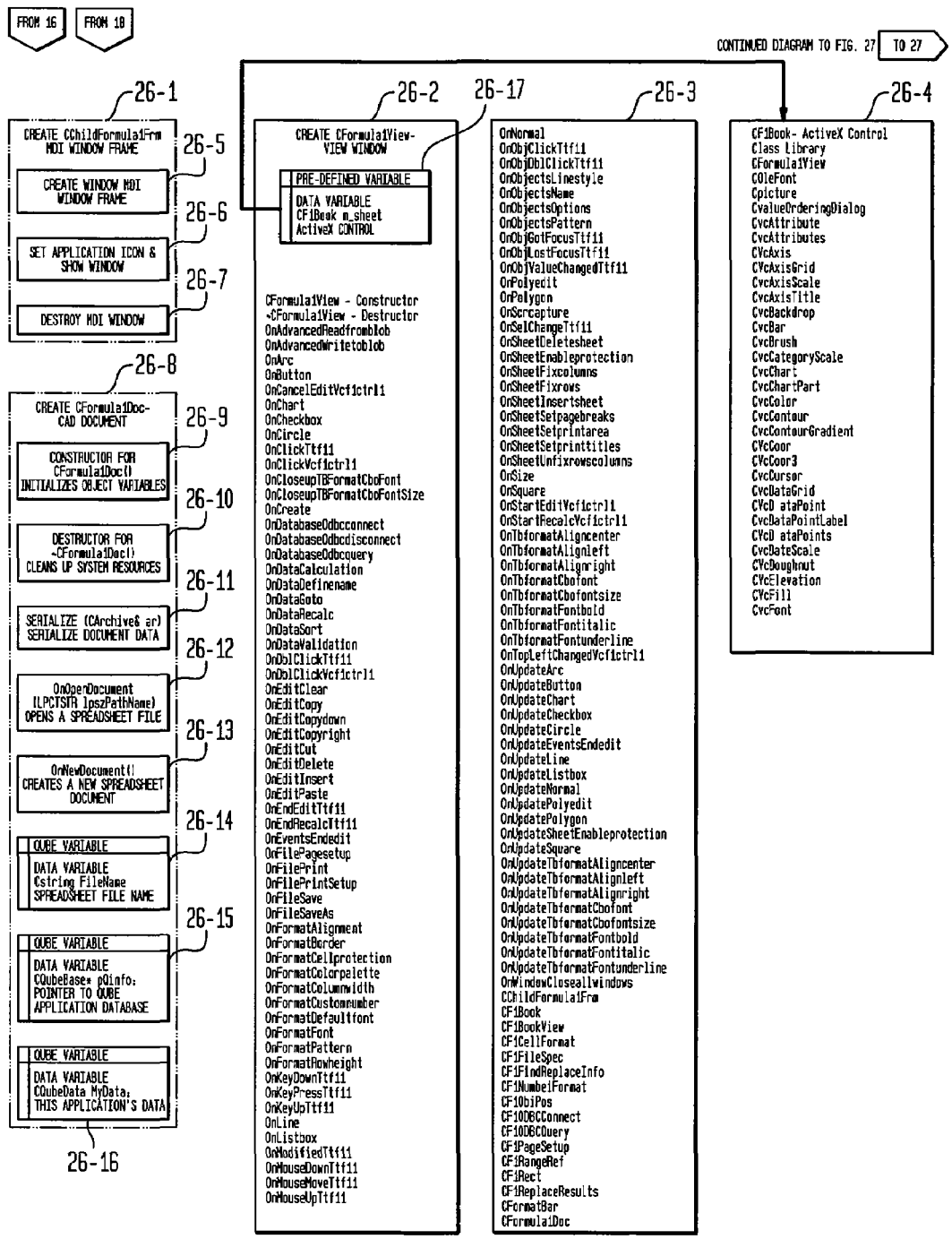

FIGS. 26 and 27 depict exemplary programmatic elements associated with a spreadsheet application module, according to an embodiment of the present invention. FIG. 82 depicts an exemplary screenshot with the spreadsheet application, in accordance with an embodiment of the present invention.

Figure 28:
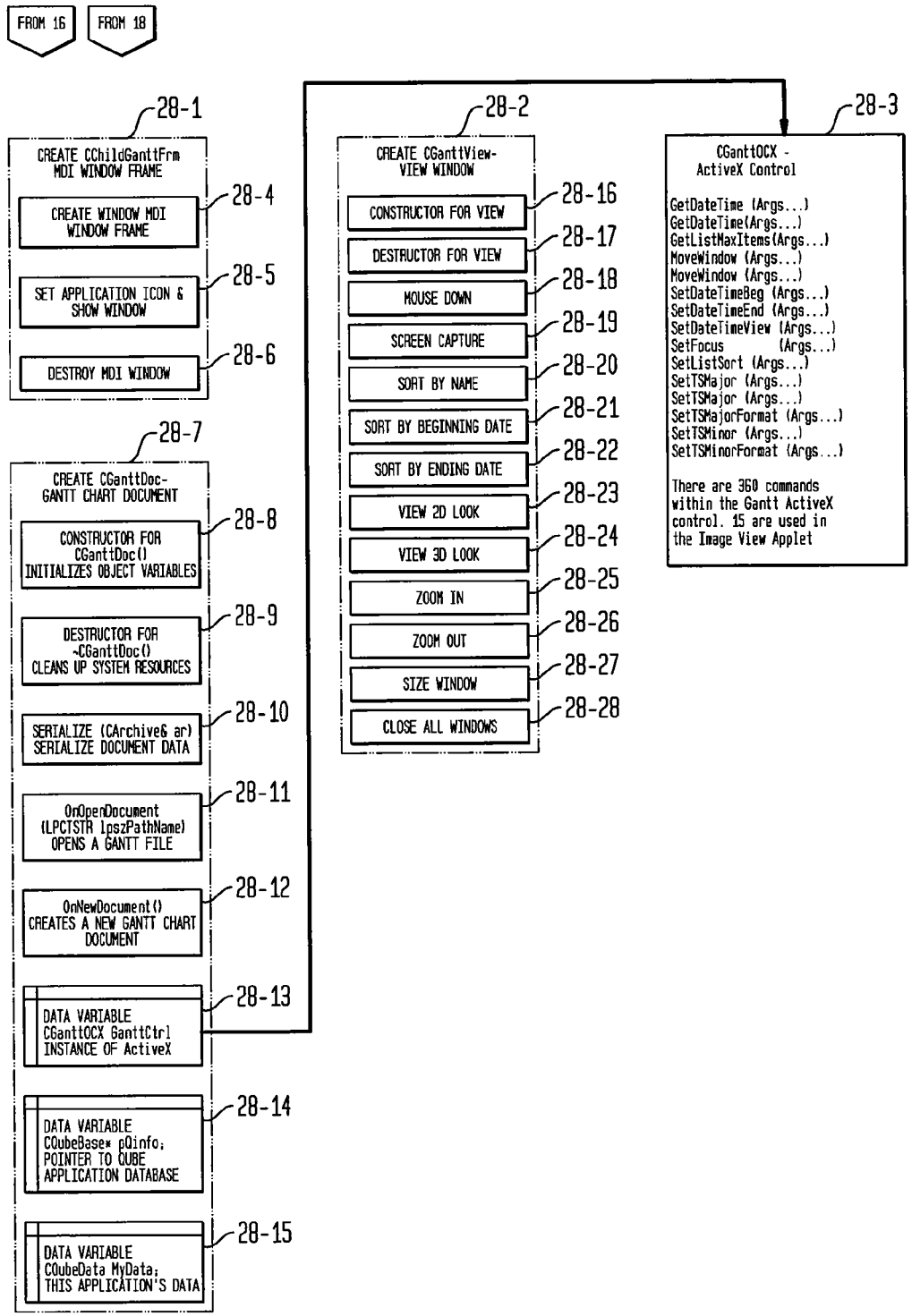

FIG. 28 depicts exemplary programmatic elements associated with the Gantt scheduling application module, according to an embodiment of the present invention. FIG. 80 depicts an exemplary screenshot with the Gantt scheduling application, according to an embodiment of the present invention.

Figure 29:
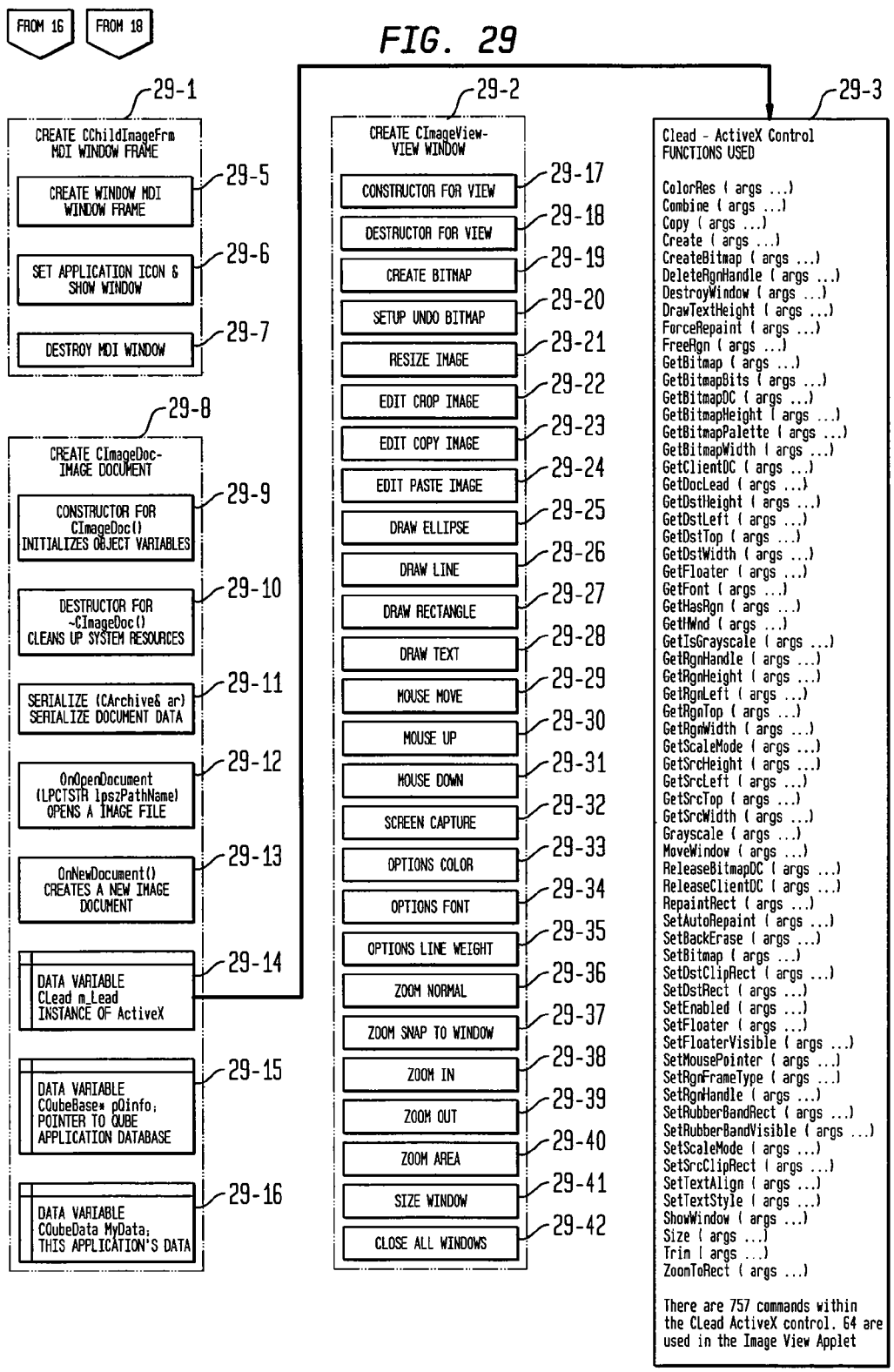

FIG. 29 depicts exemplary programmatic elements associated with the image viewer/processor application module, according to an embodiment of the present invention. FIG. 81 depicts an exemplary screenshot with the image processor/viewer application, according to an embodiment of the present invention.

Figure 30:
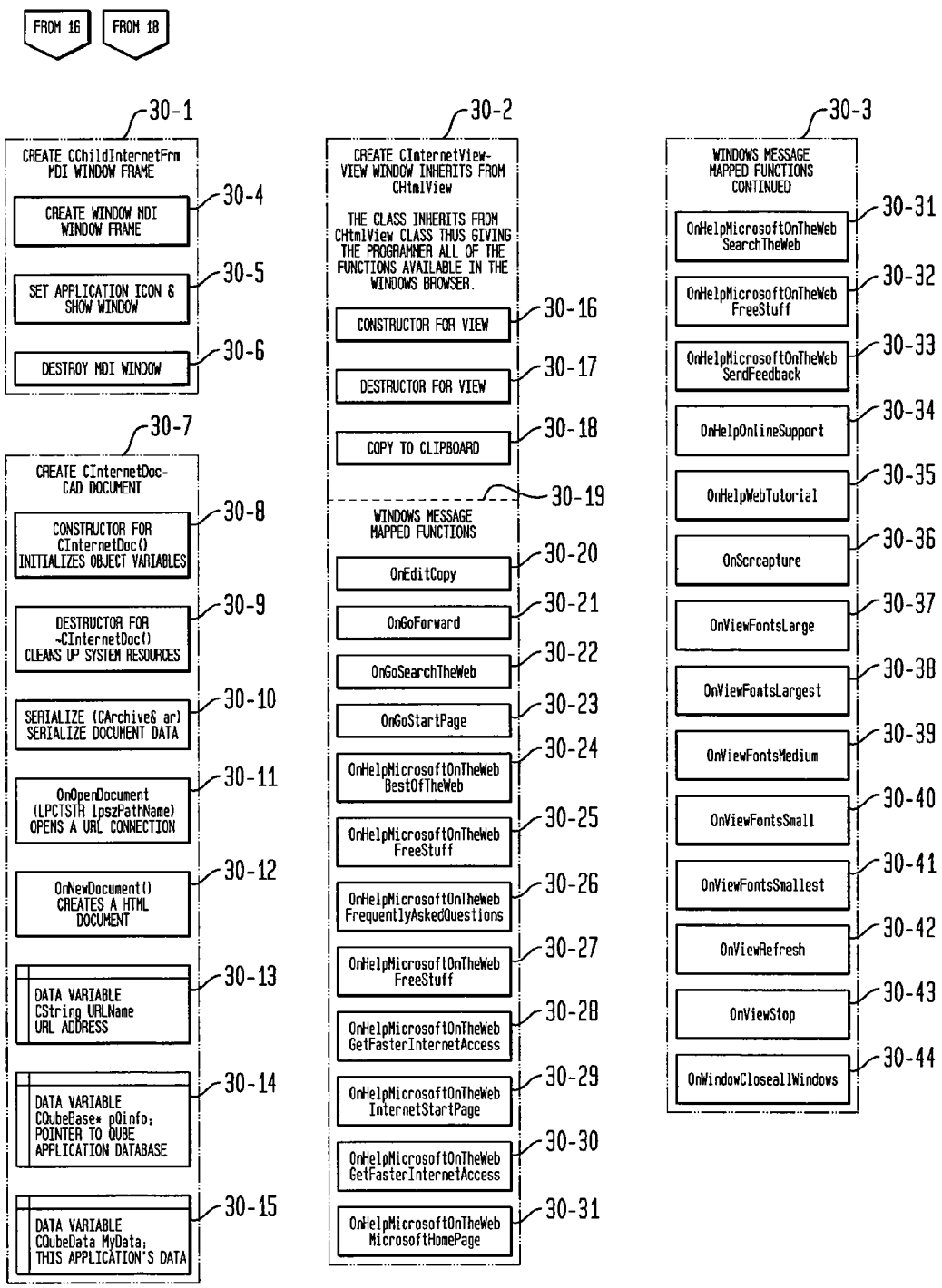

FIG. 30 depicts exemplary programmatic elements associated with the Internet browser application module, according to an embodiment of the present invention. FIG. 84 depicts an exemplary screenshot with the Internet browser application, according to an embodiment of the present invention. Although FIG. 84 depicts a specific Internet browser, a person of skill in the art will recognize that any Internet browser could be used with the present invention.

Figure 31:
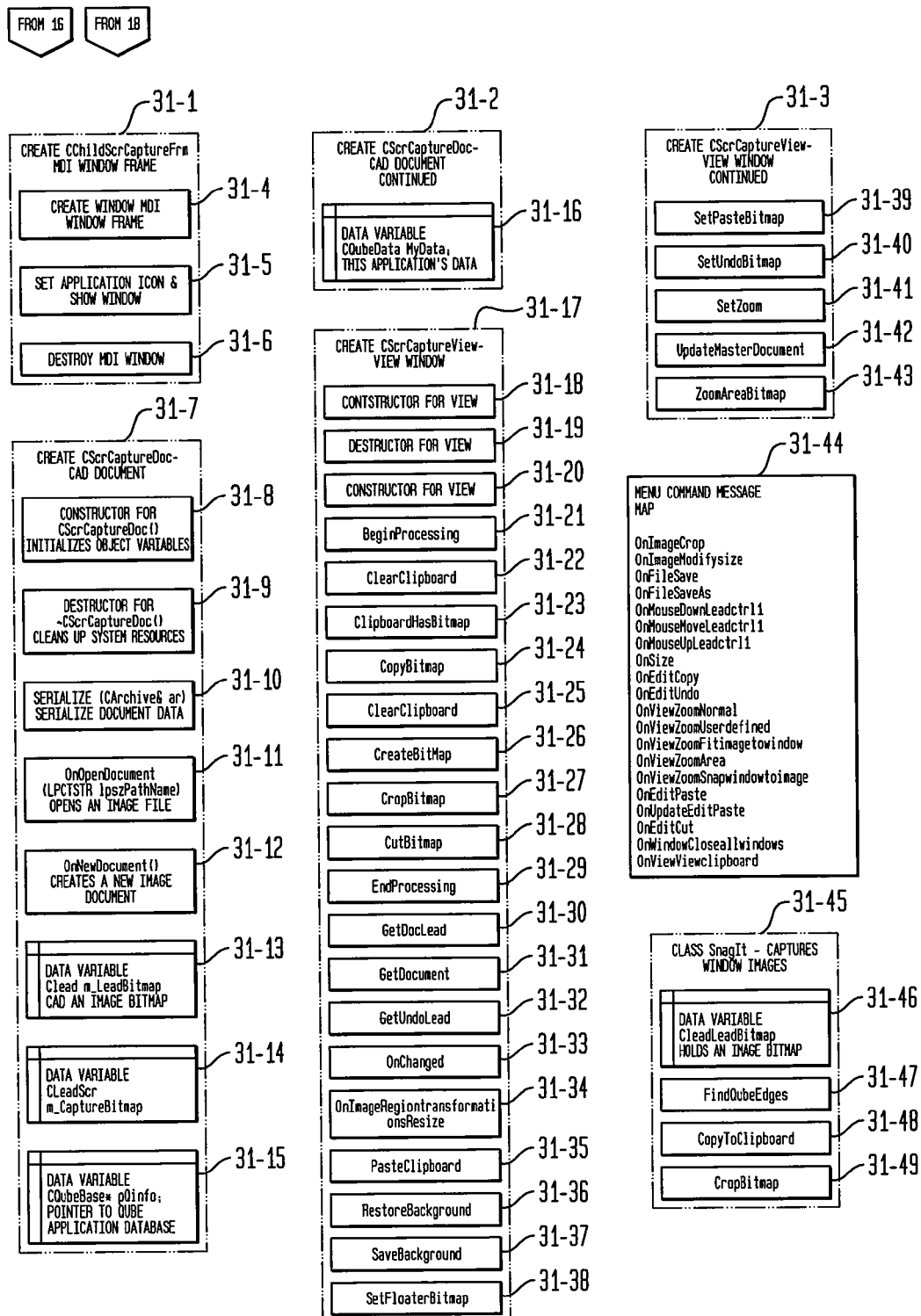

FIG. 31 depicts exemplary programmatic elements associated with the screen capture application module, according to an embodiment of the present invention.

Figure 21:
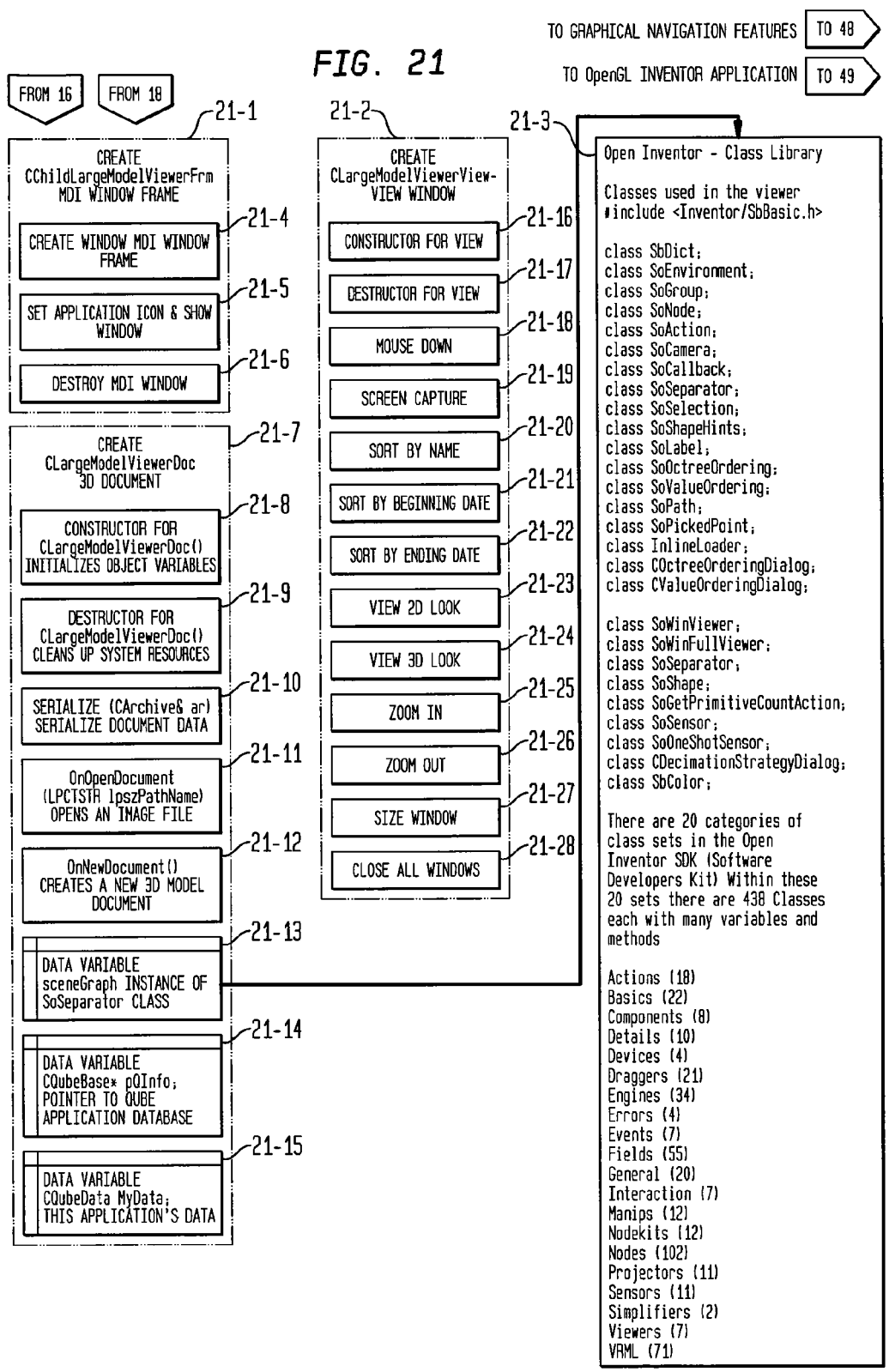

FIG. 21 depicts exemplary programmatic elements associated with the three dimensional (3D) model viewer application module, according to an embodiment of the present invention. FIG. 86 depicts an exemplary screenshot with an OpenGL/VRML model viewer application, according to an embodiment of the present invention.

Figure 32:
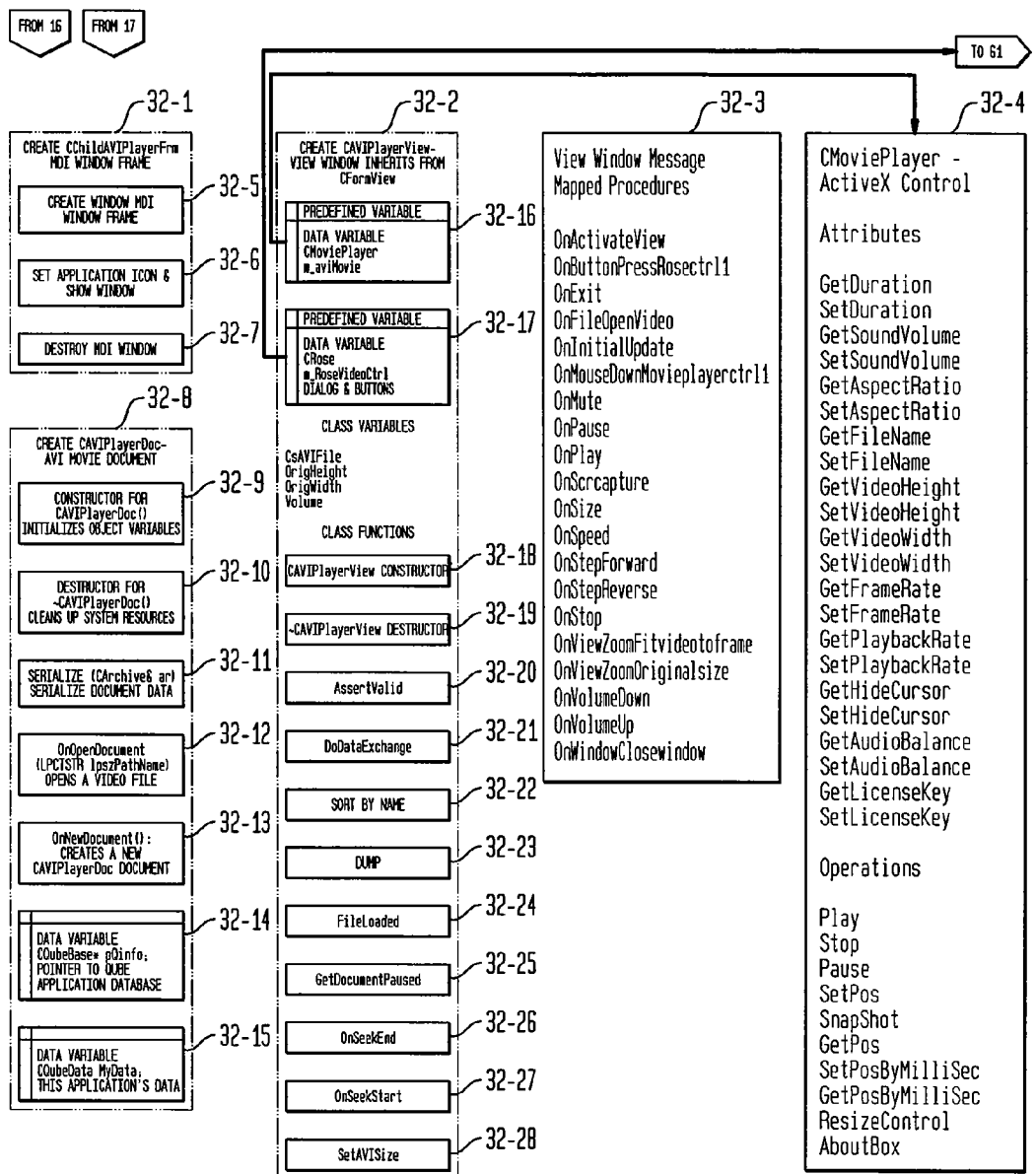
Figure 33:
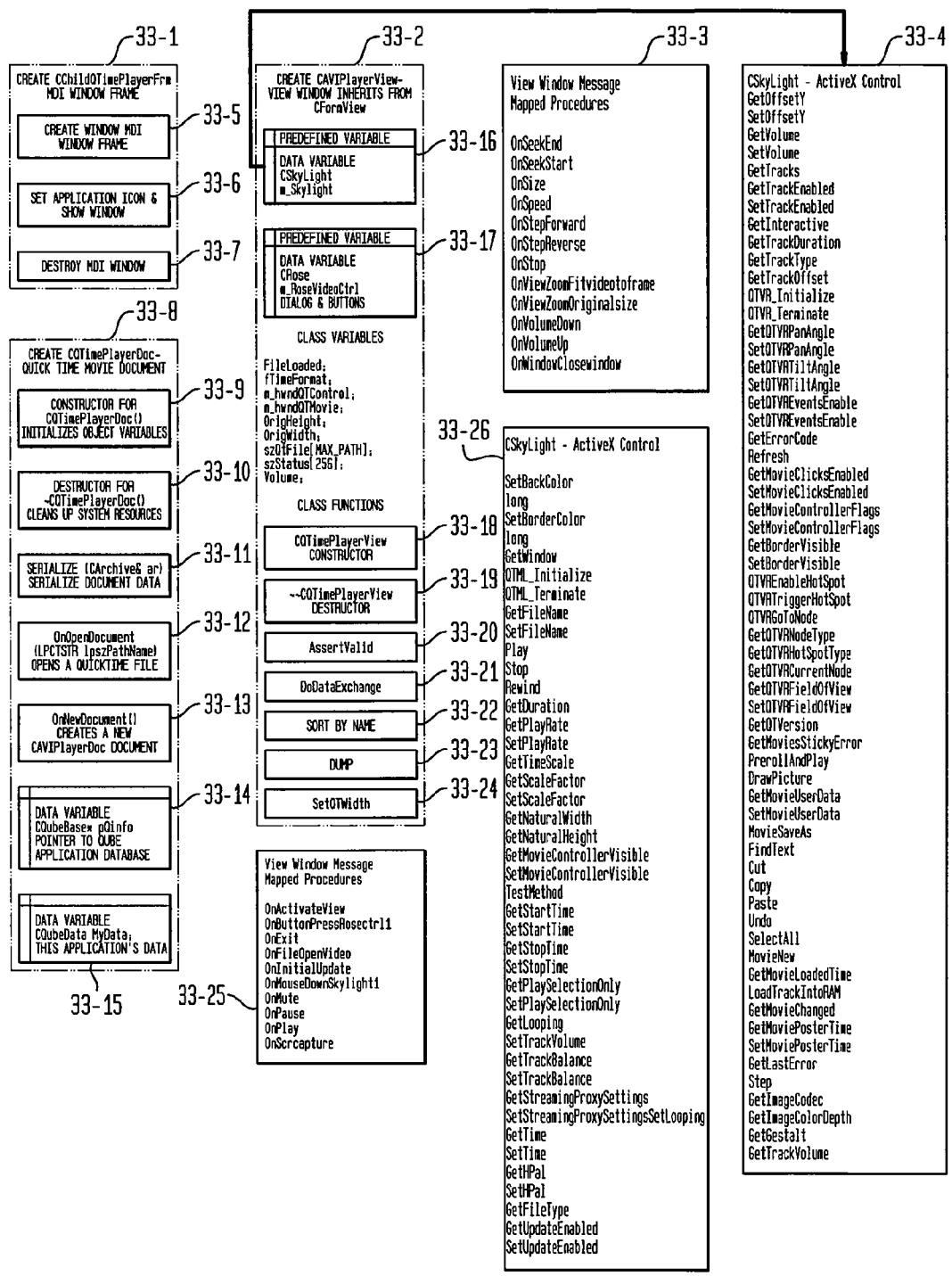

As would be appreciated by a person of ordinary skill in the art, any video player application module can be used with the present invention to playback video files. In an embodiment, multiple players can be supported. For example, a video application can be made up of 2 ActiveX controls, one for audio video interleave (AVI) format and one for the Quick Time format. These two ActiveX controls are mutually exclusive in operation and only one or the other is operational for a user selected file type. FIG. 32 depicts exemplary programmatic elements associated with a video application module AVI player, according to an embodiment of the present invention. FIG. 33 depicts exemplary programmatic elements associated with a video application module Quick Time, according to an embodiment of the present invention. FIG. 85 depicts an exemplary screenshot with a video player application, according to an embodiment of the present invention.

Figure 34:
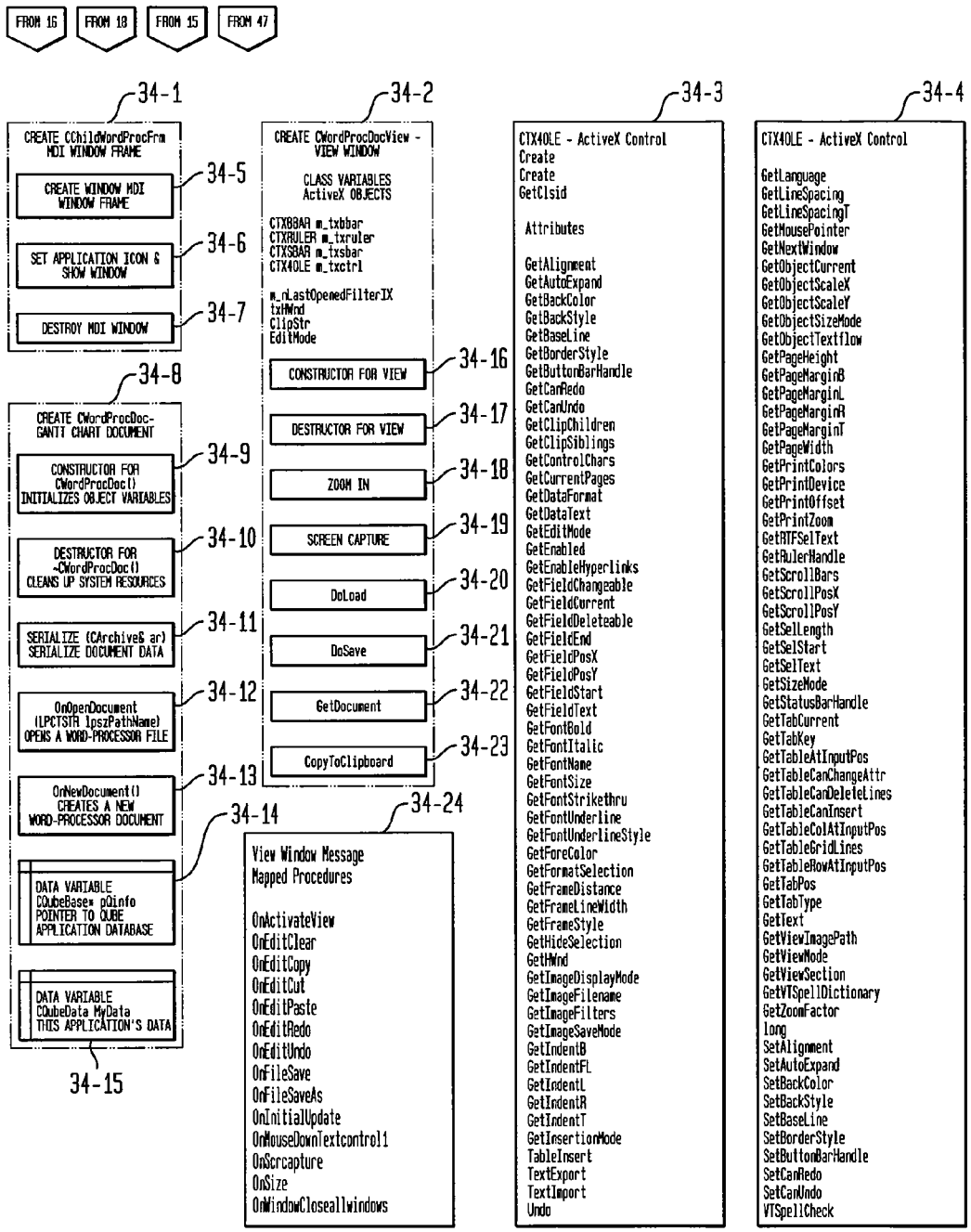

FIGS. 34 and 35 depict exemplary programmatic elements associated with the word processing application module, according to an embodiment of the present invention. In an embodiment, in addition to general text editing and word processing, the word processing application module also provides the functions for creating, editing, debugging and running QScripts and XML data files. When a .qsc or .xml file is created or selected for editing, the editor changes into an Integrated Development Environment for code creation, editing, testing, and execution. FIG. 83 depicts an exemplary screenshot with word processor application, according to an embodiment of the present invention.

3.2.1.6 Utility Components

Utility components are a set of modules that provide common system wide functionality to the Quantum Matrix system. In an embodiment, the Quantum Matrix system includes, but is not limited to, the following utility classes: extended toolbar control (CBar), access windows API client window parameters (CNonClientMetrics), QScript text parser (CParse), popup flyover hints for Quantum Matrix objects (CPopupText), windows disk drive, directory path, file names and file extensions manipulation and access (CQubeUtility), extended dialog control class (CRose), file searching (CSearchFileDlg), directory path retrieval (CWzdDirDlg), class library of mathematical functions (CFunction), and automatic memory allocation string manipulation (WStr). FIGS. 53-58 depict exemplary programmatic elements associated with the CParse Class, according to an embodiment of the present invention. As would be appreciated by persons of skill in the art, any type of utility modules can be used with the present invention, as required by the user and/or application.

3.2.2 Qube User Interface Protocol (QUIP)

3.2.2.1 Overview

In an embodiment, the Quantum Matrix system includes Qube User Interface Protocol (QUIP) applied within multi-dimensional visual interface and data storage paradigm. QUIP is the Quantum Matrix's internal message processing protocol. It is both a keyboard/mouse interface as well as a scripting/macro language. QUIP is a communication and control system that parses messages and or scripts and is the mechanism through which all Qube Embedded Applications are mapped to Qubes and through which all mapped applications are communicated with and controlled. FIGS. 12 through 15 depict exemplary process flows for Quantum Matrix system modules that receive QUIP messages. FIGS. 16 through 20 depict exemplary process flows for Qube application modules that control the storage, mapping, and accessing of data as well as the graphics user interface. FIGS. 21 through 35 depict representative application modules, described above, that receive QUIP messages to operating the representative application plug-ins according to an embodiment of the invention.

Commands that control the operation of the Quantum Matrix may come from either the keyboard and mouse and menus (e.g., as illustrated in FIGS. 9 and 10), or scripts read and executed by the program (e.g., as illustrated in FIG. 47 and FIGS. 64 through 66) to affect the same end as manual input. The source of a message is irrelevant to the invention.

The QScript parser reduces each script statement to one of multiple types of messages or actions including, but not limited to, Standard Windows message type statements, ORPC Object Remote Procedure Calls, and directly executable Qube functions. With these three types of action/messages the sum total functionality of the Quantum Matrix system can be affected.

This messaging functionality can be used across all manner of networks. Thus, QUIP allows for both local and remote automation of all Quantum Matrix system functionality. By using remote procedure calls, the Quantum Matrix system can be controlled and operated from anywhere. Data can be transmitted, and functions initiated from the desktop, across the room or around the world. The Quantum Matrix system makes DCOM extensible to the end user in supporting execution while it continues to function in the transport layer. The Quantum Matrix makes DCOM extensible on the desktop by providing a real enterprise tool that incorporates the DCOM concepts and provides real functionality for business and management solutions.

3.2.2.2 Structural Embodiments of QUIP

QUIP is an interpreted macro language integrated into the Quantum Matrix system. In an embodiment, the macro language is translated through a parser into executable function calls that are either executed directly by the Quantum Matrix system or passed on to the Windows operating system for handling. FIGS. 53 through 58 depict an exemplary parser, according to an embodiment of the invention. In this embodiment, CParser is a C++ class that decomposes the mnemonic statements in the script and translates the same into Quantum Matrix system and Windows message for execution. An exemplary QUIP command set for the macro language can be found in FIGS. 92 through 99.

QUIP scripts take the form of script text files that can be created and edited by the built in word processing application of the Quantum Matrix system or any text editor capable of producing standard ASCII format files. QUIP commands can be generated internally by the Quantum Matrix system and sent as message to affect the automation of the execution of various program features. More generally, the Quantum Matrix system can be directed to load a user created QScript file and to execute the commands therein.

Figure 47:
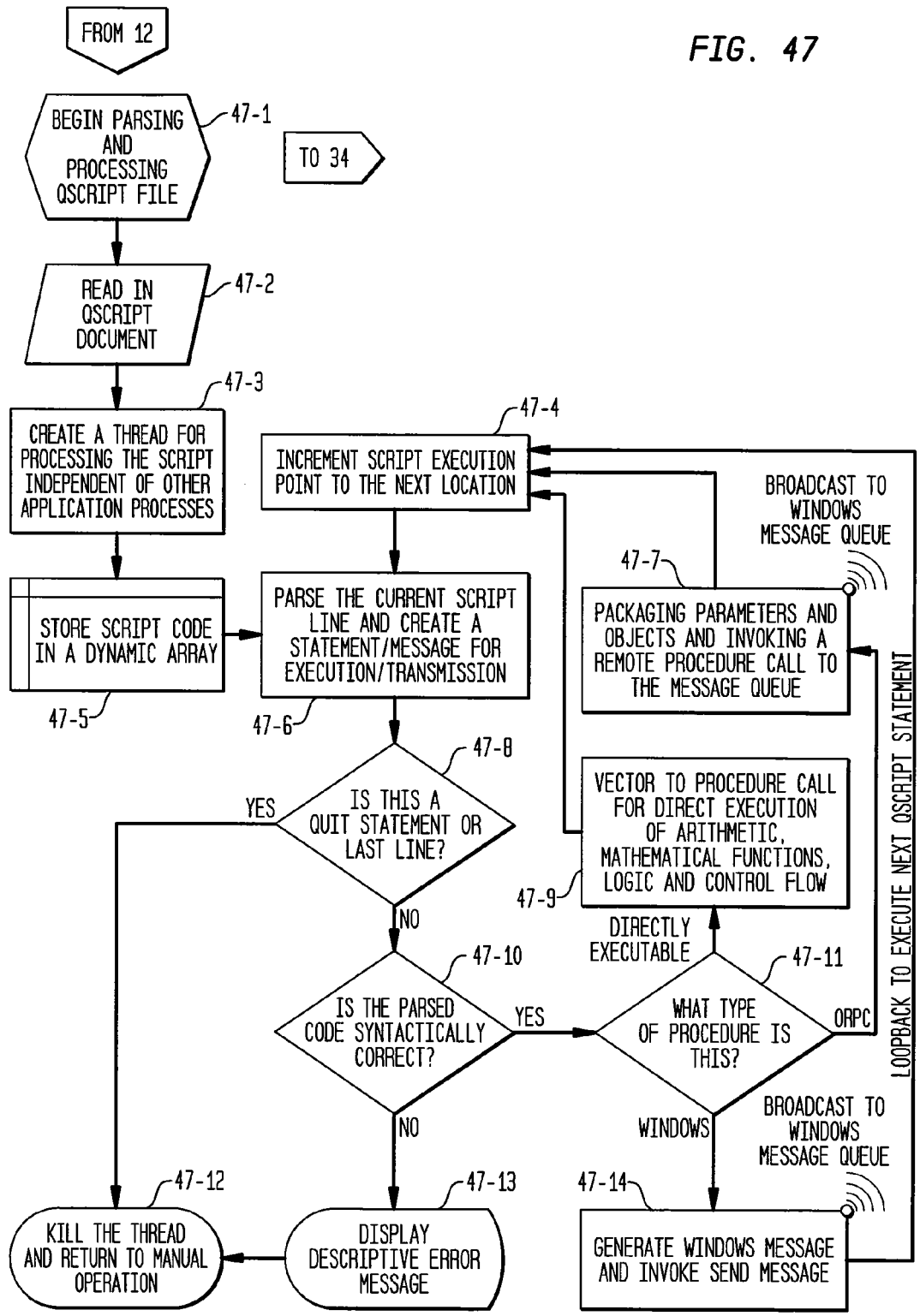

FIG. 47 is a block diagram of the QUIP module for script control, according to an embodiment of the present invention. FIG. 47 depicts the parsing and processing of QUIP script lines and the subsequent routing to the Windows operating system, for transmission or directly to the Quantum Matrix system for execution. In brief, the QUIP parser reads in each line in the script file and translates the text into executable statements and/or functions. The QUIP parser and messaging module is a parallel system to the manual operation of the Quantum Matrix application. In an embodiment, scripts are created, edited, tested and run using the word processor module. The word processor module is depicted in FIG. 34. Through QScript, any manual application can be affected. The origin of messages is irrelevant to the Quantum Matrix application. The application deals with all events and messages in the same manner whether produced interactively, by a script, or by a Remote Procedure Call (RPC). In general, FIG. 47 illustrates the parsing and processing of QUIP script lines and the subsequent routing to the Windows operating system, to transmission, or to the Quantum Matrix application for execution.

As discussed above, in an embodiment, the Quantum Matrix system is both a host and server application with respect to its network communication RPC functionality. For example, two or more programs can communicate with one another and execute commands on the other interactively, executing commands on another Quantum Matrix application resident on another computer accessible across a network. FIG. 48 depicts an exemplary Remote Procedure Call module for online collaboration, according to an embodiment of the present invention.

As illustrated in FIGS. 47 and 48, QUIP further allows data to be transmitted between nodes and for procedures to be automated. Each QUIP message has one or more of the following attributes: the address of the recipient node or Qube, the address of the recipient sub node, a message type number, equations and or logic statement to be evaluated, type of data, size of data to be transmitted, a pointer to the transmitted data, and the return address of the source of the message. As would be appreciated by persons of skill in the art, other attributes could be associated with a QUIP message.

The target node on receiving the QUIP message responds to the message according to its internal capabilities and functions, (as shown in FIGS. 47 and 48), and may activate functions in an applet plug-in as shown in FIGS. 21 through 35. Anything that is in the target program's menu can be automated.

QUIP allows nodes to be functionally linked both for intra and inter nodal communication. QUIP also permits intra and inter nodal (Qube to Qube) communication through the Quantum Matrix's internal network accessing capability that equips the Quantum Matrix with its more generalized internet/intranet capabilities. The structural process flows for intra and inter Qube communication through the Quantum Matrix's internal network accessing capability is described in FIG. 12. This messaging functionality can be used across all manner of networks. Thus, QUIP allows for both local and remote automation of all Quantum Matrix functionality. By using remote procedure calls as described in FIG. 48, the Quantum Matrix can be controlled and operated from anywhere. Data can be transmitted, and functions initiated from the desktop, across the room or around the world.

3.2.3 QScript

In an embodiment of the invention, a feature of the QUIP messaging system is that the Quantum Matrix system can be "programmed" through the use of its scripting language; QScript. In an embodiment, QUIP Script is a hybrid of Basic, XML. It provides a set of macro commands that are interpreted by the program and executed through the QUIP messaging system. Syntactically it is similar to Basic while at the same time providing the text and layout capabilities of XML. It uses the XML file schema methodology to structure data that is consistent and compatible across networks and to various machine types and operating systems.

Because the user may create unique QScript programs, their level of complexity (and effectiveness) is at the option of the user. As the user becomes familiar with QScript, the user can automate complex command sequences, such as printing a complex monthly report or transmitting updated information to a server Qube. In addition, the user can build actual applications, which can be used by others with little or no knowledge about the Quantum Matrix system.

In an embodiment, the Quantum Matrix Scripting Component is an ActiveX control and development tool for the Quantum Matrix user which allows one to add new features or change the way the application functions, and to automate various tasks. QScript allows the user to write source code to control associated applications.

Functions and features of QScript include, but are not limited to: full support for modern BASIC source code; the ability for any user informed in BASIC to extend the language by adding statements, functions, and global variables and specialized object types (e.g., as shown in FIGS. 92-99); an enabler of user designed applications to call Basic subroutines or functions directly, giving Quantum Matrix users the ability to customize the behavior of the application or applications; support for the in-code creation of custom dialog boxes using standard Windows controls including: buttons, checkboxes, group boxes, list boxes, option buttons (also called radio buttons), picture and text edit controls; support for ActiveX Automation, which allows QScript to programmatically access software components from other applications; the ability to declare and call any Windows API function from within the Basic language. This feature is particularly important in that it allows one to create and send windows messages thus providing a direct interface between Windows and the Quantum Matrix kernel and QUIP; a built in editor and Integrated Development Environment; and menus, dialogs and text strings localized for languages in addition to English. In addition to the above, QScript provides tools for debugging user applications.

For each menu command, mouse event, keyboard stroke, and every Windows message there is a corresponding QScript command. In addition to these event type commands there are arithmetic, logic and mathematical function libraries.

The QScript statements consist of a sequence of keystrokes and/or commands that automatically execute a set of specified operations within the Quantum Matrix, the process flows for which are shown at FIG. 47. In an embodiment, 180 QScript keywords, 120 math functions and 6 arithmetic symbolic operations (+, −, *, /, %, ^) and 10 logical operators (EQ NE, AND OR GT, GE, LT, LE, EOR) are supported. As would be appreciated by persons of skill in the art, additional keywords, math functions and arithmetic symbolic operations, and logical operators can be used with QScript. QScripts are stored as files and a list of QScript files associated with a node or Qube are maintained in the Quantum Matrix's database (FIGS. 45 and 46) in which they are created, so that the user can have a different set of executable/automation instructions that can be created for each Quantum Matrix used. (FIGS. 92-99)

QScript statements shown in (FIG. 47 and FIGS. 53-58) can use any keys on the keyboard and any command in the menus as well as special commands that perform operations that menu commands cannot, such as prompting the user for input before continuing the execution of the QScript instruction set. As shown in FIGS. 92-99, QScript commands also provide several programming functions such as looping, branching, and subroutines.

The QScript component module is a functionally complete programming language built into the Quantum Matrix Application. In an embodiment, it is a Basic programming language, although any programming language could be supported. The QScript has the same seven structural elements as all programming languages and includes a complete windows Application Programmers Interface (API). QScript provides the following general programming capabilities: data declarations for creating variables (e.g., strings, floating point numbers, integers, arrays), arithmetic operation and mathematics functions, logic-program flow control, looping, subroutines-functions, input (e.g., keyboard and mouse), and output (e.g., printing and file accessing). API Qscript scripting properties, methods, events, and objects include but are not limited to properties, methods, events, handler object, handlers collection, and module object.

Each component in the Quantum Matrix system has a message handler, which receives messages and associates the received message with a function for execution. The CParse class reads a script file and builds a message which is transmitted to the Windows operating system that in turn transmits it to the specified window and or application for execution or builds and internally executable function call with arguments for direct execution in the Quantum Matrix's internal message vectoring system.

In an embodiment, the CParser module creates windows messages in the form of:

LRESULT SendMessage(UINT message, WPARAM wParam=0, LPARAM lParam=0);

This message is then received into the message map of the window application to which it is directed, i.e.

```
BEGIN_MESSAGE_MAP(CQubeView, CView)
    //{{AFX_MSG_MAP(CQubeView)
    ON_WM_SETFOCUS( )
    ON_WM_SIZE( )
    ON_COMMAND(ID_OLE_INSERT_NEW, OnInsertObject)
    ON_COMMAND(ID_CANCEL_EDIT_CNTR, OnCancelEditCntr)
    ON_WM_DESTROY( )
    ON_WM_CREATE( )
    ON_WM_PAINT( )
    ON_WM_ERASEBKGND( )
    ON_COMMAND(ID_EDIT_COPY, OnEditCopy)
    ON_COMMAND(ID_EDIT_CUT, OnEditCut)
    ON_UPDATE_COMMAND_UI(ID_EDIT_CUT, OnUpdateEditCut)
    ON_UPDATE_COMMAND_UI(ID_EDIT_COPY, OnUpdateEditCopy)
```

```
    ON_COMMAND(ID_EDIT_PASTE, OnEditPaste)
    ON_UPDATE_COMMAND_UI(ID_EDIT_PASTE, OnUpdateEditPaste)
    ON_COMMAND(ID_VIEW_SELECTIONMODE,
        OnViewViewmodesSelectionmode)
    ON_COMMAND(ID_VIEW_VIEWINGMODE, OnViewViewmodesViewingmode)
    ON_COMMAND(ID_EDIT_PASTE_SPECIAL, OnEditPasteSpecial)
    ON_COMMAND(ID_FILE_PREFERENCES, OnFilePreferences)
    ON_COMMAND(ID_FILE_SETPROJECTDIRECTORY,
        OnFileSetprojectdirectory)
    ON_COMMAND(ID_VIEW_STEROSCOPICDISPLAYMODE,
        OnViewSteroscopicdisplaymode)
    ON_COMMAND(ID_EDIT_DELETE, OnEditDelete)
    //}}AFX_MSG_MAP
    // Standard printing commands
    ON_COMMAND(ID_FILE_PRINT, CView::OnFilePrint)
    ON_COMMAND(ID_FILE_PRINT_DIRECT, CView::OnFilePrint)
    ON_COMMAND(ID_FILE_PRINT_PREVIEW, CView::OnFilePrintPreview)
END_MESSAGE_MAP( )
```

Therefore, any class, ActiveX, COM or DCOM object with a message handler can be caused to execute any function in its Message Map declaration.

FIGS. 92 and 93 include the QScript Property Reference table. Each QScript Property entry includes a summary of what the property does, a detailed description of how the property is implemented, and how the property relates to other properties. Each entry also contains references to related properties, methods, and events. FIG. 94 is a QScript methods reference table. Each method entry includes a summary of what the method does, a detailed description of how the method is implemented, and how the method relates to other methods. Each entry also contains references to related properties, methods, and events. FIG. 95 is a QScript events reference table. Each events entry includes a summary of what the event does, a detailed description of how the event is implemented, and how the event relates to other events. Each entry also contains references to related properties, methods, and events. FIG. 96 shows the Handler Object Reference and the Handlers Collection Reference. FIG. 97 shows the Module Object Reference. FIGS. 98 and 99 show the Constants Reference table. Each constant refers to a specific menu item in the control's internal menu system.

4. Applications 4.1 Overview

FIG. 103 is a flowchart 103-100 of a general application method of the Quantum Matrix system, according to an embodiment of the present invention. In step 103-10, the Qube configuration parameters are received. Qube configuration parameters include the display structure of the Qube (e.g., cube, triangle, human body, aircraft, etc.) and the number of nodal or voxel elements included in the Qube. In an embodiment, the default display structure is a 64 cube array 4×4×4 nodes on a side. The display structure of the Qube can be set based on the application. For example, for medical applications, the structure could be the human body or portion of a body.

In step 103-20, population data for one or more nodes is received. Population data may include association information between the node and other nodes, between the node and data, and/or between the node and a set of nodes. In an embodiment, population can be manual or automatic.

When the Quantum Matrix Qube is first displayed, no applications or other data are mapped to the nodes. If manual population is selected, a user starts one of the Quantum Matrix mime applications for a particular document file name and type. Once the document appears and the applet is running the user would click the right mouse button in the client area of the application window. This captures the application's name, location and a snapshot image of the application to the system clipboard. Next, the user would return to the Quantum Matrix window by touching the window's header to give it the focus and click the left mouse button on the cube to which the application and document are mapped.

Through this technique, a user can visually organize their data and documents, defining where items should be placed in the matrix. Having dropped a document on a Qube, it appears as a mapped image on all surfaces of the selected Qube. Simultaneously the item is automatically inserted into the Qube's data tree as another type view of the organizational structure that is being created. Once an image/application has been mapped to a Qube, clicking the Qube will activate the application and re-display the document in its own window. The subsequent window and its document can then be viewed, modified, and manipulated. Finally, the Quantum Matrix Qube is named appropriately and saved.

For example, in order to prepare for the submission of a bid in an architectural project, the architect might do some pre-interview research on the University and the project. Using the Quantum Matrix's built in web browser the user would surf the website looking for general information about the client, submission requirements and the project. When the user comes upon potentially useful information, the user can right click the mouse in the view window, and select a node in the matrix by left clicking the mouse to map the HTML page to the node. The user would continue to browse, selecting pages they wish to keep and map the documents to nodes in the matrix.

More than one type of data can be held in a Quantum Matrix Qube. In an embodiment, the Quantum Matrix in its default configuration can read a write over 100 different file types in a dozen different document categories. Once the user is satisfied with the document population of the matrix, the Quantum Matrix Qube is saved under an appropriate file name.

During this Quantum Matrix session or in subsequent sessions the user can edit the matrix documents, reorganize the content, and modify the document contents. The user can move documents from node to node by cutting and pasting. Documents that on second glance are not needed can be deleted by selecting the Qube and pressing the delete key. In addition, more documents can be mapped to nodes as needed.

Once the user is satisfied with the Quantum Matrix's organization and content the Quantum Matrix is resaved.

If automatic population is selected, the user designates a directory in which the documents that are to be loaded into the cube system reside on a disk drive or server. The Quantum Matrix system assumes that the legacy file structure should be duplicated, and so the Quantum Matrix system automatically analyzes the directory structure and creates a node in node hierarchy corresponding to the existing file folder organization. The Quantum Matrix system then determines the types of documents held in each folder and opens each in turn, capturing an application image, the document name and file path and then maps the document/application alphabetically and sequentially to nodes in the Qube.

Once the documents have been automatically loaded into Quantum Matrix array, their organization can be manually edited and reconfigured using cut and paste procedures to move document/applications to different nodes within the same Quantum Matrix or even between matrices.

In step 103-30, the populated Qube is displayed in three-dimensions.

In step 103-40, the multi-dimensional structure is navigated by a user. Relational logic, Boolean algebra, or a scripting language can be applied to the nodes, data, and associations to produce a resultant set of nodes. Furthermore, portions of the multi-dimensional structure can be isolated with the use of planes to ease navigation. Clipping planes can divide the multi-dimensional structure into four quadrants. One quadrant can be selected for further navigation and the other part may be hidden to focus the navigation on the node set. In this manner, the multi-dimensional structure can be diced until a resultant set of nodes is remaining. Furthermore, an Avatar may be displayed and used to automate the navigation of the multi-dimensional structure. When a user activates a node, data associated with the node or a sub-Qube associated with the node is displayed.

4.2 Architectural Practice Application of the Quantum Matrix

The Quantum Matrix system can be used in many different ways by professionals, and others who need to manage, and access large amounts diverse digital information. The Quantum Matrix system is designed to support this kind of activity across a broad spectrum of disciplines and fields. Similar scenarios to the architectural example described herein exist. The applet set of data access and manipulation tools found in the Quantum Matrix system provide a wide spectrum of types of digital information that can be integrated into a single consistent data access, manipulation and management environment for user content.

During the architectural design process there is a constant need to collaborate and coordinate with consulting engineers, interior designers, product manufactures and the client. As the design moves into the design development phase, each of the various engineering disciplines have computational data associated with their particular aspect to the building (e.g., structural, mechanical, electrical, plumbing, elevators, etc.). Each of these has internal schedules and budgets, drawings and extensive paper trails.

A single architectural project includes data from a wide variety of applications. For example, one firm may use Microstation© CAD from Bentley Systems, Inc., while their engineers use AutoCAD© from Autodesk, Inc. In addition, the architectural firm may use the AIA's MASTERSPEC© program to create contract document specifications. In preliminary design, the firm uses SketchUp© for quick three-dimensional models to study building massing and organization. Later in schematic design, the firm may use 3D Studio Viz© for more detailed modeling and rendering. During the design development, these models are used in creating detailed images and animated walk throughs of the building. In addition to this, there are spreadsheets with project budget data, cost estimates supplied by the contractor, all manner of text correspondence in both paper and digital formats. From the beginning of the project, a critical path schedule is maintained to monitor progress and to control project cost and schedules.

The Quantum Matrix system can run each of the software platforms without requiring the native software application and serve as a framework for managing the entire scope of an architectural project from start to finish, beginning with the client presentation to get the job up to and including owner occupancy. The scenario that follows outlines in more detail the use of the Quantum Matrix system in this process.

4.2.1 Marketing

In an embodiment, the Quantum Matrix system can be used as a presentation and marketing tool. For example, in preparation for a project interview presentation, the user accesses a digital library of photographs and drawings of past projects, selectively browsing the images and drawings by opening the files in the Quantum Matrix application. Drawings and images relevant to the presentation would be selected and mapped to Qubes/nodes creating a more flexible presentation environment that allows one to respond to questions in a more ad hoc way. Activating a node displays the node's content.

An online brochure of the in PDF format that provides information describing the firm's capabilities and a list of past clients can also be added to the marketing Qube. Downloading the PDF file and clicking its image and a mapping to a Quantum Matrix node effectively incorporates the brochure into the presentation.

The firm's marketing team can use the created Quantum Matrix Qube either as a presentation sequencer, moving through a series of slides in a timed mode or interactively with a mouse click on a node. In the slide mode, nodal documents are shown in natural order. The slides can be overlaid with outline text. Transitions betweens slides give the presentation a smooth flow and professional look. Unlike conventional presentation tools, the Quantum Matrix system allows one to drill down when questions are asked requiring more detail. The Quantum Matrix allows the user to jump to any presentation page/node as needed during a presentation and the system remembers automatically the return page/node in the presentation where the detour occurred.

The stereoscopic feature of the Quantum Matrix when used in an interview situation allows potential clients to experience the architect's past design triumphs in all their three-dimensional glory. Using the Quantum Matrix scripting capability standalone presentations with voice over and a music sound track can be incorporated for exhibits and creation of auto run CDs marketing the firm.

4.2.2 Site Analysis, Master Planning, and GIS

In an embodiment, the Quantum Matrix system can assume the role of a GIS system allowing the user to map GIS maps to a planar stack display mode. The Quantum Matrix system displays a dense array of voxel box/nodes to which are mapped pixel colors of the GIS bitmap. The Quantum Matrix system can then count and perform color histograming, area computation and statistical analysis of layer properties, and perform multiple regression analysis between GIS map features and layers. The user can download GIS maps from an already existing website and map the images to a nodal plane or the user can create a completely new GIS map using the Quantum Matrix CAD program's bitmap vector overlay capability.

Other types of documents can be integrated into a complete site analysis. For example, the user might go to the USGS (United States Geodetic Survey) website and down load a 3D DEM (Digital Elevation Model) of the project site, visit the towns GIS (Graphics Information System) and download aerial photographs and zoning site overlays. Site photographs and digital panoramic views of the site and surround context can be made and mapped to Quantum Matrix nodes.

4.2.3 Architectural Space Programming

Architectural space programming of a building is critical to the subsequent schematic design phase. Architectural programming takes a problem seeking approach, describing the various factors that influence the building design. The types, number, and sizes of spaces as well as the functional groupings of these spaces are recorded in a program brief, often in the form of a spreadsheet. In addition, there are textual descriptions of contextual issues and detailed functional descriptions of the buildings nature and purpose. In complex buildings such as hospitals, there are often large equipment databases and special engineering and construction requirements associated with the space program.

The spreadsheet, database and word processing applications of the Quantum Matrix system provide for access to and manipulation of these types of information. In the programming phase of a project, a space program would be created as a spreadsheet of rooms grouped by department and as functional sets. The Space program spreadsheet would be mapped to a node. Associated with each room, a database of equipment and furnishing for the space would be compiled and a relational link from space to equipment would be created. A relational database of the equipment would be mapped to a Quantum Matrix node. In the programming phase of an architectural project, flow diagrams are used to describe functional relationships and conceptual constructs for the subsequent design of the building; these too would be mapped to Quantum Matrix nodes. In each case, an application and document class object would be mapped to a Qube for each of these programmatic requirements.

In addition, during the programming phase an overall project schedule would be developed and used in all subsequent phases to monitor the progress and the internal project budgets of the architectural firm. The Gantt chart application would be used to create this project management tool.

4.2.4 Schematic Design

In the schematic design phase, drawings and CAD models are used extensively. Physical models and 3D digital models are used to create design concept representations of the building and its context. Sketches, hand drawn renderings and other paper documents are created upon which design development is based.

In this phase of a project paper sketches, model photos and drawings would be scanned into the image processing application of the Quantum Matrix system and mapped to nodes. In addition, CAD drawings and 3D models of the project would be created through the Quantum Matrix system or via an external system and mapped to Quantum Matrix nodes.

The stereoscopic feature of the Quantum Matrix system is a valuable tool in schematic design. The stereoscopic feature is a design visualization tool, allowing the designer, client and consultants to explore virtual models of the building before committing to a final design. Alternatives can be explored and evaluated. An iterative design process is much more meaningful when spatial changes can be made and compared to previous design options through virtual simulations.

4.2.5 Design Development

As a project moves into the design development phase, the scope of the project expands to include other technical and engineering disciplines. During this phase of the work, there are a multitude of CAD drawings, which are contingent on the architectural drawings. Each discipline must be coordinated with each of the others. The node in node feature of the Quantum Matrix system can be used extensively in this phase, allowing for a relational organization of engineering documents with respect to their architectural counter parts. The architectural drawings would be mapped into the Quantum Matrix Qube, each drawing corresponding to a Qube or node. Each of the engineering disciplines would in turn be a sub Quantum Matrix Qube mapped to a node in the architectural matrix. Each engineering discipline would operate in their own Quantum Matrix environment.

As the number of project participants increases, the number of coordination meetings and the project complexity multiplies exponentially. Meeting notes and minutes would be stored in the Quantum Matrix Qube and associatively linked with the engineering discipline's drawings. The engineering work during this phase is computationally intensive, employing spreadsheets to record results. Beam and column tables are computed, ducts and pipes dimensions are determined, chillers and boilers are sized, electrical buses and communication lines are sized and each element is located in a discipline specific drawing coordinated with the architectural drawings, as well as with each of the other engineering disciplines.

During the design development phase, the project management schedule would be accessed through the Quantum Matrix system, modified and expanded to accommodate the addition of structural, mechanical, electrical, plumbing, lighting and acoustical engineering disciplines and other consultants.

During the design development phase, the collaborative capabilities and Avatar features of the Quantum Matrix system are particularly useful. Imagine that a network meeting using the Quantum Matrix is being conducted between the architect and members of the design team. Avatar humanoids can serve as surrogates of the people participating in a project meeting from remote locations.

Specifically in the meeting, three design team members (e.g., the architect, the structural engineer and the mechanical engineer) are present. The problem is that a duct is passing through a beam in the boardroom and the beam is below the ceiling, exposed in the space. The architect and the consultants are each exploring simultaneously the same three-dimensional model of the building and have an Avatar representing him/her in the virtual building. The trio is connected via a conference call link and moves individually through the building at their desk on networked, stereoscopically equipped computer. The three Avatars are in the Quantum Matrix scenegraph space simultaneously. However, the individual Avatars are independent of each other and controlled by their respective primes through the Quantum Matrix's Remote Procedure Call (RPC) process. The Avatar's eyes are the camera position through which the meeting participant sees into the virtual space.

For example, the structural engineer may identify the problem and identify it for the other two participants. The other two users can right click the mouse and a popup window displaying a three dimensional x-ray radar view will appearing showing the location of all meeting Avatar participants.

The user clicks the mouse on the head of the Avatar agent that spoke and is immediately synchronized with the other Avatar's view. The team discusses the problem and decides on a new approach to spanning the boardroom. Rather than using steel girders with a wide spacing, they will reduce the spacing and use high strength steel joist to reduce the depth of the structure and simultaneously provide openings for the duct to pass through. The AI (Artificial Intelligence) Avatars can be instructed to remember the entire conversion for replay later and transcription to a text file of meeting notes, which are then inserted into the project record.

As highlighted above, Quantum Matrix system is powerful as a tool for collaboration, providing a mechanism for operation and remote control of the Quantum Matrix through its RPC and QScript messaging capability. These features allow remote presentations, collaborative design, and synchronization of copies of a Quantum Matrix network located on other computers across a network. A corporate Quantum Matrix network would be maintained on an enterprise server where all people working on the project would store and access their respective work. The built-in security features of the Quantum Matrix would provide control over who has access to the matrix, what parts of the database they can access, what parts are visible to them, and what they can make changes to. The corporate model would also make the maintenance and backup of the database easier. The Quantum Matrix's archive feature would facilitate the archival process. The Quantum Matrix's archival capability allows one to automatically create an archive to a disk drive, CD/DVD, or digital tape. Quantum Matrix content residing on websites can be extracted in their entirety and consolidated into single archive. This allows the user to be assured of access to critical information that might otherwise be lost, as websites come and go. An entire multi-volume Quantum Matrix, which exists across networks with of nodes in nodes, Quantum Matrices in a node, on different computers, on the Internet, on a corporate intranet, can be archived, and extracted into a single consolidated location. This is fundamental to mission critical operations.

4.2.6 Contract Documents

In an architectural project, the majority of the work is in the contract document phase. During this part of the project, the architect and his engineering team produce two documents: a set of construction drawings and the construction specifications. The work during this phase is based on all of the previous phases of work going back to the space program, site analysis, equipment requirements, schematic design concepts and the more detailed considerations of the design development phase. Continuity of data flow is critical to the execution this phase of work, which produces a legal set of contract documents defining explicitly every aspect of the building design. The Quantum Matrix system can provide a flexible and highly accessible database of documents of all types in a single, consistent, integrated environment.

4.2.6.1 Working Drawings

On large-scale projects, the number of working drawing sheets is often over one hundred. CAD drawings can be stored and accessed by the project team through the Quantum Matrix system interface. As drawing are created and modified, they are mapped and saved to Quantum Matrix Qube nodes. The project team can browse through the drawings of their own discipline as well as those of other team members to coordinate the work. The project manager can also monitor the progress of the work keeping a watchful an eye on oversights and omissions.

A project architect would open the architectural Quantum Matrix Qube and double click the mouse on the drawing they wish to view or work on. On completing the work session, the architect would save the document back to the Quantum Matrix file. If a new drawing were added to the Quantum Matrix, the user would map the new drawing to a Qube and would be prompted to save the modified matrix database on quitting the program session.

4.2.6.2 Specifications

The architectural project specification writer is a key member of the project team producing the second component of the contract document set. The specification writer requires access to all of the drawings and meeting notes produced by the project team. It is the specification writer's job to turn design intent into construction specifications for each component and element in the building. The working drawings define the location and details of assembly for the building and the specifications define what is to be assembled. The specifications document can top three hundred pages.

The specifications are normally based on the AIA (American Institute of Architects) and CSI (Construction Specification Institute) AIA specifications tool, MASTERSPEC. The parts of the specifications come from the various members of the project engineering and consultant team, and again this requires careful coordination with the drawings and among the architects and engineers. This coordination is greatly facilitated by the Quantum Matrix system. For example, the MASTERSPEC document is mapped to a node or Qube in the architectural project Quantum Matrix.

4.2.6.3 Project Scheduling

One of the biggest obstacles in running and architectural practice is resource and manpower scheduling. This requires that sophisticated project management and scheduling tool be available to the project architect and his team. The Quantum Matrix Scheduling component serves this critical function. Project schedules can be developed in the Quantum Matrix native format or schedules developed using such programs as Microsoft Project can be included. The Project schedule can be linked to a project accounting spreadsheet through the active link feature of the Quantum Matrix.

4.2.6.4 Cost Estimating

During the construction document phase of an architectural project, cost estimating comes to the forefront. For the architect and the client this is a critical point. It determines whether the project is within the client's budget and work can move ahead into the construction contract phase or whether cuts and modifications must be made to the design. The cost estimator uses the working drawings and specifications, the equipment database, and online tools such as RSMeans, which provide unit cost for various construction tasks. From these, the estimator performs a quantity survey and develops an estimate of the cost of the building in the form of a spreadsheet.

In an embodiment, the Quantum Matrix spreadsheet application tool could be used to create the estimate. The cost estimator can load a previously developed cost estimating spreadsheet template with pre-defined unit cost to speed the estimating process. A copy of the spreadsheet cost template is accessed from the firm's disk server and is mapped to a node in the project matrix. The template is used with quantity survey data extracted from the contract documents to estimate the cost of construction and general contract conditions. The base line estimate is then projected with an escalation rate to the date of construction. Building cost estimating is often an iterative process with alternative design approaches and construction phasing complicating the process. The integrated database provided by the Quantum Matrix makes the estimator's task much easier, it assures completeness, and enhances the accuracy of the architect's estimate.

4.2.6.5 Construction Bidding

As the client's agent in a standard construction bid process, the architect seeks bids from contractors. The contract documents are submitted to a third party group such as BIDs where contractors obtain copies of the working drawings and specifications and do their own estimates for the cost of construction. The key difference here is that the contractor will be bound to this cost as a legal contract when a contract is signed for construction. The quality of the construction documents is critical to the contractors decision regarding his profit range and contingency cost added to the base estimate price quoted.

In a design build contract situation, the contractor is already working with the architect and is a partner in the design process, working together with the architect, normally beginning with the schematic design phase of the work. In this case, the entire Quantum Matrix database would be available to the contractor for doing estimates. This method of building design and construction is used extensively in the private sector as it provides much tighter cost control and reduces the time to occupancy considerably. The Quantum Matrix is designed specifically to be a partner in this process.

4.2.6.6 Construction Observation

As the client's agent in a standard construction bid process, the architect observes the construction assuring the client that the contractor is adhering to the contract documents and performing the work accordance with the general conditions of the contract. The architect certifies the contractor's incremental invoices for work completed on the project. During this most important phase of the architect's work a site observer on larger projects may be constantly on the job; while on smaller projects, the architect may periodically visit the construction site. During construction observation, the architect takes construction photographs of the building progress. These site photographs could be mapped to a Quantum Matrix Qubes and/or nodes, documenting the construction progress on a day-to-day basis.

Since the Quantum Matrix Qube can accept dynamic data input through its signal processing capability, a web camera could be installed on the construction site and linked to a Quantum Matrix Qube node. The feed would be mapped to the node. This connection would allow the architect to control the camera to observe remotely the work being done at any given moment. The camera could also be a stereoscopic dual head device, which records binocular images. This would allow the architect to experience the site in a highly realistic way with depth of field. The stereoscopic camera output could be shown through the Quantum Matrix's stereoscopic display capability.

4.2.6.7 Shop Drawings

During the construction phase of an architectural project, shop drawings are submitted to the architect for verification that they meet the design intent of the architect and comply with the contract documents. These drawings are submitted by product suppliers who are supplying building components to the contractor. These drawings are checked by the architect and compared to the working drawings and specifications. The shop drawings are red lined where they do not comply with the contract documents and a resubmission is requested. In the case where the shop drawing is correct it would be scanned into the Quantum Matrix and mapped to a node as a part of the construction record.

The architect would use a Quantum Matrix Qube to access both drawings and specification to assure that the shop drawing meets the contract conditions.

4.2.6.8 Change Orders and Addendums

As with all human endeavors errors and omission do occur in the construction of a building. The architect is obligated to correct the condition and a change order is issued. The architect evaluates the necessary change in the context of the actual construction condition and with respect to the working drawings and specifications. The Quantum Matrix database contains all of this information in an integrated format that allows the architect to make the most informed and expedient change to the design. Drawings and specification changes are made and supplied to the contractor. The contractor submits a cost for the change to the architect who in turn consults with the owner before authorizing the change.

The change order drawings and specifications can be mapped to one or more nodes in the construction Quantum Matrix as a part of the project record.

4.2.6.9 Assembly Methods

During the construction of a building, the Quantum Matrix's ability to store and to display videos can be used to show workers how to assemble complex component parts of the building. Further, if the videos were recorded in stereo they can be replayed in stereo giving a heretofore unheard of construction tool to builders. Manufacturers could also supply videos of products and assembly procedures, which could be added to the Quantum Matrix database.

A copy of the complete Quantum Matrix network for the building under construction would be present on the construction site and available to the contractor and site superintendent, and the various trades. The contractor could then extend the Quantum Matrix database to include construction sequencing and logistics information in the form of spreadsheets and Gantt charts and text files.

4.2.6.10 As Built Drawings

A natural use of the Quantum Matrix system and an extension of the existing document database are as built drawings. Rather than creating a new set of drawings of the building for the as built documentation, the contractor could modify the CAD drawings that are already in the Quantum Matrix database.

This would assure a more complete and inclusive set of as built drawings to be turned over to the building owner. In addition, the as built drawings stored in the project Quantum Matrix in addition would give the owner a comparative record of the differences between the contract documents and what actually was built.

Instead of turning over merely a set of as built drawings, the contractor and the architect could give the owner an added bonus, a user manual for the building. The entire Quantum Matrix Qube could serve as the foundation for a digital user manual. The architect could offer this service to the client for a fee in partnership with the contractor. The manual for HVAC equipment, security systems, window washing equipment, movable partitions, etc could be mapped to nodes in a user manual Quantum Matrix database.

4.2.6.11 Occupancy and Maintenance

In current practice, the owner is given the keys to the building and a set of as built drawings and left to figure out how to live with the building by himself. If the owner were to be given a copy of the Quantum Matrix network as a user manual, they would have a complete history of the project as well as knowing the designers intentions with such design features as sun screens, day lighting consideration in the use of blinds, roof warranty information, light re-lamping information, etc.

Moreover, the building owner and the building superintendent could continue to use and extend the Quantum Matrix as a maintenance and operations tool for the duration of the occupancy life of the building.

4.2.7 Summary

The design and construction of a building is a daunting and complex process, complicated by the numbers of people involved, corporate cultures, and financial issues. As described above, the Quantum Matrix system can be used to effectively manage this complex process and to make the collaboration inherent in the process more manageable.

The Quantum Matrix system can serve as a collaborative bridge between the various parties involved. In the typical architectural design project, many discrete and distinct disciplines exist, each with a different focus and often-different professional paradigms. What brings these discordant notes into harmony is their point of convergence with respect to intervention in the environment, both man made and natural. These activities range from the planning and management of natural resources to the design and construction of individual buildings and in scale from the planning of whole cities to the design of furniture and fixtures.

Each of these disciplines holds in common the need to visualize what does not yet exist and to judge the impact of decisions, policies, and designs prior to their implementation and to simulate the effect of interventions made to the environment in which we exist. A single building can cost several billion dollars as in the case of the World Trade Center. A city costs trillions of dollars, and a forest is priceless. Because of the scale, complexity and cost of the problem domain in which the discipline of architecture operates, it is often not possible to directly test the implications of design and planning decisions. And yet, a designer must choose between alternative designs, concepts, construction methods and product prototypes.

The key to making decisions is in previewing the results. The people who inhabit the cities, work in the building buildings, and live in the homes designed by architects and engineers need to clearly understand what planners, designers and contractors propose. Most lay people do not understand the documents used for planning and building, nor can they imagine in their mind's eye, the three-dimensional object that would be the result. The Quantum Matrix system, in conjunction with the its stereoscopic capabilities, can empower constituents to understand spatially the cities in which they live, a family to understand an architectural plan for a house, and a physically handicapped individual to test the accessibility of a building.

4.3 Other Applications

The Quantum Matrix system can be used in a wide variety of other application contexts. For commercial applications, the Quantum Matrix offers one consistent medium for execution and integration of disparate applications as well as disparate data types where the integration, manipulation, display, relational association and computation capability is available to the user through the QUIP and QScript messaging systems. All these features may be utilized without the user needing to be able to write code. In addition, all these features can be utilized on the desktop, remotely or collaboratively over networks, creating the opportunity for efficiency and creativity in a wide range of commercial, academic and government sectors.

For example, the Quantum Matrix system can be used in law enforcement and other security applications. In these application (e.g., the FBI, the Immigration and Naturalization Service or Homeland Security), the Quantum Matrix system can serve both as an active communication vehicle and a single medium for maintaining vast numbers of files for all manner of information. That information might include voice prints, audio and video evidence, fingerprints, writings, photographs, documentary evidence, reports, etc, all of which may be available for collaborative use, information sharing, and updating both locally and across networks. This incredible volume of data can be organized using Quantum Matrix Qube(s) using techniques similar to those described above in the architectural example.

In the health care, scientific and medical research sectors, not only would the features described above be useful, but in addition, the node within node feature and malleability of the representational structure of the Quantum Matrix system (e.g., binary large object or point cloud feature) join to permit the scientist, health care provider or medical research user to map the physical features of the body, body parts, organs or other structures to the surface of a node and drill below that surface to as many levels as required to explore the underlying structures, functions, relationships, etc. These visual objects can also be joined with active analytical inputs or other active systems for modeling response, behavior, or joined with other organs or structures to actively demonstrate and study functional relationships as inputs to each organ or structure are modified, etc.

In commercial sectors requiring structural design, materials planning, construction and capital planning, such as architecture or automotive design, the Quantum Matrix system enables the user to display and modify design characteristics using the CAD module, and using the node within node feature, attach both material selections and associated capital and labor cost to each design element. For example, by activating a design element, the user can also examine the proposed material, and/or associated cost. Similarly, the user may modify a design element, and utilizing QScript, create a relationship between the design display node, the materials node and the cost node so that the proposed change will automatically change the material selection as well as the capital cost and cost of labor report. The advantage to the user of the invention is that all these functions and more can be achieved in one medium.

In the telecom sector, network surveillance of many different network and service component types require coordinated use of multiple software types associated with the various network and service components. The Quantum Matrix system enables a telecommunications service provider to use the single Qube to run the many software types for the many different networks and service component types, simplifying surveillance and surveillance training and reducing cost.

In the broadcast and video entertainment sector, the Quantum Matrix could serve as an interactive movie or TV guide, allowing the viewer to run video clips mapped to nodes, select a movie or show, and in the case of pay per view, order the selection. This could be achieved by including aspects of the Quantum Matrix system in chip or similar medium and integrating the chip into the cable or satellite video service provider's converter box. Similarly, in the retail sector the invention can serve as a form of "yellow pages" featuring still photos, full motion video and audio advertising for retailers, with drill downs for products and services (using the node in node feature) together with active links between the retailer's published telephone number and the live signal processing function of the invention to enable the user to click on the phone number and place a call to the retailer from the user's work station.

The compatibility of the Quantum Matrix with the CAVE and its ability to display two dimensional visual objects in a desk top environment also forecast a medium term and long term business and consumer opportunity. As noted above, the Quantum Matrix system has real time signal processing capability. This combination of three dimensional display and live signal processing features suggests that by including the Quantum Matrix capabilities in a chip or similar medium and integrating that chip into the next generation of desk top computers and/or cable converter boxes, media companies can begin to offer residential consumers a mix of conventional two dimensional as well as 3D video games and entertainment, offered either through DVD or in real time.

All or each of the commercial applications may be used with the invention's Avatars as well. As would be appreciated by one skilled in the art, the examples of applications described above represent only a subset of potential uses and are not meant to be exhaustive.

5.0 Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer-based method of manipulating data modeling comprising:
   (a) organizing a multi-dimensional structure including a plurality of nodes dispersed throughout the interior of the multi-dimensional structure, wherein each node represents one of a data, an absence of data, and a set of nodes and has a three-dimensional coordinate, wherein the three-dimensional coordinate is able to define any location within the interior of the multi-dimensional structure;
   (b) defining one or more associations between nodes via a linked list, wherein a first node in the plurality of nodes stores a data object and a pointer to a second node in the plurality of nodes;
   (c) displaying the multi-dimensional structure three dimensionally, wherein each node is displayed at a location in a three-dimensional space defined by the corresponding three-dimensional coordinate for the node;
   (d) receiving navigational input from a user and in response, navigating the multi-dimensional structure including applying, in response to the navigational input, one of a relational logic, a Boolean algebra, and a scripting language on one or more nodes, data, and the associations to produce a resultant multi-dimensional structure including a set of nodes; and
   (e) updating the displayed multi-dimensional structure based on the resultant set of nodes.

2. The method of claim 1, wherein step (d) includes:
   (1) using a plane to divide the multi-dimensional structure into a first part and a second part; and
   (2) selecting one of the first part and the second part.

3. The method of claim 2, wherein step (d) further comprises:
   (3) hiding the unselected part.

4. The method of claim 1, wherein step (a) comprises creating the multi-dimensional structure automatically from a file system wherein a node represents one of a file and a directory, wherein a node representing a directory also represents a set of nodes in the multi-dimensional structure.

5. The method of claim 1, wherein the data comprises one of static value and a dynamically changing value.

6. The method of claim 1, wherein a plurality of nodes and data of the multi-dimensional structure are stored on one of a remote computer and storage device.

7. The method of claim 1, wherein step (c) comprises displaying the multi-dimensional structure using stereoscopic display.

8. The method of claim 1, wherein step (c) comprises displaying an Avatar and step (d) comprises the Avatar navigating the multi-dimensional structure.

9. The method of claim 1, further comprising:
   receiving configuration data from a user, wherein the configuration data defines a shape for the multi-dimensional structure.

10. The method of claim 1, wherein step (d) comprises translating along an x-axis, y-axis, and z-axis in the three dimensional space and rotating to change a roll, pitch, and yaw.

11. A system of manipulating data modeling comprising:
    a processor; and
    a memory coupled to the processor,
    the system further comprising:
    organizing means for organizing a multi-dimensional structure including a plurality of nodes dispersed throughout the interior of the multi-dimensional structure, wherein each node represents one of a data, an absence of data, and a set of nodes and has a three-dimensional coordinate, wherein the three-dimensional coordinate is able to define any location within the interior of the multi-dimensional structure;
    defining means for defining one or more associations between nodes via a linked list, wherein a first node in the plurality of nodes stores a data object and a pointer to a second node in the plurality of nodes;
    displaying means for displaying the multi-dimensional structure three dimensionally, wherein each node is displayed at a location in a three-dimensional space defined by the corresponding three-dimensional coordinate for the node; and
    receiving means for receiving navigational input from a user;
    navigating means for navigating the multi-dimensional structure, in response to the received navigational input, including means for applying one of a relational logic, a Boolean algebra, and a scripting language on one or more nodes, data, and the associations to produce a resultant multi-dimensional structure including a set of nodes; and
    updating means for updating the displayed multi-dimensional structure based on the resultant set of nodes.

12. The system of claim 11, wherein the navigating means comprises:
    using means for using a plane to divide the multi-dimensional structure into a first part and a second part; and
    selecting means for selecting one of the first part and the second part.

13. The system of claim 12, further comprising:
hiding means for hiding the unselected part.

14. The system of claim 11, wherein the organizing means comprises creating means for creating the multi-dimensional structure automatically from a file system wherein a node represents one of a file and a directory, wherein a node representing a directory also represents a set of nodes in the multi-dimensional structure.

15. The system of claim 11, further comprising:
means for receiving configuration data from a user, wherein the configuration data defines a shape for the multi-dimensional structure.

16. The method of claim 11, wherein the navigating means includes a means for translating along an x-axis, y-axis, and z-axis in the three dimensional space and rotating to change a roll, pitch, and yaw.

17. A computer program product comprising a computer useable storage medium having control logic stored therein, the control logic enabling the modeling and manipulation of data, the computer program product comprising:
first computer readable program code means for enabling a processor to organize a multi-dimensional structure including a plurality of nodes dispersed throughout the interior of the multi-dimensional structure, wherein each node represents one of a data, an absence of data, and a set of nodes and has a three-dimensional coordinate, wherein the three-dimensional coordinate is able to define any location within the interior of the multi-dimensional structure;
second computer readable program code means for enabling a processor to define one or more associations between nodes via a linked list, wherein a first node in the plurality of nodes stores a data object and a pointer to a second node in the plurality of nodes;
third computer readable program code means for enabling a processor to display the multi-dimensional structure three dimensionally, wherein each node is displayed at a location in a three-dimensional space defined by the corresponding three-dimensional coordinate for the node;
fourth computer readable program code means for enabling a processor to receive navigational input from a user and in response, to navigate the multi-dimensional structure, including a fifth computer readable program code means for applying one of a relational logic, a Boolean algebra, and a scripting language on the nodes, data, and the associations to produce a resultant multi-dimensional structure including a third set of nodes; and
sixth computer readable code means for enabling a processor to update the displayed multi-dimensional structure based on the resultant set of nodes.

18. The computer program product of claim 17, wherein the fourth computer readable program code means comprises:
seventh computer readable program code means for enabling a processor to use a plane to divide the multi-dimensional structure into a first part and a second part; and
eighth computer readable program code means for enabling a processor to select one of the first part and the second part.

19. The computer program product of claim 18, wherein the fourth computer readable program code means further comprises:
ninth computer readable program code means for enabling a processor to hide the unselected part.

20. The computer program product of claim 17, wherein the first computer readable program code means comprises a seventh computer readable program code means for enabling a processor to create the multi-dimensional structure automatically from a file system wherein a node represents one of a file and a directory, wherein a node representing a directory also represents a set of nodes in the multi-dimensional structure.

21. The computer program product of claim 17, wherein the data comprises of one of static value and a dynamically changing value.

22. The computer program product of claim 17, wherein a plurality of nodes and data of the multi-dimensional structure are stored on one of a remote computer and storage device.

23. The computer program product of claim 17, wherein the third computer readable program code means comprises a seventh computer readable program code means for enabling a processor to display the multi-dimensional structure using stereoscopic display.

24. The computer program product of claim 17, wherein the third computer readable program code means comprises a seventh computer readable program code means for enabling a processor to display an Avatar and the fourth computer readable program code means comprises a eighth computer readable program code means enabling a processor to navigate the multi-dimensional structure by the Avatar.

25. The computer program product of claim 17, further comprising:
seventh computer readable program code means for enabling a processor to receive configuration data from a user, wherein the configuration data defines a shape for the multi-dimensional structure.

26. The method of claim 17, wherein the fourth computer readable program code means includes a seventh computer readable code means for translating along an x-axis, y-axis, and z-axis in the three dimensional space and rotating to change a roll, pitch, and yaw.

* * * * *